(12) United States Patent
Hart et al.

(10) Patent No.: US 11,016,680 B2
(45) Date of Patent: *May 25, 2021

(54) REFLECTIVE, COLORED, OR COLOR-SHIFTING SCRATCH RESISTANT COATINGS AND ARTICLES

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/229,673

(22) Filed: Dec. 21, 2018

(65) Prior Publication Data

US 2019/0179550 A1 Jun. 13, 2019

Related U.S. Application Data

(62) Division of application No. 15/973,790, filed on May 8, 2018, now Pat. No. 10,162,084.

(Continued)

(51) Int. Cl.
*G06F 3/06* (2006.01)
*G02C 7/10* (2006.01)

(Continued)

(52) U.S. Cl.
CPC ............ *G06F 3/0631* (2013.01); *C03C 3/085* (2013.01); *C03C 3/091* (2013.01);

(Continued)

(58) Field of Classification Search
None
See application file for complete search history.

(56) References Cited

U.S. PATENT DOCUMENTS 4,851,095 A 7/1989 Scobey et al.
5,054,903 A 10/1991 Jannard et al.
(Continued)

FOREIGN PATENT DOCUMENTS

WO 2014182639 A1 11/2014
WO 2016018490 A1 2/2016
WO 2016138195 A1 9/2016

OTHER PUBLICATIONS

Charles Kittel, "Introduction to Solid State Physics." Seventh Edition, John Wiley & Sons, Inc., NY, 1996, pp. 611-627.

(Continued)

*Primary Examiner* — Ramsey Zacharia

(57) ABSTRACT

Embodiments of durable, scratch resistant articles are described. The articles have coatings that provide specific reflectance, transmission, and/or color properties, as well as high hardness. Some embodiments have low reflectance, and high color. Some embodiments have high reflectance and neutral color. Some embodiments have high reflectance and high color. In some embodiments, the articles may be sunglasses with an optical coating, a scratch resistant mirror with an optical coating, or a consumer electronic product with an optical coating.

29 Claims, 137 Drawing Sheets

Related U.S. Application Data

(60) Provisional application No. 62/614,733, filed on Jan. 8, 2018, provisional application No. 62/503,051, filed on May 8, 2017.

(51) Int. Cl.

| | | |
|---|---|---|
| *G02B 1/115* | (2015.01) | |
| *G02B 1/14* | (2015.01) | |
| *C03C 17/34* | (2006.01) | |
| *C03C 3/085* | (2006.01) | |
| *C03C 3/091* | (2006.01) | |
| *C03C 21/00* | (2006.01) | |

(52) U.S. Cl.
CPC ........ *C03C 17/3435* (2013.01); *C03C 21/002* (2013.01); *G02B 1/115* (2013.01); *G02B 1/14* (2015.01); *G02C 7/107* (2013.01); *G06F 3/0604* (2013.01); *G06F 3/067* (2013.01); *G06F 3/0656* (2013.01); *C03C 2217/734* (2013.01); *C03C 2217/78* (2013.01)

(56) References Cited

U.S. PATENT DOCUMENTS

| | | | |
|---|---|---|---|
| 5,637,353 | A | 6/1997 | Kimock et al. |
| 6,379,803 | B1 | 4/2002 | Nakamura et al. |
| 7,452,076 | B2 | 11/2008 | De Ayguavives et al. |
| 8,312,739 | B2 | 11/2012 | Lee et al. |
| 8,974,896 | B2 | 3/2015 | Peterson et al. |
| 9,335,444 | B2 | 5/2016 | Hart et al. |
| 9,488,852 | B2 | 11/2016 | Cado et al. |
| 9,663,852 | B2 | 5/2017 | Peterson et al. |
| 9,772,509 | B2 | 9/2017 | Bolshakov et al. |
| 10,162,084 | B2 * | 12/2018 | Hart ........................ G06F 3/067 |
| 2007/0030569 | A1 | 2/2007 | Lu et al. |
| 2010/0009154 | A1 | 1/2010 | Allan et al. |
| 2014/0113083 | A1 | 4/2014 | Lee et al. |
| 2014/0315014 | A1 | 10/2014 | Peterson et al. |
| 2014/0334006 | A1 | 11/2014 | Adib et al. |
| 2014/0335335 | A1 | 11/2014 | Koch, III et al. |
| 2016/0147085 | A1 | 5/2016 | Arrouy et al. |
| 2017/0075039 | A1 | 3/2017 | Hart et al. |
| 2017/0276838 | A1 | 9/2017 | Oishi et al. |

OTHER PUBLICATIONS

Fischer-Cripps; "Critical Review of Analysis and Interpretation of Nanoindentation Test Date"; Surface & Coatings Technology, 200, 4153-4165 (2006).

Harding et al; "Cracking During Indentation and Its Use in the Measurement of Fracture Toughness"; Mat. Res. Soc. Symp. Proc.; Vo.. 356, 1995, pp. 663-668.

Hay et al; "Continuous Stiffness Measurement During Instrumented Indentation Testing"; Experimental Techniques, 34 (3) 86-94 (2010).

https://en.wikipedia.org/wiki/Optical_coating: see paragraph on dielectric coating.

James F. Shackelford, "Introduction to Materials Science for Engineers,"Sixth Edition, Pearson Prentice Hall, New Jersey, 2005, pp. 404-418.

Oliver et al; "An Improved Technique for Determining Hardness and Elastic Modulus Using Load and Displacement Sensing Indentation Experiments"; J. Mater. Res., vol. 7, No. 6, 1992, 1564-1583.

Oliver et al; "Measurement of Hardness and Elastic Modulus by Instrument Indentation: Advances in Understanding and Refinements to Methodology"; J. Mater. Res., vol. 19, No. 1, 2004, 3-20.

Smart and Moore; "Solid State Chemistry, An Introduction," Chapman & Hall University and Professional Division, London, 1992, pp. 136-151.

Invitation to Pay Additional Fees of the International Searching Authority; PCT/US2018/031558; dated Mar. 26, 2019; 16 Pages; European Patent Office.

\* cited by examiner

REFLECTIVE, COLORED, OR COLOR-SHIFTING SCRATCH RESISTANT COATINGS AND ARTICLES

CROSS-REFERENCE TO RELATED APPLICATIONS

This application is a divisional application and claims the benefit of priority under 35 U.S.C. § 120 of U.S. application Ser. No. 15/973,790 filed on May 8, 2018 and issued as U.S. Pat. No. 10,162,084 on Dec. 25, 2018, which in turn, claims the benefit of priority under 35 U.S.C. § 119 of U.S. Provisional Application Ser. No. 62/614,733 filed on Jan. 8, 2018 and U.S. Provisional Application Ser. No. 62/503,051 filed on May 8, 2017, the contents of each of which are relied upon and incorporated herein by reference in their entireties.

BACKGROUND

The disclosure relates to durable and scratch resistant articles and methods for making the same, and more particularly to articles with multi-layer interference stacks exhibiting abrasion resistance and scratch resistance.

Known multi-layer interference stacks are susceptible to wear or abrasion. Such abrasion can compromise any optical performance improvements achieved by the multi-layer interference stack. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles. Nitrides and diamond-like coatings may exhibit high hardness values but such materials do not exhibit the transmittance needed for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials experiencing abrasion damage can also oxidize, which further degrades the durability of the coating.

Known multi-layer interference stacks are also susceptible to scratch damage and, often, even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, such as sub-surface cracking, frictive cracking, chipping and/or wear. Evidence suggests that a majority of such scratches and other visible damage is caused by sharp contact that occurs in a single contact event. Once a significant scratch appears, the appearance of the article is degraded since the scratch causes an increase in light scattering, which may cause significant reduction in optical properties. Single event scratch damage can be contrasted with abrasion damage. Single event scratch damage is not caused by multiple contact events, such as reciprocating sliding contact from hard counter face objects (e.g., sand, gravel and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

Accordingly, there is a need for new multi-layer interference stacks, and methods for their manufacture, which are abrasion resistant, scratch resistant and have improved optical performance.

SUMMARY

The present disclosure describes embodiments directed to durable and scratch resistant articles that include a multi-layer interference stack. In some embodiments, the article includes a substrate and an optical coating disposed on the major surface forming an outer surface. In some embodiments, the optical coating includes an multi-layer interference stack.

In some embodiments, the embodiments of any of the preceding paragraphs may have low reflectance and high color, high reflectance and high color, or high reflectance and low color. The articles may exhibit high or low color shift depending on viewing angle.

In some embodiments, an article includes a durable and scratch resistant optical coating. The article includes a substrate having a major surface. The optical coating is disposed on the major surface. The optical coating comprises a multilayer interference stack, the multilayer interference stack having an outer surface opposite the major surface. The article exhibits a maximum hardness of about 12 GPa or greater as measured on the outer surface by a Berkovich Indenter Hardness Test along an indentation depth of about 50 nm or greater, e.g., about 100 nm to about 500 nm. The article exhibits a single side average photopic light reflectance measured at the outer surface as measured at near normal incidence of about 10% or less over an optical wavelength regime in the range from about 400 nm to about 700 nm. The single sided reflectance may be 9% or less, 8% or less, 7% or less, 6% or less, 5% or less, 4% or less, 3% or less, or 2% or less. The single sided reflectance may be as low as 0.1%. The article exhibits article reflectance color coordinates in the (L*, a*, b*) colorimetry system for at least one incidence angle from 0 degrees to 90 degrees under an International Commission on Illumination illuminant exhibiting a reference point color shift of more than about 12 from a reference point as measured at the outer surface, the reference point comprising at least one of the color coordinates (a*=0, b*=0), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{((a^*_{article}-a^*_{substrate})^2+(b^*_{article}-b^*_{substrate})^2)}$. The color shift from a reference point may be more than about 14, more than about 16, more than about 18, more than about 20, more than about 22, or more than about 24. The color shift from a reference point may be 100 or less.

In some embodiments, an article includes a durable and scratch resistant optical coating. The article includes a substrate having a major surface. The optical coating is disposed on the major surface. The optical coating comprises a multilayer interference stack, the multilayer interference stack having an outer surface opposite the major surface. The article exhibits a maximum hardness of about 12 GPa or greater as measured on the outer surface by a Berkovich Indenter Hardness Test along an indentation depth of about 50 nm or greater, e.g., about 100 nm to about 500 nm. The article exhibits at least one of: (1) a single side photopic average light reflectance of about 12% or about 14% or more, and (2) a single side maximum reflectance of about 12% or more, or about 14% or more, measured at the outer surface for at least one near normal incident angle over an optical wavelength regime in the range from about 400 nm to about 700 nm. The single side photopic average light reflectance and/or the single side maximum reflectance may be about 12% or more, 14% or more, 20% or more, 30% or more, 40% or more, 50% or more, 60% or more, 70% or more, 80% or more, or 90% or more. The single side photopic average light reflectance and/or the single side maximum reflectance may be as high as 99.9%.

In some embodiments, the embodiments of any of the preceding paragraphs may include articles that exhibit article reflectance color coordinates in the (L*, a*, b*) colorimetry system for at least one incidence angle from 0 degrees to 90 degrees under an International Commission on Illumination illuminant exhibiting a reference point color shift of more than about 12 from a reference point as measured at the outer surface, the reference point comprising at least one of the color coordinates (a*=0, b*=0), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{(a^*_{article}-a^*_{substrate})^2+(b^*_{article}-b^*_{substrate})^2)}$. The color shift from a reference point may be more than about 14, more than about 16, more than about 18, more than about 20, more than about 22, or more than about 24 The color shift from a reference point may be 100 or less.

In some embodiments, the embodiments of any of the preceding paragraphs may include articles that exhibit article reflectance color coordinates in the (L*, a*, b*) colorimetry system for all incidence angles from 0 degrees to 90 degrees under an International Commission on Illumination illuminant exhibiting a reference point color shift of less than about 12 from a reference point as measured at the outer surface, the reference point comprising at least one of the color coordinates (a*=0, b*=0), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{((a^*_{article}-a^*_{substrate})^2+(b^*_{article}-b^*_{substrate})^2)}$. The color shift from a reference point may be less than about 10, less than about 8, less than about 6, less than about 4, less than about 2, or greater than 6 but less than 12. The color shift from a reference point may be as low as zero.

In some embodiments, the embodiments of any of the preceding paragraphs may include articles that exhibit scratch resistance by exhibiting a maximum hardness of about 12 GPa or greater, 14 GPa or greater, 16 GPa or greater, 18 GPa or greater, or 20 GPa or greater as measured by a Berkovich Indenter Hardness Test, as described herein. The articles may exhibit a maximum hardness of 50 GPa or less. The maximum hardness may be measured along an indentation depth of about 50 nm or greater, e.g. from about 50 nm to about 300 nm, from about 50 nm to about 400 nm, from about 50 nm to about 500 nm, from about 50 nm to about 600 nm, from about 50 nm to about 1000 nm or from about 50 nm to about 2000 nm, or 100 nm or greater, e.g. from about 100 nm to about 300 nm, from about 100 nm to about 400 nm, from about 100 nm to about 500 nm, from about 100 nm to about 600 nm, from about 100 nm to about 1000 nm or from about 100 nm to about 2000 nm, on the outer surface. Additional hardnesses and indentation depths are described herein.

In some embodiments, the embodiments of any of the preceding paragraphs may include articles that exhibit an abrasion resistance as measured on the outer surface after a 500-cycle abrasion using a Taber Test, as described herein. In one or more embodiments, the article exhibits an abrasion resistance (as measured on the outer surface) comprising about 1% haze or less, as measured using a haze meter having an aperture, wherein the aperture has a diameter of about 8 mm. This haze may be as low as zero. In one or more embodiments, the article exhibits an abrasion resistance (as measured on the outer surface) comprising an average roughness Ra, as measured by atomic force microscopy, of about 12 nm or less. This average roughness may be as low as 0.01 nm. In one or more embodiments, the article exhibits an abrasion resistance (as measured on the outer surface) comprising a scattered light intensity of about 0.05 (in units of 1/steradian) or less, at a polar scattering angle of about 40 degrees or less, as measured at near normal incidence in transmission using an imaging sphere for scatter measurements, with a 2 mm aperture at 600 nm wavelength. This scattered light intensity may be as low as zero (1/steradian). In some instances, the article exhibits an abrasion resistance (as measured on the outer surface) comprising a scattered light intensity of about 0.1 (in units of 1/steradian) or less, at a polar scattering angle of about 20 degrees or less, as measured at near normal incidence in transmission using an imaging sphere for scatter measurements, with a 2 mm aperture at 600 nm wavelength. This scattered light intensity may be as low as zero (1/steradian).

In some embodiments, the embodiments of any of the preceding paragraphs may include articles that exhibit a photopic average light transmission of about 5% to about 50% over an optical wavelength regime from about 400 nm to about 700 nm. The articles may also exhibit article transmittance color coordinates in the (L*, a*, b*) colorimetry system at near normal incidence under an International Commission on Illumination illuminant that exhibit a reference point color shift of less than about 12 from a reference point as measured at the outer surface, the reference point comprising at least one of the color coordinates (a*=0, b*=0) and the transmittance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{((a^*_{article}-a^*_{substrate})^2+(b^*_{article}-b^*_{substrate})^2)}$. The color shift from a reference point may be less than about 10, less than about 8, less than about 6, less than about 4, or less than about 2. The color shift from a reference point may be as low as zero. In the examples, some of the color shift is due to the effect of the multi-layer interference stack, and some is due to absorption by the glass substrate. Because the glass substrate is absorbing and causes some color shift, the color shift values in many of the examples do not go much below 10 in transmission. Lower values for color shift may be obtained by using a non-absorbing or lower absorbing glass substrate.

In some embodiments, the embodiment of the preceding paragraph may exhibit the color shift described at all incidence angles from 0 degrees to 90 degrees.

In some embodiments, the embodiments of any of the preceding paragraphs may include articles that exhibit a reflected angular color shift of about 12 or more for at least one incident illumination angle that is 20 degrees or greater, at least one angle between 20 and 80 degrees, or at least one angle between 20 and 60 degrees, referenced to normal incidence, under an International Commission on Illumination illuminant selected from the group consisting of A series illuminants, B series illuminants, C series illuminants, D series illuminants, and F series illuminants, wherein angular color shift is calculated using the equation $\sqrt{((a*2-a*1)^2+(b*2-b*1)^2)}$, with a*1, and b*1 representing the coordinates of the article when viewed at normal incidence and a*2, and b*2 representing the coordinates of the article when viewed at the incident illumination angle. The reflected angular color shift referenced to normal incidence may be about 14 or more, about 16 or more, about 18 or more, about 20 or more, about 22 or more, or about 24 or more. The reflected angular color shift referenced to normal incidence may be 100 or less.

In some embodiments, the embodiments of any of the preceding paragraphs may include articles that exhibit a reflected angular color shift of about 12 or less for at least one incident illumination angle that is 20 degrees or greater, referenced to normal incidence, under an International Commission on Illumination illuminant selected from the group consisting of A series illuminants, B series illuminants, C series illuminants, D series illuminants, and F series illuminants, wherein angular color shift is calculated using the equation $\sqrt{((a*2-a*1)^2+(b*2-b*1)^2)}$, with a*1, and b*1 representing the coordinates of the article when viewed at normal incidence and a*2, and b*2 representing the coordinates of the article when viewed at the incident illumination angle. The reflected angular color shift referenced to normal incidence may be about 10 or less, about 8 or less, about 6 or less, greater than 6 but less than 12, about 5 or less, about 4 or less, about 2 or less. The reflected angular color shift referenced to normal incidence may be as low as zero. In some embodiments, the reflected angular color shift referenced to normal incidence may be for all incident illumination angles from 20 degrees to 60 degrees, for all incident illumination angles from 0 degrees to 60 degrees, or for all incident illumination angles from 0 degrees to 90 degrees.

In some embodiments, the embodiments of any of the preceding paragraphs may include articles wherein the substrate has a hardness less than the maximum hardness of the article.

In some embodiments, the embodiments of any of the preceding paragraphs may include articles wherein the multi-layer interference stack comprises a plurality of layers, wherein the plurality of layers comprises a first low RI layer, and a second high RI layer.

In some embodiments, the embodiments of any of the preceding paragraphs may include articles wherein the multilayer interference stack comprises a plurality of periods such that the first low RI layer and the second high RI layer alternate.

In some embodiments, the embodiments of any of the preceding paragraphs may include a multi-layer interference stack comprising a plurality of layers. For example, in some embodiments, the multi-layer interference stack includes a period comprising a first low RI layer and a second high RI layer. The period may include a first low RI layer and a second high RI disposed on the first low RI layer or vice versa. In some embodiments, the period may include a third layer. The multi-layer interference stack may include a plurality of periods such that the first low RI layer and the second high RI layer alternate. The multi-layer interference stack can include up to about 6 periods, up to about 10 periods, up to about 14 periods, or up to about 20 periods.

In some embodiments, the embodiments of any of the preceding paragraphs may include articles wherein the single side average light reflectance is about 2% or less over the optical wavelength regime at a viewing angle in the range from about 6 degrees to about 40 degrees. This single side average light reflectance may be as low as zero.

In some embodiments, the embodiments of any of the preceding paragraphs may include an amorphous substrate or a crystalline substrate. An amorphous substrate includes glass that may be selected from the group consisting of soda lime glass, alkali aluminosilicate glass, alkali containing borosilicate glass and alkali aluminoborosilicate glass. In some embodiments, the glass may be strengthened and may include a compressive stress (CS) layer with a surface CS of 250 MPa or more extending within the strengthened glass from a surface of the chemically strengthened glass to a depth of compression (single sided) of about 10 μm or more. This surface CS may be 2 GPa or less. As used herein the term "glass" is meant to include any material made at least partially of glass, including glass, glass-ceramics, and sapphire. "Glass-ceramics" include materials produced through controlled crystallization of glass. In embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

In some embodiments, the embodiments of any of the preceding paragraphs may include articles wherein the amorphous substrate comprises a glass selected from the group consisting of soda lime glass, alkali aluminosilicate glass, alkali containing borosilicate glass and alkali aluminoborosilicate glass.

In some embodiments, the embodiments of any of the preceding paragraphs may include articles further comprising an easy-to-clean coating, a diamond-like coating, a scratch-resistant coating, or a combination thereof disposed on the optical coating. Such coatings may be disposed on the multi-layer interference stack or between layers of the multi-layer interference stack.

In some embodiments, the embodiments of any of the preceding paragraphs may include articles wherein the optical coating comprises a scratch resistant layer having a thickness in the range from about 200 nanometers to about 3 micrometers, or from about 500 nm to about 5000 nm. Exemplary scratch resistant layers may exhibit a maximum hardness in the range from about 10 GPa to about 50 GPa as measured by a Berkovich Indenter Hardness Test, as defined herein.

In some embodiments, the embodiments of any of the preceding paragraphs may include articles wherein the multilayer interference stack is disposed between a scratch resistant layer and the substrate.

In some embodiments, the embodiments of any of the preceding paragraphs may include articles wherein the scratch resistant layer is disposed between the substrate and the multilayer interference stack.

In some embodiments, the embodiments of any of the preceding paragraphs may include articles wherein: the multilayer interference stack comprises a first portion and a second portion, the scratch resistant layer is disposed between the first portion and the second portion; and the second portion, the scratch resistant layer, and the first portion are disposed in order over the substrate.

In some embodiments, the embodiments of any of the preceding paragraphs may include articles wherein the first portion comprises at least one layer comprising a material having a hardness of 10 GPa or less (and as low as 0.01 GPa), and at least one layer comprising a material having a hardness of 12 GPa or more (and 50 GPa or less), wherein the total thickness of layers in the first portion having a hardness less than 10 GPa is 300 nm or less, 200 nm or less, or 100 nm or less.

In some embodiments, the embodiments of any of the preceding paragraphs may include articles wherein the multilayer interference stack comprises at least one layer comprising a material having a hardness of 10 GPa or less (and as low as 0.01 GPa), and at least one layer comprising a material having a hardness of 12 GPa or more (and 50 GPa or less).

In some embodiments, the embodiments of any of the preceding paragraphs may include articles wherein the total thickness of layers in multilayer interference stack having a hardness of 10 GPa or less is 800 nm or less, 600 nm or less, 500 nm or less, 400 nm or less, or 300 nm or less. The total thickness of layers in multilayer interference stack having a hardness of 10 GPa or less is 1 nm or more.

In some embodiments, the embodiments of any of the preceding paragraphs may include articles wherein the total thickness of layers in multilayer interference stack having a hardness of 10 GPa or less is 60 percent or less, 50 percent or less, 45 percent or less, 40 percent or less, 30 percent or less, or 20 percent or less of the total thickness of the multilayer interference stack. The total thickness of layers in multilayer interference stack having a hardness of 10 GPa or less may be 1% or more.

In some embodiments, the embodiments of any of the preceding paragraphs may include articles wherein the article exhibits an average photopic light transmission of about 50% to about 95% over an optical wavelength regime in the range from about 400 nm to about 700 nm.

In some embodiments, the embodiments of any of the preceding paragraphs may include articles wherein the multilayer interference stack exhibits an average photopic light transmission of about 50% to about 99% over an optical wavelength regime in the range from about 400 nm to about 700 nm.

In some embodiments, the embodiments of any of the preceding paragraphs may include articles wherein, when the topmost 50 nm or the topmost 200 nm of the optical coating is removed: the near-normal photopic average reflectance changes by about 10% or less (and as low as zero %), and the total range of reflected color for all angles from 0 to 90 degrees shifts by about 12 or less or by about 6 or less (and as low as zero), relative to the near-normal photopic average reflectance and reflected color prior to removal of the topmost 50 nm or the topmost 200 nm of the optical coating.

In some embodiments, the embodiments of any of the preceding paragraphs may include articles wherein the article is a sunglass lens.

In some embodiments, the embodiments of any of the preceding paragraphs may include articles wherein the article is a scratch resistant mirror.

In some embodiments, the embodiments of any of the preceding paragraphs may include articles wherein the article is at least a portion of a housing for an electronic device.

Where a measured property depends on the reference illuminant used, any standard illuminant may be used, including any one of CIE F2, CIE F10, CIE F11, CIE F12 and CIE D65. In some embodiments, the angular color shift, the reference point color shift and the color coordinates (a* and/or b*) described herein are observed under a D65 and/or F2 illuminant. In some embodiments, the optical performance described herein is observed under a F2 illuminant, which is known to be more challenging due to the sharp spectral features of the F2 illuminant source.

In some embodiments, the embodiments of any of the preceding paragraphs may include an article including a layer in the multi-layer interference stack having a refractive index greater than about 1.8. Materials that may be utilized in that layer include $SiN_x$, $SiO_xN_y$, $Si_uAl_vO_xN_y$, $AlN_x$, $AlO_xN_y$, or a combination thereof.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
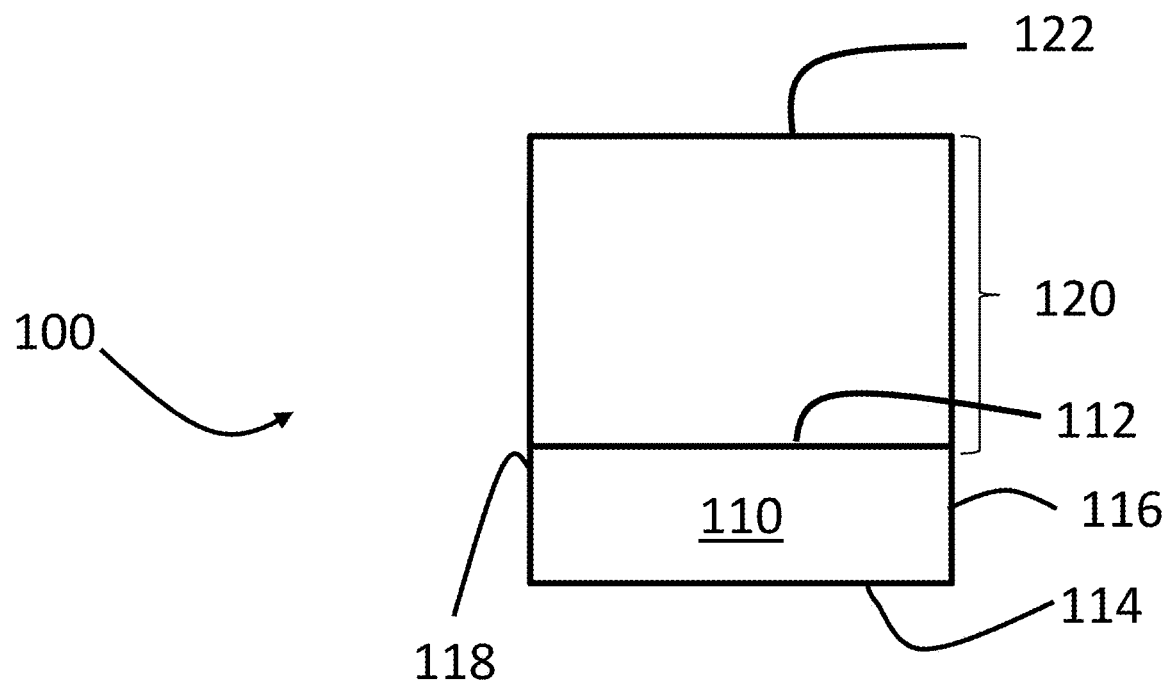
FIG. 1 is a side view of an article, according to one or more embodiments.

Reference will now be made in detail to various embodiments, examples of which are illustrated in the accompanying drawings.

For some applications, a relatively high level of reflectance and/or high color may be desired in a hardcoating that also provides high hardness and scratch resistance. These applications may include sunglasses, RF transparent backings or housings of smartphones and similar devices, heads-up display systems, automotive windows, mirrors, and display surfaces, architectural glass and surfaces, and other decorative, optical, display, or protective applications. In addition, it may be desirable that the reflectance and/or color shows the minimal change in optical properties when a scratch or damage occurs to the coated surface.

In some embodiments, designs are provided for scratch resistant, high-reflectance and/or high color coating for applications such as sunglasses and housings for smartphones. The coating structure may include hard oxide, nitride, or oxynitride layers, optionally in combination with metallic layers. In some cases, there may be no metals in the structure, and the high reflectance and/or color may be entirely generated by optical interference in a designed multilayer optical coating comprising hard coating materials. The absence of metals from the structure may improve the overall adhesion and scratch resistance of the coated article.

The hard, scratch-resistant coating designs of various embodiments may be categorized according to their optical performance, particularly by the reflectance and reflected color of the hardcoated surface. One such set of categorizations, and potential applications, are described below.

Category 1: Low Reflectance, Neutral Color.
R<10%, <8%, <4%, <2%, or even <1% (photopic average reflection at near-normal incidence).
$-12<(a^*$ and $b^*)<12$ ('medium' color); $-10<(a^*$ and $b^*)<1$ (blue-green biased color); $-6<(a^*$ and $b^*)<6$ ('low' color); for all incidence angles from 0 to 90 degrees. (color as measured in CIE $L^*a^*b^*$ space)
Preferred applications include display covers, eyeglasses, interior (eye-facing) side of sunglasses, smartphone covers, smart watches, and smartphone backings (e.g. hardcoated glass or glass ceramics).

Category 2: Low Reflectance, High Color.
R<10%, <8%, <4%, <2%, or even <1% (photopic average reflection at near-normal incidence).
$a^*$ or $b^*>12$, or $>20$; $a^*$ or $b^*<-12$, or $<-20$; for some incidence angles from 0 to 90 degrees. (color as measured in CIE $L^*a^*b^*$ space)
Preferred applications include smartphone backings (e.g. hardcoated glass or glass ceramics), exterior or interior of sunglasses.

Category 3: High Reflectance, Neutral Color:
R>10%, >15%, >20%, >30%, >40%, >50% (photopic average reflection or maximum reflectance in the 400-700 nm range).
$-12<(a^*$ and $b^*)<12$ ('medium' color); $-10<(a^*$ and $b^*)<1$; $-6<(a^*$ and $b^*)<6$ ('low' color); for all incidence angles from 0 to 90 degrees. (color as measured in CIE $L^*a^*b^*$ space)
Preferred applications include smartphone backings (e.g. hardcoated glass or glass ceramics), exterior of sunglasses, scratch-resistant mirrors.

Category 4: High Reflectance, High Color:
R>10%, >15%, >20%, >30%, >40%, >50% (photopic average reflection or as a maximum reflectance in the 400-700 nm range).
$a^*$ or $b^*>12$, or $>20$; $a^*$ or $b^*<-12$, or $<-20$; for some incidence angles from 0 to 90 degrees. (color as measured in CIE $L^*a^*b^*$ space)
Preferred applications include smartphone backings (e.g. hardcoated glass or glass ceramics), exterior of sunglasses, scratch-resistant mirrors.

Buried Optical Layers

In some embodiments, a sub-category which may appear within each of the four categories above includes coated articles with "buried" optical layers. In these cases, the scratch resistance may be enhanced by burying a majority of the layers, all but three, or all but one of the optical interference or reflective layers underneath a thick (e.g. 500 nm-5000 nm thick) hard scratch resistant layer. 300 nm or less, 200 nm or less or even 100 nm or less of lower-hardness or low-refractive-index material (e.g. $SiO_2$) may be above the thick hard layer (i.e. disposed on the outside-facing or user surface) of the hardcoated article. The amount of lower-hardness or low-refractive-index material above the thick hard layer may be zero, or may be 1 nm or more.

This thick, hard scratch resistant layer need not be truly a single material or a single layer, but rather the thick hard layer can comprise many thin layers or nanolayers, such as in a "superlattice" structure, or other hard layer structures comprising multiple materials, compositions, or structural layers or gradients. Exemplary structures are disclosed in WO2016/138195, which is incorporated by reference in its entirety.

In embodiments may be useful to quantify the amount or thickness of low-refractive-index (also called low-index) material in the coating design. Low-index materials (generally defined as having refractive index below about 1.6) are typically also lower-hardness materials. Thus it is desirable to minimize the amount of low-index material in the coating design, but some amount of low-index material is typically desired to efficiently tailor reflection and color targets. The thickness and the fraction of low-index material (which in embodiments is understood to be a lower-hardness material) is denoted in the design descriptions in terms of absolute thickness and fraction of total coating thickness. It can be useful to quantify both the total amount of low-index material in the entire coating, as well as the amount of low-index material that is above the thickest high-hardness layer in the coating design. The thickest high-hardness layer in the coating design protects the layers underneath it from scratch and damage, meaning that the low-index layers above the thickest high-hardness layer are most susceptible to scratch and other types of damage. As noted above, the thickest high-hardness layer need not be a single monolithic material, but can form a superlattice or other layered structure including multiple layers or material, provided that the thick high-hardness layer forms or monolithic or 'composite' region with a max. hardness or average hardness that is higher than the max. or average hardness of the entire coating stack.

In some embodiments, burying the majority of the layers of the optical coating underneath a thick layer of hard material may result in coated articles and films with photopic average reflectance and D65 color that is relatively insensitive to removal of top 50-500 nm of coating. This means that in addition to the protection of high hardness, the optical design also is tailored to reduce visibility of damage sites when it does occur. The coatings of Examples 1 through 16 were designed to be relatively insensitive to thickness changes in the thickest hard layer, meaning these coating designs can be adjusted by changing the thickness of the thickest hard layer in the range of about 0.5-10 microns without substantially changing the optical performance Example 11, when compared to Examples 11A, 11B and 11C demonstrates this insensitivity. Scratch resistance and hardness at selected indentation depths may increase by increasing the thickness of the thickest hard layer.

The designs detailed herein illustrate various embodiments of high-reflectance, colored, and color-shifting scratch-resistant hardcoatings. These coatings are resistant to scratches due to their high material hardness. In addition, the coatings may be designed such that even when some of the coating material is removed due to a scratch or damage event, the average reflectance, average transmittance, and range of color across many viewing angles is minimally changed. For example, the range of color observed over all incidence angles from 0 to 90 degrees may change by 5 or less, or 2 or less, for a* and/or b* upon removal of 50, 200, or even 500 nm of the top-most coating material. The range of color observed over incidence angles from 0 to 90 degrees may not change at all upon such removal. The average reflectance or transmittance (for example, a photopic average) may change by less than 10%, less than 5%, or even less than 2% with similar material removals from the top of the coating. The average reflectance or transmittance may change by as little as zero % upon such removal. This unique optical insensitivity to coating material removal is not typical of traditional optical film designs.

Materials

In some embodiments, the coating structure may include hard oxide, nitride, or oxynitride layers, optionally in combination with metallic layers. Preferred hardcoating materials include SiNx, AlOxNy, and SiuAlvOxNy. It has been found that "AlON" and "SiAlON" based compositions are substantially interchangeable in the optical designs disclosed here, when properly tuned to achieve the desired combinations of hardness, refractive index, film stress, and low optical absorption. A preferred thin film deposition process is reactive or metal-mode sputtering, though other processes such as PECVD are also avenues for fabricating the coatings of the present disclosure. For the purposes of this disclosure, single and multi-layer films of AlOxNy and SiuAlvOxNy were fabricated by reactive and metal-mode sputtering, and their hardness and optical properties tuned to achieve the desired ranges. Suitable fabrication processes are described, for example, in U.S. Pat. No. 9,335,444, which is incorporated by reference in its entirety. The measured optical properties of these coatings were used in thin-film design simulations to generate the modeled examples of the present disclosure.

The optical layers (which may be hard layers or softer layers) may also include additional materials known in the thin film art such as $SiO_2$, $Al_2O_3$, $TiO_2$, $Nb_2O_5$, $SiO_xN_y$, $Ta_2O_5$, $HfO_2$, others known in the art, and mixtures, layered structures, and combinations thereof.

Colors and Color Shift

In some cases the scratch resistant coating may be designed to have a relatively neutral (silver) color and a relatively small change in color with angle of light incidence. In other cases the color may be tuned to achieve a designed color and color change with viewing angle, for example; blue at normal incidence reflection shifting to neutral or purple or gold at higher angles; purple-red on axis shifting to orange-gold off-axis; gold on axis shifting to green or blue off-axis, and other related combinations. Further illustrations of colors are in the examples.

Different colors generated by these hardcoatings may span the entire color palette from red, orange, gold (yellow), green, blue, to purple. In some cases the colors may shift with angle across multiple colors. In other cases the color will be bounded in a certain range in a* and b* with angle of incidence. A "high color" coating, may still preferably have a restriction on its color with viewing angle in some embodiments. For example, a 'green' coating may have a* less than 5 or less than 1 for all viewing angles from 0 to 90 degrees. A 'blue' or 'blue-green' coating may have b* less than 5 or less than 1 for all viewing angles from 0 to 90 degrees. A 'red' or 'orange' or 'purple' coating may have a* greater than −5 or greater than −1 for all viewing angles from 0 to 90 degrees. A 'gold' coating may have b* greater than −5 or greater than −1 for all viewing angles from 0 to 90 degrees. These constraints can be combined with one another to create a designed color in a high-color coating, for example a "blue-green" coating may combine the constraints of b* less than 5 and a* less than 5 for all viewing angles. A "red-gold" coating may combine the constraints of b* greater than −5 and a* greater than −5 for all viewing angles. Other color combinations and constraints are possible.

Applications

In some embodiments, applications include smartphone backings (e.g. hardcoated glass or glass ceramics), exterior of sunglasses, scratch-resistant mirrors. Examples of designs for scratch resistant, high-reflectance and/or high color coatings suitable for such embodiments are provided herein.

Figure 88:
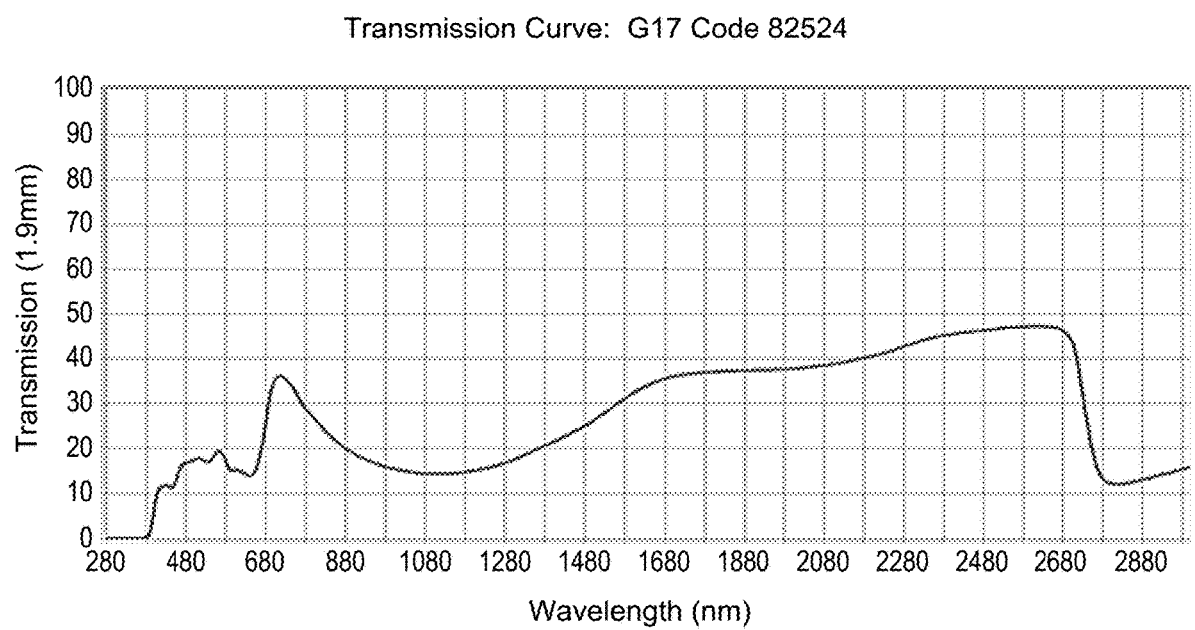
FIG. 88 shows a transmittance spectrum for a glass substrate material used in the examples.

Different substrates may be used for different applications. The modeled examples herein use Corning Grey 17 (glass code 82524, available from Corning Incorporated, Corning, N.Y.), a partially absorbing glass substrate that is suitable for sunglasses applications and can be chemically strengthened. FIG. 88 shows a transmittance spectrum for a 1.9 mm thick substrate of Corning Grey 17. The refractive index of Corning Grey 17 at various wavelengths is: 1.53367 at 480 nm; 1.53312 at 486.1 nm; 1.52853 at 546.1 nm 1.52618 at 587.6 nm; 1.52366 at 643.8 nm; and 1.52323 at 656.3 nm. It should be understood that alternate substrates (clear non-absorbing glass such as Gorilla glass, or glass ceramics such as chemically strengthened black glass ceramic) can also be used as substrates for these coating designs. The first-surface reflectance and reflected color values remain substantially the same with these different choices of substrate (while the transmission values will be largely changed by the choice of substrate). In the case of black glass-ceramic substrates, the total article transmission can be less than 10% or less than 1%. In the case of clear non-absorbing substrates, the transmittance will be approximately 100-% Reflectance of coating ($1^{st}$ surface), or 100-4-% Reflectance of coating (the latter case accounting for a 4% Reflectance from the rear, uncoated surface of the clear glass substrate).

Other Layers

In some embodiments, hardcoating designs described herein can be combined with metallic layers or absorbing layers. Absorbing layers may be particularly useful in sunglasses applications where it is desirable to minimize the reflectance on the user side of the coated article. In these cases, it may be preferable to locate absorbing material on the user side of the hardcoating, such as an absorbing glass substrate facing the user's eyes, and the reflective or colored hardcoatings on the external-facing surface of the article for both reflectance and scratch resistance towards the external environment. In these cases incorporating a one-sided absorbing article structure, the reflectance from the two sides of the article can vary due to the absorber. In these cases, unless otherwise specified, the reflectance values quoted here will apply to the environment-facing surface, the hardcoated surface, or the surface having a low level of absorption between the environment and the hardcoating/reflection layers. In some embodiments, it may be desirable to exclude metals from the stack, as in the above examples, to maximize adhesion and scratch resistance.

In some embodiments, as both sides of eyeglasses or sunglasses can be subject to abrasion, especially during cleaning, it may be desirable to place a scratch-resistant coating on both sides of an eyeglass or sunglasses lens. In the case of an absorbing sunglass or eyeglass lens, it will often be desirable to place a higher-reflectance scratch-resistant coating on the external surface of the sunglass lens, and a low-reflectance or anti-reflection scratch-resistant coating on the interior (user eye facing) surface of the sunglass lens. For example, a coating on the exterior (front) surface of the lens may have a photopic average reflectance higher than 8%, including modeled examples from this disclosure, as well as other coatings, such as those described in WO2014182639 (examples 1 and 13). The interior (back) surface of the lens may have a hardcoating with a photopic average reflectance below 2%, including modeled examples from this disclosure, as well as other coatings, such as those described in WO2016018490 (example 11). WO2016018490 and WO2014182639 are incorporated by reference in their entireties.

In some embodiments, where a scratch-resistant coating is placed on both sides of an eyeglass or sunglasses lens, high hardness and scratch resistance is imparted to both surfaces. In these cases it may be preferred to place a low-reflectance coating (e.g. <4% photopic average reflectance) on the interior surface of the sunglass and a high-reflecting coating (e.g. >6% photopic average reflectance on the exterior surface. In this situation, the order of elements would be 1) user's eye; 2) Low-reflectance coating; 3) absorbing glass substrate; 4) High-reflectance coating; 5) sun or ambient environment. The Low-reflectance coating may be, for example, the coating described in WO2016018490 (example 11), or any of the low-reflectance coatings of the present disclosure. The high-reflectance coating may be, for example, coatings as described in WO2014182639 (examples 1 and 13), or any of the high-reflectance coatings of the present disclosure.

In an eyeglasses application, as opposed to sunglasses, it may be preferred to utilize a low-reflectance scratch-resistant coating on both sides of a clear (non-absorbing glass substrate). In other cases it will be more cost-effective to use a single scratch resistant coating, most likely on the exterior facing surface of the eyeglasses or sunglasses.

In some embodiments, coatings described herein may also be useful in automotive glass applications, e.g. side windows or sunroofs or lamp covers. The coatings can provide an aesthetic reflection or color while having high scratch and weathering resistance.

Parameters that may be considered and specified based on the disclosure herein include the following:

Hardness of coated article, coated surface.
Fraction of softer (typically lower refractive index) material in the coating stack.
Total amount (thickness) of softer material in the coating stack.
Total amount (thickness) of softer material on the exposed (away from substrate) side of the thickest high hardness (high index) layer.
Maximum reflectance in the visible range.
Average reflectance in the visible range (e.g. photopic average reflectance), in pristine and 'damaged' states.
Transmittance in the visible range (with or without combination with absorbing materials or substrates).
Reflected color and color shift with optical angle of incidence, in pristine and 'damaged' states.
Transmitted color and color shift with optical angle of incidence, in pristine and 'damaged' states.

Referring to FIG. 1, the article 100 according to one or more embodiments may include a substrate 110, and an optical coating 120 disposed on the substrate. The substrate 110 includes opposing major surfaces 112, 114 and opposing minor surfaces 116, 118. The optical coating 120 is shown in FIG. 1 as being disposed on a first opposing major surface 112; however, the optical coating 120 may be disposed on the second opposing major surface 114 and/or one or both of the opposing minor surfaces, in addition to or instead of being disposed on the first opposing major surface 112. The optical coating 120 forms an outer surface 122.

The optical coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

The thickness of the optical coating 120 may be about 1 µm or greater while still providing an article that exhibits the optical performance described herein. In some examples, the optical coating 120 thickness may be in the range from about 1 µm to about 20 µm (e.g., from about 1 µm to about 10 µm, or from about 1 µm to about 5 µm). Thickness of the thin film elements (e.g., scratch-resistant layer, layers of the optical film, etc.) was measured by scanning electron microscope (SEM) of a cross-section, or by optical ellipsometry (e.g., by an n & k analyzer), or by thin film reflectometry. For multiple layer elements (e.g., layers of the optical film stack), thickness measurements by SEM are preferred.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

Figure 2:
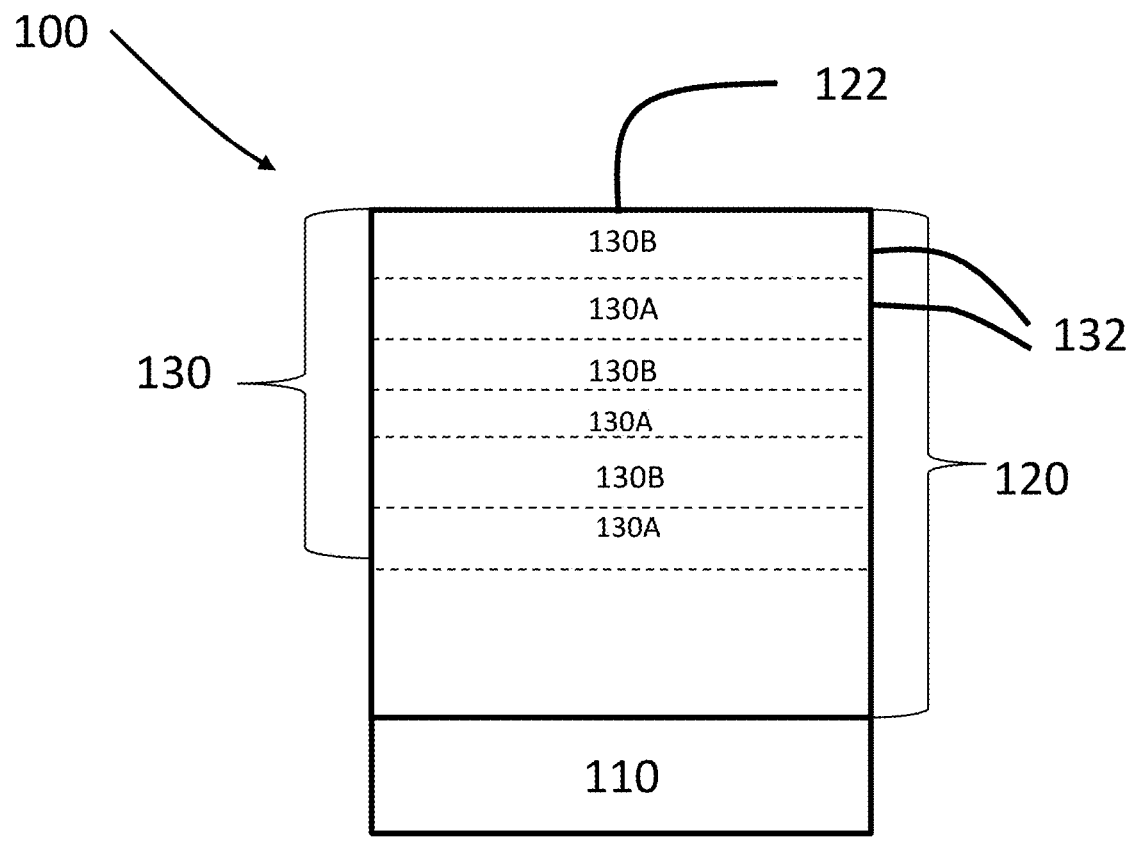
FIG. 2 is a side view of an article, according to one or more specific embodiments.

As shown in FIG. 2, the optical coating 120 includes an multi-layer interference stack 130, which may include a plurality of layers (130A, 130B). In one or more embodiments, the multi-layer interference stack 130 may include a period 132 comprising two or more layers. In one or more embodiments, the two or more layers may be characterized as having different refractive indices from each another. In some embodiments, the period 132 includes a first low RI layer 130A and a second high RI layer 130B. The difference in the refractive index of the first low RI layer and the second high RI layer may be about 0.01 or greater, 0.05 or greater, 0.1 or greater or even 0.2 or greater.

As shown in FIG. 2, the multi-layer interference stack 130 may include a plurality of periods (132). A single period includes include a first low RI layer 130A and a second high RI layer 130B, such that when a plurality of periods are provided, the first low RI layer 130A (designated for illustration as "L") and the second high RI layer 130B (designated for illustration as "H") alternate in the following sequence of layers: L/H/L/H or H/L/H/L, such that the first low RI layer and the second high RI layer appear to alternate along the physical thickness of the multi-layer interference stack 130. In the example in FIG. 2, the multi-layer interference stack 130 includes three periods. In some embodiments, the multi-layer interference stack 130 may include up to 25 periods. For example, the multi-layer interference stack 130 may include from about 2 to about 20 periods, from about 2 to about 15 periods, from about 2 to about 10 periods, from about 2 to about 12 periods, from about 3 to about 8 periods, from about 3 to about 6 periods.

Figure 3:
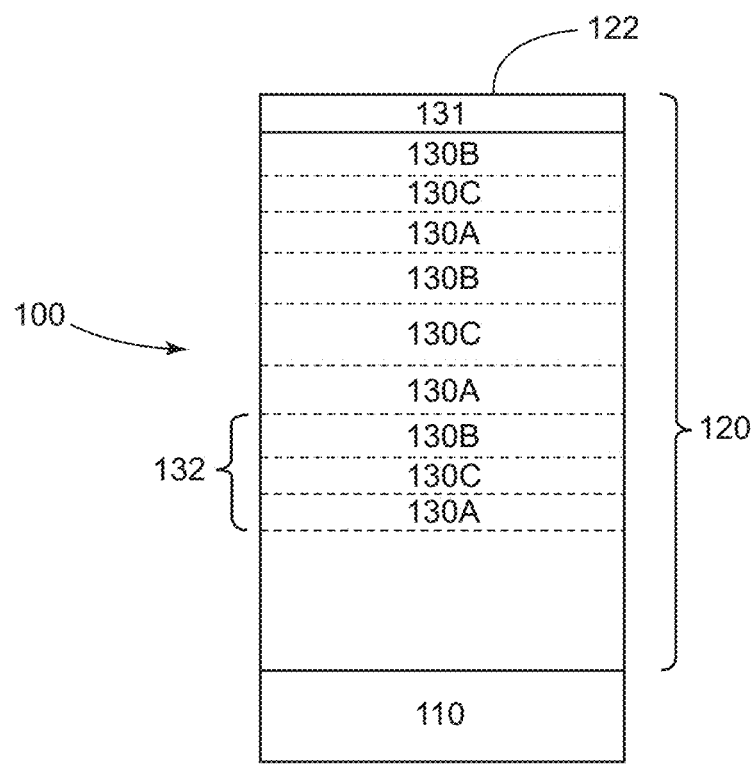
FIG. 3 is a side view of an article, according to one or more embodiments.

In FIG. 3, the multi-layer interference stack 130 may include an additional capping layer 131, which may include a lower refractive index material than the second high RI layer 130B. In some embodiments, the period 132 may include one or more third layers 130C, as shown in FIG. 3. The third layer(s) 130C may have a low RI, a high RI or a medium RI. In some embodiments, the third layer(s) 130C may have the same RI as the first low RI layer 130A or the second high RI layer 130B. In other embodiments, the third layer(s) 130C may have a medium RI that is between the RI of the first low RI layer 130A and the RI of the second high RI layer 130B. Alternatively, the third layer(s) 130C may have a refractive index greater than the $2^{nd}$ high RI layer 130B. The third layer may be provided in the multi-layer interference stack 130 in the following exemplary configurations: $L_{third\ layer}$/H/L/H/L; $H_{third\ layer}$/L/H/L/H; L/H/L/H/$L_{third\ layer}$; H/L/H/L/$H_{third\ layer}$; $L_{third\ layer}$/H/UH/L/$H_{third\ layer}$; $H_{third\ layer}$/UH/L/H/$L_{third\ layer}$; $L_{third\ layer}$/L/H/L/H; $H_{third\ layer}$/H/L/H/L; H/L/H/L/$L_{third\ layer}$; L/H/U H/$H_{third\ layer}$; $L_{third\ layer}$/L/H/UH/$H_{third\ layer}$; $H_{third\ layer}$//H/L/H/L/$L_{third\ layer}$; L/$M_{third\ layer}$/H/L/M/H; H/M/L/H/M/L; M/L/H/L/M; and other combinations. In these configurations, "L" without any subscript refers to the first low RI layer and "H" without any subscript refers to the second high RI layer. Reference to "$L_{third\ sub-layer}$" refers to a third layer having a low RI, "$H_{third\ sub-layer}$" refers to a third layer having a high RI and "M" refers to a third layer having a medium RI, relative to the $1^{st}$ layer and the $2^{nd}$ layer.

As used herein, the terms "low RI", "high RI" and "medium RI" refer to the relative values for the RI to another (e.g., low RI<medium RI<high RI). In one or more embodiments, the term "low RI" when used with the first low RI layer or with the third layer, includes a range from about 1.3 to about 1.7 or 1.75. In one or more embodiments, the term "high RI" when used with the second high RI layer or with the third layer, includes a range from about 1.7 to about 2.5 (e.g., about 1.85 or greater). In some embodiments, the term "medium RI" when used with the third layer, includes a range from about 1.55 to about 1.8. In some instances, the ranges for low RI, high RI and medium RI may overlap; however, in most instances, the layers of the multi-layer interference stack 130 have the general relationship regarding RI of: low RI<medium RI<high RI.

Figure 4:
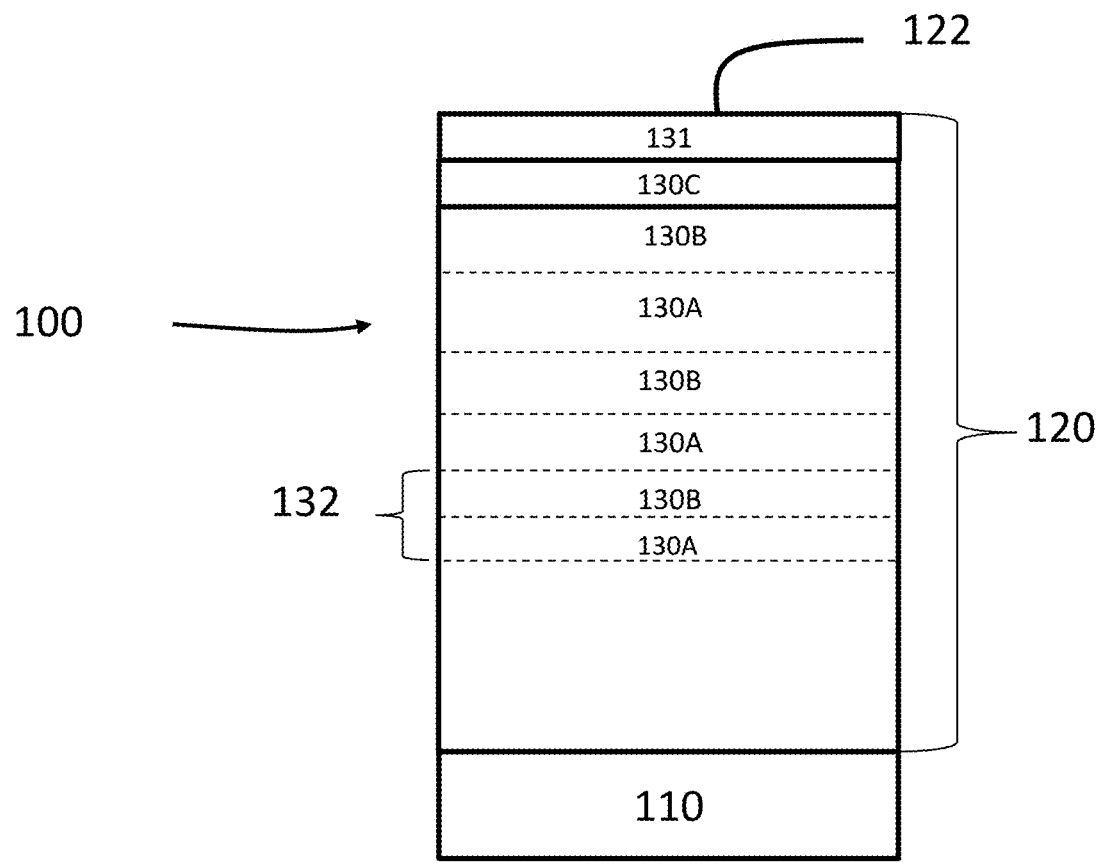
FIG. 4 is a side view of an article, according to one or more embodiments.
Figure 5:
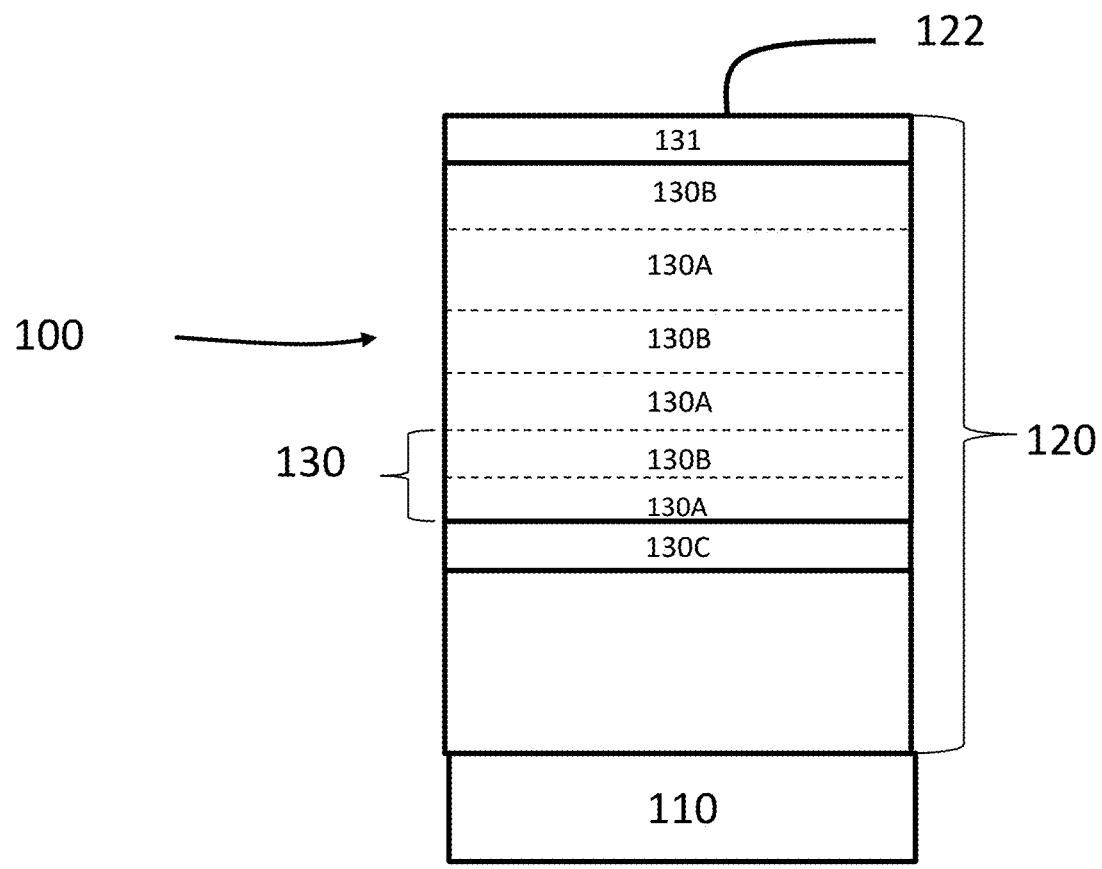
FIG. 5 is a side view of an article, according to one or more embodiments.
Figure 6:
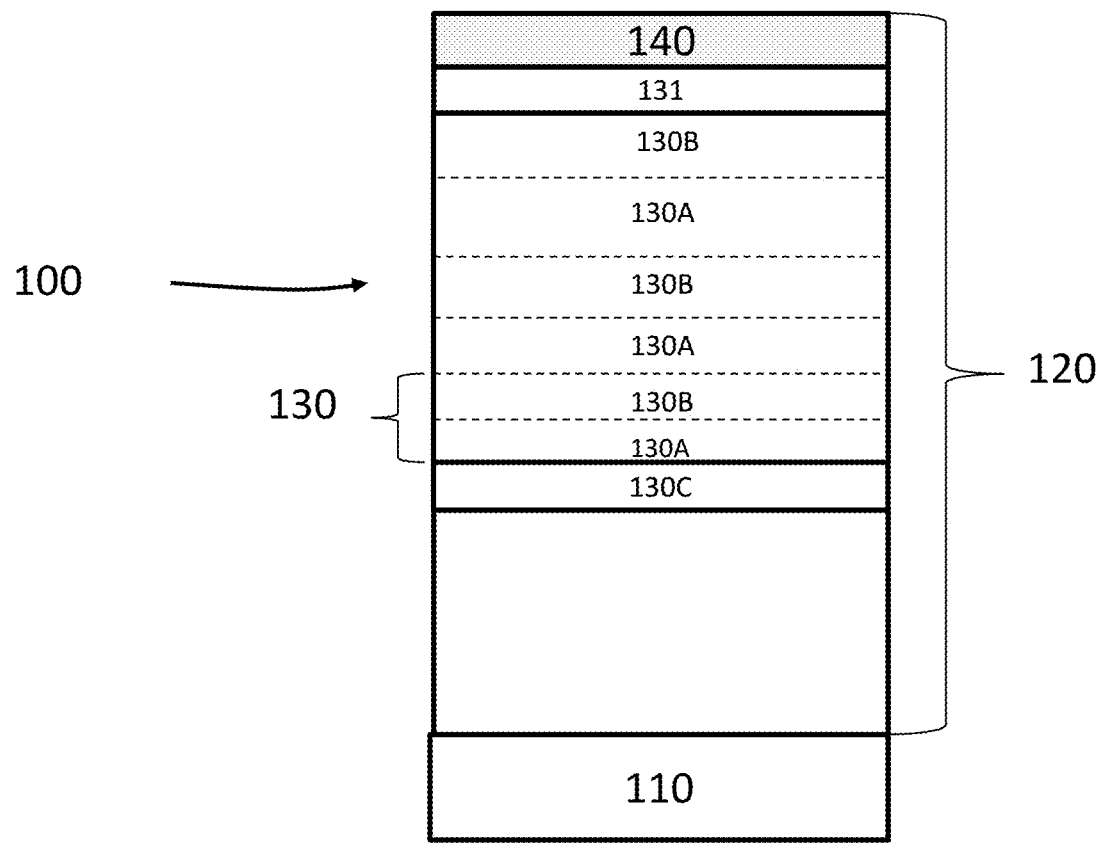
FIG. 6 is a side view of an article, according to one or more embodiments.

The third layer(s) 130C may be provided as a separate layer from a period 132 and may be disposed between the period or plurality of periods and the capping layer 131, as shown in FIG. 4. The third layer(s) may also be provided as a separate layer from a period 132 and may have disposed between the substrate 110 and the plurality of periods 132, as shown in FIG. 5. The third layer(s) 130C may be used in addition to an additional coating 140 instead of the capping 131 or in addition to the capping layer, as shown in FIG. 6.

Exemplary materials suitable for use in the multi-layer interference stack 130 include: $SiO_2$, $Al_2O_3$, $GeO_2$, SiO, $AlOxNy$, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI layer include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$). Some examples of suitable materials for use in the second high RI layer include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$ and diamond-like carbon. The oxygen content of the materials for the second high RI layer and/or the scratch-resistant layer may be minimized, especially in SiNx or $AlN_x$ materials. $AlO_xN_y$ materials may be considered to be oxygen-doped $AlN_x$, that is they may have an $AlN_x$ crystal structure (e.g. wurtzite) and need not have an AlON crystal structure. Exemplary preferred $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary preferred $Si_uAl_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Where a material having a medium refractive index is desired, some embodiments may utilize AlN and/or $SiO_xN_y$. The hardness of the second high RI layer and/or the scratch-resistant layer may be characterized specifically. In some embodiments, the maximum hardness of the second high RI layer and/or the scratch-resistant layer, as measured by the Berkovich Indenter Hardness Test, may be about 10 GPa or greater, about 12 GPa or greater, about 15 GPa or greater, about 18 GPa or greater, or about 20 GPa or greater. In some cases, the second high RI layer material may be deposited as a single layer and may be characterized as a scratch resistant layer, and this single layer may have a thickness from about 500 nm to about 2000 nm for repeatable hardness determination.

In one or more embodiments at least one of the layer(s) of the multi-layer interference stack 130 may include a specific optical thickness range. As used herein, the term "optical thickness" is determined by (n*d), where "n" refers to the RI of the sub-layer and "d" refers to the physical thickness of the layer. In one or more embodiments, at least one of the layers of the multi-layer interference stack 130 may include an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the multi-layer interference stack 130 may each have an optical thickness in the range from about 2 nm to about 200 nm, from about 10 nm to about 100 nm, from about 15 nm to about 100 nm, from about 15 to about 500 nm, or from about 15 to about 5000 nm. In some cases, at least one layer of the multi-layer interference stack 130 has an optical thickness of about 50 nm or greater. In some cases, each of the first low RI layers of the optical interference stack 130 have an optical thickness in the range from about 2 nm to about 200 nm, from about 10 nm to about 100 nm, from about 15 nm to about 100 nm, from about 15 to about 200 nm, or from about 15 to about 400 nm. In other cases, each of the second high RI layers of the optical interference stack 130 have an optical thickness in the range from about 2 nm to about 200 nm, from about 10 nm to about 100 nm, from about 15 nm to about 100 nm, from about 15 nm to about 200 nm, from about 15 nm to about 400 nm, from about 15 to about 500 nm, or from about 15 to about 5000 nm. In yet other cases, each of the third layers of the optical interference stack 130 have an optical thickness in the range from about 2 nm to about 200 nm, from about 10 nm to about 100 nm, from about 15 nm to about 100 nm, from about 15 to about 200 nm, or from about 15 to about 400 nm.

In some embodiments, the thickness of one or more of the layers of the optical coating 130 may be minimized. In one or more embodiments, the thickness of the thickness of the high RI layer(s) and/or the medium RI layer(s) are minimized such that they are less than about 500 nm each. In one or more embodiments, the combined thickness of the high RI layer(s), the medium RI (layers) and/or the combination of the high RI and medium RI layers is less than about 500 nm.

In some embodiments, the amount of low RI material in the optical coating may be minimized Without being bound by theory, the low RI material is typically also a lower-hardness material, owing to the nature of atomic bonding and electron densities that simultaneously affect refractive index and hardness, and thus minimizing such material can maximize the hardness, while maintaining the reflectance and color performance described herein. Expressed as a fraction of physical thickness of the optical coating 120, the low RI material may comprise less than about 60%, less than about 50%, less than about 40%, less than about 30%, less than about 20%, less than about 10%, or less than about 5% of the physical thickness of the optical coating. The low RI material may comprise more than zero % or more than 1% of the physical thickness of the optical coating. Alternately or additionally, the amount of low RI material may be quantified as the sum of the physical thicknesses of all layer of low RI material that are disposed above the thickest high RI layer in the optical coating (i.e. on the side opposite the substrate, user side or air side). Without being bound by theory, the thick high RI layer having a high hardness effectively shields the layers underneath (or between the thick RI layer and the substrate) from many or most scratches. Accordingly, the layers disposed above the thickest high RI layer may have an outsized effect on scratch resistance of the overall article. This is especially relevant when the thickest high RI layer has a physical thickness that is greater than about 400 nm and has a maximum hardness greater than about 12 GPa as measured by the Berkovich Indenter Hardness Test. The amount of low RI material disposed on the thickest high RI layer (i.e. on the side opposite the substrate, user side or air side) may have a thickness less than or equal to about 300 nm, less than or equal to about 200 nm, less than or equal to about 150 nm, less than or equal to about 120 nm, less than or equal to about 110 nm, 100 nm, 90 nm, 80 nm, 70 nm, 60 nm, 50 nm, 40 nm, 30 nm, 25 nm, 20 nm, 15 nm, or less than or equal to about 12 nm. The amount of low RI material disposed on the thickest high RI layer (i.e. on the side opposite the substrate, user side or air side) may have a thickness greater than or equal to about 0 nm or 1 nm.

In some embodiments, the top-most air-side layer may comprise a high RI layer that also exhibits high hardness, as shown in Modeled Examples 8-9. In some embodiments, an additional coating 140 may be disposed on top of this top-most air-side high RI layer (e.g., the additional coating may include low-friction coating, an oleophobic coating, or an easy-to-clean coating). Moreover, as illustrated by Modeled Example 10, the addition of a low RI layer having a very low thickness (e.g., about 10 nm or less, about 5 nm or less or about 2 nm or less) has minimal influence on the optical performance, when added to the top-most air-side layer comprising a high RI layer. The low RI layer having a very low thickness may include $SiO_2$, an oleophobic or low-friction layer, or a combination of $SiO_2$ and an oleophobic material. Exemplary low-friction layers may include diamond-like carbon, such materials (or one or more layers of the optical coating) may exhibit a coefficient of friction less than 0.4, less than 0.3, less than 0.2, or even less than 0.1.

In one or more embodiments, the multi-layer interference stack 130 has a physical thickness of about 800 nm or less. The multi-layer interference stack 130 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, and all ranges and sub-ranges therebetween.

In one or more embodiments, the combined physical thickness of the second high RI layer(s) may be characterized. For example, in some embodiments, the combined thickness of the second high RI layer(s) may be about 100 nm or greater, about 150 nm or greater, about 200 nm or greater, about 500 nm or greater. The combined thickness is the calculated as a combination of the thicknesses of the individual high RI layer(s) in the multi-layer interference stack 130, even when there are intervening low RI layer(s) or other layer(s). In some embodiments, the combined physical thickness of the second high RI layer(s), which may also comprise a high-hardness material (e.g., a nitride or an oxynitride material), may be greater than 30% of the total physical thickness of the multi-layer interference stack. For example, the combined physical thickness of the second high RI layer(s) may be about 40% or greater, about 50% or greater, about 60% or greater, about 70% or greater, about 75% or greater, or even about 80% or greater, of the total physical thickness of the multi-layer interference stack. The combined physical thickness of the second high RI layer(s) may be about 99% or less of the total physical thickness of the multi-layer interference stack. Additionally or alternatively, the amount of the high refractive index material, which may also be a high-hardness material, included in the optical coating may be characterized as a percentage of the physical thickness of the upper most (i.e., user side or side of the optical coating opposite the substrate) 500 nm of the article or optical coating 120. Expressed as a percentage of the upper most 500 nm of the article or optical coating, the combined physical thickness of the second high RI layer(s) (or the thickness of the high refractive index material) may be about 50% or greater, about 60% or greater, about 70% or greater, about 80% or greater, or even about 90% or greater. The combined physical thickness of the second high RI layer(s) in the upper most 500 nm of the article or optical coating 120 may be about 99% or less of the total physical thickness in this upper most 500 nm. In some embodiments, greater proportions of hard and high-index material within the multi-layer interference stack can also simultaneously be made to also exhibit low reflectance, low color, and high abrasion resistance as further described elsewhere herein. In one or more embodiments, the second high RI layers may include a material having a refractive index greater than about 1.85 and the first low RI layers may include a material having a refractive index less than about 1.75. In some embodiments, the second high RI layers may include a nitride or an oxynitride material. In some instances, the combined thickness of all the first low RI layers in the optical coating (or in the layers that are disposed on the exterior or non-substrate side of the thickest second high RI layer of the optical coating) may be about 200 nm or less (e.g., about 150 nm or less, about 100 nm or less, about 75 nm or less, or about 50 nm or less). The combined thickness of all the first low RI layers in the optical coating (or in the layers that are disposed on the exterior or non-substrate side of the thickest second high RI layer of the optical coating) may be about 1 nm or more.

In some embodiments, the multi-layer interference stack 130 exhibits an average light reflectance (which may be a photopic average) of about 9% or less, about 8% or less, about 7% or less, about 6% or less, about 5% or less, about 4% or less, about 3% or less, or about 2% or less over the optical wavelength regime, when measured at the outer surface 122 only (e.g., when removing the reflections from an uncoated back surface (e.g., 114 in FIG. 1) of the article, such as through using index-matching oils on the back surface coupled to an absorber, or other known methods). The average reflectance (which may be a photopic average) may be in the range from about 0.4% to about 9%, from about 0.4% to about 8%, from about 0.4% to about 7%, from about 0.4% to about 6%, or from about 0.4% to about 5% and all ranges therebetween. In some instances, the multi-layer interference stack 130 may exhibit such average light reflectance over other wavelength ranges such as from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm. In some embodiments, the outer surface 122 exhibits an average light transmission of about 90% or greater, 92% or greater, 94% or greater, 96% or greater, or 98% or greater, and as high as 99.9%, over the optical wavelength regime. Unless otherwise specified, the average reflectance or transmittance is measured at an incident illumination angle from about 0 degrees to about 10 degrees (however, such measurements may be provided at incident illumination angles of 45 degrees or 60 degrees).

The article 100 may include one or more additional coatings 140 disposed on the multi-layer interference stack, as shown in FIG. 6. In one or more embodiments, the additional coating may include an easy-to-clean coating. An example of a suitable an easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, published as US2014-0113083A1, which is incorporated herein in its entirety by reference. The easy-to-clean coating may have a thickness in the range from about 5 nm to about 50 nm and may include known materials such as fluorinated silanes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch resistant layer or layers. In some embodiments, the additional coating 140 includes a combination of easy-to-clean material and scratch resistant material. In one example, the combination includes an easy-to-clean material and diamond-like carbon. Such additional coatings 140 may have a thickness in the range from about 5 nm to about 20 nm. The constituents of the additional coating 140 may be provided in separate layers. For example, the diamond-like carbon may be disposed as a first layer and the easy-to clean can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean may have a thickness of about 1 nm to about 10 nm (or more specifically about 6 nm). The diamond-like coating may include tetrahedral amorphous carbon (Ta—C), Ta—C:H, and/or a-C—H.

Figure 7:
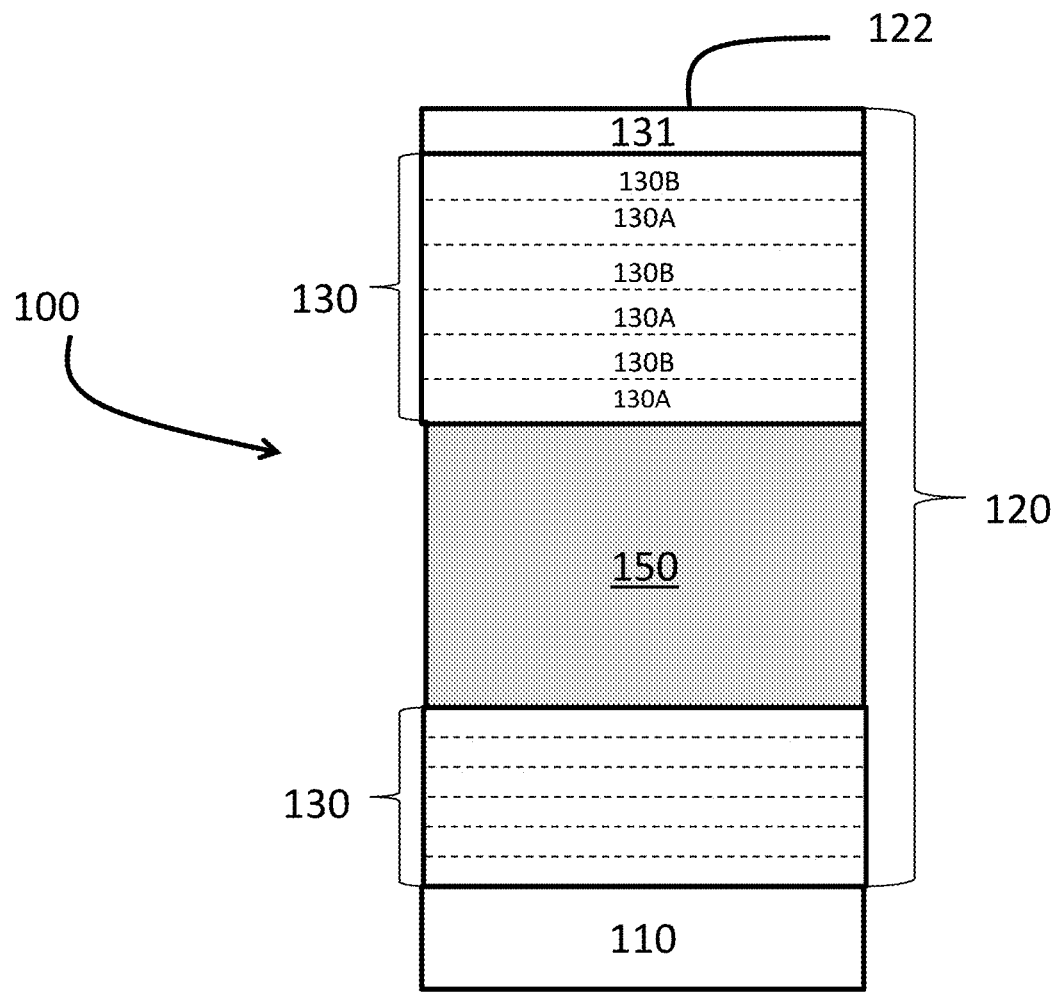
FIG. 7 is a side view of an article, according to one or more embodiments.
Figure 8:
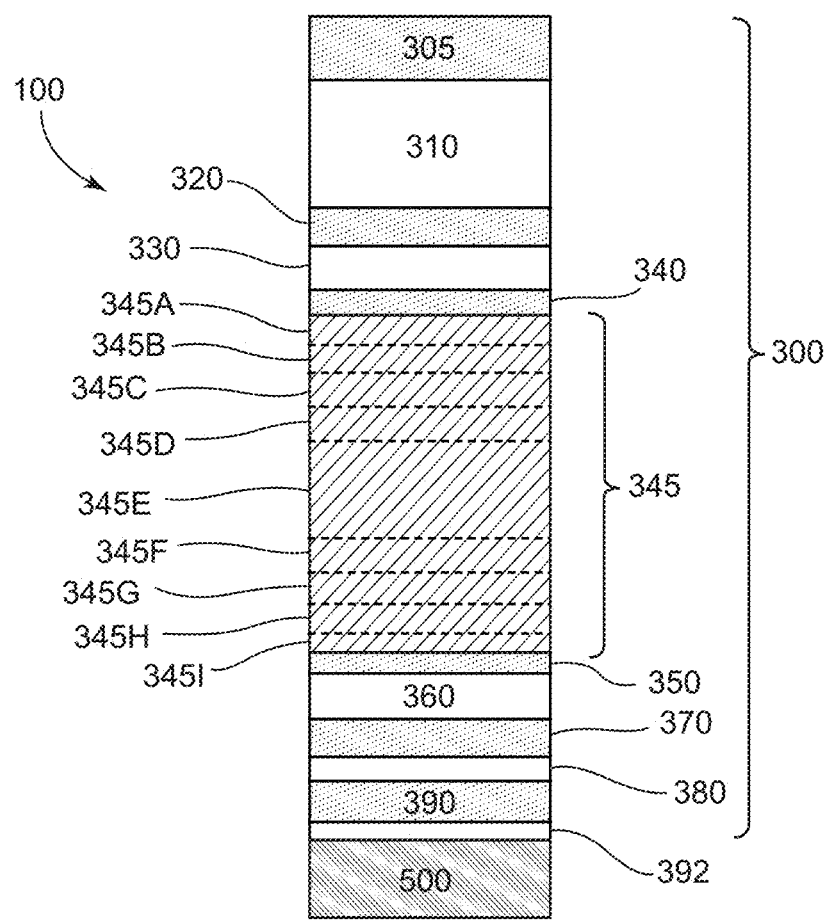
FIG. 8 is a side view of an article according Example 1.

As mentioned herein, the optical coating 120 may include a scratch resistant layer 150 or coating (when a plurality of scratch resistant layers are utilized), which may be disposed between the multi-layer interference stack 130 and the substrate 110. In some embodiments, the scratch resistant layer 150 or coating is disposed between the layers of the multi-layer interference stack 130 (such as 150 as shown in FIG. 7 or 345 as shown in FIG. 8). The two sections of the multi-layer interference stack (i.e., a first section disposed between the scratch resistant layer 150 and the substrate 110, and a second section disposed on the scratch resistant layer) may have a different thickness from one another or may have essentially the same thickness as one another. The layers of the two sections of the multi-layer interference stack may be the same in composition, order, thickness and/or arrangement as one another or may differ from one another.

Exemplary materials used in the scratch resistant layer 150 or coating (or the scratch-resistant layer/coating used as an additional coating 140) may include an inorganic carbide, nitride, oxide, diamond-like material, or combination of these. Examples of suitable materials for the scratch resistant layer or coating include metal oxides, metal nitrides, metal oxynitride, metal carbides, metal oxycarbides, and/or combinations thereof combination thereof. Exemplary metals include B, Al, Si, Ti, V, Cr, Y, Zr, Nb, Mo, Sn, Hf, Ta and W. Specific examples of materials that may be utilized in the scratch resistant layer or coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof. The scratch resistant layer or coating may also comprise nanocomposite materials, or materials with a controlled microstructure to improve hardness, toughness, or abrasion/wear resistance. For example the scratch resistant layer or coating may comprise nanocrystallites in the size range from about 5 nm to about 30 nm. In embodiments, the scratch resistant layer or coating may comprise transformation-toughened zirconia, partially stabilized zirconia, or zirconia-toughened alumina. In embodiments, the scratch resistant layer or coating exhibits a fracture toughness value greater than about 1 MPa √m and simultaneously exhibits a hardness value greater than about 8 GPa. Fracture toughness of thin films is measured as described in D. S Harding, W. C. Oliver, and G. M. Pharr, Cracking During Indentation and its use in the Measurement of Fracture Toughness, Mat. Res. Soc. Symp. Proc., vol. 356, 1995, 663-668.

The scratch resistant layer may include a single layer 150 (as shown in FIG. 7), multiple sub-layers or sub-layers or single layers that exhibit a refractive index gradient (i.e., scratch resistant coating 345, as shown in FIG. 8). In some embodiments, the scratch-resistant layer is the thickest layer in the optical coating 120, and may also have the highest index of refraction of all the materials in the optical coating 120. Where multiple layers are used, such layers form a scratch resistant coating 345. For example, a scratch resistant coating 345 may include a compositional gradient of $Si_uAl_vO_xN_y$, where the concentration of any one or more of Si, Al, 0 and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 28, 2014, published as US2014-0334006A1, which is hereby incorporated by reference in its entirety.

The composition of the scratch resistant layer or coating may be modified to provide specific properties (e.g., hardness). In one or more embodiments, the scratch resistant layer or coating exhibits a maximum hardness in the range from about 5 GPa to about 30 GPa as measured on a major surface of the scratch resistant layer or coating, by the Berkovich Indenter Hardness Test. In one or more embodiments, the scratch resistant layer or coating exhibits a maximum hardness in the range from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 10 GPa to about 28 GPa, from about 10 GPa to about 26 GPa, from about 10 GPa to about 24 GPa, from about 10 GPa to about 22 GPa, from about 10 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. In one or more embodiments, the scratch resistant coating may exhibit a maximum hardness that is greater than 15 GPa, greater than 20 GPa, or greater than 25 GPa. In one or more embodiments, the scratch resistant layer exhibits a maximum hardness in the range from about 15 GPa to about 150 GPa, from about 15 GPa to about 100 GPa, or from about 18 GPa to about 100 GPa. Maximum hardness is the highest hardness value measured over a range of indentation depths. Such maximum hardness values are exhibited along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

The physical thickness of the scratch resistant coating or layer may be in the range from about 1 nm to about 5 µm. In some embodiments, the physical thickness of the scratch resistant coating may be in the range from about 1 nm to about 3 µm, from about 1 nm to about 2.5 µm, from about 1 nm to about 2 µm, from about 1 nm to about 1.5 µm, from about 1 nm to about 1 µm, from about 1 nm to about 0.5 µm, from about 1 nm to about 0.2 µm, from about 1 nm to about 0.1 µm, from about 1 nm to about 0.05 µm, from about 5 nm to about 0.05 µm, from about 10 nm to about 0.05 µm, from about 15 nm to about 0.05 µm, from about 20 nm to about 0.05 µm, from about 5 nm to about 0.05 µm, from about 200 nm to about 3 µm, from about 400 nm to about 3 µm, from about 800 nm to about 3 µm, from about 200 nm to about 5 µm, from about 300 nm to about 5 µm, from about 400 nm to about 5 µm, from about 500 nm to about 5 µm, from about 600 nm to about 5 µm, from about 700 nm to about 5 µm, from about 800 nm to about 5 µm, and all ranges and sub-ranges therebetween. In some embodiments, the scratch resistant layer is the thickest layer in the optical coating 120, and may also have the highest index of refraction of all the materials in the optical coating 120. In some embodiments, the physical thickness of the scratch resistant coating may be in the range from about 1 nm to about 25 nm. In some instances, the scratch-resistant layer may include a nitride or an oxy-nitride material and may have a thickness of about 200 nm or greater, 500 nm or greater or about 1000 nm or greater.

The article of one or more embodiments may be described as abrasion resistant as measured by various methods, after being abraded on the outer surface 122 according to a Taber Test after about 500 cycles or more. Various forms of abrasion test are known in the art, such as the test method specified in ASTM D1044-99, using abrasive media supplied by Taber Industries. Modified abrasion methods related to ASTM D1044-99 can be created using different types of abrading media, abradant geometry and motion, pressure, etc. in order to provide repeatable and measurable abrasion or wear tracks to meaningfully differentiate the abrasion resistance of different samples. For example, different test conditions will usually be appropriate for soft plastics vs. hard inorganic test samples. The embodiments described herein were subjected to a Taber Test, as defined herein, which is a specific modified version of ASTM D1044-99 that gives clear and repeatable differentiation of durability between different samples which comprise primarily hard inorganic materials, such as oxide glasses and oxide or nitride coatings. As used herein, the phrase "Taber Test" refers to a test method using a Taber Linear Abraser 5750 (TLA 5750) and accessories supplied by Taber Industries, in an environment including a temperature of about 22° C.±3° C. and Relative Humidity of up to about 70%. The TLA 5750 includes a CS-17 abraser material having a 6.7 mm diameter abraser head. Each sample was abraded according to the Taber Test and the abrasive damage was evaluated using both Haze and Bidirectional Transmittance Distribution Function (CCBTDF) measurements, among other methods. In the Taber Test, the procedure for abrading each sample includes placing the TLA 5750 and a flat sample support on a rigid, flat surface and securing the TLA 5750 and the sample support to the surface. Before each sample is abraded under the Taber Test, the abraser is refaced using a new S-14 refacing strip adhered to glass. The abraser is subjected to 10 refacing cycles using a cycle speed of 25 cycles/minute and stroke length of 1 inch, with no additional weight added (i.e., a total weight of about 350 g is used during refacing, which is the combined weight of the spindle and collet holding the abraser). The procedure then includes operating the TLA 5750 to abrade the sample, where the sample is placed in the sample support in contact with the abraser head and supporting the weight applied to the abraser head, using a cycle speed of 25 cycles/minute, and a stroke length of 1 inch, and a weight such that the total weight applied to the sample is 850 g (i.e., a 500 g auxiliary weight is applied in addition to the 350 g combined weight of the spindle and collet). The procedure includes forming two wear tracks on each sample for repeatability, and abrading each sample for 500 cycle counts in each of the two wear tracks on each sample.

In one or more embodiments, the outer surface 122 of the article 100 is abraded according to the above Taber Test and the article exhibits a haze of about 10% of less, or about 1% or less, as measured on the abraded side using a haze meter supplied by BYK Gardner under the trademark Haze-Guard Plus®, using an aperture over the source port, the aperture having a diameter of 8 mm.

The article 100 of one or more embodiments exhibits such abrasion resistance with and without any additional coatings (including the additional coating 140, which will be described herein). In some embodiments, the haze may be about 9% or less, about 8% or less, about 7% or less, about 6% or less, about 5% or less, about 4% or less, about 3% or less, about 2% or less, about 1% or less, about 0.5% or less or about 0.3% or less. In some specific embodiments, the article 100 exhibits a haze in the range from about 0.1% to about 10%, from about 0.1% to about 9%, from about 0.1% to about 8%, from about 0.1% to about 7%, from about 0.1% to about 6%, from about 0.1% to about 5%, from about 0.1% to about 4%, from about 0.1% to about 3%, from about 0.1% to about 2%, from about 0.1% to about 1%, 0.3% to about 10%, from about 0.5% to about 10%, from about 1% to about 10%, from about 2% to about 10%, from about 3% to about 10%, from about 4% to about 10%, from about 5% to about 10%, from about 6% to about 10%, from about 7% to about 10%, from about 1% to about 8%, from about 2% to about 6%, from about 3% to about 5%, and all ranges and sub-ranges therebetween.

Alternate methods for quantifying the abrasion resistance are also contemplated here. In one or more embodiments, article 100 abraded by the Taber Test on the outer surface 122 may exhibit an abrasion resistance as measured by atomic force microscopy (AFM) surface profiling, which may be carried out for example over an 80×80 micron area, or multiple 80×80 micron areas (to sample a larger portion of the abraded area) of the outer surface 122. From these AFM surface scans, surface roughness statistics such as RMS roughness, Ra roughness, and peak-to-valley surface height may be evaluated. In one or more embodiments, the article 100 (or specifically, the outer surface 122) may exhibit average surface roughness (Ra) values of about 50 nm or less, about 25 nm or less, about 12 nm or less, about 10 nm or less, or about 5 nm or less, after being abraded under the Taber Test described above.

In one or more embodiments, the article 100 may exhibit an abrasion resistance, after the outer surface 122 is abraded by the Taber Test as measured by a light scattering measurement. In one or more embodiments, the light scattering measurement includes a bi-directional reflectance distribution function (BRDF) or bi-directional transmittance distribution function (BTDF) measurement carried out using a Radiant Zemax IS-SA™ instrument. This instrument has the flexibility to measure light scattering using any input angle from normal to about 85 degrees incidence in reflection, and from normal to about 85 degrees incidence in transmission, while also capturing all scattered light output in either reflection or transmission into 2*Pi steradians (a full hemisphere in reflection or transmission). In some embodiments, the article 100 exhibits an abrasion resistance, as measured using BTDF at normal incidence and analyzing the transmitted scattered light at a selected angular range, for example from about 10° to about 80° degrees in polar angles and any angular range therein. The full azimuthal range of angles can be analyzed and integrated, or particular azimuthal angular slices can be selected, for example from about 0° and 90° azimuthally. In the case of linear abrasion, it may be desired to choose an azimuthal direction that is substantially orthogonal to the abrasion direction so as to increase signal-to-noise of the optical scattering measurement. In one or more embodiments, the article 100 may exhibit a scattered light intensity as measured at the multilayer interference stack 120, of about less than about 0.1, about 0.05 or less, about 0.03 or less, about 0.02 or less, about 0.01 or less, about 0.005 or less, or about 0.003 or less (in units of 1/steradian), when using the Radiant Zemax IS-SA tool in CCBTDF mode at normal incidence in transmission, with a 2 mm aperture and a monochrometer set to 600 nm wavelength, and when evaluated at polar scattering angles in the range from about 15° to about 60° (e.g. specifically, about 20° or about 40°). Normal incidence in transmission may be otherwise known as zero degrees in transmission, which may be denoted as 180° incidence by the instrument software. In one or more embodiments, the scattered light intensity may be measured along an azimuthal direction substantially orthogonal to the abraded direction of a sample abraded by the Taber Test. In one example, the Taber Test may use from about 10 cycles to about 1000 cycles, and all values in between. These optical intensity values may also correspond to less than about 1%, less than about 0.5%, less than about 0.2%, or less than about 0.1% of the input light intensity that is scattered into polar scattering angles greater than about 5 degrees, greater than about 10 degrees, greater than about 30 degrees, or greater than about 45 degrees.

Generally speaking, BTDF testing at normal incidence, as described herein, is closely related to the transmission haze measurement, in that both are measuring the amount of light that is scattered in transmission through a sample (or, in this case the article 100, after abrading the multi-layer interference stack 120). BTDF measurements provide more sensitivity as well as more detailed angular information, compared to haze measurements. BTDF allows measurement of scattering into different polar and azimuthal angles, for example allowing us to selectively evaluate the scattering into azimuthal angles that are substantially orthogonal to the abrasion direction in the linear Taber test (these are the angles where light scattering from linear abrasion is the highest). Transmission haze is essentially the integration of all scattered light measured by normal incidence BTDF into the entire hemisphere of polar angles greater than about +/−2.5 degrees.

Hardness and Young's modulus values of thin film coatings as reported herein were determined using widely accepted nanoindentation practices. See: Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P, and Herbert, E., Continuous Stiffness measurement During Instrumented Indentation Testing, Experimental Techniques, 34 (3) 86-94 (2010) (hereinafter "Hay"). For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. See Hay. The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (less than or equal to about 200 nm). At deeper indentation depths both hardness and modulus will gradual diminish as the response is influenced by the softer glass substrate. In this case the coating hardness and modulus are taken be those associated with the regions exhibiting the maximum hardness and modulus. In the case of soft coatings on a harder glass substrate, the coating properties will be indicated by lowest hardness and modulus levels that occur at relatively small indentation depths. At deeper indentation depths, the hardness and modulus will gradually increase due to the influence of the harder glass. These profiles of hardness and modulus versus depth can be obtained using either the traditional Oliver and Pharr approach (as described in Fischer-Cripps) or by the more efficient continuous stiffness approach (see Hay). The elastic modulus and hardness values reported herein for such thin films were measured using known diamond nanoindentation methods, as described above, with a Berkovich diamond indenter tip.

The optical coating 120 and the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the outer surface 122 of the article or the surface of the optical coating 120 (or the surface of any one or more of the layers in the multi-layer interference stack) with the diamond Berkovich indenter to form an indent to an indentation depth in the range from about 50 nm to about 1000 nm (or the entire thickness of the multi-layer interference stack or layer, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness. Unless otherwise specified, hardness values provided herein refer to values measured by the Berkovich Indenter Hardness Test.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

Figure 85:
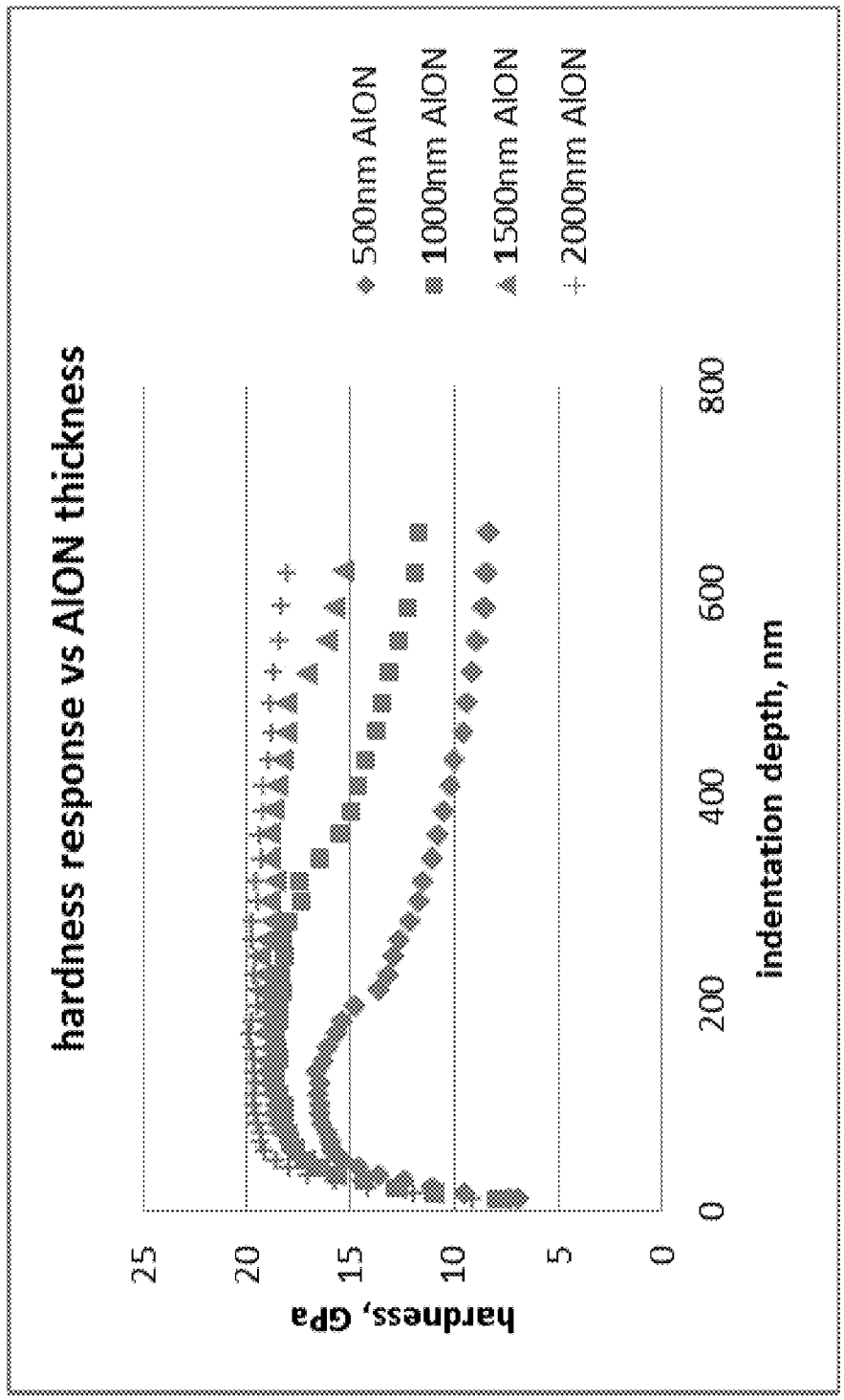
FIG. 85 shows hardness response vs. layer thickness for an optical coating.

FIG. 85 illustrates the changes in measured hardness value as a function of indentation depth and thickness of a coating. As shown in FIG. 85, the hardness measured at intermediate indentation depths (at which hardness approaches and is maintained at maximum levels) and at deeper indentation depths depends on the thickness of a material or layer. FIG. 85 illustrates the hardness response of four different layers of $AlO_xN_y$ having different thicknesses. The hardness of each layer was measured using the Berkovich Indenter Hardness Test. The 500 nm-thick layer exhibited its maximum hardness at indentation depths from about 100 nm to 180 nm, followed by a dramatic decrease in hardness at indentation depths from about 180 nm to about 200 nm, indicating the hardness of the substrate influencing the hardness measurement. The 1000 nm-thick layer exhibited a maximum hardness at indentation depths from about 100 nm to about 300 nm, followed by a dramatic decrease in hardness at indentation depths greater than about 300 nm. The 1500 nm-thick layer exhibited a maximum hardness at indentation depths from about 100 nm to about 550 nm and the 2000-nm thick layer exhibited a maximum hardness at indentation depths from about 100 nm to about 600 nm. Although FIG. 85 illustrates a thick single layer, the same behavior is observed in thinner coatings and those including multiple layers such as the multi-layer interference stack 120 of the embodiments described herein.

In some embodiments, the optical coating 120 may exhibit a hardness of about 10 GPa or greater, or about 11 GPa or greater, or about 12 GPa or greater (e.g., 14 GPa or greater, 16 GPa or greater, 18 GPa or greater, 20 GPa or greater). The hardness of the optical coating 120 may be up to about 20 GPa, 30 GPa, or 50 GPa. The article 100, including the multi-layer interference stack 120 and any additional coatings, as described herein, exhibit a hardness of about 10 GPa or greater, or 11 GPa or greater, or about 12 GPa or greater (e.g., 14 GPa or greater, 16 GPa or greater, 18 GPa or greater, 20 GPa or greater), and about 50 GPa or less, for example about 40 GPa or less, or about 30 GPa or less, as measured on the outer surface 22, by a Berkovich Indenter Hardness Test. The hardness of the optical coating 120 may be up to about 20 GPa, 30 GPa, or 50 GPa. Such measured hardness values may be exhibited by the optical coating 120 and/or the article 100 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the outer surface).

The optical coating 120 may have at least one layer having a hardness (as measured on the surface of such layer, e.g., surface of the second high RI layer 130B of FIG. 2 or the surface of the scratch resistant layer) of about 12 GPa or greater, about 13 GPa or greater, about 14 GPa or greater, about 15 GPa or greater, about 16 GPa or greater, about 17 GPa or greater, about 18 GPa or greater, about 19 GPa or greater, about 20 GPa or greater, about 22 GPa or greater, about 23 GPa or greater, about 24 GPa or greater, about 25 GPa or greater, about 26 GPa or greater, or about 27 GPa or greater (up to about 50 GPa), as measured by the Berkovich Indenter Hardness Test. The hardness of such layer may be in the range from about 18 GPa to about 21 GPa, as measured by the Berkovich Indenter Hardness Test. Such measured hardness values may be exhibited by the at least one layer along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

In one or more embodiments, the optical coating 120 or individual layers within the optical coating may exhibit an elastic modulus of about 75 GPa or greater, about 80 GPa or greater or about 85 GPa or greater, as measured on the outer surface 122, by indenting that surface with a Berkovich indenter. The optical coating 120 or individual layers within the optical coating may exhibit an elastic modulus of about 500 GPa or less. These modulus values may represent a modulus measured very close to the outer surface, e.g. at indentation depths of 0 nm to about 50 nm, or it may represent a modulus measured at deeper indentation depths, e.g. from about 50 nm to about 1000 nm.

In embodiments of the article which include a scratch-resistant layer (when used as part of the multi-layer interference stack, e.g., 150 of FIG. 7 or 345 of FIG. 8) or scratch resistant coating (when used as an additional coating 140), the article may exhibit a maximum hardness in the range from about 12 GPa to about 50 GPa, or about 12 GPa to about 25 GPa, as measured by the Berkovich Indenter Hardness Test on the outer surface 122, or the surface of the scratch resistant coating, respectively. Such measured hardness values may be exhibited along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). This hardness may be exhibited even when the scratch resistant layer is not disposed at or near the outer surface 122 (e.g., as shown in FIGS. 7 and 8).

Optical interference between reflected waves from the optical coating 120/air interface and the optical coating 120/substrate 110 interface can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmission may also play a factor in color shift in reflection and vice versa. Factors in angular color shifts in transmission and/or reflection may also include angular color shifts due to viewing angle or angular color shifts away from a certain white point that may be caused by material absorption (somewhat independent of angle) defined by a particular illuminant or test system.

As used herein, a "near normal" incidence angle means an incidence angle that is 10 degrees or less from normal incidence. "Near normal" includes normal. When a transmission or reflection criteria is described as occurring at a "near normal" angle, the criteria is met if the specified transmission or reflection criteria occurs at any near normal angle. In many cases, optical properties such as reflectance, transmission and color shift due to a multi-layer interference stack do not vary much as a function of angle at near normal angles. So, "near normal" incidence and "normal" incidence are, for practical purposes, the same. In addition, some measurement techniques do not work well at exactly normal incident angles, so properties at normal incident angles are often estimated based on measurements at near normal angles. All occurrences of "normal" incidence herein should be read as including "near normal."

It is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

To speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another; for instance, we see that Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the optical coating 120, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the optical coating 120 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical coating 120 can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

The oscillations may be described in terms of amplitude. As used herein, the term "amplitude" includes the peak-to-valley change in reflectance or transmittance. The phrase "average amplitude" includes the peak-to-valley change in reflectance or transmittance averaged over several oscillation cycles or wavelength sub-ranges within the optical wavelength regime. As used herein, the "optical wavelength regime" includes the wavelength range from about 400 nm to about 700 nm (and more specifically from about 450 nm to about 650 nm).

One aspect of this disclosure pertains to an article that exhibits color or colorlessness properties in reflectance and/or transmittance even when viewed at different incident illumination angles under an illuminant. In one or more embodiments, the article exhibits an angular color shift in reflectance and/or transmittance of about 5 or less or about 2 or less between a reference illumination angle and any incidental illumination angles in the ranges provided herein. As used herein, the phrase "color shift" (angular or reference point) refers to the change in both a* and b*, under the CIE L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following Equation (1):

$$\sqrt{((a^*_2 - a^*_1)^2 + (b^*2 - b^*_1)^2)},$$

with $a^*_1$, and $b^*_1$ representing the a* and b* coordinates of the article when viewed at incidence reference illumination angle (which may include normal incidence) and $a^*_2$, and $b^*_2$ representing the a* and b* coordinates of the article when viewed at an incident illumination angle, provided that the incident illumination angle is different from the reference illumination angle and in some cases differs from the reference illumination angle by about 1 degree or more, for example, about 2 degrees or about 5 degrees. In some instances, a specified angular color shift in reflectance and/or transmittance is exhibited by the article when viewed at various incident illumination angles from a reference illumination angle, under an illuminant. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). More specifically, the articles exhibit a specified angular color shift in reflectance and/or transmittance when viewed at an incident or non-incident illumination angle from the reference illumination angle under a CIE F2, F10, F11, F12 or D65 illuminant, or more specifically, under a CIE F2 illuminant.

The reference illumination angle may include normal incidence (i.e., from about 0 degrees to about 10 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the incident illumination angle and the reference illumination angle is about 1 degree or more, for example, about 2 degrees or about 5 degrees. The incident illumination angle may be, with respect to the reference illumination angle, in the range from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from the reference illumination angle. The article may exhibit the angular color shifts in reflectance and/or transmittance described herein at and along all the incident illumination angles in the range from about 2 degrees to about 80 degrees (or from about 10 degrees to about 80 degrees, or from about 20 degrees to about 80 degrees), when the reference illumination angle is normal incidence. In some embodiments, the article may exhibit the angular color shifts in reflectance and/or transmittance described herein at and along all the incident illumination angles in the range from about 2 degrees to about 80 degrees (or from about 10 degrees to about 80 degrees, or from about 20 degrees to about 80 degrees), when the difference between the incident illumination angle and the reference illumination angle is about 1 degree or more, for example about 2 degrees or about 5 degrees.

In some embodiments, the angular color shift may be measured at all angles between a reference illumination angle (e.g., normal incidence) and an incident illumination angle in the range from about 20 degrees to about 80 degrees. In other words, the angular color shift may be measured and may be less than about 5 or less than about 2, at all angles in the range from about 0 degrees and 20 degrees, from about 0 degrees to about 30 degrees, from about 0 degrees to about 40 degrees, from about 0 degrees to about 50 degrees, from about 0 degrees to about 60 degrees or from about 0 degrees to about 80 degrees.

In one or more embodiments, the article exhibits a color in the CIE L*, a*, b* colorimetry system in reflectance and/or transmittance such that the distance or reference point color shift between the transmittance color or reflectance coordinates from a reference point is as specified under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). In specific examples, the articles exhibit a specified color shift in reflectance and/or transmittance when viewed at incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the outer surface 122 having a specified reference point color shift from a reference point, as defined herein. Unless otherwise noted, the transmittance color or transmittance color coordinates are measured on two surfaces of the article including at the outer surface 122 and the opposite bare surface of the article (i.e., 114). Unless otherwise noted, the reflectance color or reflectance color coordinates are measured on only the outer surface 122 of the article. However, the reflectance color or reflectance color coordinates described herein can be measured on both the anti-reflective surface 122 of the article and the opposite side of the article (i.e., major surface 114 in FIG. 1) using either a 2-surface measurement (reflections from two sides of an article are both included) or a 1-surface measurement (reflection only from the outer surface 122 of the article is measured).

In one or more embodiments, the reference point may be the origin (0, 0) in the CIE L*, a*, b* colorimetry system (or the color coordinates a*=0, b*=0), the coordinates (a*=−2, b*=−2), or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

Where the reference point is the color coordinates a*=0, b*=0, the reference point color shift is calculated by Equation (2).

reference point color shift=$\sqrt{((a^*_{article})^2+(b^*_{article})^2)}$

Where the reference point is the color coordinates a*=−2, b*=−2, the reference point color shift is calculated by Equation (3).

reference point color shift=$\sqrt{((a^*_{article}+2)^2+(b^*_{article}+2)^2)}$

Where the reference point is the color coordinates of the substrate, the reference point color shift is calculated by Equation (4).

reference point color shift=$\sqrt{((a^*_{article}-a^*_{substrate})^2+(b^*_{article}-b^*_{substrate})^2)}$ In some embodiments, the article may exhibit a transmittance color (or transmittance color coordinates) and a reflectance color (or reflectance color coordinates) such that the reference point color shift is as specified when the reference point is any one of the color coordinates of the substrate, the color coordinates a*=0, b*=0 and the coordinates a*=−2, b*=−2.

In some embodiments, the article may exhibit a b* value in transmittance (as measured at the outer surface and the opposite bare surface of the article) of less than about 2 (or about 1.8 or less, about 1.6 or less, 1.5 or less, 1.4 or less, 1.2 or less, or about 1 or less) in the CIE L*, a*, b* colorimetry system at all incidence illumination angles in the range from about 0 to about 60 degrees (or from about 0 degrees to about 40 degrees or from about 0 degrees to about 30 degrees). The lower limit of the b* value in transmittance may be about −5.

In some embodiments, the article exhibits a specified a* value in transmittance (at the outer surface and the opposite bare surface) at incident illumination angles in the range from about 0 degrees to about 60 degrees under illuminants D65, A, and F2. In some embodiments, the article exhibits a specified b* value in transmittance (at the outer surface and the opposite bare surface) at incident illumination angles in the range from about 0 degrees to about 60 degrees under illuminants D65, A, and F2.

In some embodiments, the article exhibits a specified a* value in reflectance (at only the outer surface) at incident illumination angles in the range from about 0 degrees to about 60 degrees under illuminants D65, A, and F2. In some embodiments, the article exhibits a specified b* value in reflectance (at only the outer surface) at incident illumination angles in the range from about 0 degrees to about 60 degrees under illuminants D65, A, and F2.

The article of one or more embodiments, or the outer surface (comprising the coating) 122 of one or more articles, may exhibit an average light transmittance of about 95% or greater (e.g., about 9.5% or greater, about 96% or greater, about 96.5% or greater, about 97% or greater, about 97.5% or greater, about 98% or greater, about 98.5% or greater or about 99% or greater) over the optical wavelength regime in the range from about 400 nm to about 700 nm. In some embodiments, the article, or the outer surface 122 of one or more articles, may exhibit an average light reflectance of about 2% or less (e.g., about 1.5% or less, about 1% or less, about 0.75% or less, about 0.5% or less, or about 0.25% or less) over the optical wavelength regime in the range from about 400 nm to about 700 nm. These light transmittance and light reflectance values may be observed over the entire optical wavelength regime or over selected ranges of the optical wavelength regime (e.g., a 100 nm wavelength range, 150 nm wavelength range, a 200 nm wavelength range, a 250 nm wavelength range, a 280 nm wavelength range, or a 300 nm wavelength range, within the optical wavelength regime). In some embodiments, these light reflectance and transmittance values may be a total reflectance or total transmittance (taking into account reflectance or transmittance on both the outer surface 122 and the opposite major surface 114) or may be observed on a single side of the article, as measured on the outer surface 122 only (without taking into account the opposite surface). Unless otherwise specified, the average reflectance or transmittance is measured at an incident illumination angle in the range from about 0 degrees to about 10 degrees (however, such measurements may be provided at incident illumination angles of 45 degrees or 60 degrees).

In some embodiments, the article of one or more embodiments, or the outer surface 122 of one or more articles, may exhibit a specified average visible photopic reflectance over the optical wavelength regime. These photopic reflectance values may be exhibited at incident illumination angles in the range from about 0° to about 20°, from about 0° to about 40° or from about 0° to about 60°. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in Equation (4) as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda$$

In some embodiments, the article exhibits a specified single-side average photopic reflectance, measured at normal or near-normal incidence (e.g. 0-10 degrees) on the outer surface only. A maximum reflectance color shift values represent the lowest color point value measured at any angle from about 5 degrees to about 60 degrees from normal incidence, subtracted from the highest color point value measured at any angle in the same range. The values may represent a maximum change in a* value ($a^*_{highest} - a^*_{lowest}$), a maximum change in b* value ($b^*_{highest} - b^*_{lowest}$), a maximum change in both a* and b* values, or a maximum change in the quantity $\sqrt{((a^*_{highest} - a^*_{lowest})^2 + (b^*_{highest} - b^*_{lowest})^2)}$.

Substrate

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., a sapphire layer, a polycrystalline alumina layer and/or or a spinel ($MgAl_2O_4$) layer).

The substrate 110 of one or more embodiments may have a hardness that is less than the hardness of the article (as measured by the Berkovich Indenter Hardness Test described herein). The hardness of the substrate may be measured using known methods in the art, including but not limited to the Berkovich Indenter Hardness Test, as described herein.

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single side of the substrate (i.e., on the outer surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, published as US2010-0009154A1, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum CT values are measured using a scattered light polariscope (SCALP) technique known in the art.

As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In some embodiments, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm or greater) and/or a maximum CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOC greater than 15 µm, and a maximum CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes 6 wt. % or more aluminum oxide. In further embodiments, the substrate includes a glass composition with one or more alkaline earth oxides, such that a content of alkaline earth oxides is 5 wt. % or more. Suitable glass compositions, in some embodiments, further comprise at least one of $K_2O$, MgO, and CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In some embodiments, an alkali aluminosilicate glass composition suitable for the substrate comprises alumina, at least one alkali metal and, in some embodiments, greater than 50 mol. % $SiO_2$, in other embodiments 58 mol. % or more $SiO_2$, and in still other embodiments 60 mol. % or more $SiO_2$, wherein the ratio $(Al_2O_3+B_2O_3)/\Sigma$modifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$modifiers (i.e., sum of modifiers) is greater than 1.

In some embodiments, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % MgO+CaO+SrO $\leq 8$ mol. %; $(Na_2O+B_2O_3)—Al_2O_3 \leq 2$ mol. %; 2 mol. % $\leq Na_2O—Al_2O_3 \leq 6$ mol. %; and 4 mol. % $\leq (Na_2O+K_2O)—Al_2O_3 \leq 10$ mol. %.

In some embodiments, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 µm to about 5 mm Example substrate 110 physical thicknesses range from about 100 µm to about 500 µm (e.g., 100, 200, 300, 400 or 500 µm). Further example substrate 110 physical thicknesses range from about 500 µm to about 1000 µm (e.g., 500, 600, 700, 800, 900 or 1000 µm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Multi-Layer Interference Stack

As shown in FIG. 1, the multi-layer interference stack 130 may include a plurality of layers such that one or more layers may be disposed on the opposite side of the substrate 110 from the multi-layer interference stack 130 (i.e., on major surface 114)(shown in FIG. 1).

The physical thickness of the multi-layer interference stack 130 disposed on the major surface 114 may be in the range from about 0.1 µm to about 5 µm. In some instances, the physical thickness of the multi-layer interference stack 130 disposed on major surface 114 may be in the range from about 0.01 µm to about 0.9 µm, from about 0.01 µm to about 0.8 µm, from about 0.01 µm to about 0.7 µm, from about 0.01 µm to about 0.6 µm, from about 0.01 µm to about 0.5 µm, from about 0.01 µm to about 0.4 µm, from about 0.01 µm to about 0.3 µm, from about 0.01 µm to about 0.2 µm, from about 0.01 µm to about 0.1 µm, from about 0.02 µm to about 1 µm, from about 0.03 µm to about 1 µm, from about 0.04 µm to about 1 µm, from about 0.05 µm to about 1 µm, from about 0.06 µm to about 1 µm, from about 0.07 µm to about 1 µm, from about 0.08 µm to about 1 µm, from about 0.09 µm to about 1 µm, from about 0.2 µm to about 1 µm, from about 0.2 µm to about 2 µm, from about 0.2 µm to about 3 µm, from about 0.2 µm to about 4 µm, from about 0.2 µm to about 5 µm, from about 0.3 µm to about 5 µm, from about 0.4 µm to about 5 µm, from about 0.5 µm to about 5 µm, from about 0.6 µm to about 3 µm, from about 0.7 µm to about 2 µm, from about 0.8 µm to about 1 µm, or from about 0.9 µm to about 1 µm, and all ranges and sub-ranges therebetween.

A second aspect of this disclosure pertains to a method for forming the articles described herein. In some embodiments, the method includes providing a substrate having a major surface in a coating chamber, forming a vacuum in the coating chamber, forming a durable optical coating as described herein on the major surface, optionally forming an additional coating comprising at least one of an easy-to-clean coating and a scratch resistant coating, on the optical coating, and removing the substrate from the coating chamber. In one or more embodiments, the optical coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The optical coating 120 and/or the additional coating 140 may be formed using various deposition methods such as vacuum deposition techniques, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering, metal-mode reactive sputtering, or laser ablation), thermal or e-beam evaporation and/or atomic layer deposition. Liquid-based methods may also be used such as spraying, dipping, spin coating, or slot coating (for example, using sol-gel materials). Where vacuum deposition is utilized, inline processes may be used to form the optical coating 120 and/or the additional coating 140 in one deposition run. In some instances, the vacuum deposition can be made by a linear PECVD source.

In some embodiments, the method may include controlling the thickness of the optical coating 120 and/or the additional coating 140 so that it does not vary by more than about 4% along about 80% or more of the area of the outer surface 122 or from the target thickness for each layer at any point along the substrate area. In some embodiments, the thickness of the optical coating 120 and/or the additional coating 140 so that it does not vary by more than about 4% along about 95% or more of the area of the outer surface 122.

Figure 86:
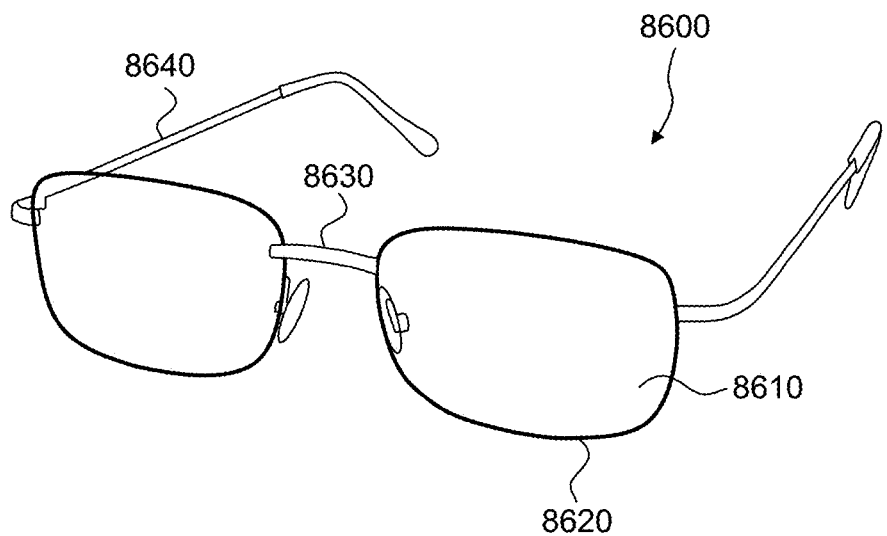
FIG. 86 shows sunglasses in accordance with some embodiments.

FIG. 86 shows sunglasses 8600 in accordance with some embodiments. Sunglasses 8600 include lenses 8610, frames 8620, a bridge 8630, and temples 8640. Any suitable sunglasses structure may be used. The specific structure of FIG. 86 is not intended to be limiting. For example, some sunglasses have a single continuous lens as opposed to two lenses separate by a bridge. And, for example, some sunglasses have different frame configurations, including half-frame and no-frame configurations. In some embodiments, a scratch resistant coating as described herein may be applied to the front surface of lenses 8610, i.e., the surface facing away from the wearer. Coatings may also be applied to the back surface of lenses 8610 as described herein.

Figure 87A:
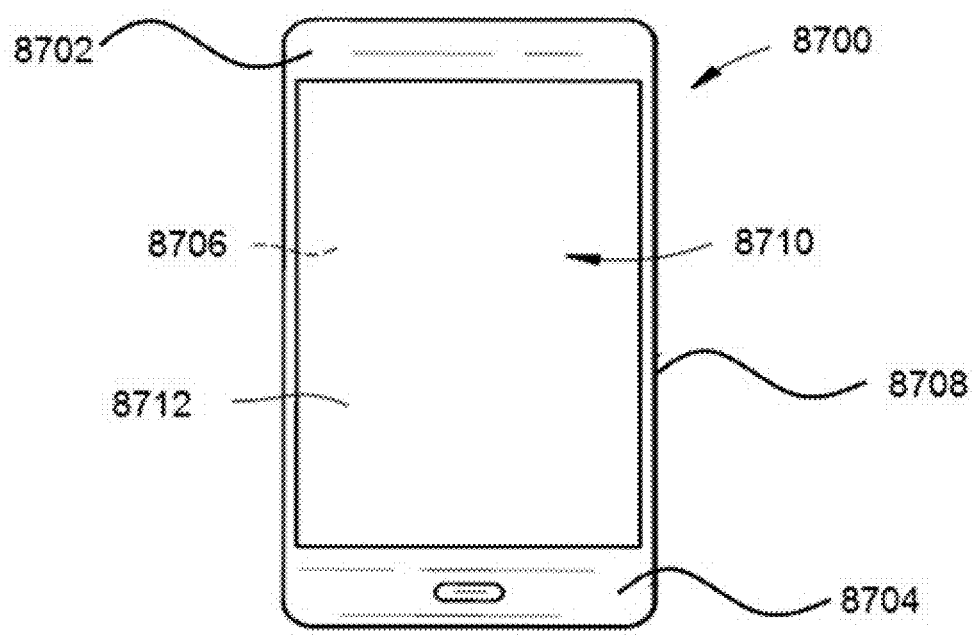
FIG. 87A is a plan view of an exemplary electronic device incorporating any of the strengthened articles disclosed herein.
Figure 87B:
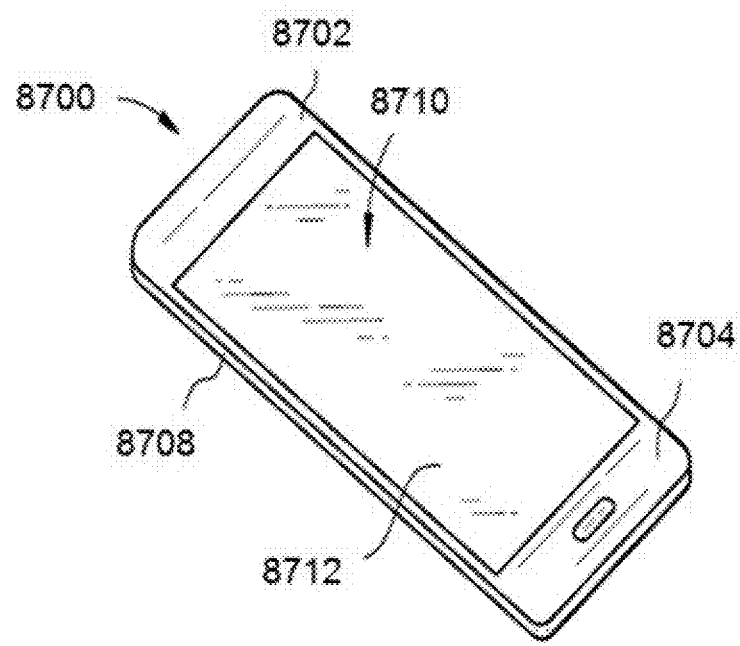
FIG. 87B is a perspective view of the exemplary electronic device of FIG. 87A.

The glass articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. The transparency may include visible/optical transparency, or may include microwave/RF transparency (even if the article is opaque in the visible spectrum, such as for a black glass-ceramic). An exemplary article incorporating any of the glass articles disclosed herein is shown in FIGS. 87A and 87B. Specifically, FIGS. 87A and 87B show a consumer electronic device 8700 including a housing 8702 having front 8704, back 8706, and side surfaces 8708; electrical components (not shown) that are at least partially inside or entirely within the housing and including at least a controller, a memory, and a display 8710 at or adjacent to the front surface of the housing; and a cover substrate 8712 at or over the front surface of the housing such that it is over the display. In some embodiments, the cover substrate 8712 may include any of the glass articles disclosed herein. In some embodiments, at least one of a portion of the housing or the cover substrate comprises the glass articles disclosed herein.

EXAMPLES

Various embodiments will be further clarified by the following examples. In the Examples, it should be noted that $AlO_xN_y$, $Si_uO_xN_y$, and $Si_uAl_vO_xN_y$ were found to be substantially interchangeable as the high-index material in the modeled examples, with minor process adjustments to re-create the targeted refractive index dispersion values and layer thickness designs provided, which are apparent to one of ordinary skill in the art.

Example A

Example A included a 12-layer optical coating 300, including capping layer 305 (e.g., comparable to capping layer 131, as shown in FIG. 2), and layers 310, 320, 330, 340, 345, 350, 360, 370, 380, 390 and 392 sequentially disposed on top of one another, and disposed on a strengthened aluminosilicate glass substrate 500 having a nominal composition of about 58 mol % $SiO_2$, 16.5 mol % $Al_2O_3$, 17 mol % $Na_2O$, 3 mol % MgO, and about 6.5 mol % $P_2O_5$ (see FIG. 8). Layers 310, 330, 360, 380 and 392 are high refractive index layers comparable in refractive index and structure as high RI layer 130B (see, e.g., FIG. 2 and corresponding description). Layers 320, 340, 350, 370 and 390 are low refractive index layers comparable in refractive index and structure as low RI layer 130A (see, e.g., FIG. 2 and corresponding description). The optical coating 300 also includes a scratch resistant layer 345 (including sub-layers 345A-345I and low RI layer 340) disposed within the layers of the anti-reflective coating. The structure of the article is shown in FIG. 8 (the thicknesses shown in FIG. 8 are not exact and intended to be illustrative) and the relative thicknesses of the layers are shown in Table A.

Both $SiO_2$ and $Si_uAl_vO_xN_y$ layers were made by reactive sputtering in an AJA-Industries Sputter Deposition Tool. $SiO_2$ was deposited by DC reactive sputtering from an Si target with ion assist; $Si_uAl_vO_xN_y$ material was deposited by DC reactive sputtering combined with RF superimposed DC sputtering with ion assist. The targets were 3" diameter Silicon and 3" diameter Al. The reactive gasses were nitrogen and oxygen, and the "working" (or inert) gas was Argon. The power supplied to the Silicon was radio frequency (RF) at 13.56 Mhz. The power supplied to the Aluminum was DC.

The sputtering process conditions by which the structure of the anti-reflective coating were made are shown in Table B.

Layers 340 and 345A-I of period 3 included a layer having a substantially homogenous composition (layer 340) and plurality of layers, when compared to one another, having a refractive index gradient (layers 345A-345I) formed from altering the composition of the plurality of layers from one layer to the next adjacent layer so the refractive index increases step-wise or monotonically from 2.015 to 2.079 to 2.015, as shown in Table A. The refractive indices of layers 345B-D and 345F-H were not measured but were estimated based on known methods in the art. The article fabricated according to Example A exhibited significantly improved abrasion resistance compared to the abrasion and scratch resistance of a comparative uncoated bare glass substrate together with reflectance below 1% over a portion of the optical wavelength regime. Fabrication methods similar to those used for Example A may be used to fabricate the structures of Examples 1 through 16, and similar structures.

TABLE A

Structure of Example A.

| Layer | Periods | Material | Refractive Index @ 550 nm | Target Physical Thickness |
|---|---|---|---|---|
| Ambient medium | — | Air | 1 | |
| Optical coating | 1 | $SiO_2$ (305) | 1.483 | 87.84 nm |
| | | $Si_uAl_vO_xN_y$ (310) | 2.015 | 147.92 nm |
| | 2 | $SiO_2$ (320) | 1.483 | 20.32 nm |
| | | $Si_uAl_vO_xN_y$ (330) | 2.015 | 49.63 nm |
| | 3 | $SiO_2$ (340) | 1.483 | 11.86 nm |
| | | $Si_uAl_vO_xN_y$ (345A) | 2.015 | 84.11 nm |
| | | $Si_uAl_vO_xN_y$ (345B) | 2.031* | 88.54 nm |
| | | $Si_uAl_vO_xN_y$ (345C) | 2.047* | 92.98 nm |

TABLE A-continued

Structure of Example A.

| Layer | Periods | Material | Refractive Index @ 550 nm | Target Physical Thickness |
|---|---|---|---|---|
| | | $Si_uAl_vO_xN_y$ (345D) | 2.063* | 97.41 nm |
| | | $Si_uAl_vO_xN_y$ (345E) | 2.079 | 1219.51 nm |
| | | $Si_uAl_vO_xN_y$ (345F) | 2.063* | 97.41 nm |
| | | $Si_uAl_vO_xN_y$ (345G) | 2.047* | 92.98 nm |
| | | $Si_uAl_vO_xN_y$ (345H) | 2.031* | 88.54 nm |
| | | $Si_uAl_vO_xN_y$ (345I) | 2.015 | 84.11 nm |
| | 4 | $SiO_2$ (350) | 1.483 | 8.38 nm |
| | | $Si_uAl_vO_xN_y$ (360) | 2.015 | 45.98 nm |
| | 5 | $SiO_2$ (370) | 1.483 | 33.21 nm |
| | | $Si_uAl_vO_xN_y$ (380) | 2.015 | 24.96 nm |
| | 6 | $SiO_2$ (390) | 1.483 | 60.17 nm |
| | | $Si_uAl_vO_xN_y$ (392) | 2.015 | 8.78 nm |
| Substrate | — | AS Glass (500) | 1.51005 | |
| — | | Total Coating Thickness | | 2444.64 nm |

TABLE B

DC/RF Reactive Sputtering Process Conditions for Example A.

| Layer(s) | Ar Flow (sccm) | N2 flow (sccm) | O2 flow (sccm) | Al Wrf | Al Wdc | Si Wrf | P (torr) |
|---|---|---|---|---|---|---|---|
| 305, 320, 340, 350, 370, 390 | 30 | 30 | 3.3 | 75 | 50 | 500 | 4 |
| 310, 330, 360, 780, 392 | 30 | 30 | 0.5 | 200 | 300 | 500 | 4 |
| 345A, 345I | 30 | 30 | 0.5 | 200 | 300 | 500 | 4 |
| 345B, 345H | 30 | 30 | 0.5 | 200 | 300 | 500 | 3.5 |
| 345C, 345G | 30 | 30 | 0.5 | 200 | 300 | 500 | 3 |
| 345D, 345F | 30 | 30 | 0.5 | 200 | 300 | 500 | 2.5 |
| 345E | 30 | 30 | 0.5 | 200 | 300 | 500 | 2 |

Modeled Examples 1-16

Modeled Examples 1-16 used modeling to demonstrate the reflectance spectra of articles that included embodiments of the optical coating, as described herein. In Modeled Examples 1-16, the optical coating included $AlO_xN_y$ and $SiO_2$ layers, and a glass substrate commercially available from Corning® as Grey 17 glass (Corning glass code 82524). The modeled examples used refractive index/dispersion curves from $AlO_xN_y$ and $SiO_2$ films fabricated on a metal-mode sputtering system.

To determine the refractive index dispersion curves for the coating materials, layers of each coating material were formed onto silicon wafers and glass substrates by metal-mode sputtering from aluminum and silicon targets. The refractive indices (as a function of wavelength) of each of the formed layers and the glass substrate were measured using spectroscopic ellipsometry. The refractive indices thus measured were then used to calculate reflectance spectra for Modeled Examples 1-16. The modeled examples use a single refractive index value in their descriptive tables for convenience, which corresponds to a point selected from the dispersion curves at about 550 nm wavelength. Unless specified otherwise, refractive index values are given at a wavelength of 550 nm.

Tables 1 through 16 show the composition and thicknesses of the layers of Examples 1 through 16, respectively. The structures look similar to that of FIG. 7, but with the specific layers, layer compositions, and layer thicknesses shown in Tables 1 through 16. The thicknesses in Tables 1 through 16 are physical thicknesses, not optical thicknesses. The thick scratch resistant layer is included as a part of the multi-layer interference stack when calculating what fraction or thickness of the stack is made of a particular material.

TABLE 1

Example 1 Coating design:

| Layer | Material | Refractive Index @550 nm | Physical Thickness (nm) |
|---|---|---|---|
| Medium | Air | 1 | |
| 1 | AlOxNy | 2.0137 | 68.3 |
| 2 | SiO2 | 1.4680 | 93.7 |
| 3 | AlOxNy | 2.0137 | 68.3 |
| 4 | SiO2 | 1.4680 | 93.7 |
| 5 | AlOxNy | 2.0137 | 2000 |
| Substrate | Grey17- (code 82524) | 1.5283 | 1.8 mm |
| Medium | Air | 1 | |

| | |
|---|---|
| Total coating thickness (all layers) | 2323.9 nm |
| Thickness (sum) of low-index matl. in coating | 187.3 nm |
| Fraction (%) of low-index matl. in coating | 8.1% |
| Thickness (sum) of low-index matl. above thickest hard layer in coating | 187.3 nm |
| Thickness (sum) of all layers above thickest hard layer in coating | 323.9 nm |
| Fraction (%) of low-index matl. above thickest hard layer in coating | 57.8% |

TABLE 2

Example 2 Coating Design

| Layer | Material | Refractive Index @550 nm | Physical Thickness (nm) |
|---|---|---|---|
| Medium | Air | 1 | |
| 1 | AlOxNy | 2.0137 | 68.3 |
| 2 | SiO2 | 1.4680 | 93.7 |
| 3 | AlOxNy | 2.0137 | 2000 |
| 4 | SiO2 | 1.4680 | 8.1 |
| 5 | AlOxNy | 2.0137 | 43.7 |
| 6 | SiO2 | 1.4680 | 28.3 |
| 7 | AlOxNy | 2.0137 | 26.3 |
| 8 | SiO2 | 1.4680 | 47.7 |
| 9 | AlOxNy | 2.0137 | 9.3 |
| Substrate | Grey17- (code 82524) | 1.52829 | 1.8 mm |
| Medium | Air | 1 | |

| | |
|---|---|
| Total coating thickness (all layers) | 2325.3 nm |
| Thickness (sum) of low-index matl. in coating | 177.8 nm |
| Fraction (%) of low-index matl. in coating | 7.6% |
| Thickness (sum) of low-index matl. above thickest hard layer in coating | 93.7 nm |
| Thickness (sum) of all layers above thickest hard layer in coating | 161.9 nm |
| Fraction (%) of low-index matl. above thickest hard layer in coating | 57.8% |

TABLE 3

Example 3 Coating Design

| Layer | Material | Refractive Index @550 nm | Physical Thickness (nm) |
|---|---|---|---|
| Medium | Air | 1 | |
| 1 | AlOxNy | 2.0137 | 68.3 |
| 2 | SiO2 | 1.4680 | 93.7 |
| 3 | AlOxNy | 2.0137 | 68.3 |
| 4 | SiO2 | 1.4680 | 93.7 |
| 5 | AlOxNy | 2.0137 | 2000 |
| 6 | SiO2 | 1.4680 | 8.4 |
| 7 | AlOxNy | 2.0137 | 43.5 |
| 8 | SiO2 | 1.4680 | 28.2 |
| 9 | AlOxNy | 2.0137 | 26.4 |
| 10 | SiO2 | 1.4680 | 46.8 |
| 11 | AlOxNy | 2.0137 | 9 |
| Substrate | Grey 17- (code 82524) | 1.5283 | 1.8 mm |
| Medium | Air | 1 | |

| | |
|---|---|
| Total coating thickness (all layers) | 2486.2 nm |
| Thickness (sum) of low-index matl. in coating | 270.7 nm |
| Faction (%) of low-index matl. in coating | 10.9% |
| Thickness (sum) of low-index matl. above thickest hard layer in coating | 187.3 nm |
| Thickness (sum) of all layers above thickest hard layer in coating | 323.9 nm |
| Faction (%) of low-index matl. above thickest hard layer in coating | 57.8% |

TABLE 4

Example 4 Coating Design

| Layer | Material | Refractive Index @550 nm | Physical Thickness (nm) |
|---|---|---|---|
| Medium | Air | 1 | |
| 1 | AlOxNy | 2.0137 | 68.3 |
| 2 | SiO2 | 1.4680 | 93.7 |
| 3 | AlOxNy | 2.0137 | 68.3 |
| 4 | SiO2 | 1.4680 | 93.7 |
| 5 | AlOxNy | 2.0137 | 68.3 |
| 6 | SiO2 | 1.4680 | 93.7 |
| 7 | AlOxNy | 2.0137 | 68.3 |
| 8 | SiO2 | 1.4680 | 93.7 |
| 9 | AlOxNy | 2.0137 | 68.3 |
| 10 | SiO2 | 1.4680 | 93.7 |
| 11 | AlOxNy | 2.0137 | 2000 |
| 12 | SiO2 | 1.4680 | 8.4 |
| 13 | AlOxNy | 2.0137 | 43.5 |
| 14 | SiO2 | 1.4680 | 28.2 |
| 15 | AlOxNy | 2.0137 | 26.4 |
| 16 | SiO2 | 1.4680 | 46.8 |
| 17 | AlOxNy | 2.0137 | 9 |
| Substrate | Grey17- (code 82524) | 1.5283 | 1.8 mm |
| Medium | Air | 1 | |

| | |
|---|---|
| Total coating thickness (all layers) | 2972.0 nm |
| Thickness (sum) of low-index matl. in coating | 551.7 nm |
| Fraction (%) of low-index matl. in coating | 18.6% |
| Thickness (sum) of low-index matl. above thickest hard layer in coating | 468.3 nm |
| Thickness (sum) of all layers above thickest hard layer in coating | 809.7 nm |
| Fraction (%) of low-index matl. above thickest hard layer in coating | 57.8% |

TABLE 5

Example 5 Coating Design

| Layer | Material | Refractive Index @550 nm | Physical Thickness (nm) |
|---|---|---|---|
| Medium | Air | 1 | |
| 1 | SiO2 | 1.4680 | 93.7 |

TABLE 5-continued

Example 5 Coating Design

| Layer | Material | Refractive Index @550 nm | Physical Thickness (nm) |
|---|---|---|---|
| 2 | AlOxNy | 2.0137 | 68.3 |
| 3 | SiO2 | 1.4680 | 93.7 |
| 4 | AlOxNy | 2.0137 | 68.3 |
| 5 | SiO2 | 1.4680 | 93.7 |
| 6 | AlOxNy | 2.0137 | 2000 |
| 7 | SiO2 | 1.4680 | 8.4 |
| 8 | AlOxNy | 2.0137 | 43.5 |
| 9 | SiO2 | 1.4680 | 28.2 |
| 10 | AlOxNy | 2.0137 | 26.4 |
| 11 | SiO2 | 1.4680 | 46.8 |
| 12 | AlOxNy | 2.0137 | 9.0 |
| Substrate | Grey17- (code 82524) | 1.5283 | 1.8 mm |
| Medium | Air | 1 | |

| | |
|---|---|
| Total coating thickness (all layers) | 2579.8 nm |
| Thickness (sum) of low-index matl. in coating | 364.4 nm |
| Fraction (%) of low-index matl. in coating | 14.1% |
| Thickness (sum) of low-index matl. above thickest hard layer in coating | 281.0 nm |
| Thickness (sum) of all layers above thickest hard layer in coating | 417.5 nm |
| Fraction (%) of low-index matl. above thickest hard layer in coating | 67.3% |

TABLE 6

Example 6 Coating Design

| Layer | Material | Refractive Index @550 nm | Physical Thickness (nm) |
|---|---|---|---|
| Medium | Air | 1 | |
| 1 | AlOxNy | 2.0137 | 48.4 |
| 2 | SiO2 | 1.4680 | 67.6 |
| 3 | AlOxNy | 2.0137 | 48.4 |
| 4 | SiO2 | 1.4680 | 67.6 |
| 5 | AlOxNy | 2.0137 | 48.4 |
| 6 | SiO2 | 1.4680 | 67.6 |
| 7 | AlOxNy | 2.0137 | 48.4 |
| 8 | SiO2 | 1.4680 | 67.6 |
| 9 | AlOxNy | 2.0137 | 48.4 |
| 10 | SiO2 | 1.4680 | 67.6 |
| 11 | AlOxNy | 2.0137 | 2000 |
| 12 | SiO2 | 1.4680 | 8.4 |
| 13 | AlOxNy | 2.0137 | 43.5 |
| 14 | SiO2 | 1.4680 | 28.2 |
| 15 | AlOxNy | 2.0137 | 26.4 |
| 16 | SiO2 | 1.4680 | 46.8 |
| 17 | AlOxNy | 2.0137 | 9 |
| Substrate | Grey17-(code 82524) | 1.5283 | 1.8 mm |
| Medium | Air | 1 | |

| | |
|---|---|
| Total coating thickness (all layers) | 2742.2 nm |
| Thickness (sum) of low-index matl. in coating | 421.3 nm |
| Fraction (%) of low-index matl. in coating | 15.4% |
| Thickness (sum) of low-index matl. above thickest hard layer in coating | 337.9 nm |
| Thickness (sum) of all layers above thickest hard layer in coating | 579.9 nm |
| Fraction (%) of low-index matl. above thickest hard layer in coating | 58.3% |

TABLE 7

Example 7 Coating Design

| Layer | Material | Refractive Index @550 nm | Physical Thickness (nm) |
|---|---|---|---|
| Medium | Air | 1 | |
| 1 | AlOxNy | 2.0137 | 87.8 |

TABLE 7-continued

Example 7 Coating Design

| Layer | Material | Refractive Index @550 nm | Physical Thickness (nm) |
|---|---|---|---|
| 2 | SiO2 | 1.4680 | 119.7 |
| 3 | AlOxNy | 2.0137 | 87.8 |
| 4 | SiO2 | 1.4680 | 119.7 |
| 5 | AlOxNy | 2.0137 | 87.8 |
| 6 | SiO2 | 1.4680 | 119.7 |
| 7 | AlOxNy | 2.0137 | 87.8 |
| 8 | SiO2 | 1.4680 | 119.7 |
| 9 | AlOxNy | 2.0137 | 87.8 |
| 10 | SiO2 | 1.4680 | 119.7 |
| 11 | AlOxNy | 2.0137 | 2000 |
| 12 | SiO2 | 1.4680 | 8.4 |
| 13 | AlOxNy | 2.0137 | 43.5 |
| 14 | SiO2 | 1.4680 | 28.2 |
| 15 | AlOxNy | 2.0137 | 26.3 |
| 16 | SiO2 | 1.4680 | 46.8 |
| 17 | AlOxNy | 2.0137 | 9.0 |
| Substrate | Grey17-(code 82524) | 1.5283 | 1.8 mm |
| Medium | Air | 1 | |

| | |
|---|---|
| Total coating thickness (all layers) | 3199.6 |
| Thickness (sum) of low-index matl. in coating | 681.8 |
| Fraction (%) of low-index matl. in coating | 21.3% |
| Thickness (sum) of low-index matl. above thickest hard layer in coating | 598.4 |
| Thickness (sum) of all layers above thickest hard layer in coating | 1037.4 |
| Fraction (%) of low-index matl. above thickest hard layer in coating | 57.7% |

TABLE 8

Example 8 Coating Design

| Layer | Material | Refractive Index @550 nm | Physical Thickness (nm) |
|---|---|---|---|
| Medium | Air | 1 | |
| 1 | AlOxNy | 2.0137 | 48.6 |
| 2 | SiO2 | 1.4680 | 63 |
| 3 | AlOxNy | 2.0137 | 45.1 |
| 4 | SiO2 | 1.4680 | 56.7 |
| 5 | AlOxNy | 2.0137 | 94.9 |
| 6 | SiO2 | 1.4680 | 66.1 |
| 7 | AlOxNy | 2.0137 | 15.6 |
| 8 | SiO2 | 1.4680 | 22.4 |
| 9 | AlOxNy | 2.0137 | 2000 |
| 10 | SiO2 | 1.4680 | 8.9 |
| 11 | AlOxNy | 2.0137 | 42.6 |
| 12 | SiO2 | 1.4680 | 30.1 |
| 13 | AlOxNy | 2.0137 | 24.5 |
| 14 | SiO2 | 1.4680 | 52.4 |
| 15 | AlOxNy | 2.0137 | 7.7 |
| Substrate | Grey17-(code 82524) | 1.5283 | 1.8 mm |
| Medium | Air | 1 | |

| | |
|---|---|
| Total coating thickness (all layers) | 2578.6 nm |
| Thickness (sum) of low-index matl. in coating | 299.6 nm |
| Fraction (%) of low-index matl. in coating | 11.6% |
| Thickness (sum) of low-index matl. above thickest hard layer in coating | 208.2 nm |
| Thickness (sum) of all layers above thickest hard layer in coating | 412.4 nm |
| Fraction (%) of low-index matl. above thickest hard layer in coating | 50.5% |

TABLE 9

Example 9 Coating Design

| Layer | Material | Refractive Index @550 nm | Physical Thickness (nm) |
|---|---|---|---|
| Medium | Air | 1 | |
| 1 | SiO2 | 1.4680 | 75 |
| 2 | AlOxNy | 2.0137 | 2000 |
| 3 | SiO2 | 1.4680 | 202.6 |
| 4 | AlOxNy | 2.0137 | 41.4 |
| 5 | SiO2 | 1.4680 | 190 |
| 6 | AlOxNy | 2.0137 | 40.2 |
| 7 | SiO2 | 1.4680 | 211.2 |
| 8 | AlOxNy | 2.0137 | 42.5 |
| 9 | SiO2 | 1.4680 | 83.1 |
| 10 | AlOxNy | 2.0137 | 190 |
| 11 | SiO2 | 1.4680 | 40 |
| 12 | AlOxNy | 2.0137 | 48.9 |
| 13 | SiO2 | 1.4680 | 93.4 |
| 14 | AlOxNy | 2.0137 | 85.1 |
| 15 | SiO2 | 1.4680 | 65.3 |
| 16 | AlOxNy | 2.0137 | 208 |
| 17 | SiO2 | 1.4680 | 106.9 |
| 18 | AlOxNy | 2.0137 | 10 |
| 19 | SiO2 | 1.4680 | 18 |
| 20 | AlOxNy | 2.0137 | 164.5 |
| Substrate | Grey17-(code 82524) | 1.5283 | 1.8 mm |
| Medium | Air | 1 | |

| | |
|---|---|
| Total coating thickness (all layers) | 3916.1 nm |
| Thickness (sum) of low-index matl. in coating | 1085.5 nm |
| Fraction (%) of low-index matl. in coating | 27.7% |
| Thickness (sum) of low-index matl. above thickest hard layer in coating | 75.0 nm |
| Thickness (sum) of all layers above thickest hard layer in coating | 75.0 nm |
| Fraction (%) of low-index matl. above thickest hard layer in coating | 100.0% |

TABLE 10

Example 10 Coating Design

| Layer | Material | Refractive Index @550 nm | Physical Thickness (nm) |
|---|---|---|---|
| Medium | Air | 1 | |
| 1 | SiO2 | 1.4680 | 79.9 |
| 2 | AlOxNy | 2.0137 | 2000 |
| 3 | SiO2 | 1.4680 | 395.1 |
| 4 | AlOxNy | 2.0137 | 80.6 |
| 5 | SiO2 | 1.4680 | 370.7 |
| 6 | AlOxNy | 2.0137 | 78.4 |
| 7 | SiO2 | 1.4680 | 411.8 |
| 8 | AlOxNy | 2.0137 | 82.9 |
| 9 | SiO2 | 1.4680 | 162 |
| 10 | AlOxNy | 2.0137 | 370.7 |
| 11 | SiO2 | 1.4680 | 78 |
| 12 | AlOxNy | 2.0137 | 95.4 |
| 13 | SiO2 | 1.4680 | 182.1 |
| 14 | AlOxNy | 2.0137 | 165.9 |
| 15 | SiO2 | 1.4680 | 127.3 |
| 16 | AlOxNy | 2.0137 | 405.5 |
| 17 | SiO2 | 1.4680 | 208.4 |
| 18 | AlOxNy | 2.0137 | 19.5 |
| 19 | SiO2 | 1.4680 | 35.1 |
| 20 | AlOxNy | 2.0137 | 320.8 |
| Substrate | Grey17-(code 82524) | 1.5283 | 1.8 mm |
| Medium | Air | 1 | |

| | |
|---|---|
| Total coating thickness (all layers) | 5670.1 nm |
| Thickness (sum) of low-index matl. in coating | 2050.4 nm |
| Fraction (%) of low-index matl. in coating | 36.2% |
| Thickness (sum) of low-index matl. above thickest hard layer in coating | 79.9 nm |
| Thickness (sum) of all layers above thickest hard layer in coating | 79.9 nm |
| Fraction (%) of low-index matl. above thickest hard layer in coating | 100.0% |

TABLE 11

Example 11 Coating Design

| Layer | Material | Refractive Index @550 nm | Physical Thickness (nm) |
|---|---|---|---|
| Medium | Air | 1 | |
| 1 | SiO2 | 1.4680 | 86.7 |
| 2 | AlOxNy | 2.0137 | 2000 |
| 3 | SiO2 | 1.4680 | 159.7 |
| 4 | AlOxNy | 2.0137 | 89.2 |
| 5 | SiO2 | 1.4680 | 131.6 |
| 6 | AlOxNy | 2.0137 | 87.1 |
| 7 | SiO2 | 1.4680 | 147.1 |
| 8 | AlOxNy | 2.0137 | 59.4 |
| 9 | SiO2 | 1.4680 | 74.7 |
| 10 | AlOxNy | 2.0137 | 139.5 |
| 11 | SiO2 | 1.4680 | 83.9 |
| 12 | AlOxNy | 2.0137 | 60.4 |
| 13 | SiO2 | 1.4680 | 81.7 |
| 14 | AlOxNy | 2.0137 | 60.9 |
| 15 | SiO2 | 1.4680 | 87.1 |
| 16 | AlOxNy | 2.0137 | 68.9 |
| 17 | SiO2 | 1.4680 | 120 |
| 18 | AlOxNy | 2.0137 | 13.1 |
| 19 | SiO2 | 1.4680 | 21 |
| 20 | AlOxNy | 2.0137 | 42.7 |
| 21 | SiO2 | 1.4680 | 19.5 |
| 22 | AlOxNy | 2.0137 | 90.9 |
| Substrate | Grey17-(code 82524) | 1.5283 | 1.8 mm |
| Medium | Air | 1 | |

| | |
|---|---|
| Total coating thickness (all layers) | 3725.1 nm |
| Thickness (sum) of low-index matl. in coating | 1013.0 nm |
| Fraction (%) of low-index matl. in coating | 27.2% |
| Thickness (sum) of low-index matl. above thickest hard layer in coating | 86.7 nm |
| Thickness (sum) of all layers above thickest hard layer in coating | 86.7 nm |
| Fraction (%) of low-index matl. above thickest hard layer in coating | 100.0% |

TABLE 11A

Example 11A Coating Design

| Layer | Material | Refractive Index @550 nm | Physical Thickness (nm) |
|---|---|---|---|
| Medium | Air | 1 | |
| 1 | SiO2 | 1.4680 | 86.7 |
| 2 | AlOxNy | 2.0137 | 800 |
| 3 | SiO2 | 1.4680 | 159.7 |
| 4 | AlOxNy | 2.0137 | 89.2 |
| 5 | SiO2 | 1.4680 | 131.6 |
| 6 | AlOxNy | 2.0137 | 87.1 |
| 7 | SiO2 | 1.4680 | 147.1 |
| 8 | AlOxNy | 2.0137 | 59.4 |
| 9 | SiO2 | 1.4680 | 74.7 |
| 10 | AlOxNy | 2.0137 | 139.5 |
| 11 | SiO2 | 1.4680 | 83.9 |
| 12 | AlOxNy | 2.0137 | 60.4 |
| 13 | SiO2 | 1.4680 | 81.7 |
| 14 | AlOxNy | 2.0137 | 60.9 |

TABLE 11A-continued

Example 11A Coating Design

| Layer | Material | Refractive Index @550 nm | Physical Thickness (nm) |
|---|---|---|---|
| 15 | SiO2 | 1.4680 | 87.1 |
| 16 | AlOxNy | 2.0137 | 68.9 |
| 17 | SiO2 | 1.4680 | 120 |
| 18 | AlOxNy | 2.0137 | 13.1 |
| 19 | SiO2 | 1.4680 | 21 |
| 20 | AlOxNy | 2.0137 | 42.7 |
| 21 | SiO2 | 1.4680 | 19.5 |
| 22 | AlOxNy | 2.0137 | 90.9 |
| Substrate | Grey17-(code 82524) | 1.5283 | 1.8 mm |
| Medium | Air | 1 | |

| | |
|---|---|
| Total coating thickness (all layers) | 2525.1 nm |
| Thickness (sum) of low-index matl. in coating | 1013.0 nm |
| Fraction (%) of low-index matl. in coating | 40.1% |
| Thickness (sum) of low-index matl. above thickest hard layer in coating | 86.7 nm |
| Thickness (sum) of all layers above thickest hard layer in coating | 86.7 nm |
| Fraction (%) of low-index matl. above thickest hard layer in coating | 100.0% |

TABLE 11B

Example 11B Coating Design

| Layer | Material | Refractive Index @550 nm | Physical Thickness (nm) |
|---|---|---|---|
| Medium | Air | 1 | |
| 1 | SiO2 | 1.4680 | 36.7 |
| 2 | AlOxNy | 2.0137 | 800 |
| 3 | SiO2 | 1.4680 | 159.7 |
| 4 | AlOxNy | 2.0137 | 89.2 |
| 5 | SiO2 | 1.4680 | 131.6 |
| 6 | AlOxNy | 2.0137 | 87.1 |
| 7 | SiO2 | 1.4680 | 147.1 |
| 8 | AlOxNy | 2.0137 | 59.4 |
| 9 | SiO2 | 1.4680 | 74.7 |
| 10 | AlOxNy | 2.0137 | 139.5 |
| 11 | SiO2 | 1.4680 | 83.9 |
| 12 | AlOxNy | 2.0137 | 60.4 |
| 13 | SiO2 | 1.4680 | 81.7 |
| 14 | AlOxNy | 2.0137 | 60.9 |
| 15 | SiO2 | 1.4680 | 87.1 |
| 16 | AlOxNy | 2.0137 | 68.9 |
| 17 | SiO2 | 1.4680 | 120 |
| 18 | AlOxNy | 2.0137 | 13.1 |
| 19 | SiO2 | 1.4680 | 21 |
| 20 | AlOxNy | 2.0137 | 42.7 |
| 21 | SiO2 | 1.4680 | 19.5 |
| 22 | AlOxNy | 2.0137 | 90.9 |
| Substrate | Grey17-(code 82524) | 1.5283 | 1.8 mm |
| Medium | Air | 1 | |

| | |
|---|---|
| Total coating thickness (all layers) | 2475.1 |
| Thickness (sum) of low-index matl. in coating | 963.0 |
| Fraction (%) of low-index matl. in coating | 38.9% |
| Thickness (sum) of low-index matl. above thickest hard layer in coating | 36.7 |
| Thickness (sum) of all layers above thickest hard layer in coating | 36.7 |
| Fraction (%) of low-index matl. above thickest hard layer in coating | 100.0% |

TABLE 11C

Example 11C Coating Design

| Layer | Material | Refractive Index @550 nm | Physical Thickness (nm) |
|---|---|---|---|
| Medium | Air | 1 | 0 |
| 1 | SiO2 | 1.4680 | 0 |
| 2 | AlOxNy | 2.0137 | 686.7 |
| 3 | SiO2 | 1.4680 | 159.7 |
| 4 | AlOxNy | 2.0137 | 89.2 |
| 5 | SiO2 | 1.4680 | 131.6 |
| 6 | AlOxNy | 2.0137 | 87.1 |
| 7 | SiO2 | 1.4680 | 147.1 |
| 8 | AlOxNy | 2.0137 | 59.4 |
| 9 | SiO2 | 1.4680 | 74.7 |
| 10 | AlOxNy | 2.0137 | 139.5 |
| 11 | SiO2 | 1.4680 | 83.9 |
| 12 | AlOxNy | 2.0137 | 60.4 |
| 13 | SiO2 | 1.4680 | 81.7 |
| 14 | AlOxNy | 2.0137 | 60.9 |
| 15 | SiO2 | 1.4680 | 87.1 |
| 16 | AlOxNy | 2.0137 | 68.9 |
| 17 | SiO2 | 1.4680 | 120 |
| 18 | AlOxNy | 2.0137 | 13.1 |
| 19 | SiO2 | 1.4680 | 21 |
| 20 | AlOxNy | 2.0137 | 42.7 |
| 21 | SiO2 | 1.4680 | 19.5 |
| 22 | AlOxNy | 2.0137 | 90.9 |
| Substrate | Grey17-(code 82524) | 1.5283 | 1.8 mm |
| Medium | Air | 1 | |

| | |
|---|---|
| Total coating thickness (all layers) | 2325.1 |
| Thickness (sum) of low-index matl. in coating | 926.3 |
| Fraction (%) of low-index matl. in coating | 39.8% |
| Thickness (sum) of low-index matl. above thickest hard layer in coating | 0.0 |
| Thickness (sum) of all layers above thickest hard layer in coating | 0.0 |
| Fraction (%) of low-index matl. above thickest hard layer in coating | 0.0% |

TABLE 12

Example 12 Coating Design

| Layer | Material | Refractive Index @550 nm | Physical Thickness (nm) |
|---|---|---|---|
| Medium | Air | 1 | |
| 1 | SiO2 | 1.4680 | 98.0 |
| 2 | AlOxNy | 2.0137 | 221.0 |
| 3 | SiO2 | 1.4680 | 10.0 |
| 4 | AlOxNy | 2.0137 | 2000 |
| 5 | SiO2 | 1.4680 | 8.9 |
| 6 | AlOxNy | 2.0137 | 42.6 |
| 7 | SiO2 | 1.4680 | 30.1 |
| 8 | AlOxNy | 2.0137 | 24.5 |
| 9 | SiO2 | 1.4680 | 52.4 |
| 10 | AlOxNy | 2.0137 | 8.0 |
| Substrate | Grey17-(code 82524) | 1.5283 | 1.8 mm |
| Medium | Air | 1 | |

| | |
|---|---|
| Total coating thickness (all layers) | 2495.6 |
| Thickness (sum) of low-index matl. in coating | 199.5 |
| Fraction (%) of low-index matl. in coating | 8.0% |
| Thickness (sum) of low-index matl. above thickest hard layer in coating | 108.0 |
| Thickness (sum) of all layers above thickest hard layer in coating | 329.0 |
| Fraction (%) of low-index matl. above thickest hard layer in coating | 32.8% |

TABLE 13

Example 13 Coating Design

| Layer | Material | Refractive Index @550 nm | Physical Thickness (nm) |
|---|---|---|---|
| Medium | Air | 1 | |
| 1 | SiO2 | 1.4680 | 108.0 |
| 2 | AlOxNy | 2.0137 | 162.0 |
| 3 | SiO2 | 1.4680 | 8.0 |
| 4 | AlOxNy | 2.0137 | 2000 |
| 5 | SiO2 | 1.4680 | 8.4 |
| 6 | AlOxNy | 2.0137 | 43.5 |
| 7 | SiO2 | 1.4680 | 28.2 |
| 8 | AlOxNy | 2.0137 | 26.4 |
| 9 | SiO2 | 1.4680 | 46.8 |
| 10 | AlOxNy | 2.0137 | 9.0 |
| Substrate | Grey17-(code 82524) | 1.5283 | 1.8 mm |
| Medium | Air | 1 | |

| | |
|---|---|
| Total coating thickness (all layers) | 2440.3 nm |
| Thickness (sum) of low-index matl. in coating | 199.4 nm |
| Fraction (%) of low-index matl. in coating | 8.2% |
| Thickness (sum) of low-index matl. above thickest hard layer in coating | 116.0 nm |
| Thickness (sum) of all layers above thickest hard layer in coating | 278.0 nm |
| Fraction (%) of low-index matl. above thickest hard layer in coating | 41.7% |

TABLE 14

Example 14 Coating Design

| Layer | Material | Refractive Index @550 nm | Physical Thickness (nm) |
|---|---|---|---|
| Medium | Air | 1 | |
| 1 | SiO2 | 1.4680 | 82.2 |
| 2 | AlOxNy | 2.0137 | 134.0 |
| 3 | SiO2 | 1.4680 | 9.0 |
| 4 | AlOxNy | 2.0137 | 2000 |
| 5 | SiO2 | 1.4680 | 8.4 |
| 6 | AlOxNy | 2.0137 | 43.5 |
| 7 | SiO2 | 1.4680 | 28.2 |
| 8 | AlOxNy | 2.0137 | 26.4 |
| 9 | SiO2 | 1.4680 | 46.8 |
| 10 | AlOxNy | 2.0137 | 9.0 |
| Substrate | Grey17-(code 82524) | 1.5283 | 1.8 mm |
| Medium | Air | 1 | |

| | |
|---|---|
| Total coating thickness (all layers) | 2387.5 nm |
| Thickness (sum) of low-index matl. in coating | 174.6 nm |
| Fraction (%) of low-index matl. in coating | 7.3% |
| Thickness (sum) of low-index matl. above thickest hard layer in coating | 91.2 nm |
| Thickness (sum) of all layers above thickest hard layer in coating | 225.2 nm |
| Fraction (%) of low-index matl. above thickest hard layer in coating | 40.5% |

TABLE 15

Example 15 Coating Design

| Layer | Material | Refractive Index @550 nm | Physical Thickness (nm) |
|---|---|---|---|
| Medium | Air | 1 | |
| 1 | SiO2 | 1.4680 | 107.3 |
| 2 | AlOxNy | 2.0137 | 151.7 |
| 3 | SiO2 | 1.4680 | 19.2 |
| 4 | AlOxNy | 2.0137 | 2000 |
| 5 | SiO2 | 1.4680 | 8.4 |
| 6 | AlOxNy | 2.0137 | 43.5 |
| 7 | SiO2 | 1.4680 | 28.2 |
| 8 | AlOxNy | 2.0137 | 26.4 |
| 9 | SiO2 | 1.4680 | 46.8 |
| 10 | AlOxNy | 2.0137 | 9 |
| Substrate | Grey17-(code 82524) | 1.5283 | 1.8 mm |
| Medium | Air | 1 | |

| | |
|---|---|
| Total coating thickness (all layers) | 2440.5 nm |
| Thickness (sum) of low-index matl. in coating | 209.9 nm |
| Fraction (%) of low-index matl. in coating | 8.6% |
| Thickness (sum) of low-index matl. above thickest hard layer in coating | 126.5 nm |
| Thickness (sum) of all layers above thickest hard layer in coating | 278.2 nm |
| Fraction (%) of low-index matl. above thickest hard layer in coating | 45.5% |

TABLE 16

Example 16 Coating Design

| Layer | Material | Refractive Index @550 nm | Physical Thickness (nm) |
|---|---|---|---|
| Medium | Air | 1 | |
| 1 | SiO2 | 1.4680 | 94.6 |
| 2 | AlOxNy | 2.0137 | 63.9 |
| 3 | SiO2 | 1.4680 | 164.7 |
| 4 | AlOxNy | 2.0137 | 2000 |
| 5 | SiO2 | 1.4680 | 8.4 |
| 6 | AlOxNy | 2.0137 | 43.5 |
| 7 | SiO2 | 1.4680 | 28.2 |
| 8 | AlOxNy | 2.0137 | 26.4 |
| 9 | SiO2 | 1.4680 | 46.8 |
| 10 | AlOxNy | 2.0137 | 9 |
| Substrate | Grey17-(code 82524) | 1.5283 | 1.8 mm |
| Medium | Air | 1 | |

| | |
|---|---|
| Total coating thickness (all layers) | 2485.4 nm |
| Thickness (sum) of low-index matl. in coating | 342.7 nm |
| Fraction (%) of low-index matl. in coating | 13.8% |
| Thickness (sum) of low-index matl. above thickest hard layer in coating | 259.3 nm |
| Thickness (sum) of all layers above thickest hard layer in coating | 323.1 nm |
| Fraction (%) of low-index matl. above thickest hard layer in coating | 80.2% |

In the examples, the outer surface may also be referred to as the "front" surface, and is the surface opposite the substrate. For example, if the multi-layer interference stacks of the examples were used on the outward facing surface of sunglasses, transmission through the outer or front surface would be what the wearer sees, and reflection from the outer or front surface would be what others see.

Figure 9:
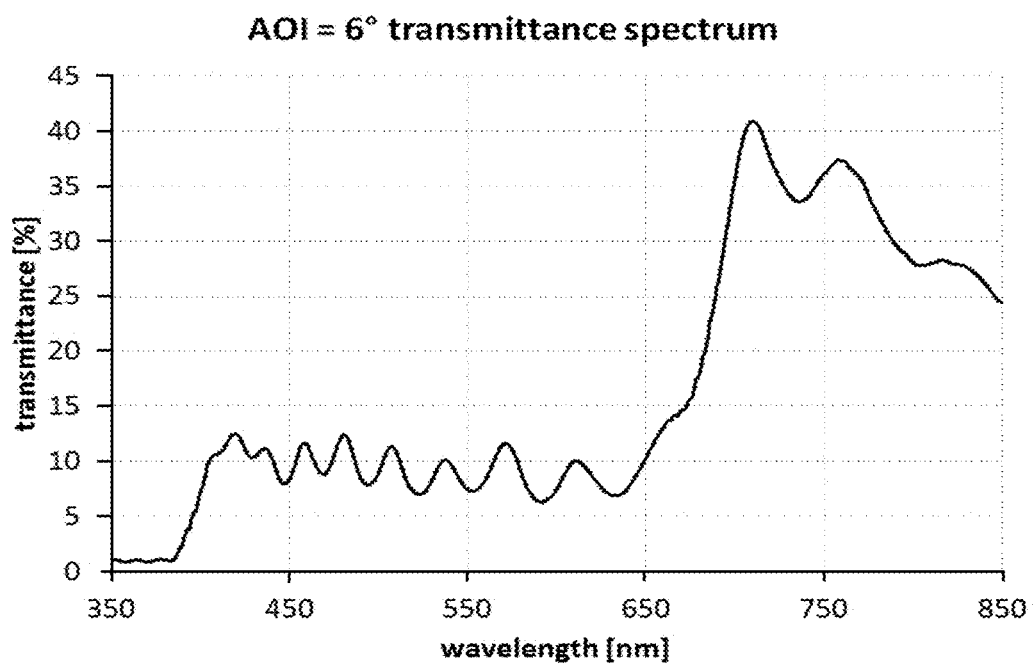
FIG. 9 shows a transmittance spectrum for Example 1.
Figure 10:
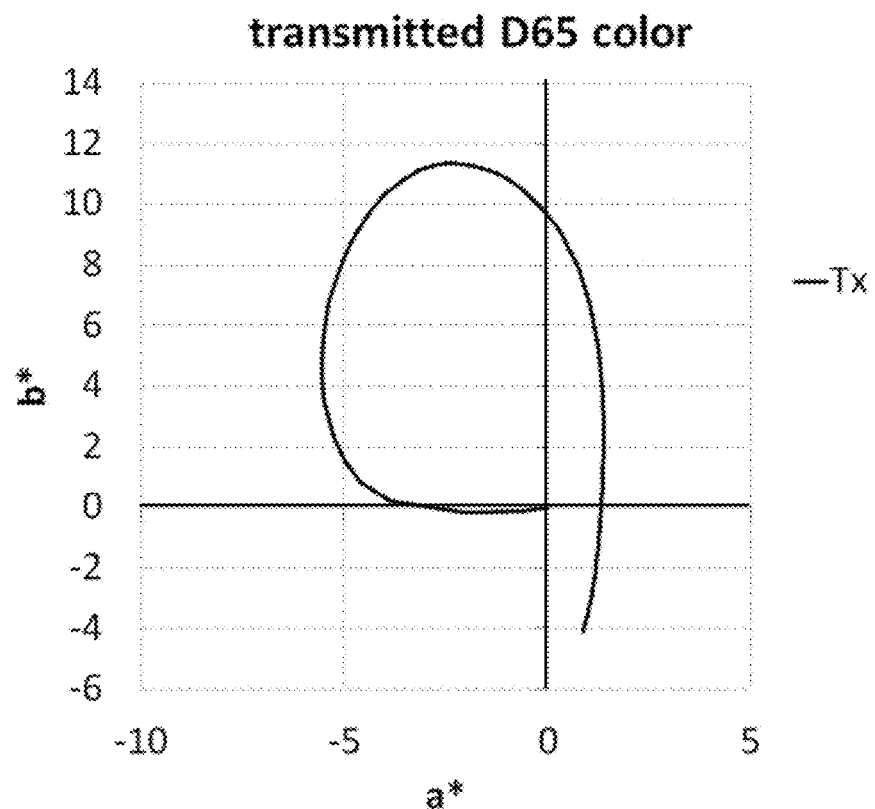
FIG. 10 shows the transmitted color for Example 1.
Figure 11:
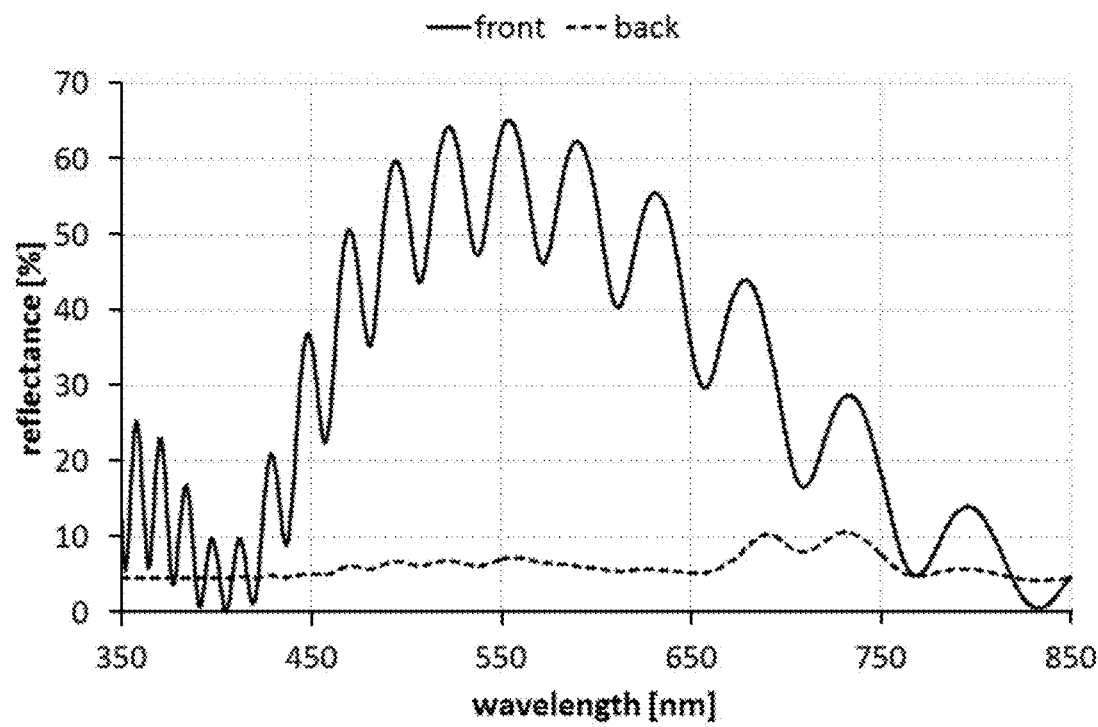
FIG. 11 shows a reflection spectrum for Example 1.
Figure 12:
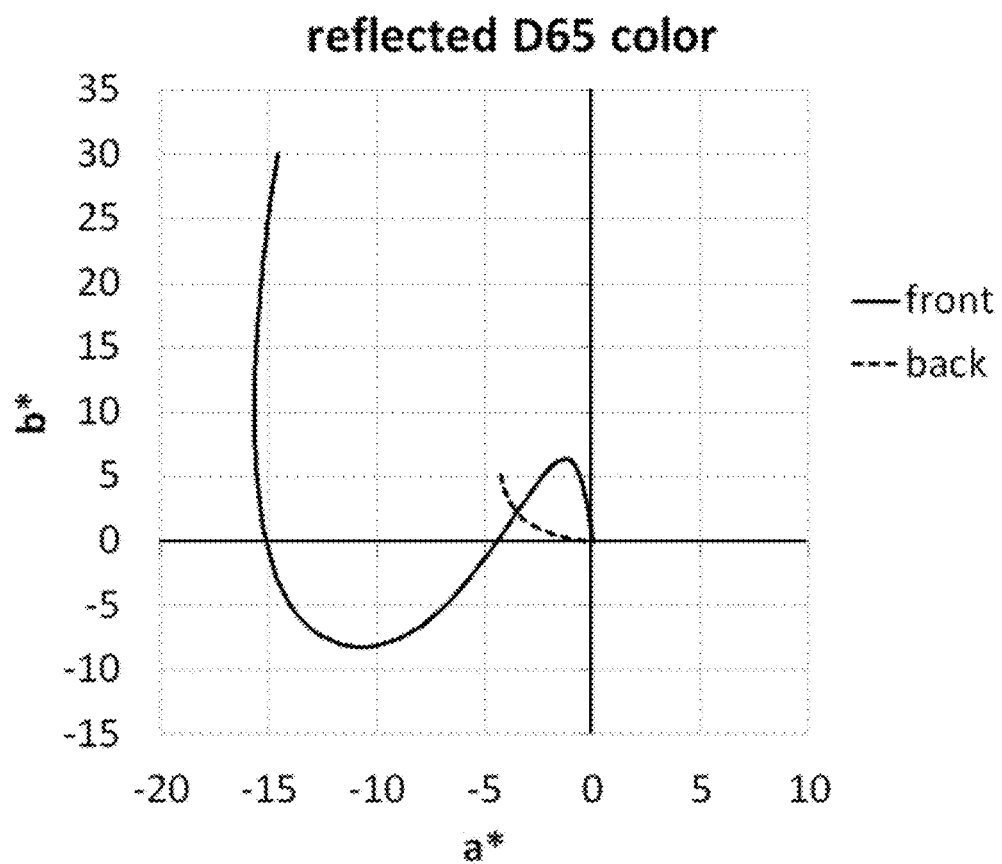
FIG. 12 shows the reflected color for Example 1.

FIG. 9 shows a transmittance spectrum for Example 1, measured at a 6 degree angle of incidence on the outer surface. FIG. 10 shows the transmitted color for Example 1, based on an incident D65 spectrum, for all incidence angles from 0 degrees to 90 degrees, incident on the outer surface. FIG. 11 shows a reflection spectrum for Example 1, measured at a 6 degree angle of incidence on the outer surface (solid line), and at a 6 degree angle of incidence on the substrate or back surface (dotted line). FIG. 12 shows the reflected color for Example 1, based on an incident D65 spectrum, for all incidence angles from 0 degrees to 90 degrees, incident on the outer surface (solid line) and substrate (dotted line). Example 1 provided a high-reflectance, high-color 'gold' scratch-resistant coating (SRC) on absorbing glass substrate. The external reflected color transitions from gold at normal incidence to blue-green to neutral (silver) at higher angles.

Figure 13:
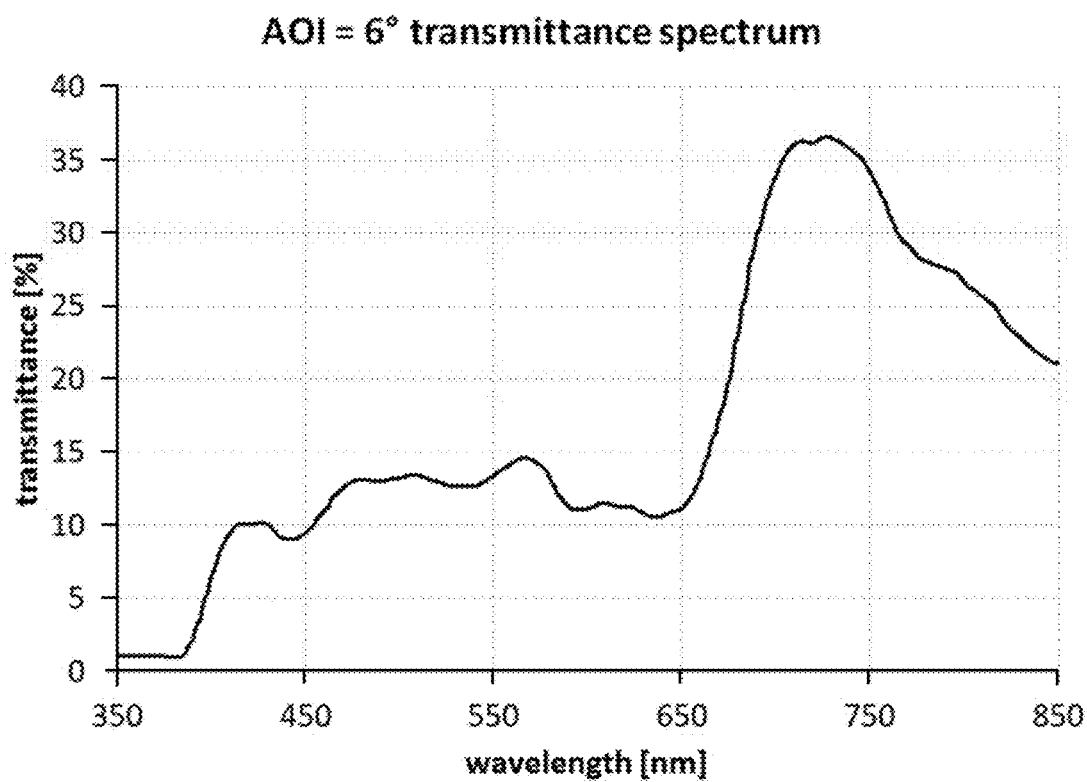
FIG. 13 shows a transmittance spectrum for Example 2.
Figure 14:
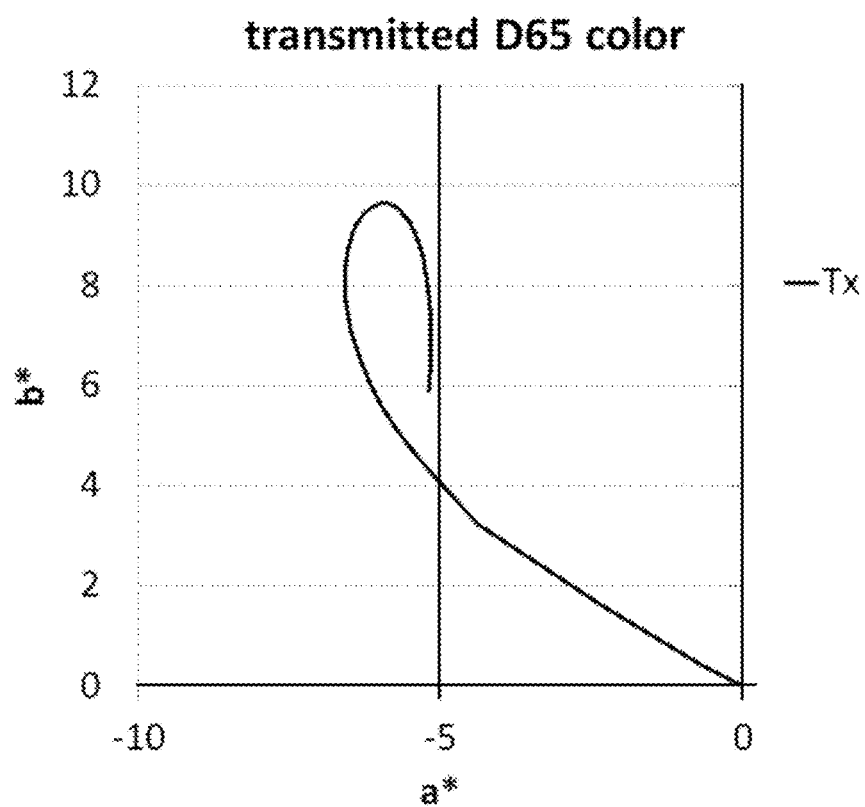
FIG. 14 shows transmitted color for Example 2.
Figure 15:
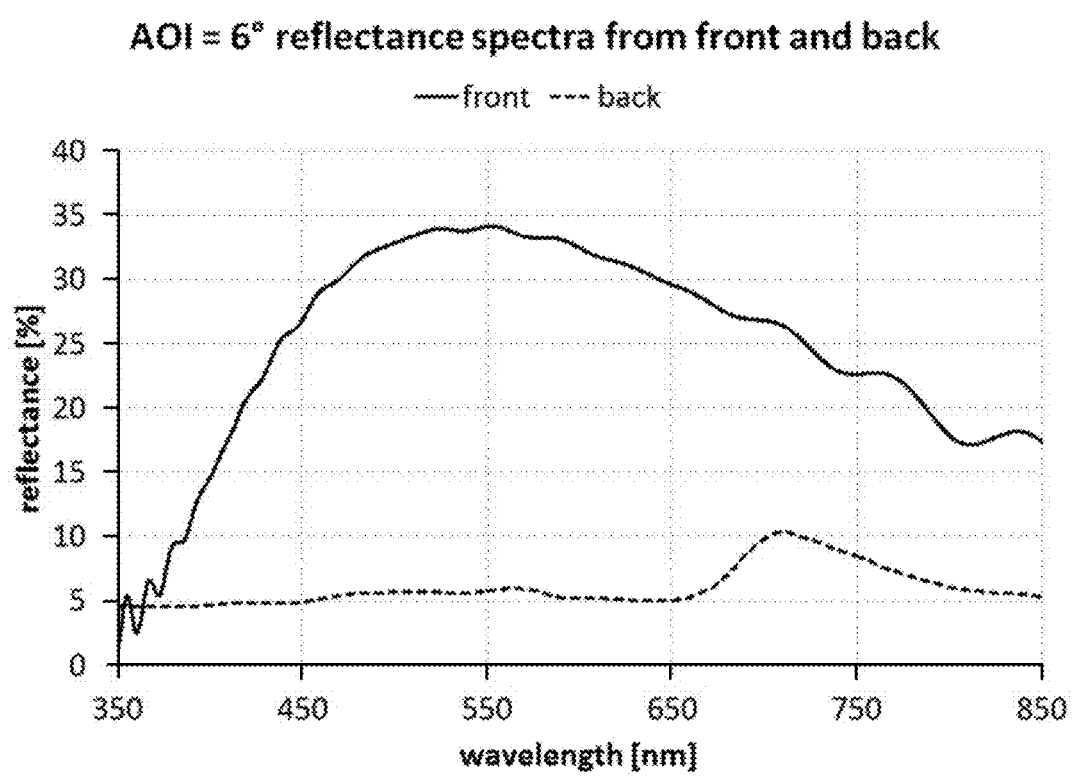
FIG. 15 shows a reflection spectrum for Example 2.
Figure 16:
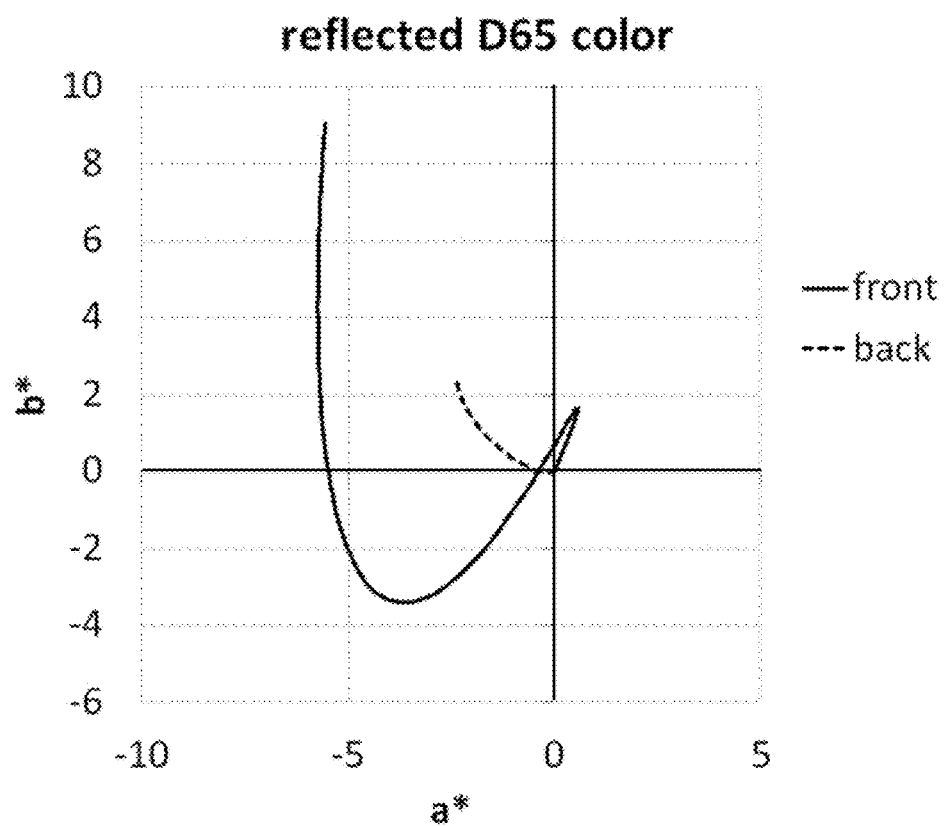
FIG. 16 shows reflected color for Example 2.

FIG. 13 shows a transmittance spectrum for Example 2. FIG. 14 shows transmitted color for Example 2. FIG. 15 shows a reflection spectrum for Example 2. FIG. 16 shows reflected color for Example 2. The incident spectrum and incident angles for FIGS. 13 through 16 are the same as for FIGS. 9 through 12, respectively. Example 2 provided a high-reflectance, low-to-medium-color 'gold/silver' scratch-resistant coating (SRC) on absorbing glass substrate. The external reflected color transitions from light gold at normal incidence to neutral (silver) at higher angles.

Figure 17:
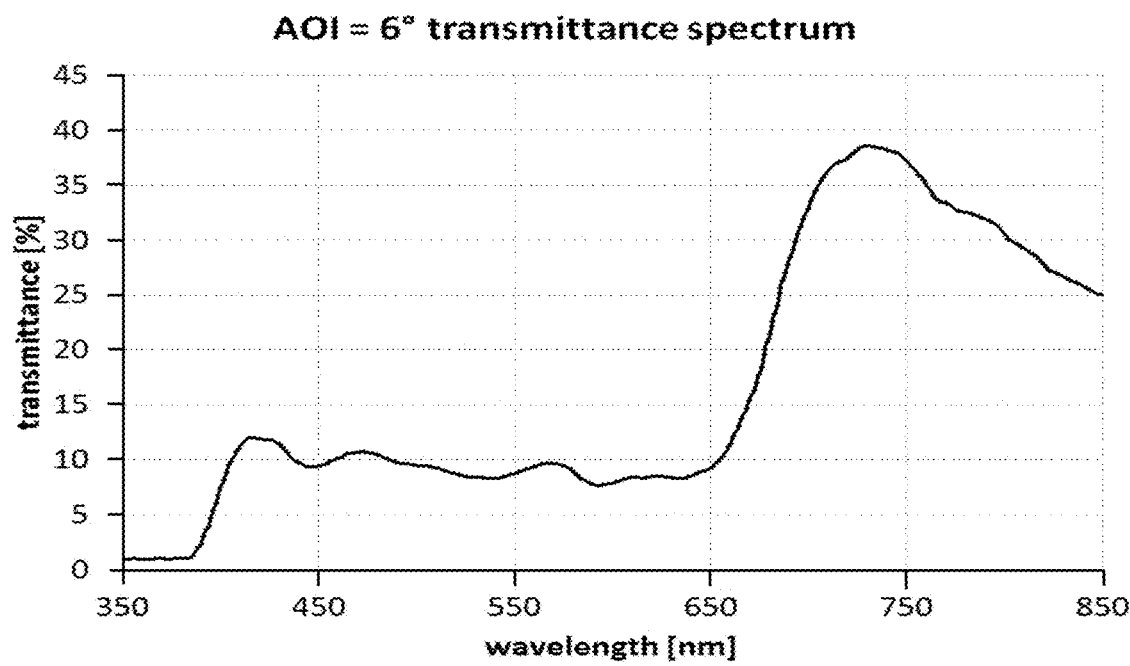
FIG. 17 shows a transmittance spectrum for Example 3.
Figure 18:
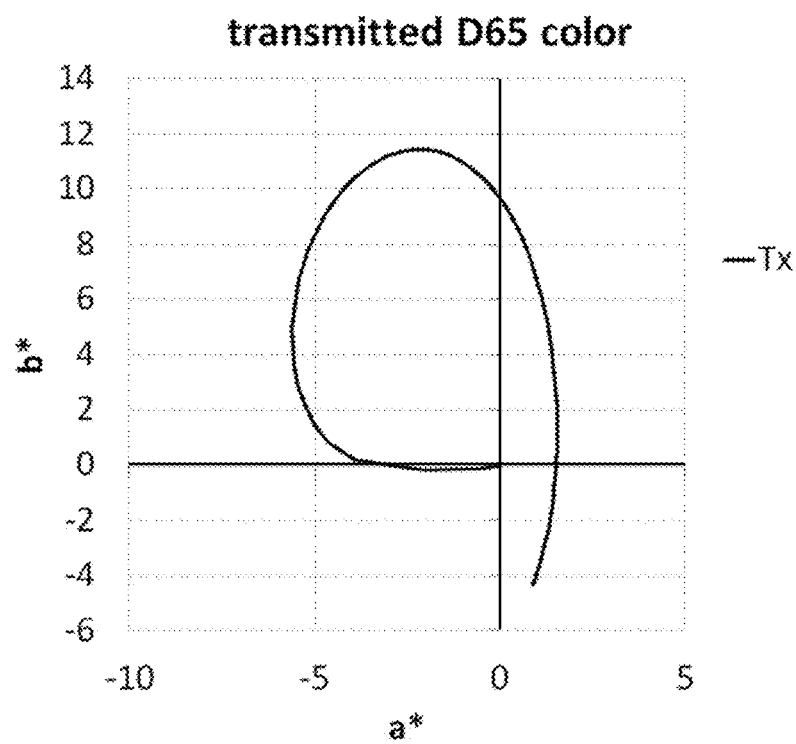
FIG. 18 shows transmitted color for Example 3.
Figure 19:
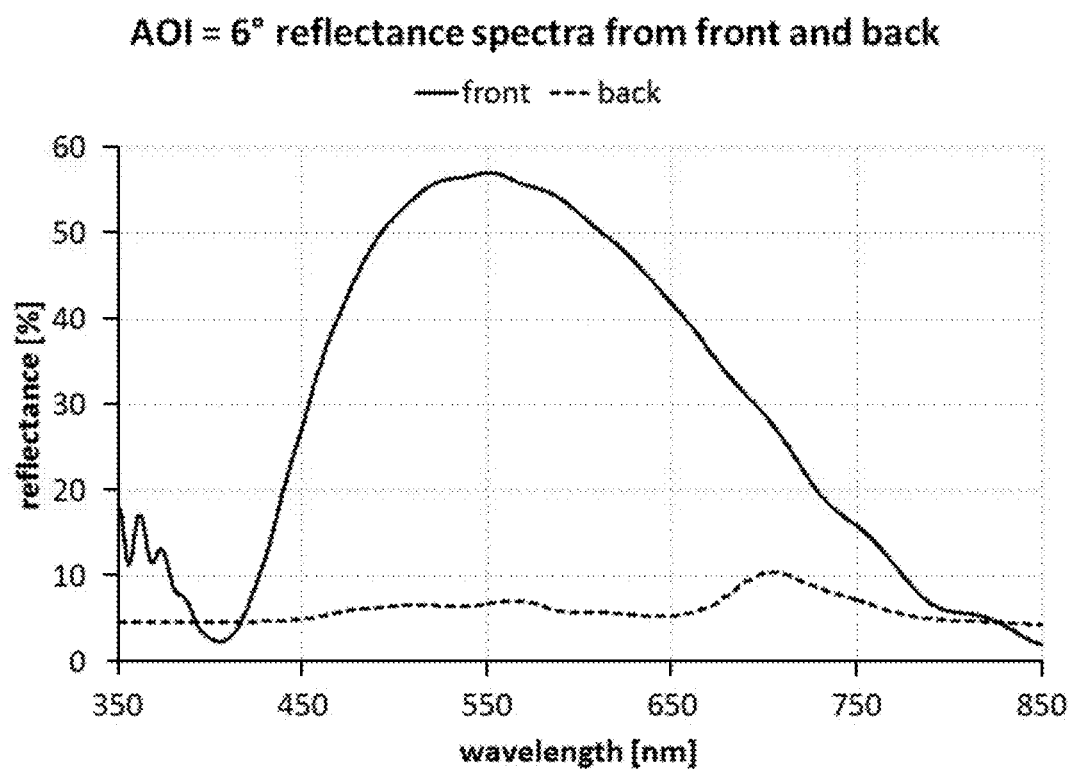
FIG. 19 shows a reflection spectrum for Example 3.
Figure 20:
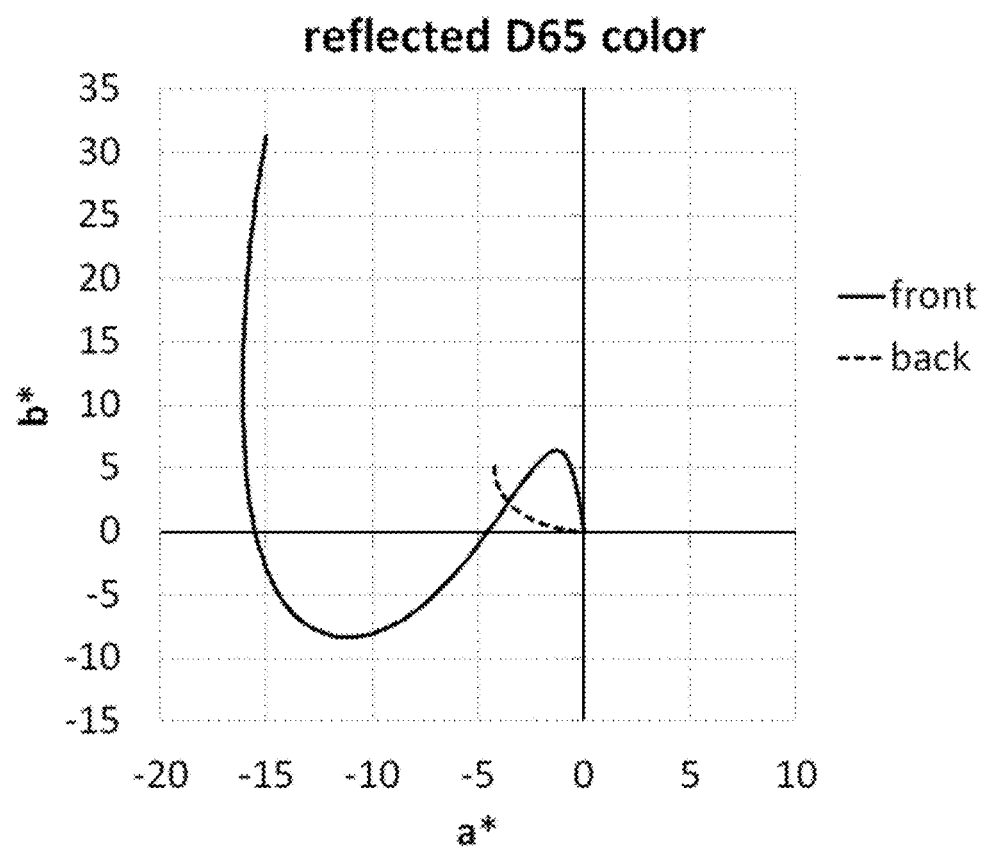
FIG. 20 shows reflected color for Example 3.

FIG. 17 shows a transmittance spectrum for Example 3. FIG. 18 shows transmitted color for Example 3. FIG. 19 shows a reflection spectrum for Example 3. FIG. 20 shows reflected color for Example 3. The incident spectrum and incident angles for FIGS. 17 through 20 are the same as for FIGS. 9 through 12, respectively. Example 3 provided a high-reflectance, high-color 'gold' scratch-resistant coating (SRC) on absorbing glass substrate. The external reflected color transitions from gold at normal incidence to green to blue to neutral (silver) at higher angles.

Figure 21:
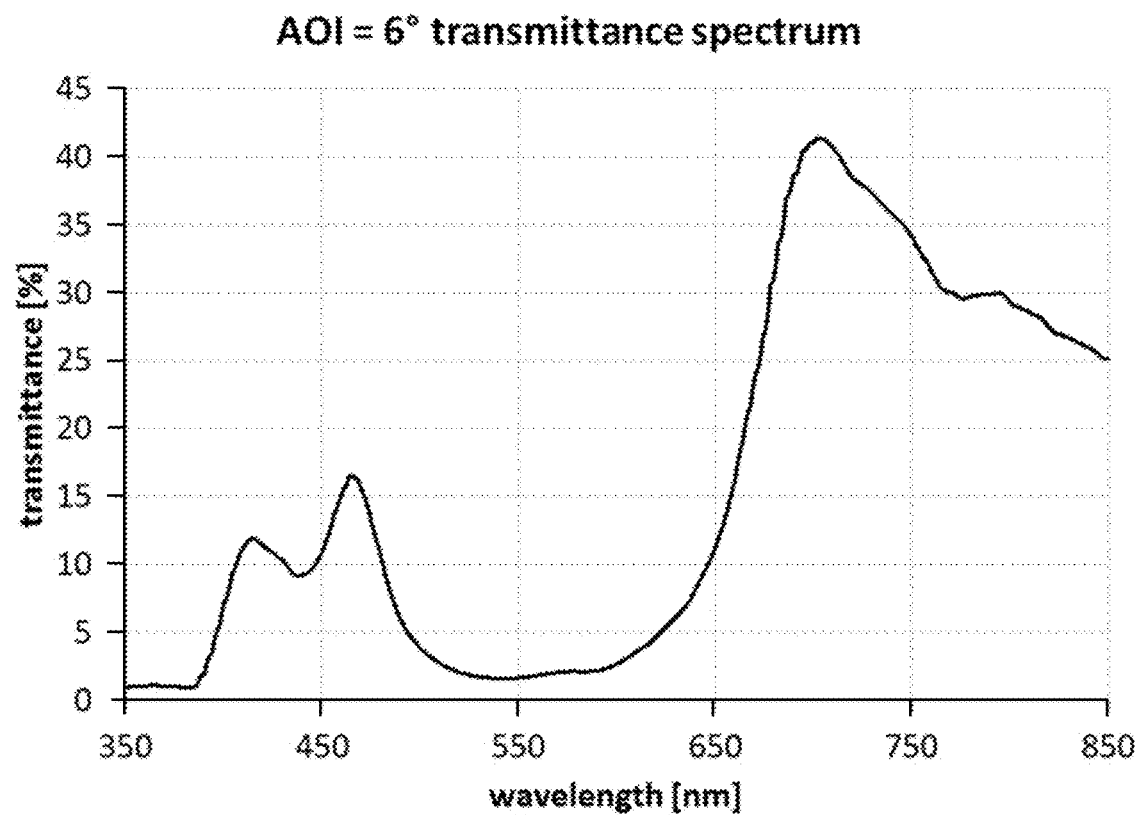
FIG. 21 shows a transmittance spectrum for Example 4.
Figure 22:
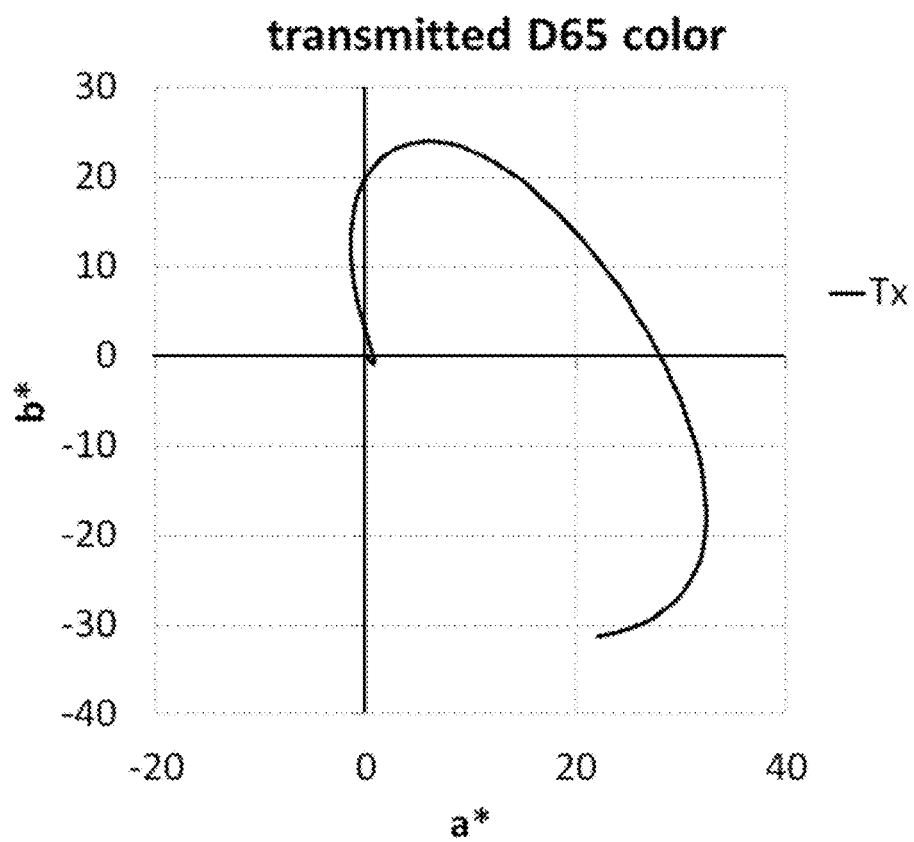
FIG. 22 shows transmitted color for Example 4.
Figure 23:
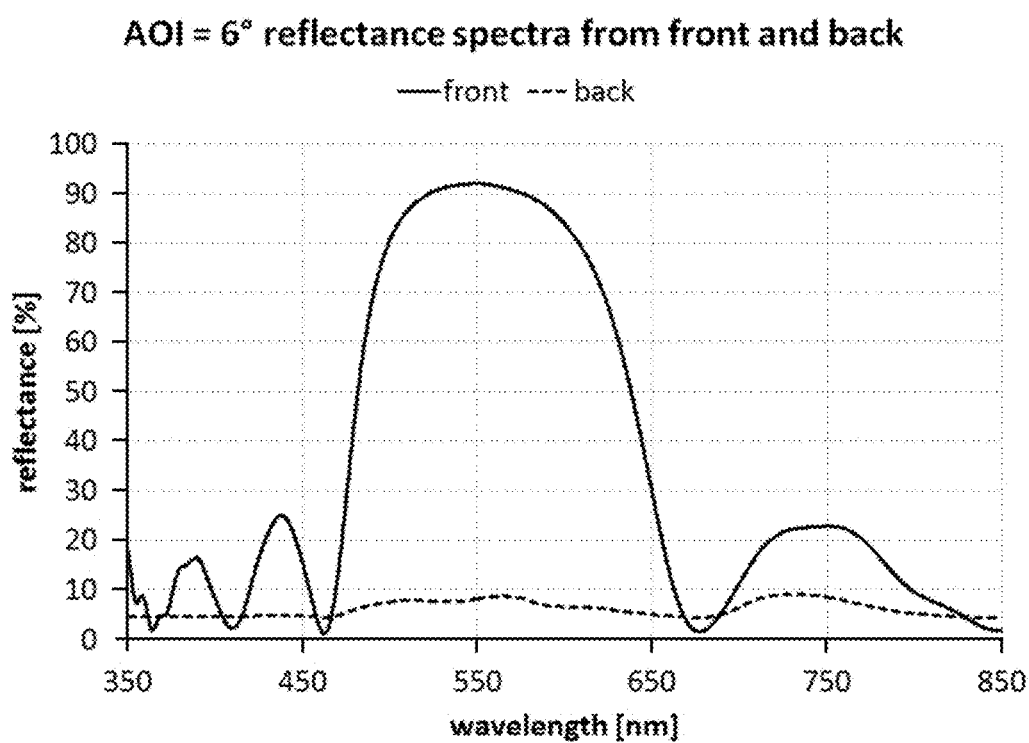
FIG. 23 shows a reflection spectrum for Example 4.
Figure 24:
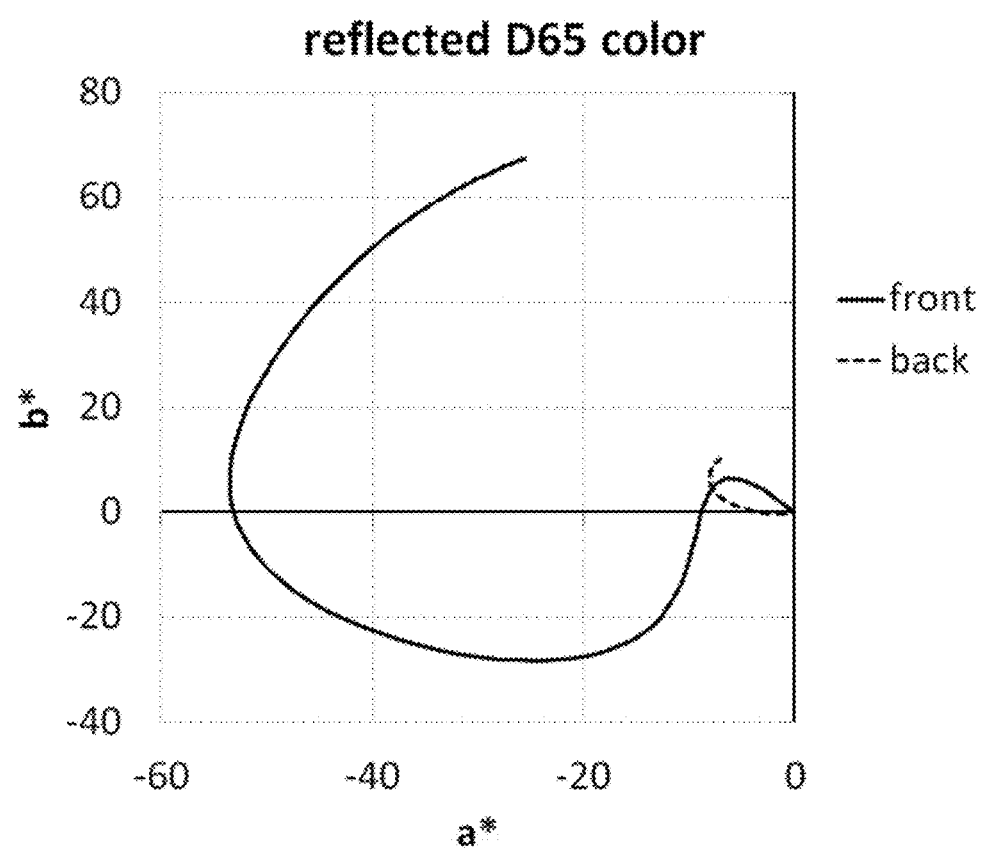
FIG. 24 shows reflected color for example 4.

FIG. 21 shows a transmittance spectrum for Example 4. FIG. 22 shows transmitted color for Example 4. FIG. 23 shows a reflection spectrum for Example 4. FIG. 24 shows reflected color for Example 4. The incident spectrum and incident angles for FIGS. 21 through 24 are the same as for FIGS. 9 through 12, respectively. Example 4 provided a very high-reflectance, high-color 'gold' scratch-resistant coating (SRC) on absorbing glass substrate. The external reflected color transitions from gold at normal incidence to green to blue to neutral (silver) at higher angles.

Figure 25:
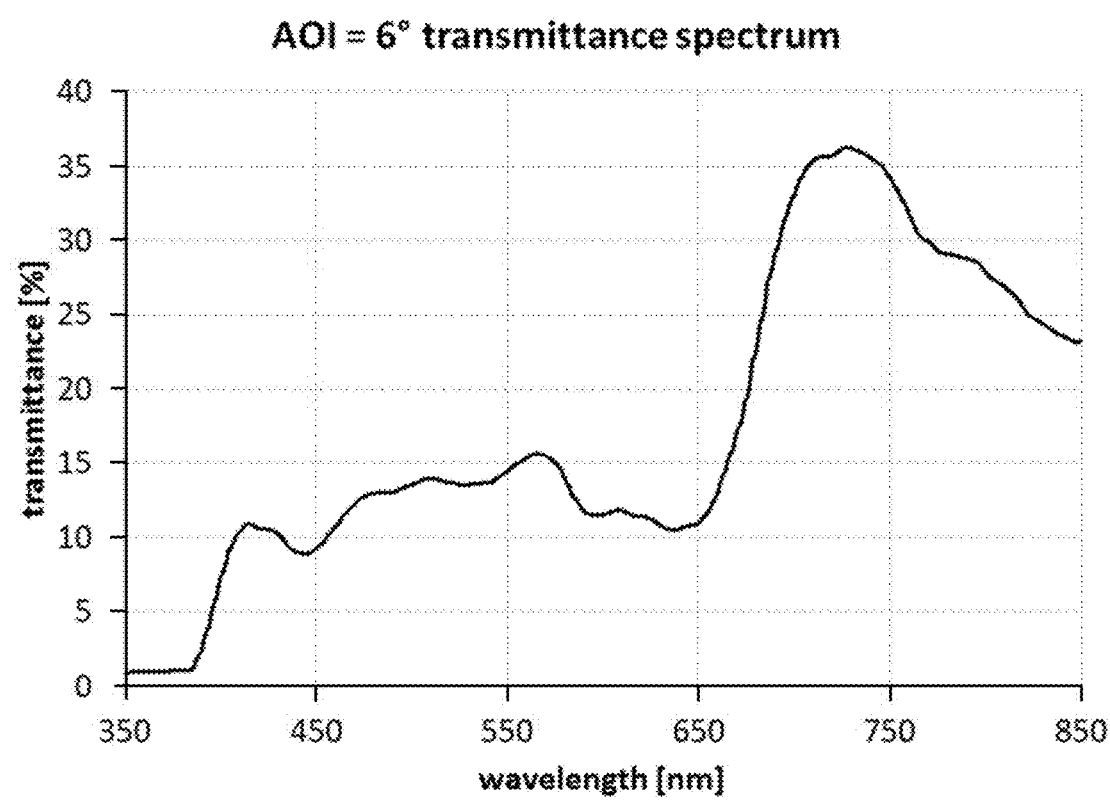
FIG. 25 shows a transmittance spectrum for Example 5.
Figure 26:
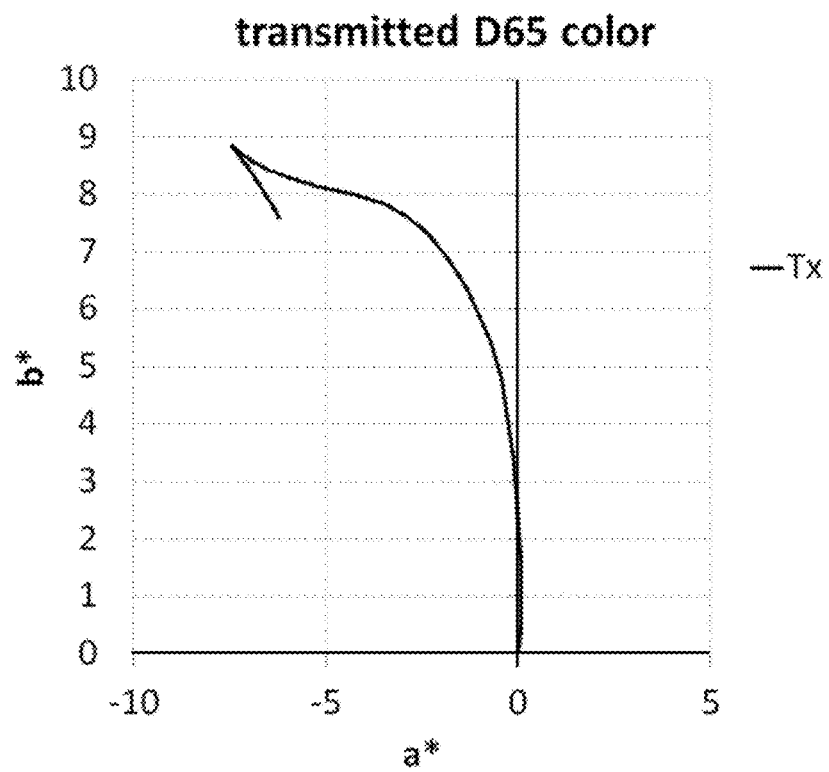
FIG. 26 shows transmitted color for Example 5.
Figure 27:
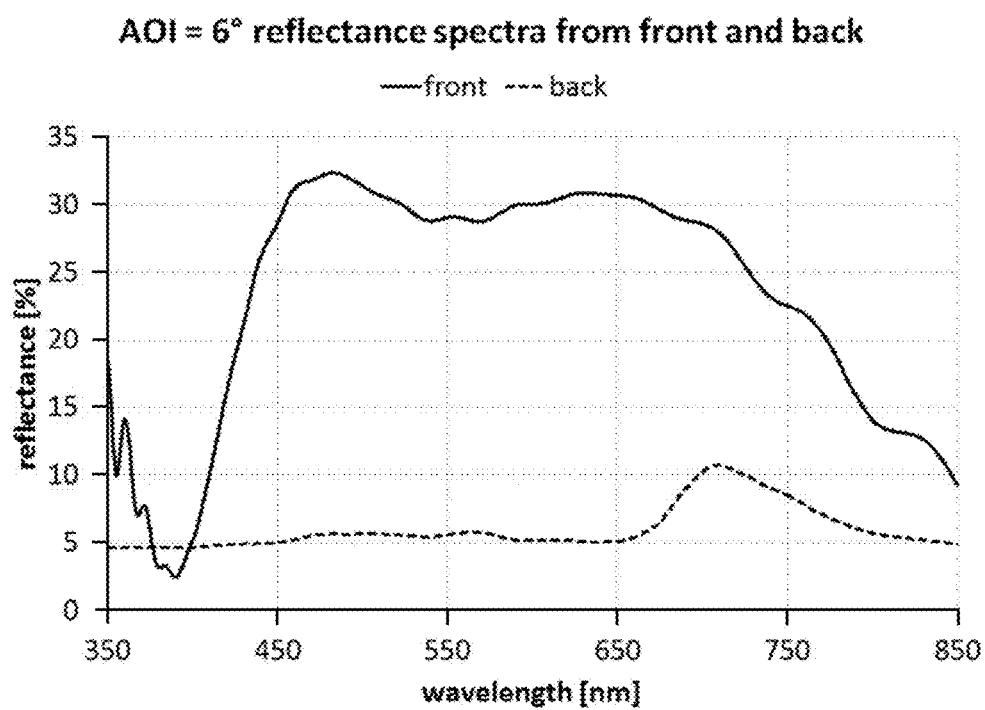
FIG. 27 shows a reflection spectrum for Example 5.
Figure 28:
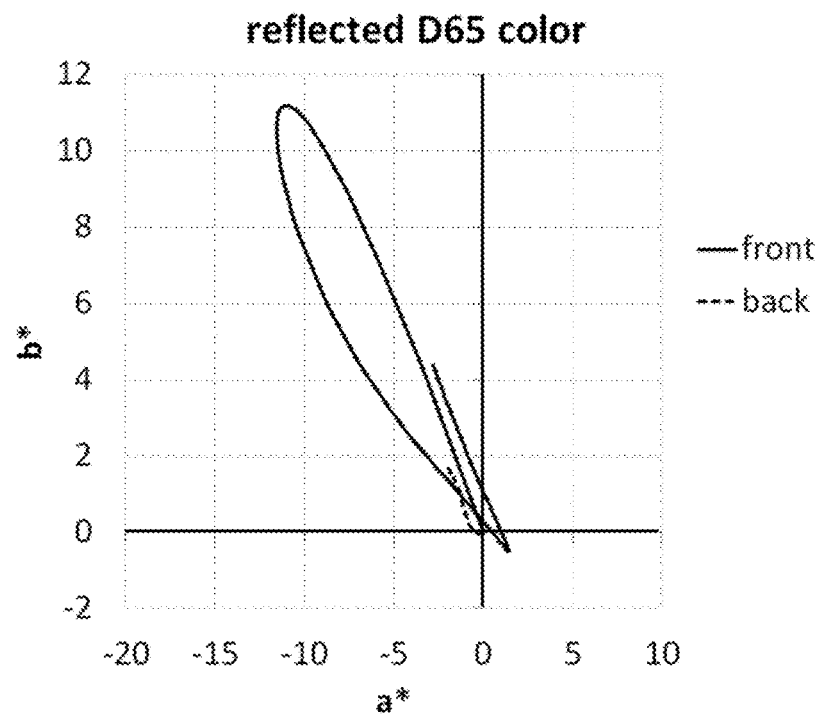
FIG. 28 shows reflected color for Example 5.

FIG. 25 shows a transmittance spectrum for Example 5. FIG. 26 shows transmitted color for Example 5. FIG. 27 shows a reflection spectrum for Example 5. FIG. 28 shows reflected color for Example 5. The incident spectrum and incident angles for FIGS. 25 through 28 are the same as for FIGS. 9 through 12, respectively. Example 5 provided a high-reflectance, low-to-medium-color 'silver' scratch-resistant coating (SRC) on absorbing glass substrate. The external reflected color transitions from neutral at normal incidence to light green-gold and back to neutral (silver) at higher angles.

Figure 29:
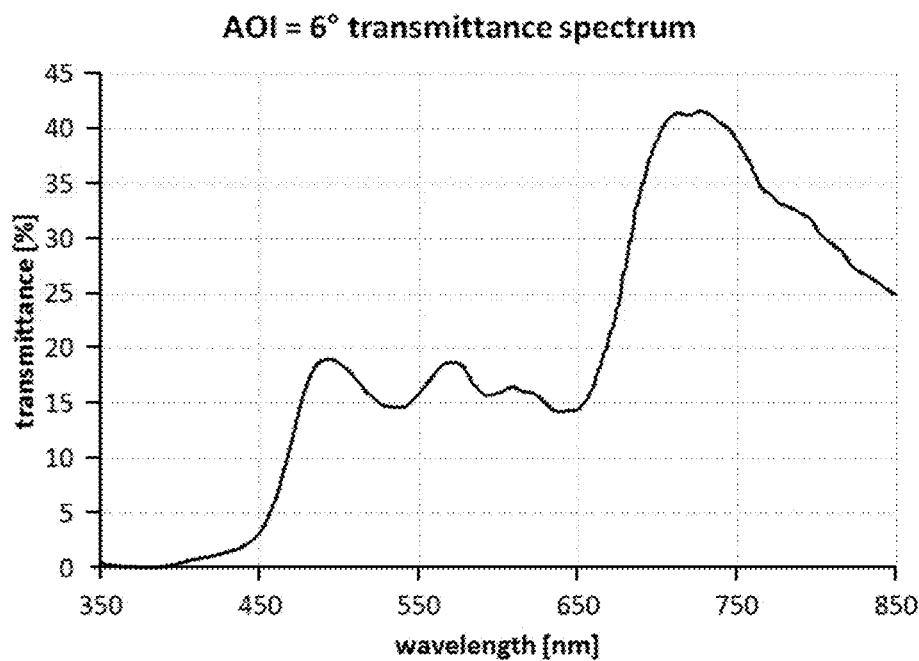
FIG. 29 shows a transmittance spectrum for Example 6.
Figure 30:
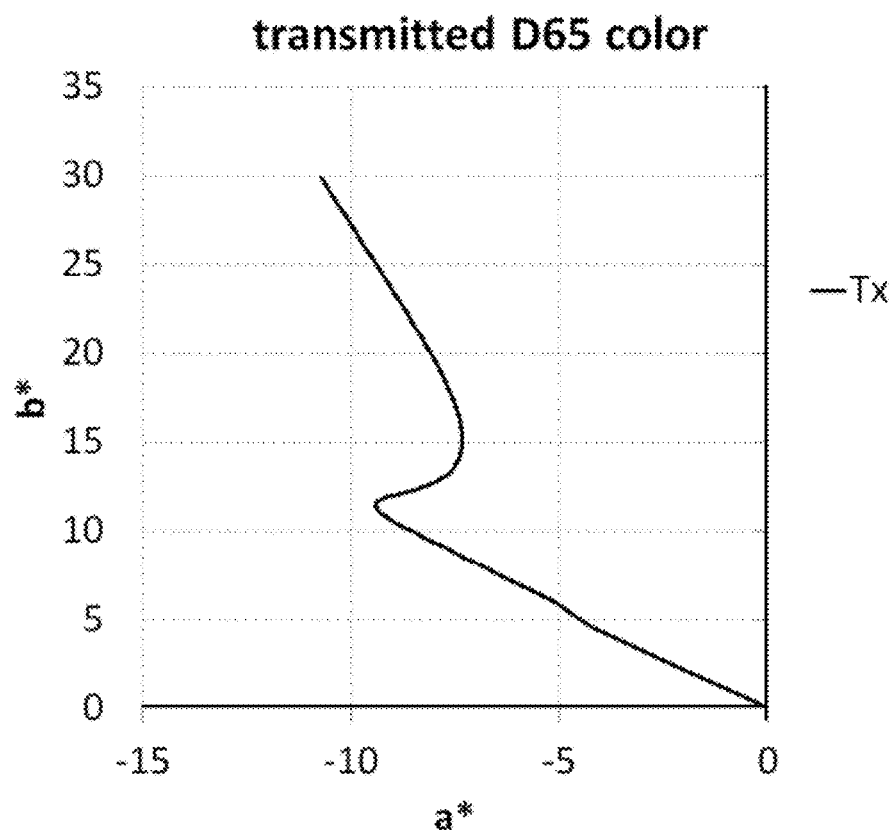
FIG. 30 shows transmitted color for Example 6.
Figure 31:
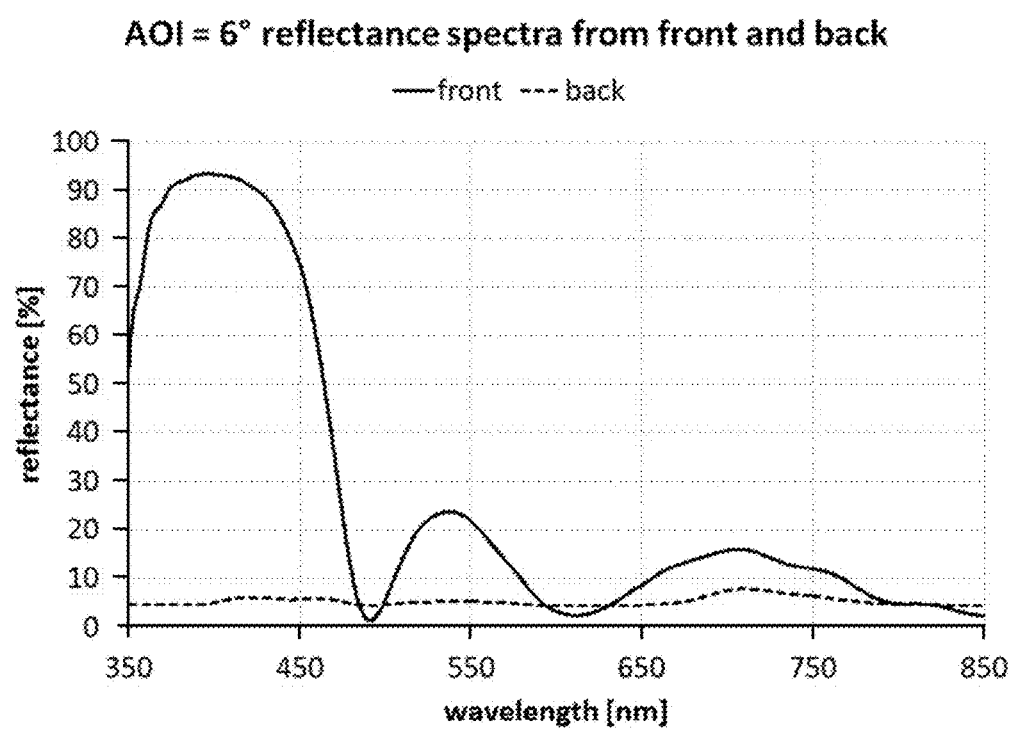
FIG. 31 shows a reflection spectrum for Example 6.
Figure 32:
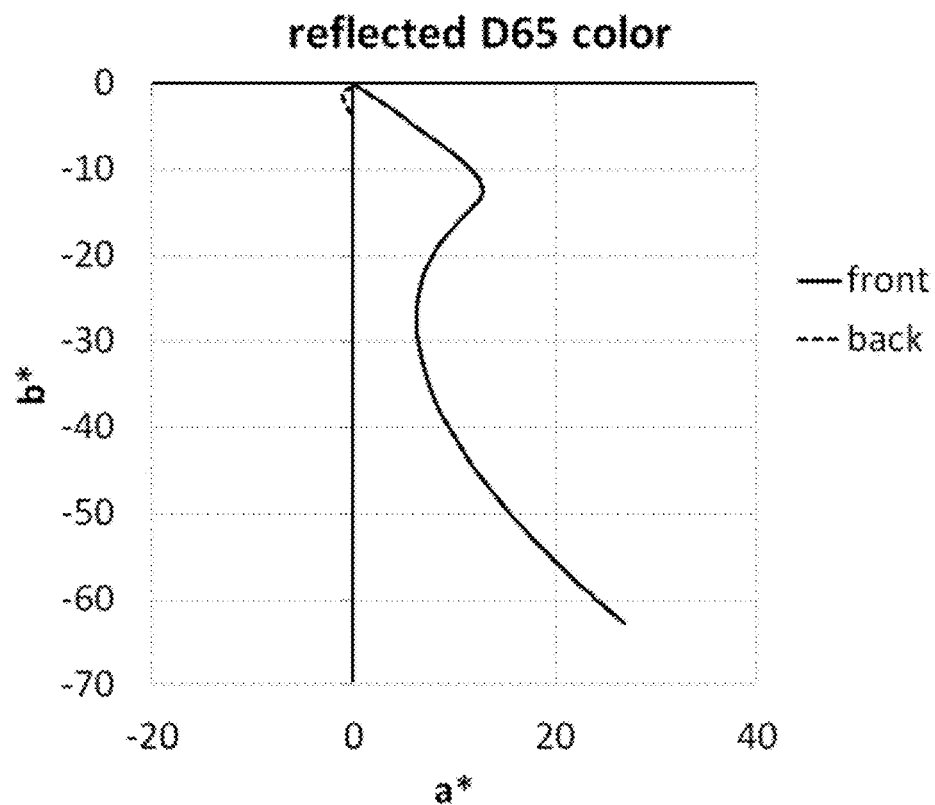
FIG. 32 shows reflected color for Example 6.

FIG. 29 shows a transmittance spectrum for Example 6. FIG. 30 shows transmitted color for Example 6. FIG. 31 shows a reflection spectrum for Example 6. FIG. 32 shows reflected color for Example 6. The incident spectrum and incident angles for FIGS. 29 through 32 are the same as for FIGS. 9 through 12, respectively. Example 6 provided a very high-reflectance, high-color 'blue' scratch-resistant coating (SRC) on absorbing glass substrate. The external reflected color transitions from deep blue at normal incidence to light blue-purple to neutral (silver) at higher angles.

Figure 33:
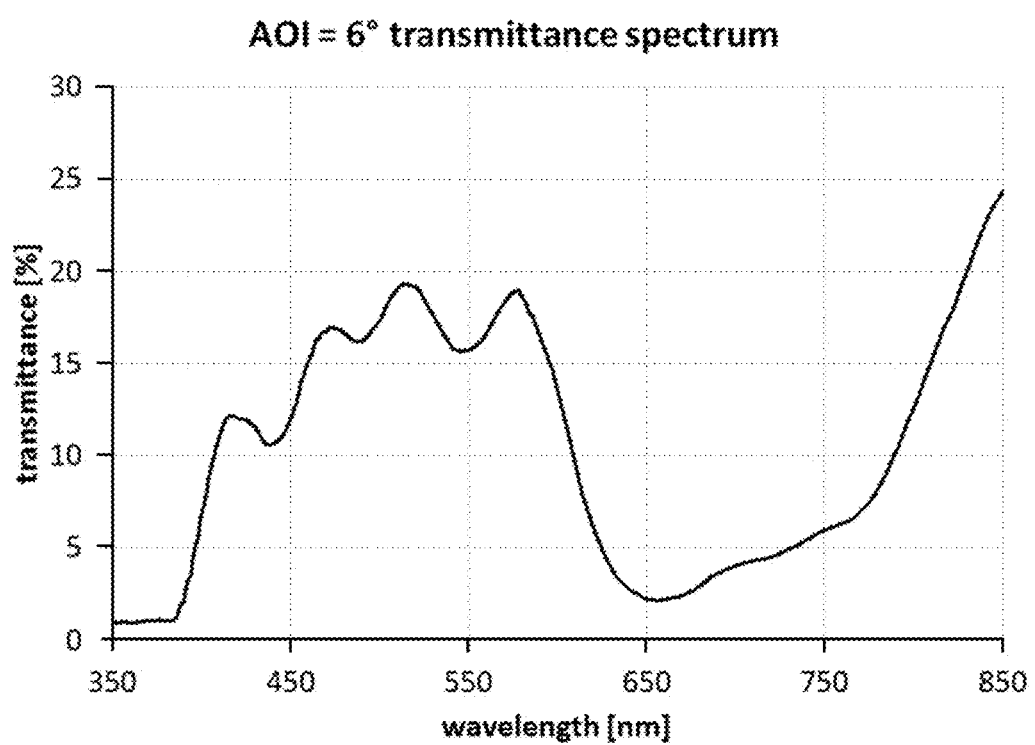
FIG. 33 shows a transmittance spectrum for Example 7.
Figure 34:
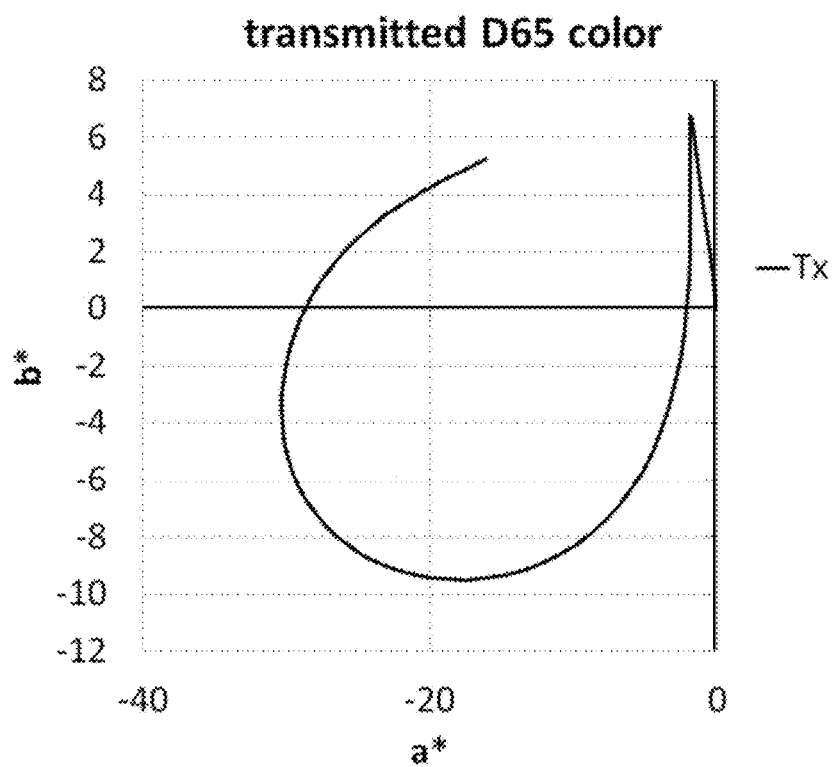
FIG. 34 shows transmitted color for Example 7.
Figure 35:
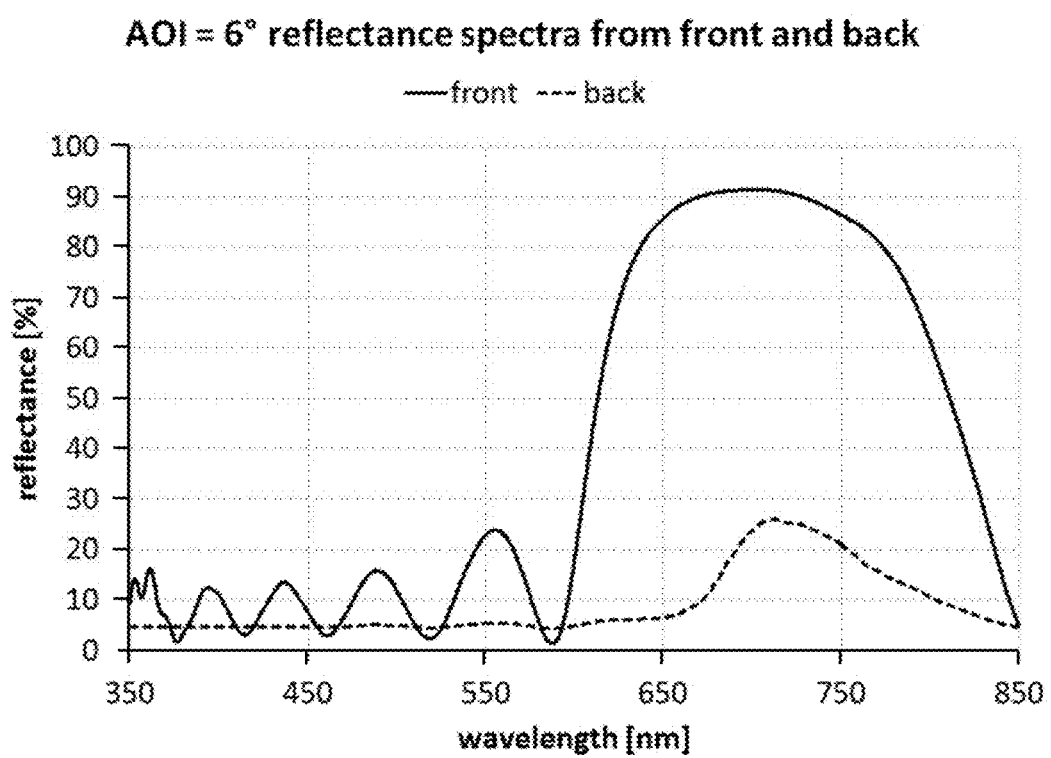
FIG. 35 shows a reflection spectrum for Example 7.
Figure 36:
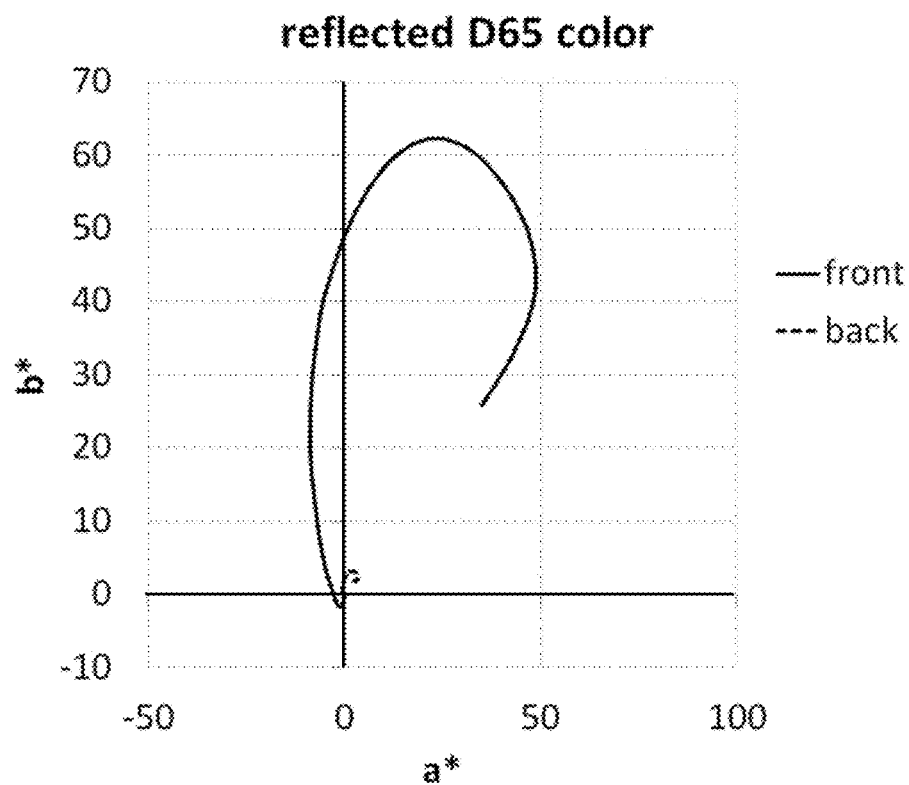
FIG. 36 shows reflected color for example 7.

FIG. 33 shows a transmittance spectrum for Example 7. FIG. 34 shows transmitted color for Example 7. FIG. 35 shows a reflection spectrum for Example 7. FIG. 36 shows reflected color for Example 7. The incident spectrum and incident angles for FIGS. 33 through 36 are the same as for FIGS. 9 through 12, respectively. Example 7 provided a very High-reflectance, high-color 'red' scratch-resistant coating (SRC) on absorbing glass substrate. The external reflected color transitions from red-orange at normal incidence to gold to neutral (silver) at higher angles.

Figure 37:
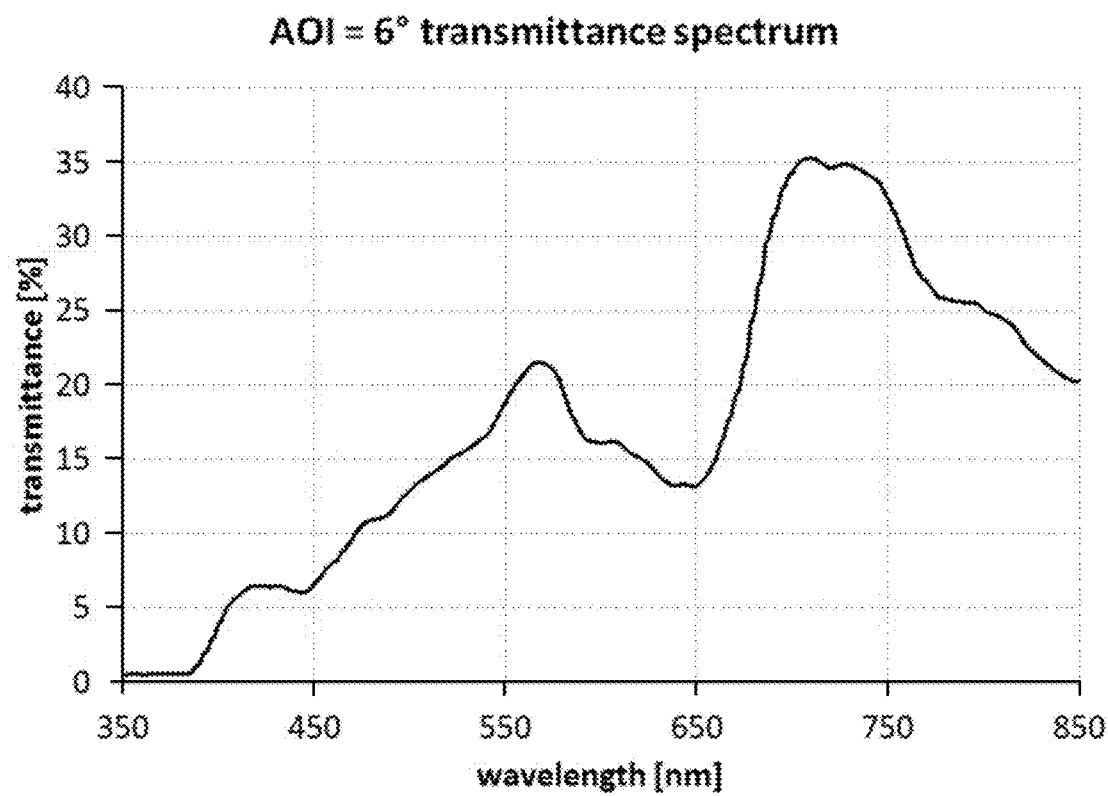
FIG. 37 shows a transmittance spectrum for Example 8.
Figure 38:
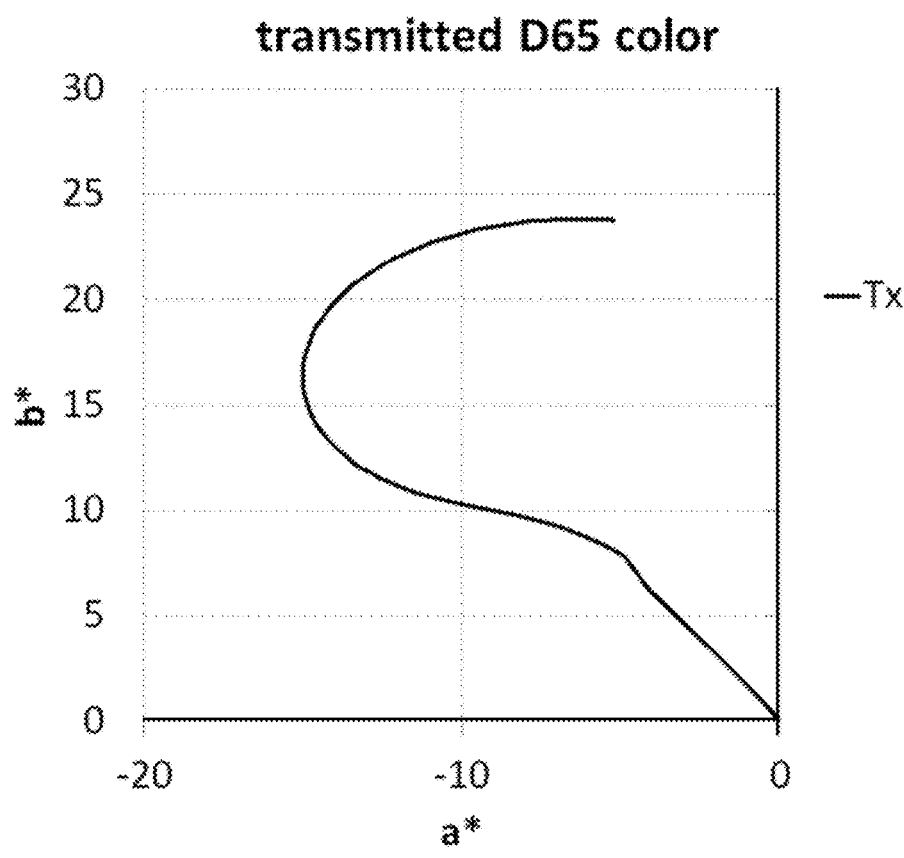
FIG. 38 shows transmitted color for Example 8.
Figure 39:
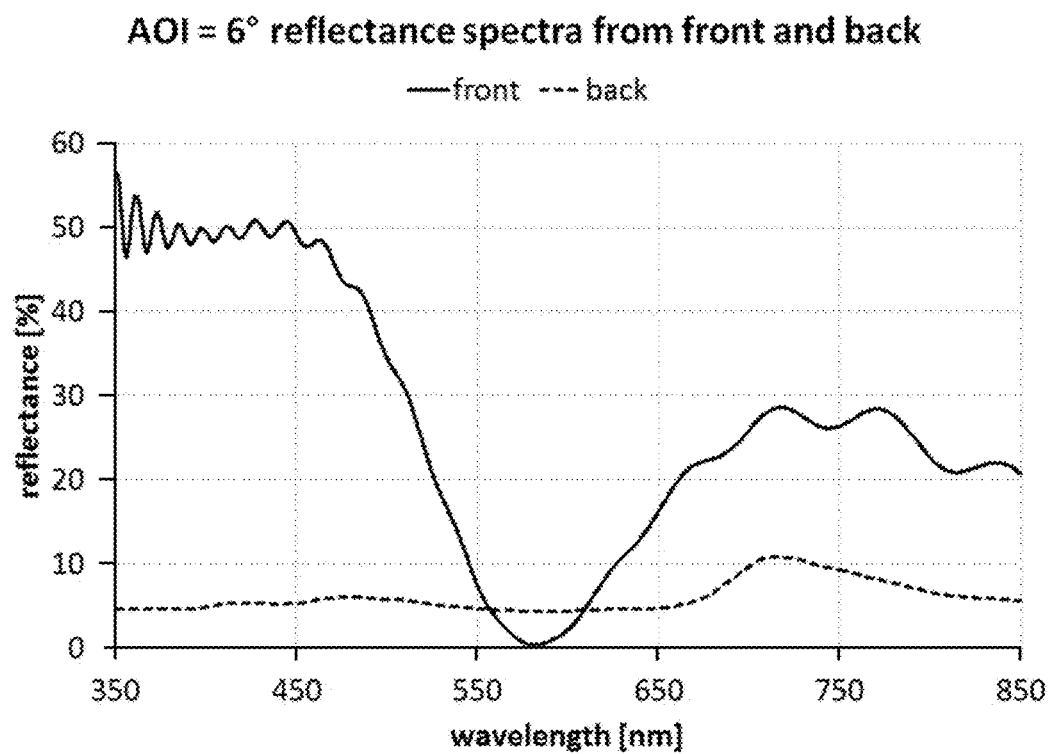
FIG. 39 shows a reflection spectrum for Example 8.
Figure 40:
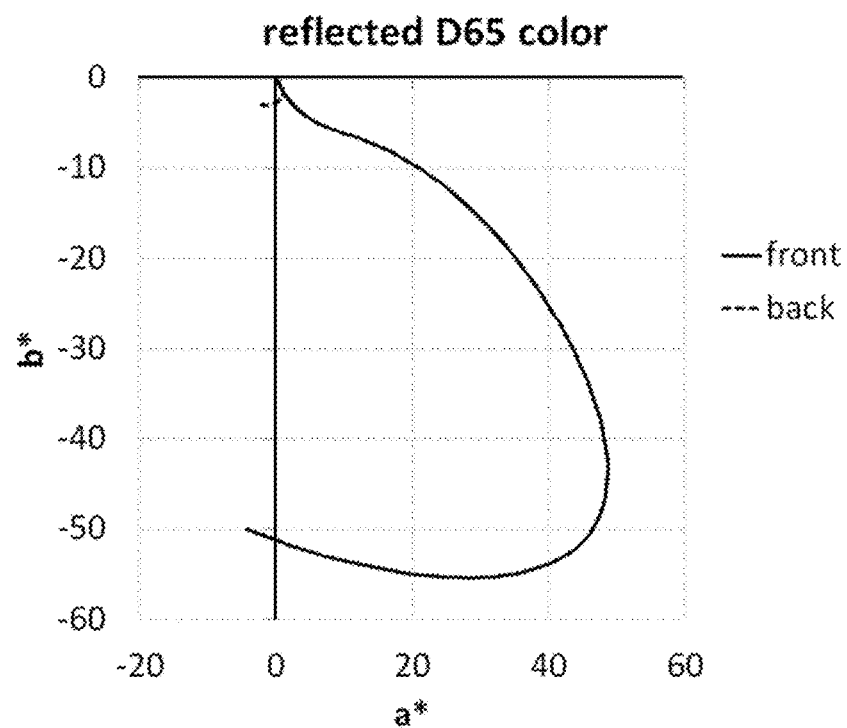
FIG. 40 shows reflected color for Example 8.

FIG. 37 shows a transmittance spectrum for Example 8. FIG. 38 shows transmitted color for Example 8. FIG. 39 shows a reflection spectrum for Example 8. FIG. 40 shows reflected color for Example 8. The incident spectrum and incident angles for FIGS. 37 through 40 are the same as for FIGS. 9 through 12, respectively. Example 8 provided a high-reflectance, high-color 'blue' scratch-resistant coating (SRC) on absorbing glass substrate. The external reflected color transitions from deep blue at normal incidence to purple to neutral (silver) at higher angles.

Figure 41:
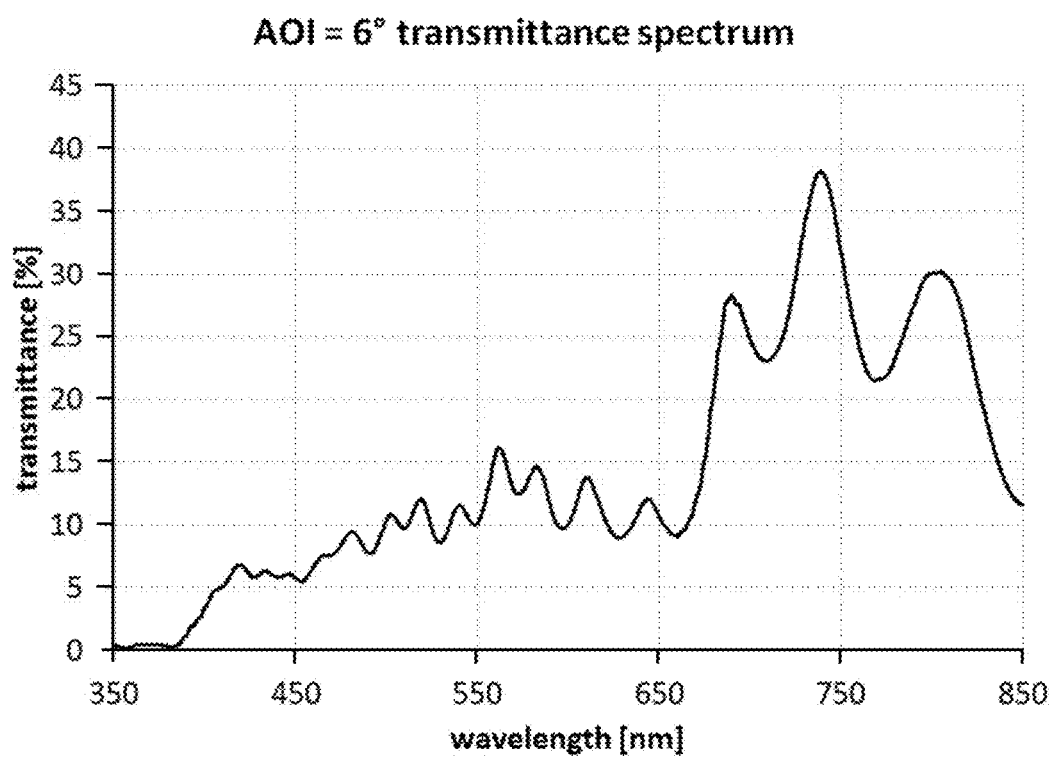
FIG. 41 shows a transmittance spectrum for Example 9.
Figure 42:
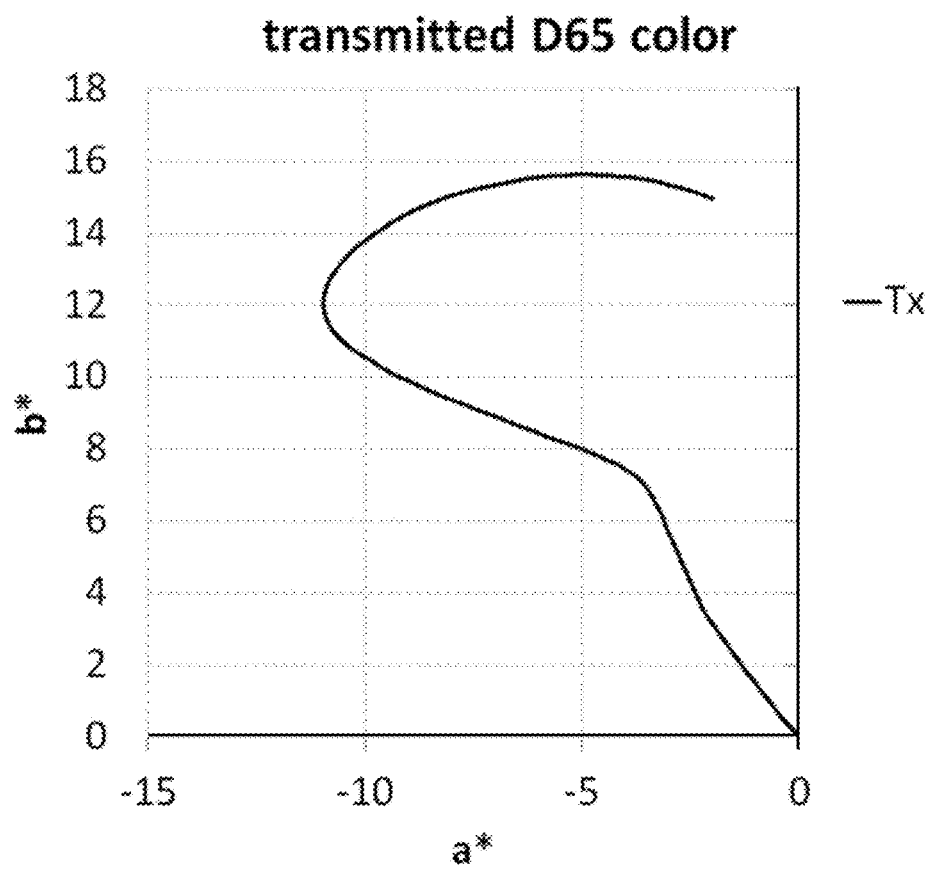
FIG. 42 shows transmitted color for Example 9.
Figure 43:
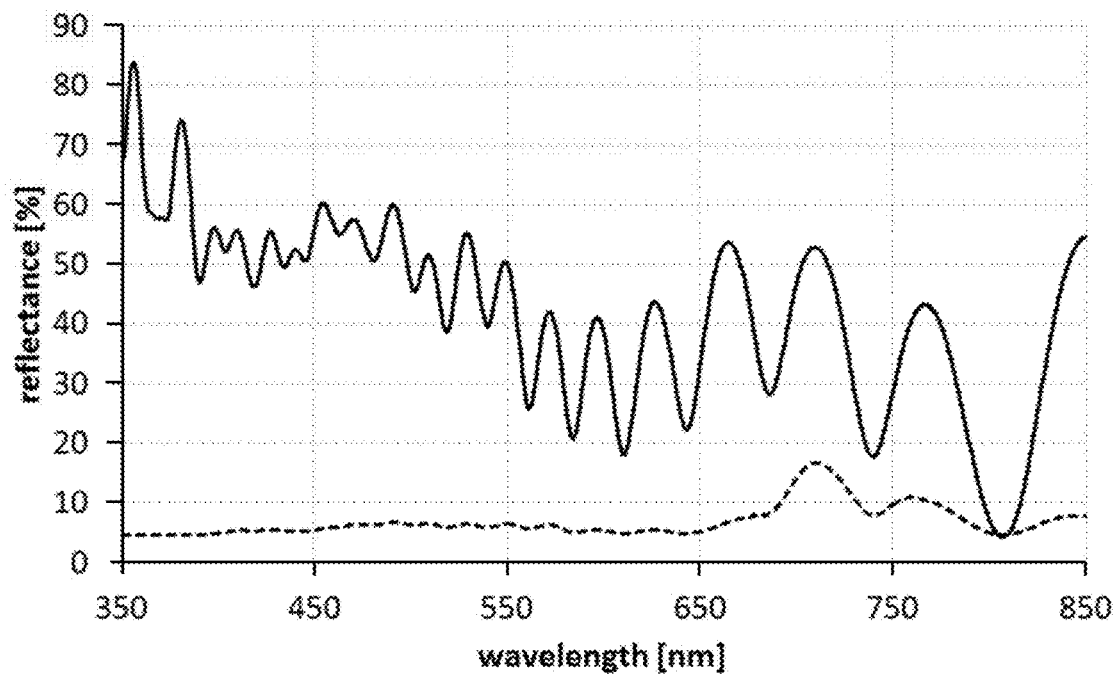
FIG. 43 shows a reflection spectrum for Example 9.
Figure 44:
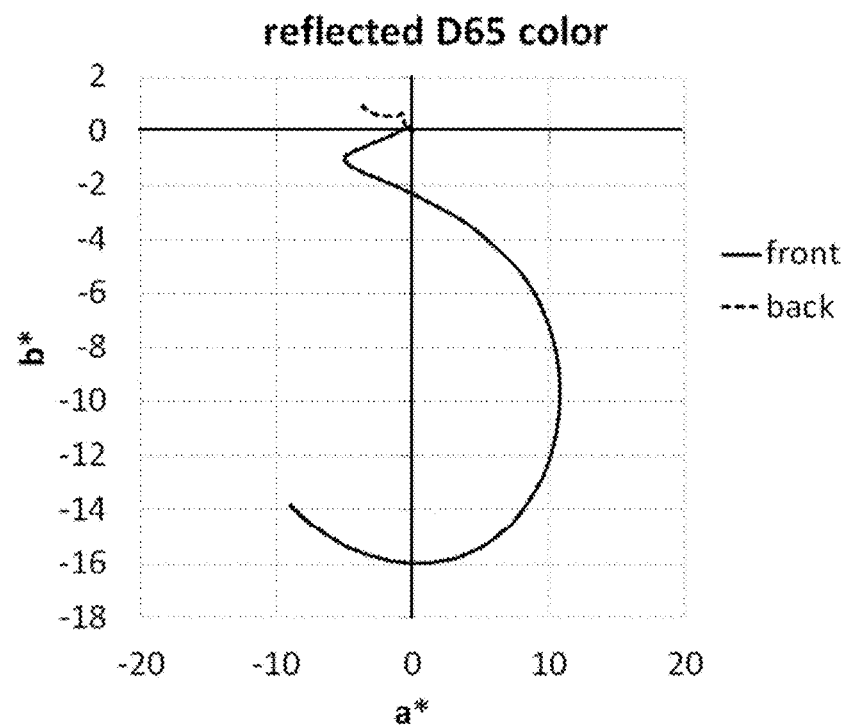
FIG. 44 shows reflected color for Example 9.

FIG. 41 shows a transmittance spectrum for Example 9. FIG. 42 shows transmitted color for Example 9. FIG. 43 shows a reflection spectrum for Example 9. FIG. 44 shows reflected color for Example 9. The incident spectrum and incident angles for FIGS. 41 through 44 are the same as for FIGS. 9 through 12, respectively. Example 9 provided a high-reflectance, medium-to-high-color 'blue' scratch-resistant coating (SRC) on absorbing glass substrate. The external reflected color transitions from blue at normal incidence to purple to neutral (silver) at higher angles. 18 optical interference layers are buried below a thick hard layer, with only one interference layer above the thick hard layer.

Figure 45:
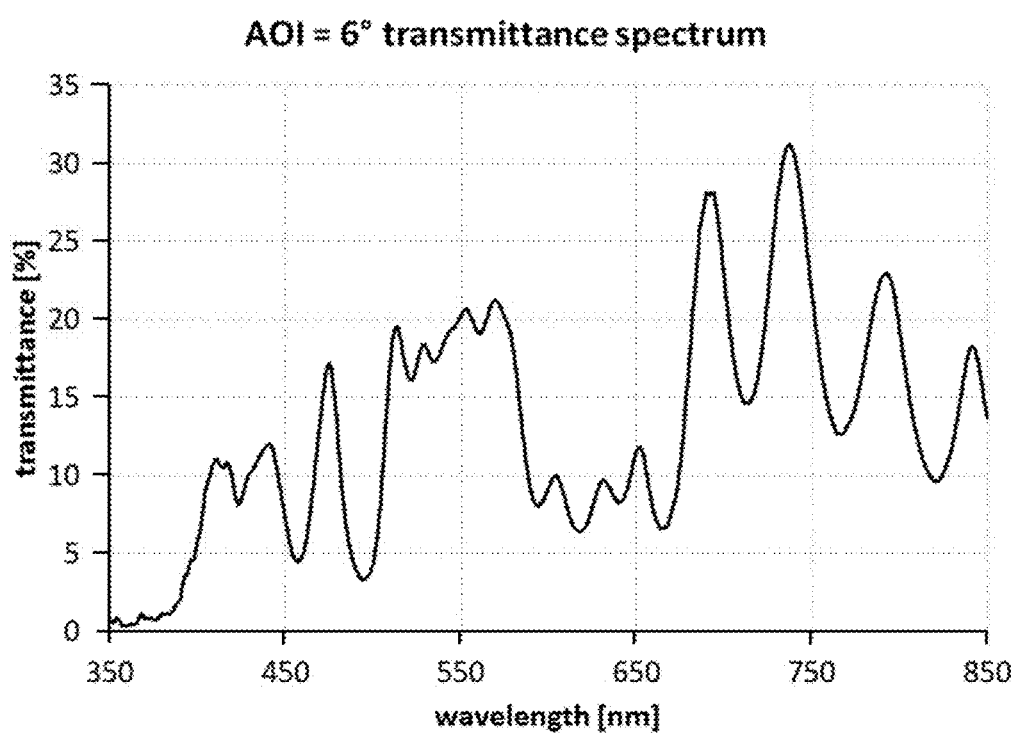
FIG. 45 shows a transmittance spectrum for Example 10.
Figure 46:
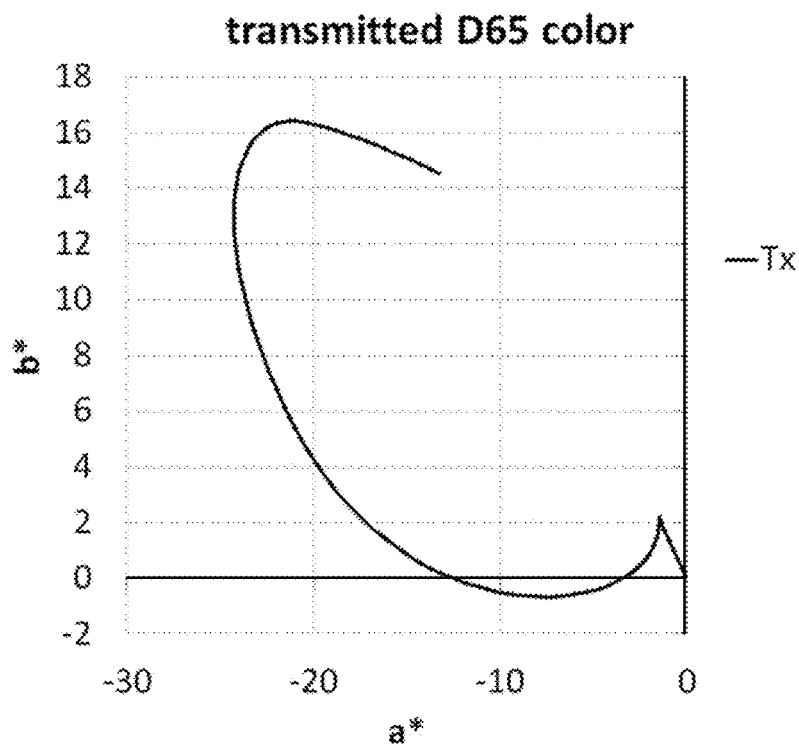
FIG. 46 shows transmitted color for Example 10.
Figure 47:
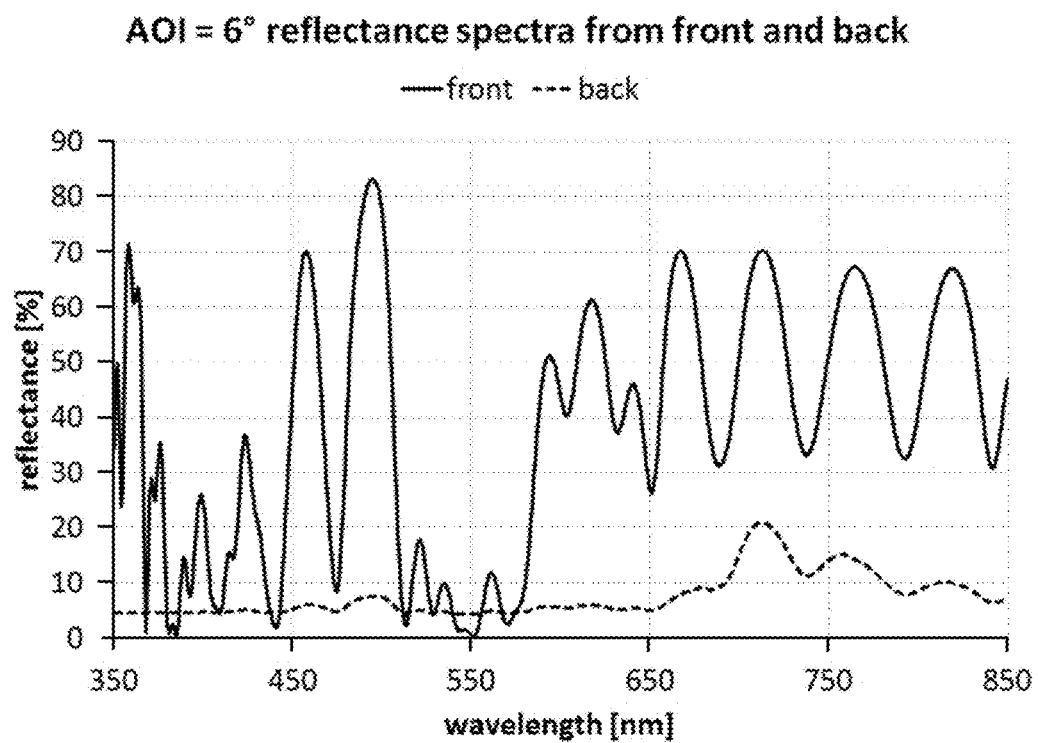
FIG. 47 shows a reflection spectrum for Example 10.
Figure 48:
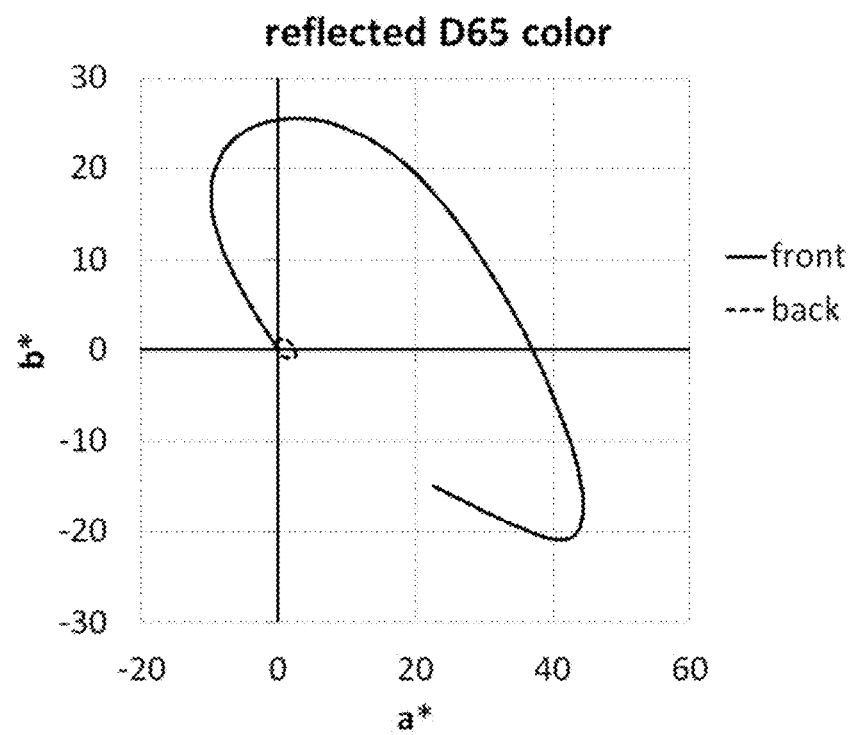
FIG. 48 shows reflected color for Example 10.

FIG. 45 shows a transmittance spectrum for Example 10. FIG. 46 shows transmitted color for Example 10. FIG. 47 shows a reflection spectrum for Example 10. FIG. 48 shows reflected color for Example 10. The incident spectrum and incident angles for FIGS. 45 through 48 are the same as for FIGS. 9 through 12, respectively. Example 10 provided a high-reflectance, high-color 'purple' scratch-resistant coating (SRC) on absorbing glass substrate. The external reflected color transitions from purple at normal incidence to gold to neutral (silver) at higher angles. 18 optical interference layers are buried below a thick hard layer, with only one interference layer above the thick hard layer.

Figure 49:
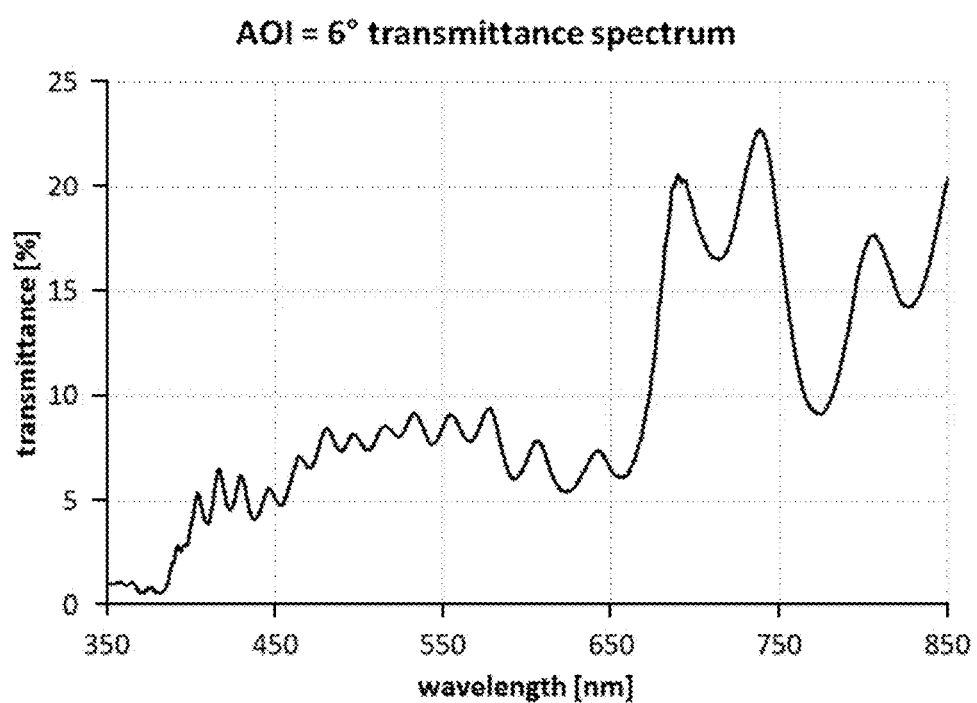
FIG. 49 shows a transmittance spectrum for Example 11.
Figure 50:
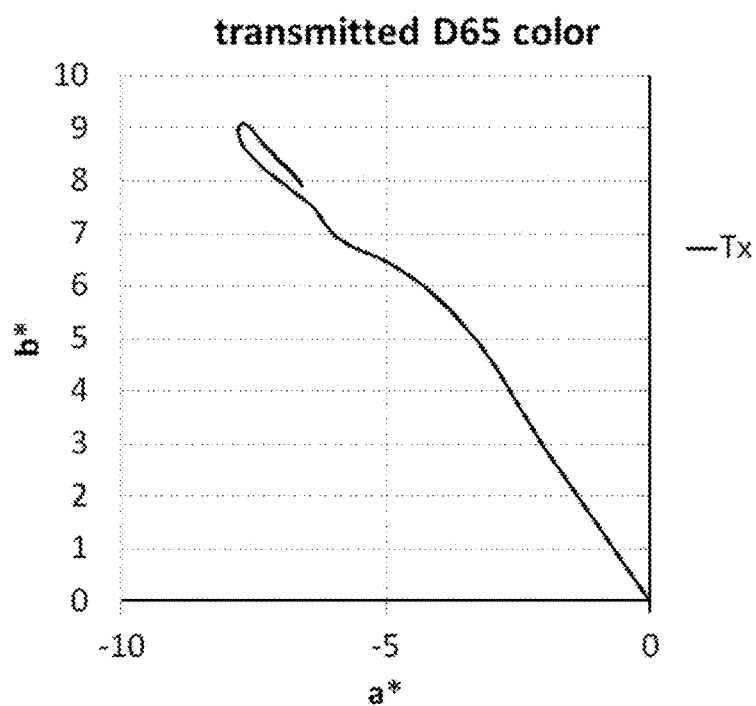
FIG. 50 shows transmitted color for Example 11.
Figure 51:
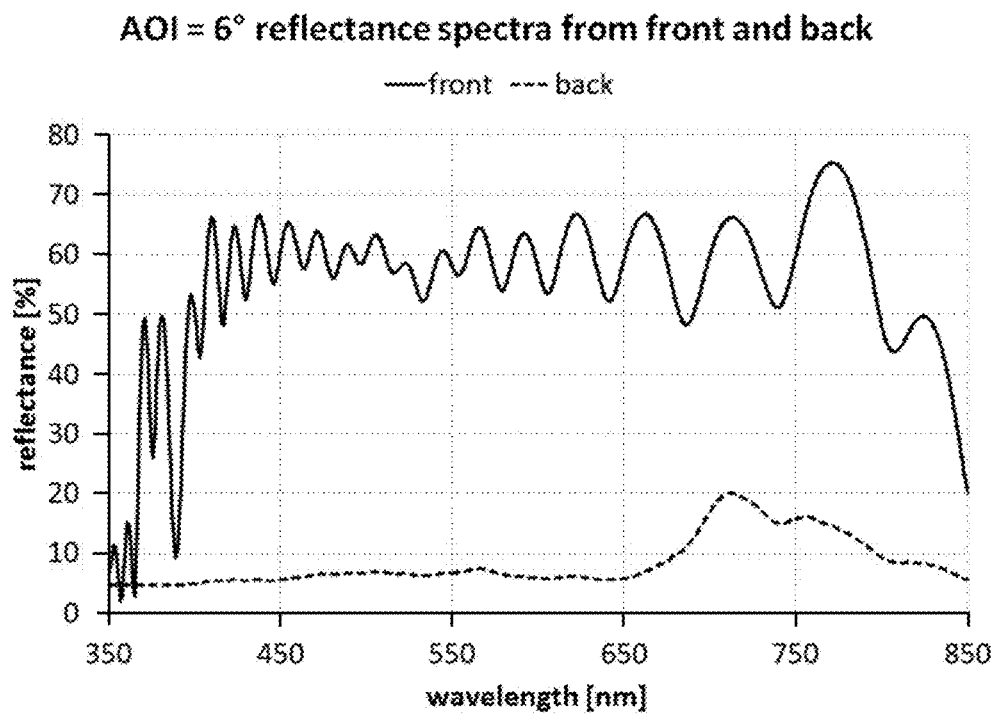
FIG. 51 shows a reflection spectrum for Example 11.
Figure 52:
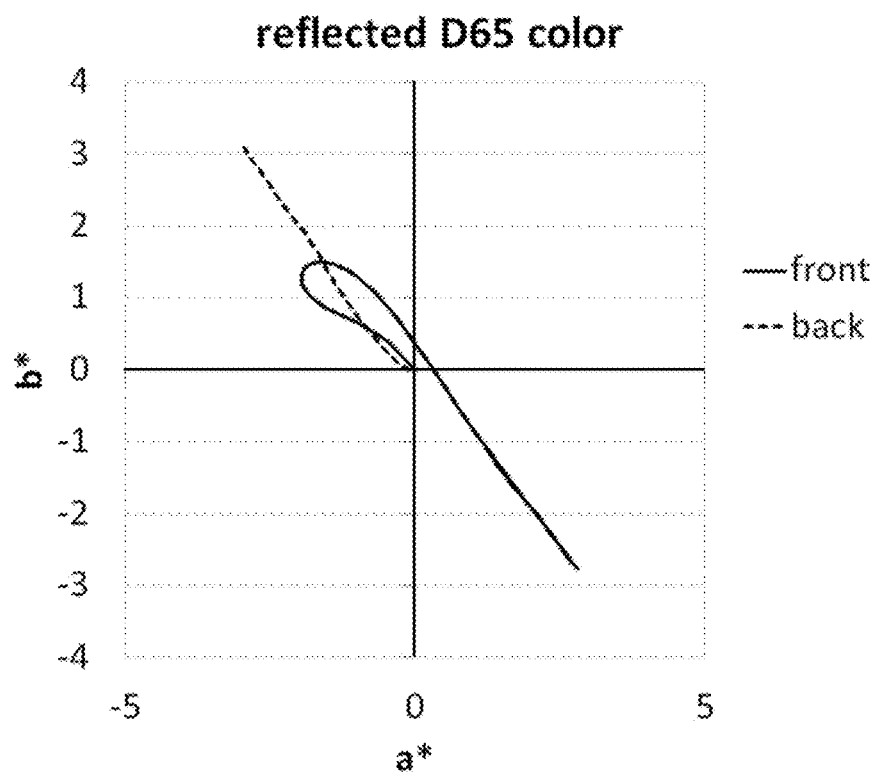
FIG. 52 shows reflected color for Example 11.

FIG. 49 shows a transmittance spectrum for Example 11. FIG. 50 shows transmitted color for Example 11. FIG. 51 shows a reflection spectrum for Example 11. FIG. 52 shows reflected color for Example 11. The incident spectrum and incident angles for FIGS. 49 through 52 are the same as for FIGS. 9 through 12, respectively. Example 11 provided a high-reflectance, low-color 'silver' scratch-resistant coating (SRC) on absorbing glass substrate. The external reflected color remains substantially neutral (silver) for all angles of incidence. 20 optical interference layers are buried below a thick hard layer, with only one interference layer above the thick hard layer.

Figure 53:
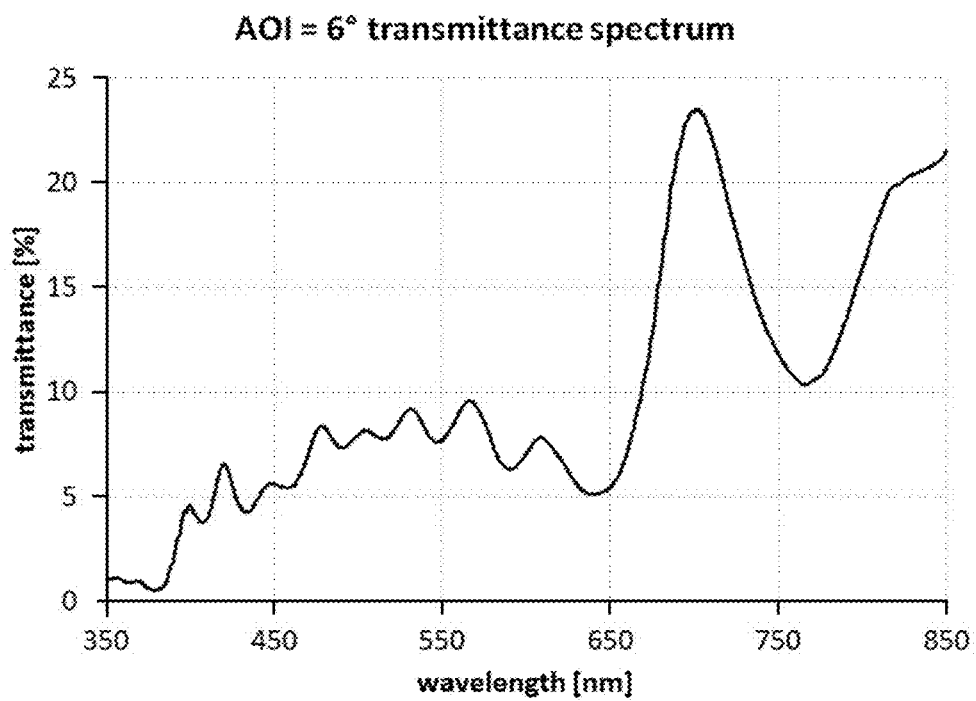
FIG. 53 shows a transmittance spectrum for Example 11A.
Figure 54:
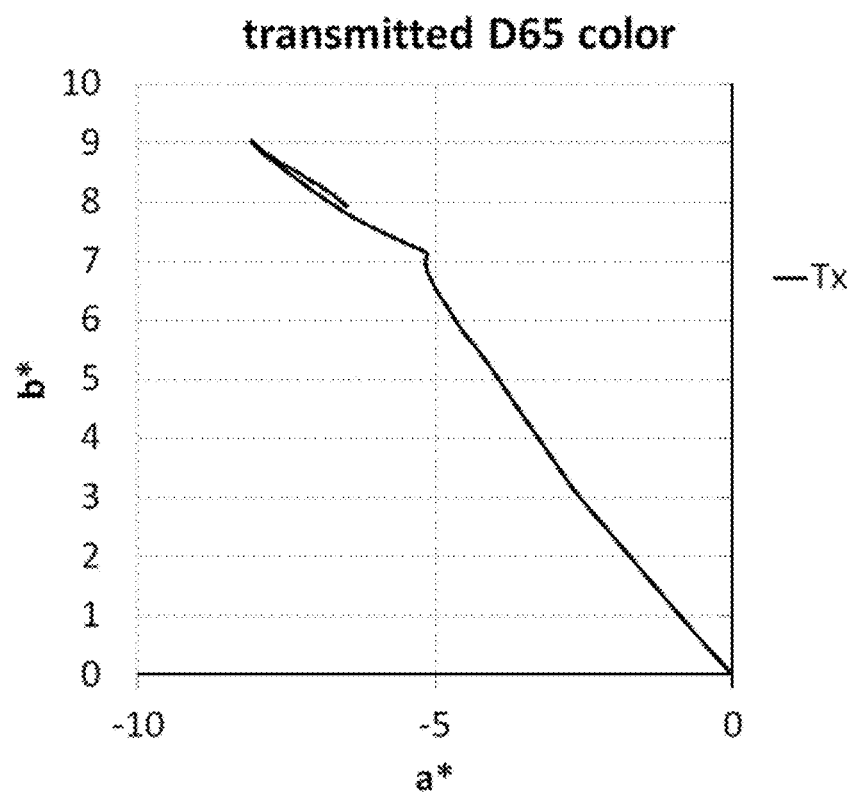
FIG. 54 shows transmitted color for Example 11A.
Figure 55:
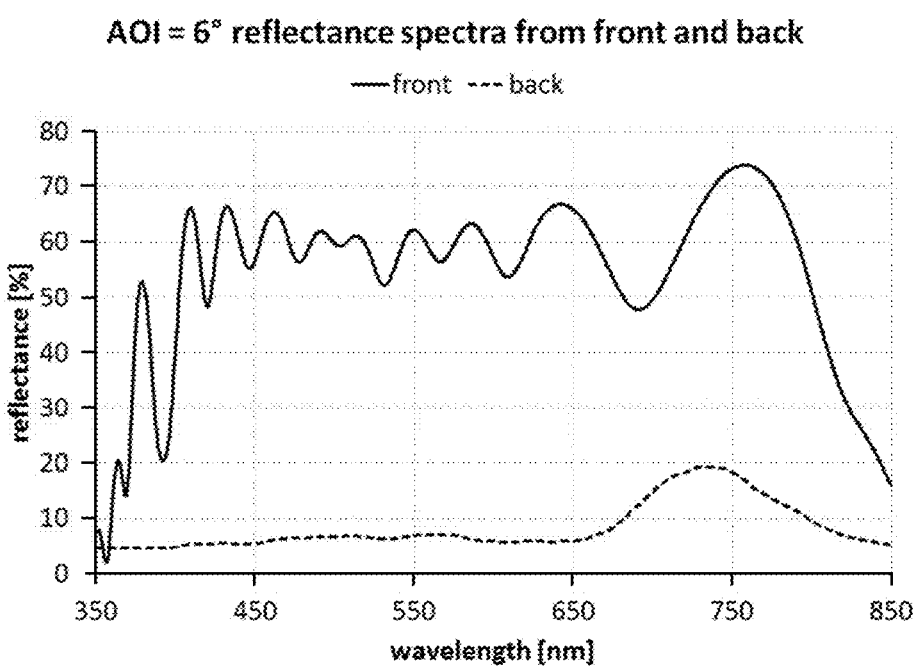
FIG. 55 shows a reflection spectrum for Example 11A.
Figure 56:
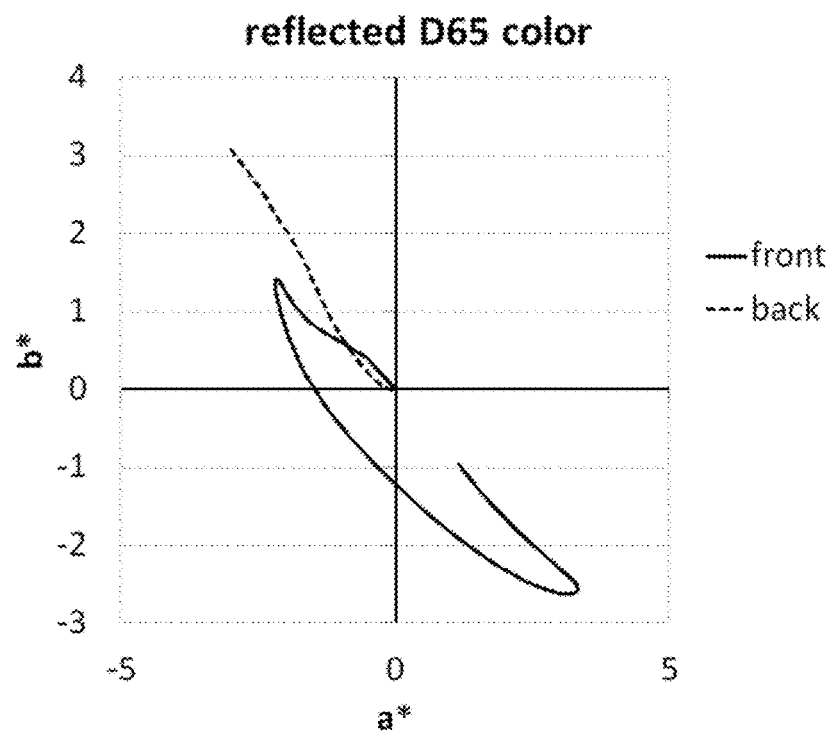
FIG. 56 shows reflected color for Example 11A.

FIG. 53 shows a transmittance spectrum for Example 11A. FIG. 54 shows transmitted color for Example 11A. FIG. 55 shows a reflection spectrum for Example 11A. FIG. 56 shows reflected color for Example 11A. The incident spectrum and incident angles for FIGS. 53 through 56 are the same as for FIGS. 9 through 12, respectively. Example 11A provided a high-reflectance, low-color 'silver' scratch-resistant coating (SRC) on absorbing glass substrate. The external reflected color remains substantially neutral (silver) for all angles of incidence. Example 11A is very similar to example 11, with reduced thickness of the Layer 2, the thick, hard layer. Example 11 shows that the thick hard layer can have a thickness in the range of about 0.5-10 microns without substantially changing the optical performance. The flexibility of the thickest layer applies to all of the examples of this disclosure.

Figure 57:
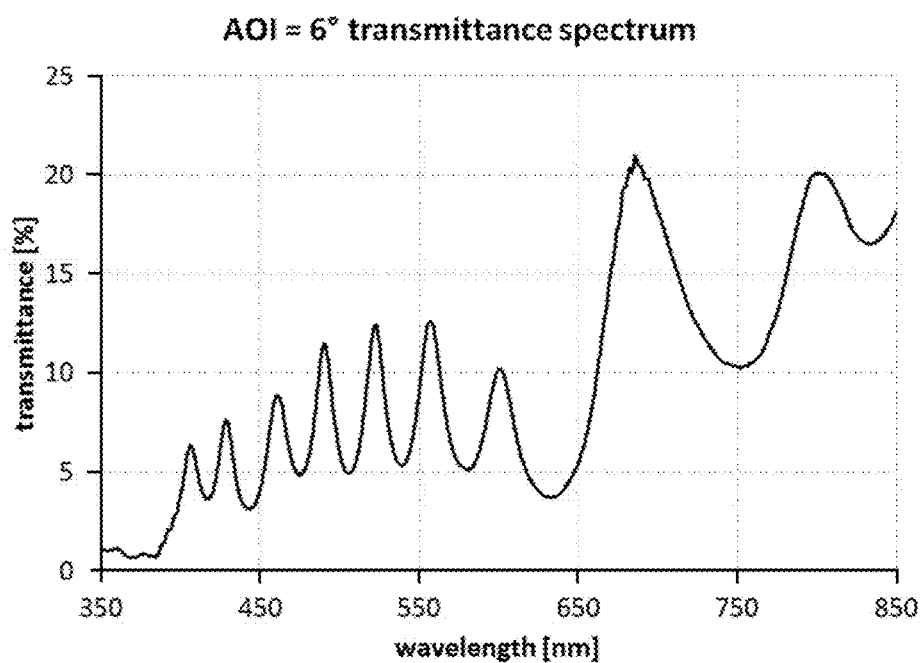
FIG. 57 shows a transmittance spectrum for Example 11B.
Figure 58:
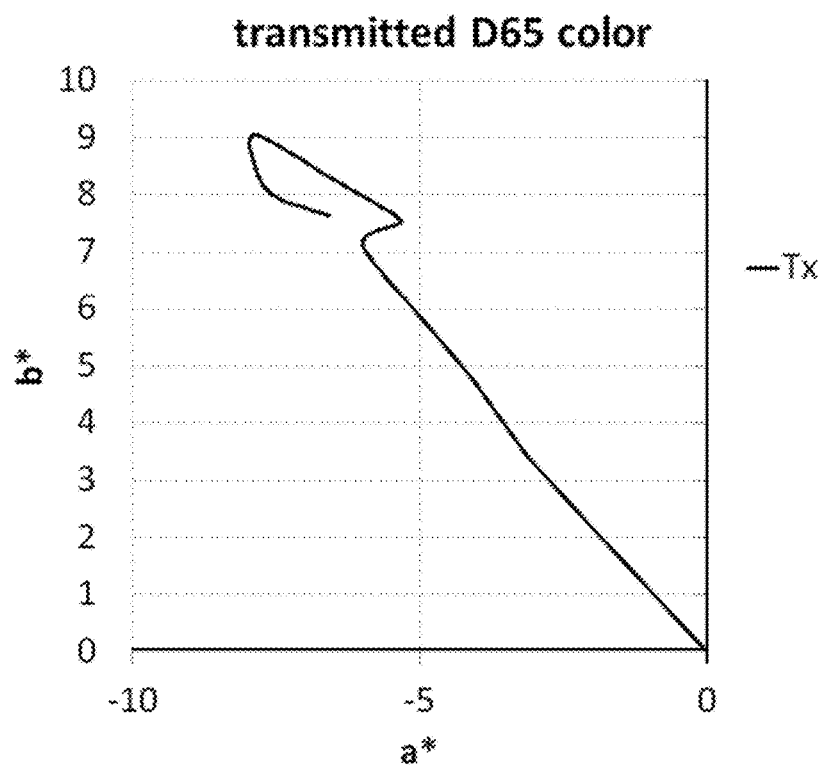
FIG. 58 shows transmitted color for Example 11B.
Figure 59:
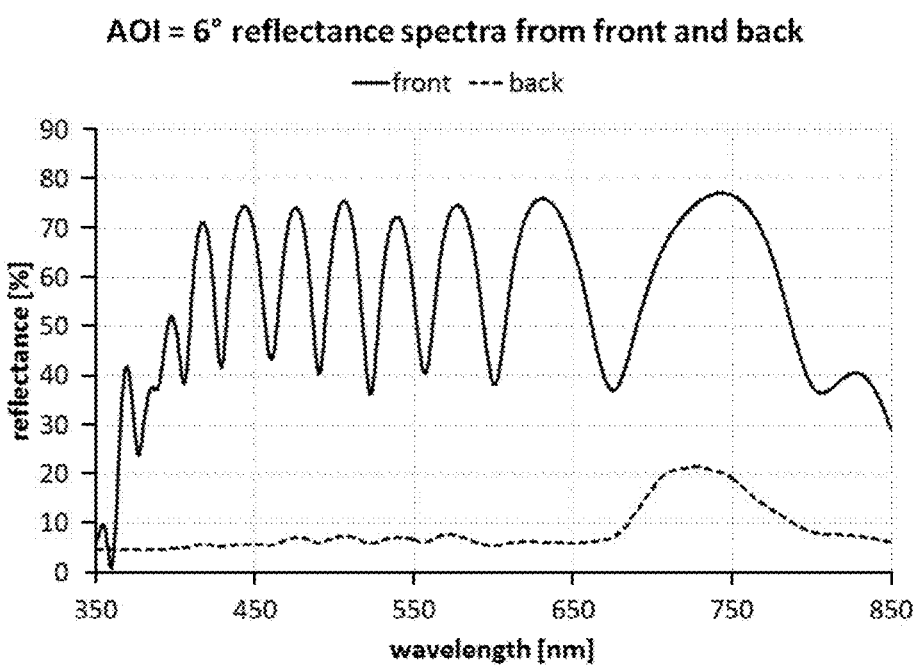
FIG. 59 shows a reflection spectrum for Example 11B.
Figure 60:
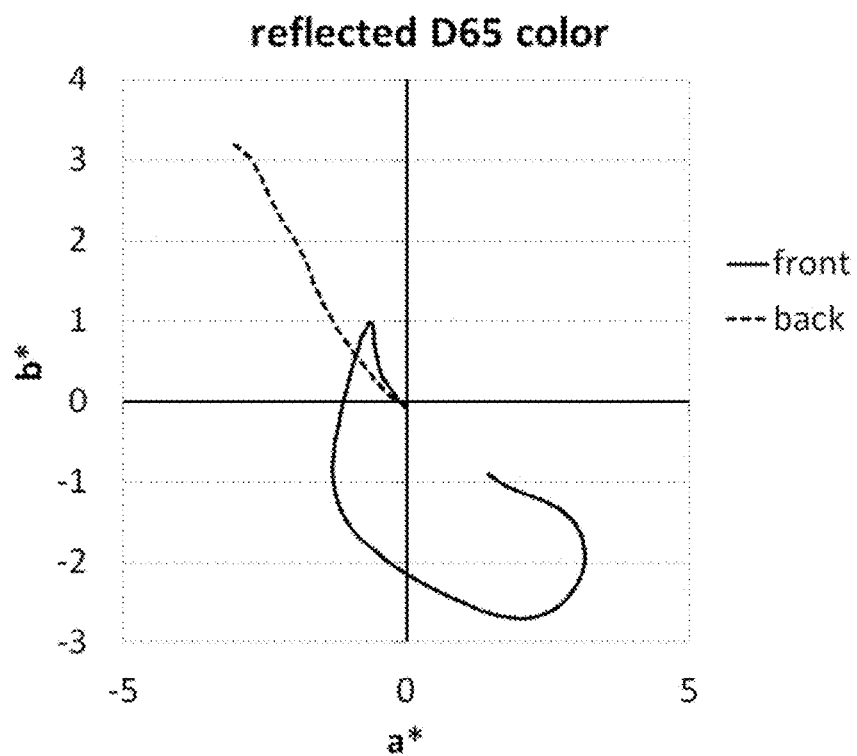
FIG. 60 shows reflected color for Example 11B.

FIG. 57 shows a transmittance spectrum for Example 11B. FIG. 58 shows transmitted color for Example 11B. FIG. 59 shows a reflection spectrum for Example 11B. FIG. 60 shows reflected color for Example 11B. The incident spectrum and incident angles for FIGS. 57 through 60 are the same as for FIGS. 9 through 12, respectively. Example 11B provided a high-reflectance, low-color 'silver' scratch-resistant coating (SRC) on absorbing glass substrate. The external reflected color remains substantially neutral (silver) for all angles of incidence. Example 11B is the same as Example 11A, except that the top 50 nm of material is removed to simulate a scratch or damage event. Average reflectance and color for Ex. 11B is very similar to Ex. 11A, demonstrating optical insensitivity to material removal.

Figure 61:
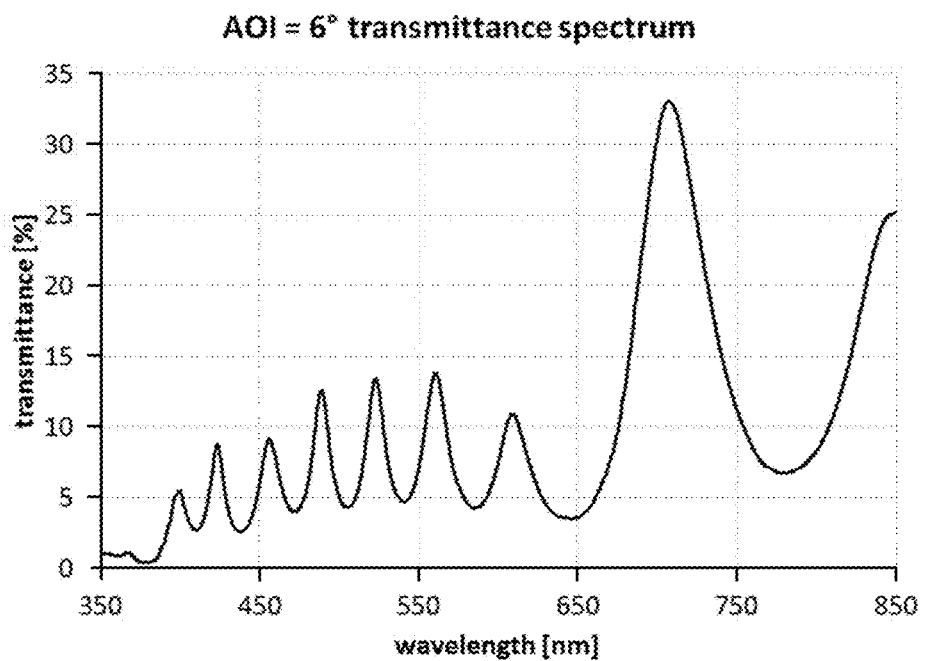
FIG. 61 shows a transmittance spectrum for Example 11C.
Figure 62:
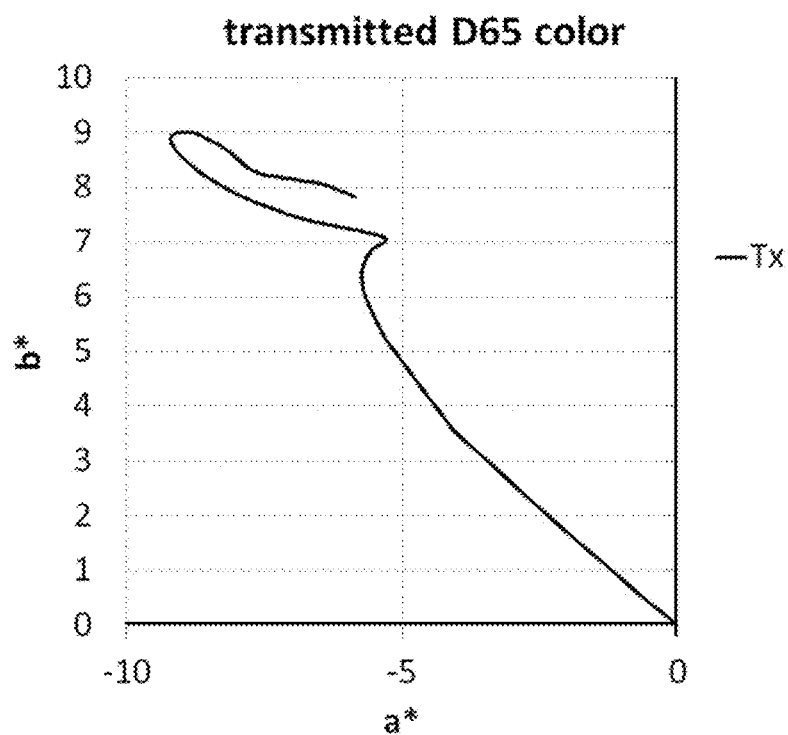
FIG. 62 shows transmitted color for Example 11C.
Figure 63:
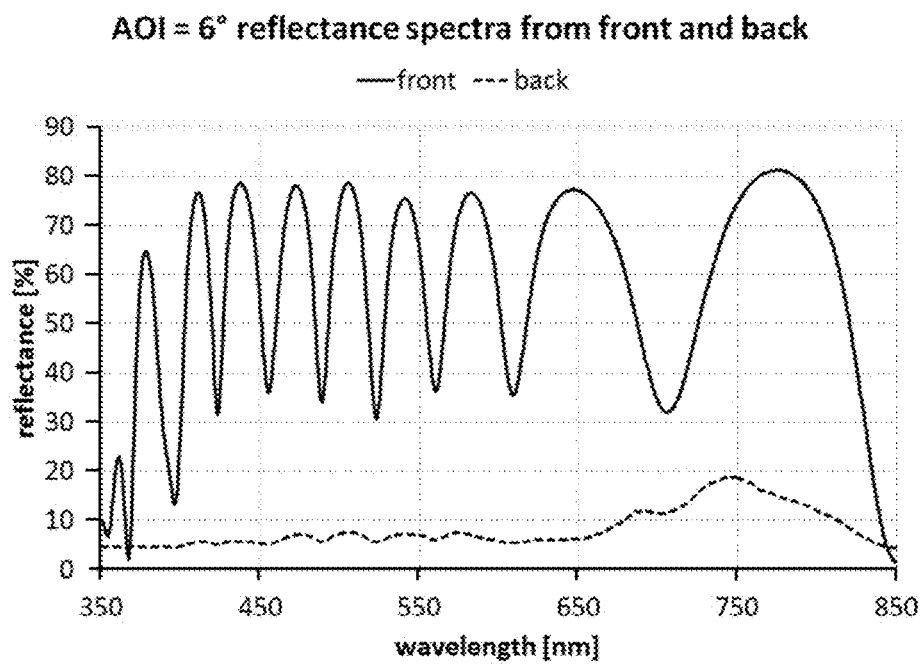
FIG. 63 shows a reflection spectrum for Example 11C.
Figure 64:
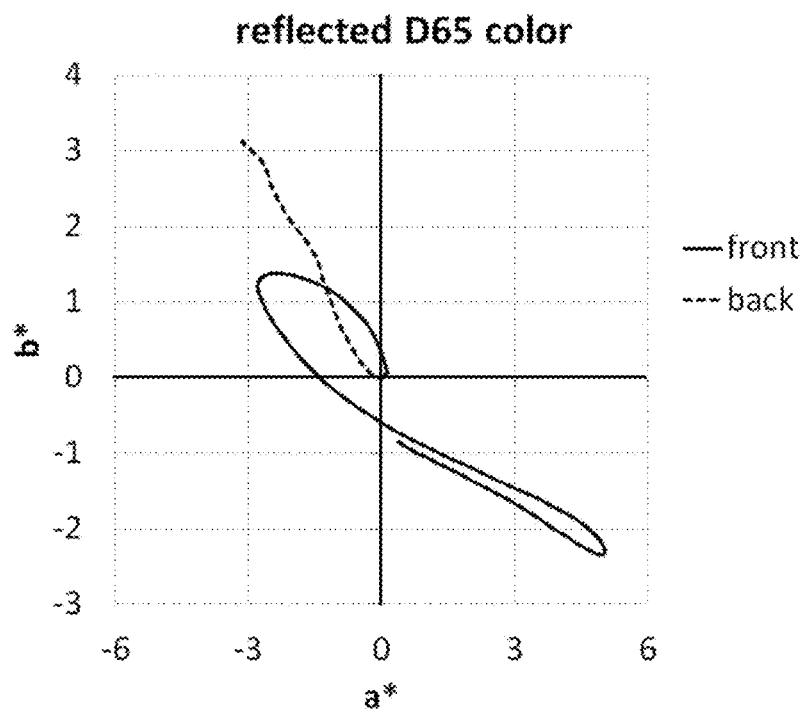
FIG. 64 shows reflected color for Example 11C.

FIG. 61 shows a transmittance spectrum for Example 11C. FIG. 62 shows transmitted color for Example 11C. FIG. 63 shows a reflection spectrum for Example 11C. FIG. 64 shows reflected color for Example 11C. The incident spectrum and incident angles for FIGS. 61 through 64 are the same as for FIGS. 9 through 12, respectively. Example 11C provided a high-reflectance, low-color 'silver' scratch-resistant coating (SRC) on absorbing glass substrate. The external reflected color remains substantially neutral (silver) for all angles of incidence. Example 11C is the same as Example 11A, except that the top 200 nm of material is removed to simulate a scratch or damage event. Average reflectance and color for Ex. 11C is very similar to Ex. 11A, demonstrating optical insensitivity to material removal.

Figure 65:
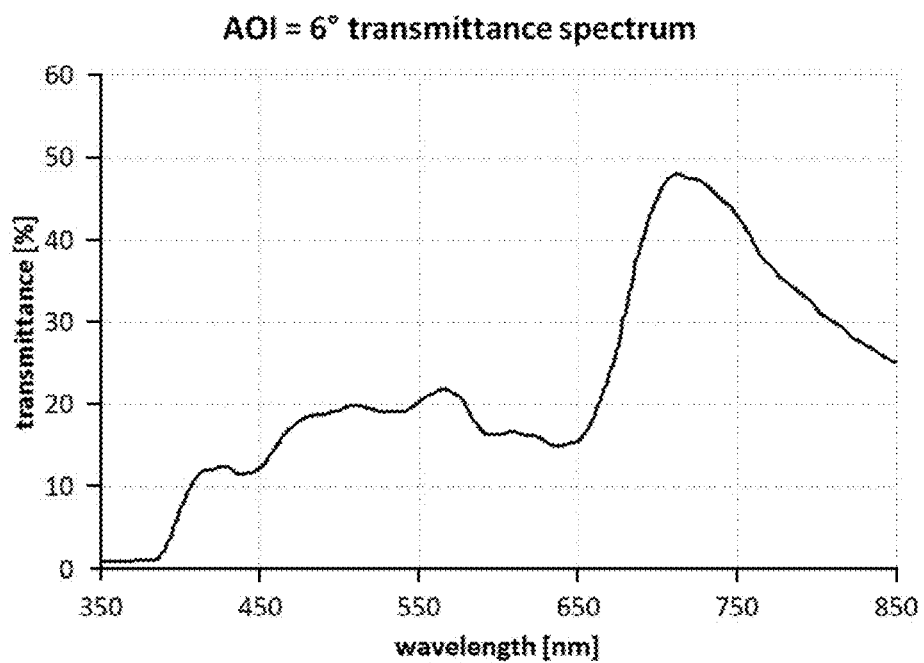
FIG. 65 shows a transmittance spectrum for Example 12.
Figure 66:
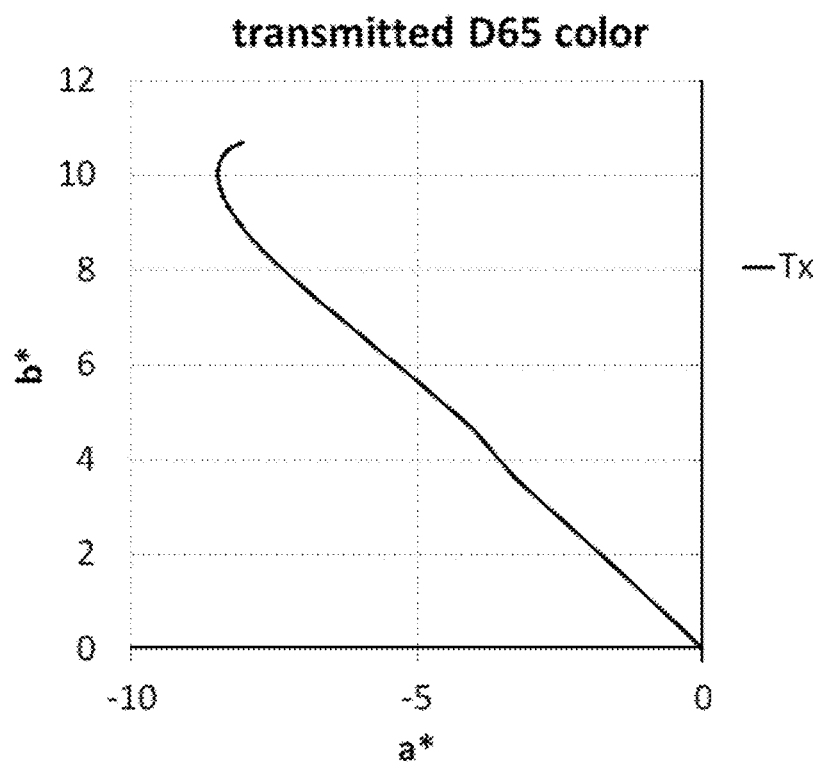
FIG. 66 shows transmitted color for Example 12.
Figure 67:
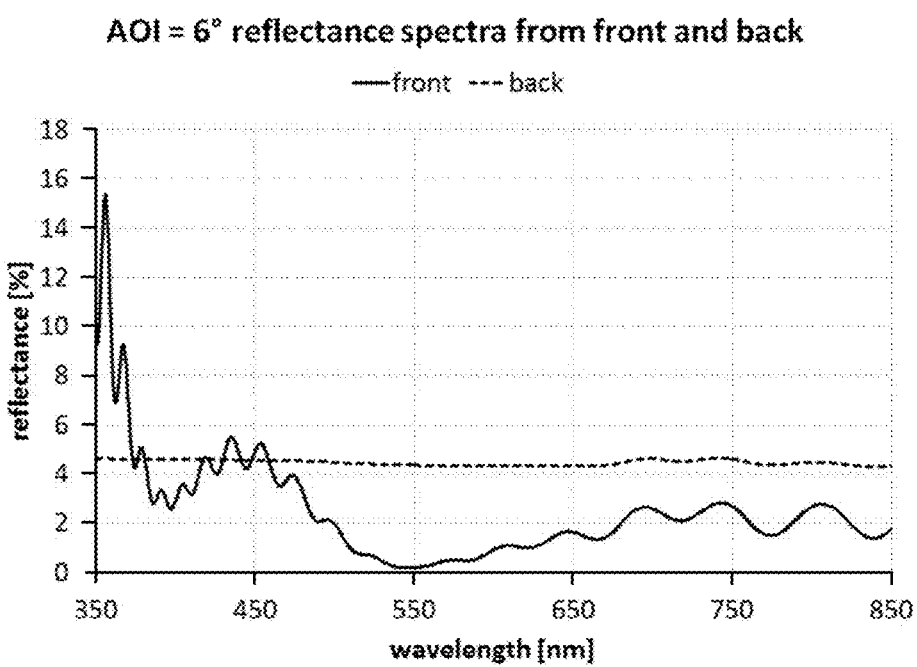
FIG. 67 shows a reflection spectrum for Example 12.
Figure 68:
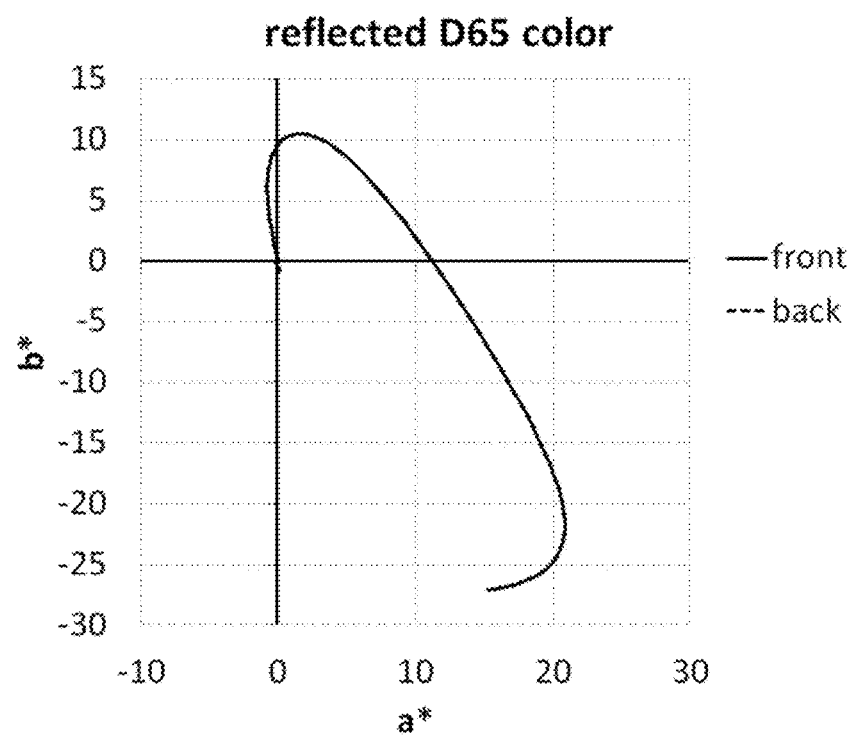
FIG. 68 shows reflected color for Example 12.

FIG. 65 shows a transmittance spectrum for Example 12. FIG. 66 shows transmitted color for Example 12. FIG. 67 shows a reflection spectrum for Example 12. FIG. 68 shows reflected color for Example 12. The incident spectrum and incident angles for FIGS. 65 through 68 are the same as for FIGS. 9 through 12, respectively.

Example 12 provided a low-reflectance, high-color 'purple' scratch-resistant coating (SRC) on absorbing glass substrate. The external reflected color transitions from purple at normal incidence to red to gold to neutral (silver) at higher angles.

Figure 69:
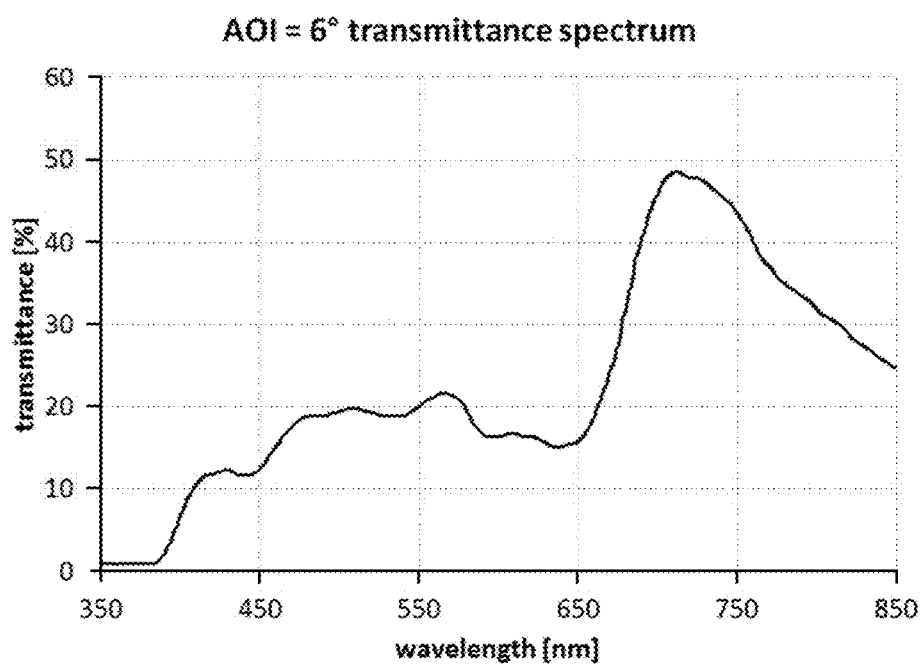
FIG. 69 shows a transmittance spectrum for Example 13.
Figure 70:
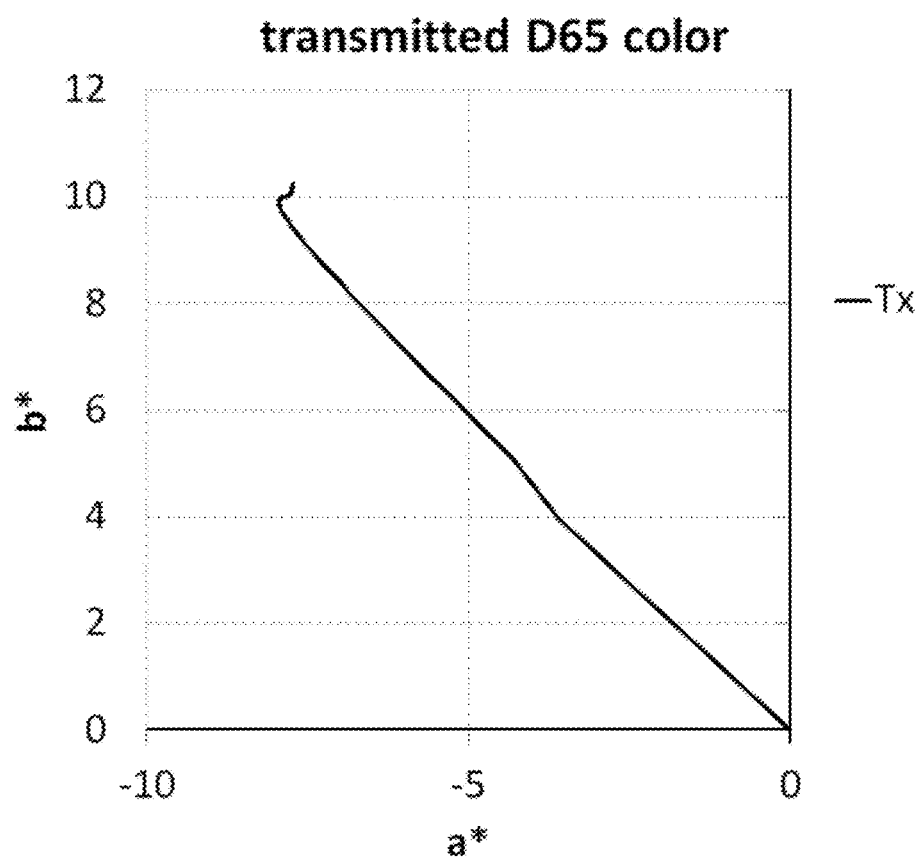
FIG. 70 shows transmitted color for Example 13.
Figure 71:
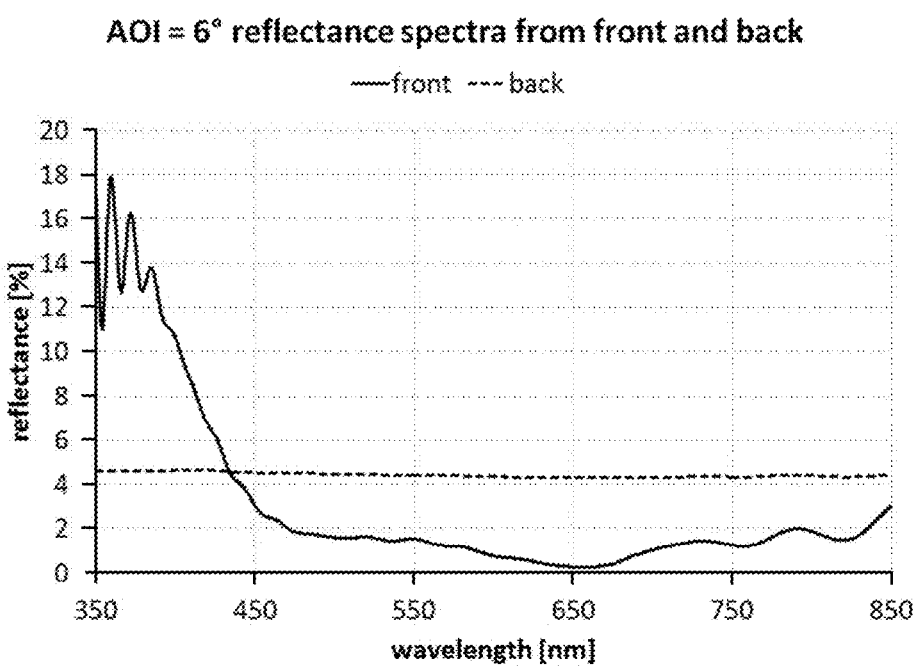
FIG. 71 shows a reflection spectrum for Example 13.
Figure 72:
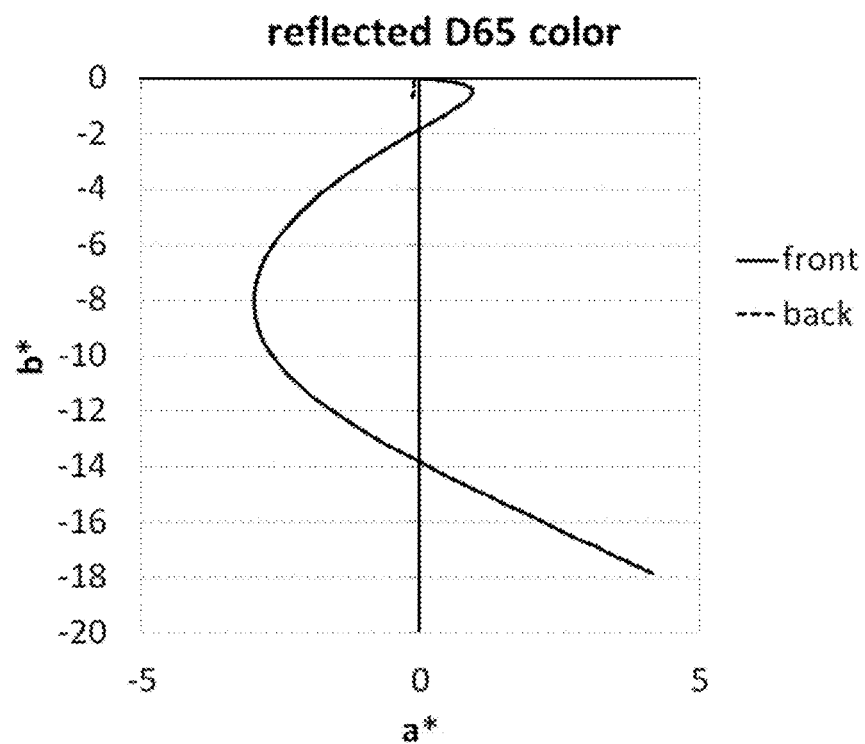
FIG. 72 shows reflected color for Example 13.

FIG. 69 shows a transmittance spectrum for Example 13. FIG. 70 shows transmitted color for Example 13. FIG. 71 shows a reflection spectrum for Example 13. FIG. 72 shows reflected color for Example 13. The incident spectrum and incident angles for FIGS. 69 through 72 are the same as for FIGS. 9 through 12, respectively. Example 13 provided a low-reflectance, high-color 'blue' scratch-resistant coating (SRC) on absorbing glass substrate. The external reflected color transitions from blue at normal incidence to light blue to neutral (silver) at higher angles.

Figure 73:
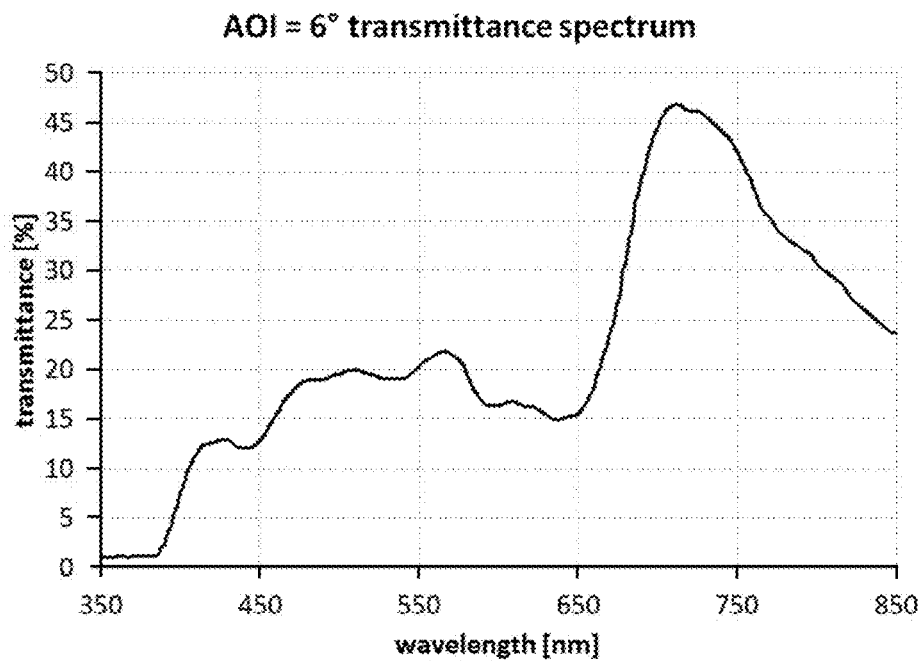
FIG. 73 shows a transmittance spectrum for Example 14.
Figure 74:
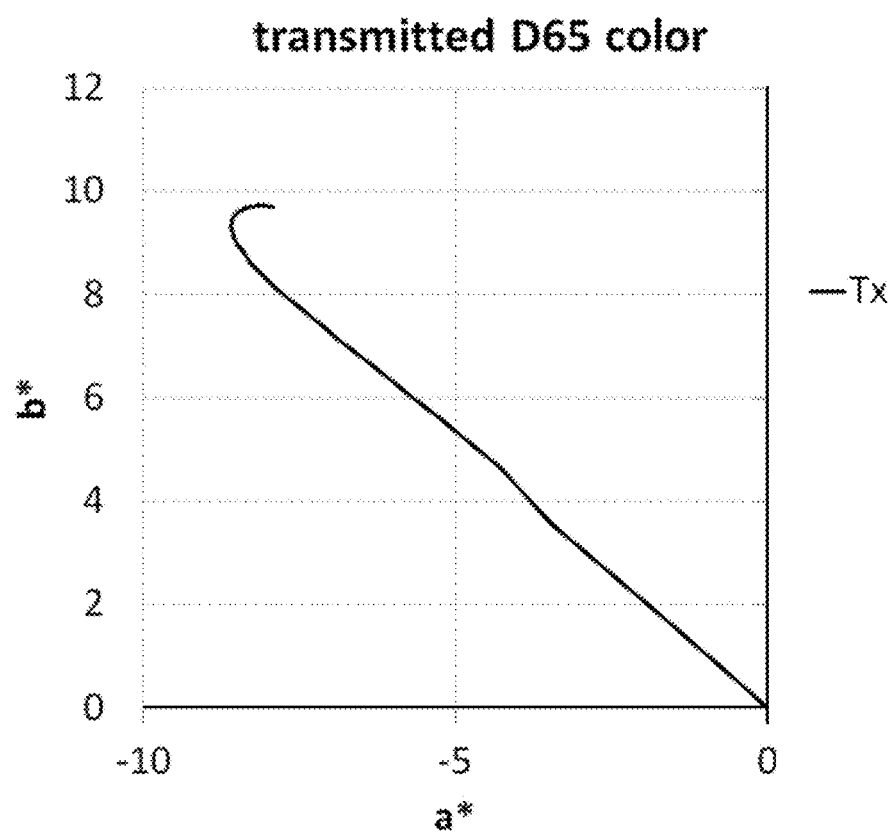
FIG. 74 shows transmitted color for Example 14.
Figure 75:
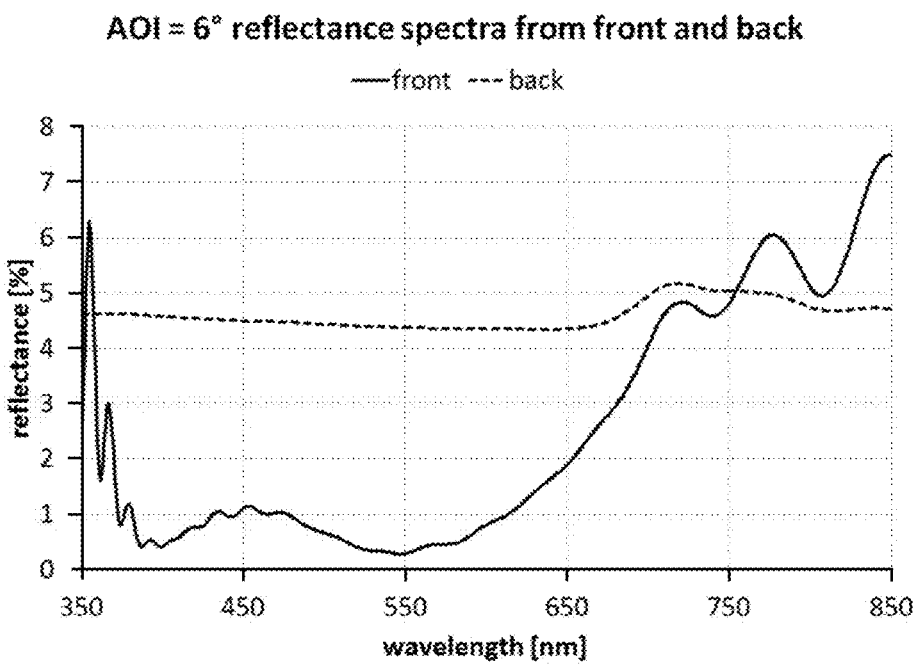
FIG. 75 shows a reflection spectrum for Example 14.
Figure 76:
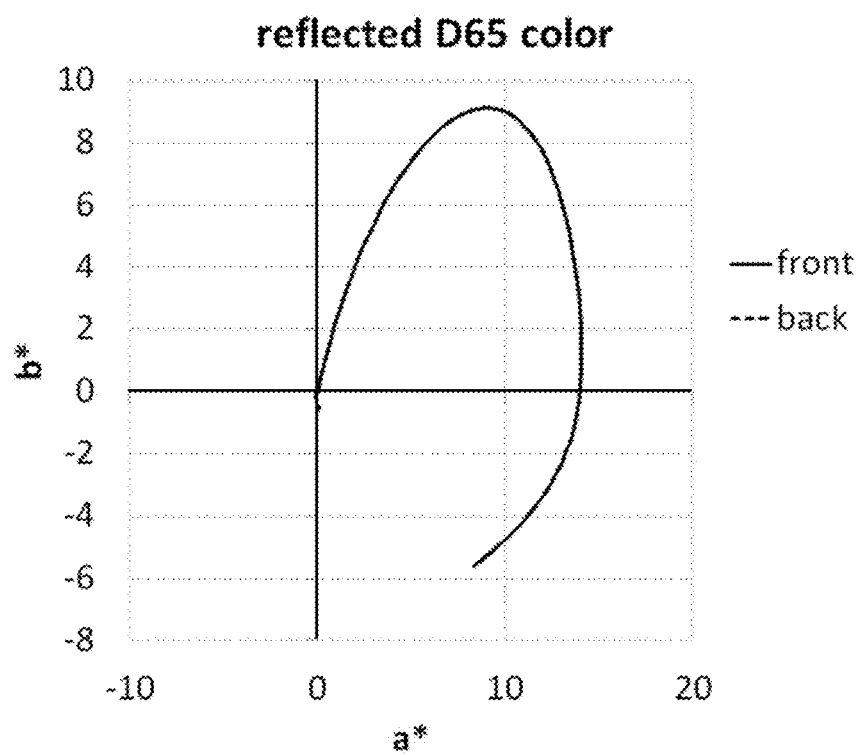
FIG. 76 shows reflected color for Example 14.

FIG. 73 shows a transmittance spectrum for Example 14. FIG. 74 shows transmitted color for Example 14. FIG. 75 shows a reflection spectrum for Example 14. FIG. 76 shows reflected color for Example 14. The incident spectrum and incident angles for FIGS. 73 through 76 are the same as for FIGS. 9 through 12, respectively. Example 14 provided a low-reflectance, medium-to-high-color 'red' scratch-resistant coating (SRC) on absorbing glass substrate. The external reflected color transitions from purple-red at normal incidence to red to gold to neutral (silver) at higher angles.

Figure 77:
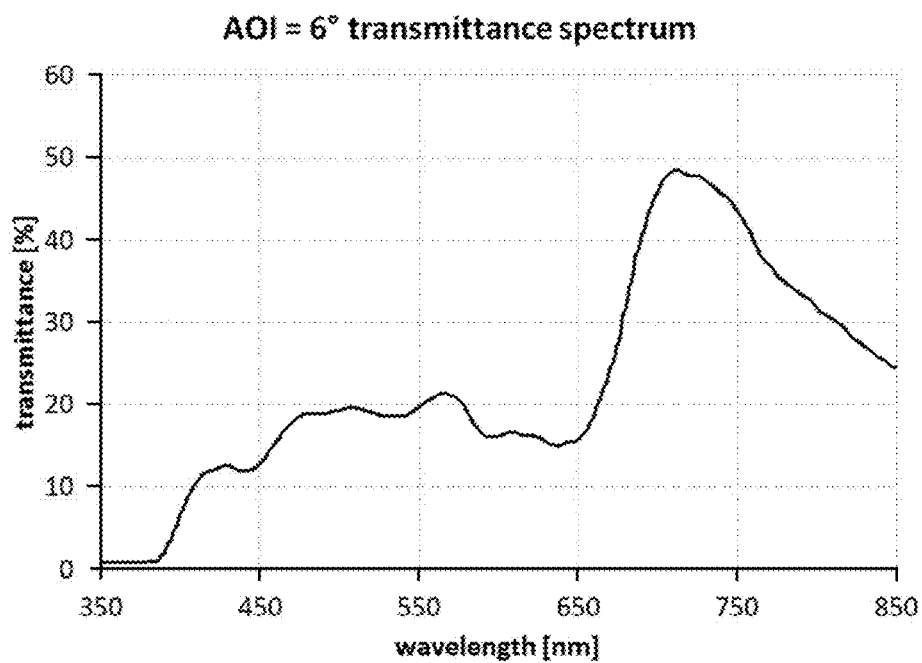
FIG. 77 shows a transmittance spectrum for Example 15.
Figure 78:
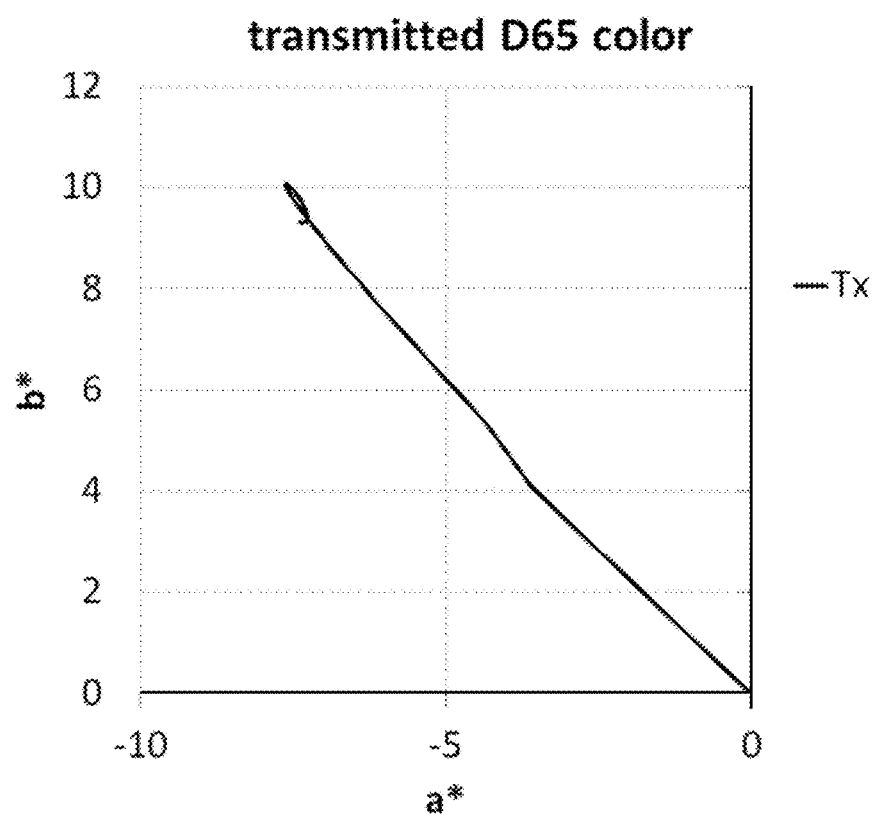
FIG. 78 shows transmitted color for Example 15.
Figure 79:
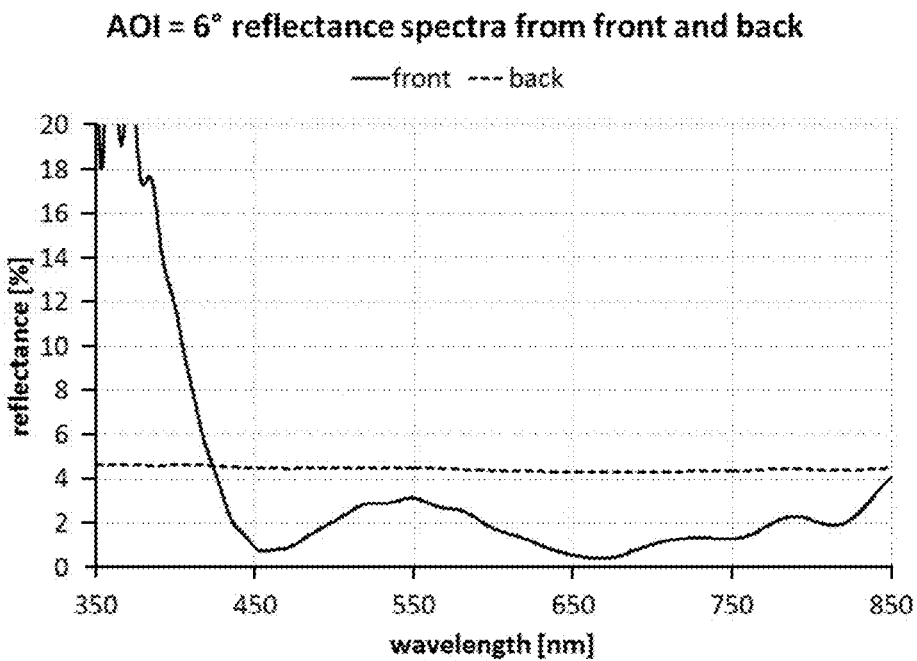
FIG. 79 shows a reflection spectrum for Example 15.
Figure 80:
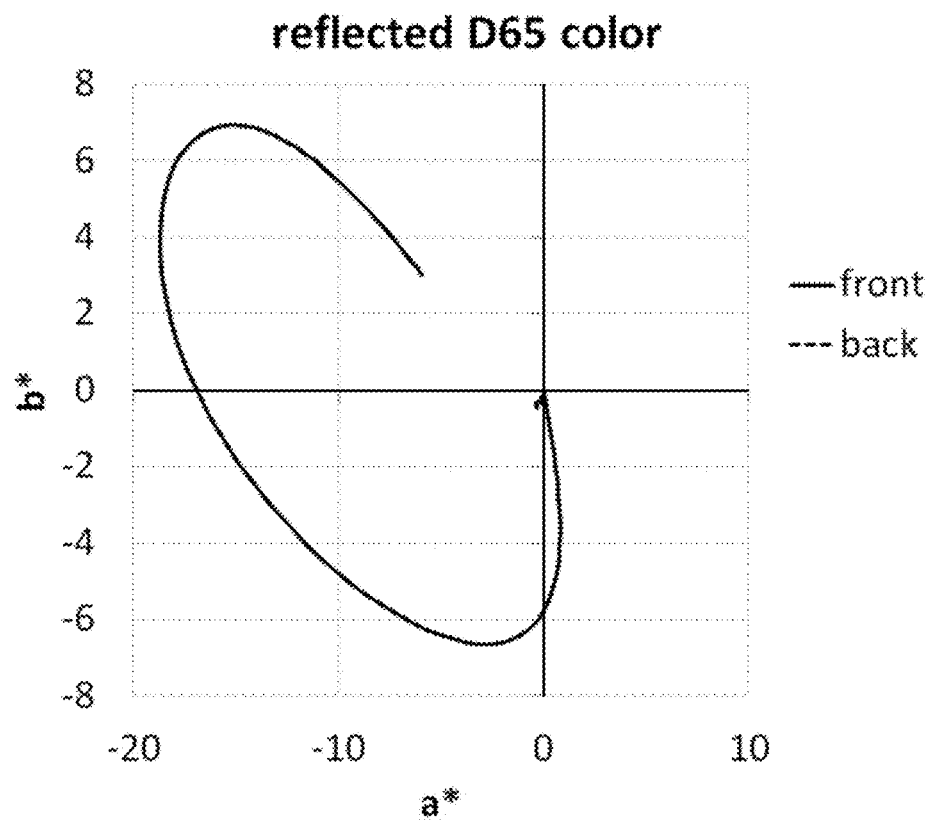
FIG. 80 shows reflected color for Example 15.

FIG. 77 shows a transmittance spectrum for Example 15. FIG. 78 shows transmitted color for Example 15. FIG. 79 shows a reflection spectrum for Example 15. FIG. 80 shows reflected color for Example 15. The incident spectrum and incident angles for FIGS. 77 through 80 are the same as for FIGS. 9 through 12, respectively. Example 15 provided a low-reflectance, medium-to-high-color 'green' scratch-resistant coating (SRC) on absorbing glass substrate. The external reflected color transitions from light green at normal incidence to green to light blue to neutral (silver) at higher angles.

Figure 81:
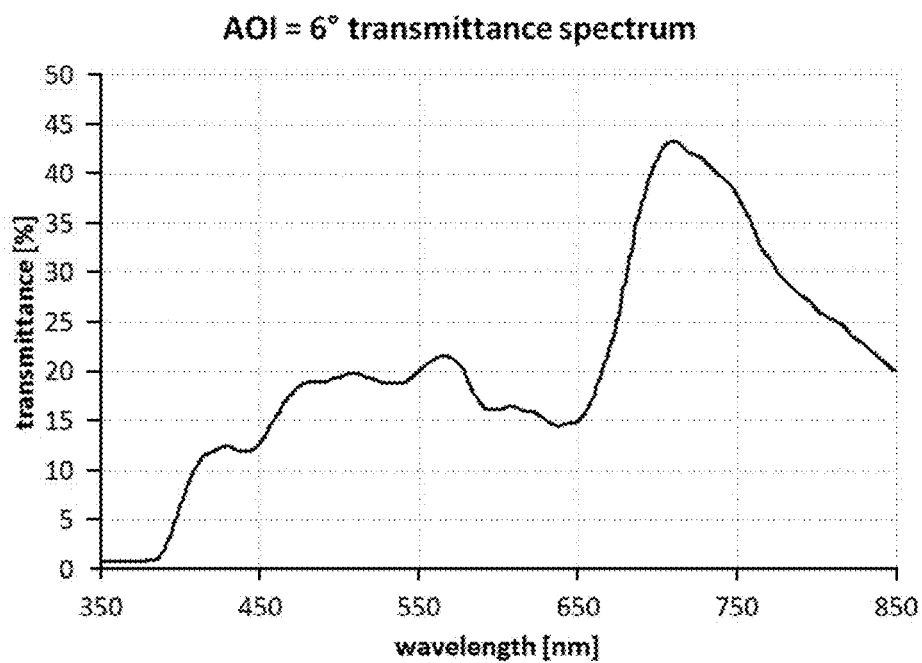
FIG. 81 shows a transmittance spectrum for Example 16.
Figure 82:
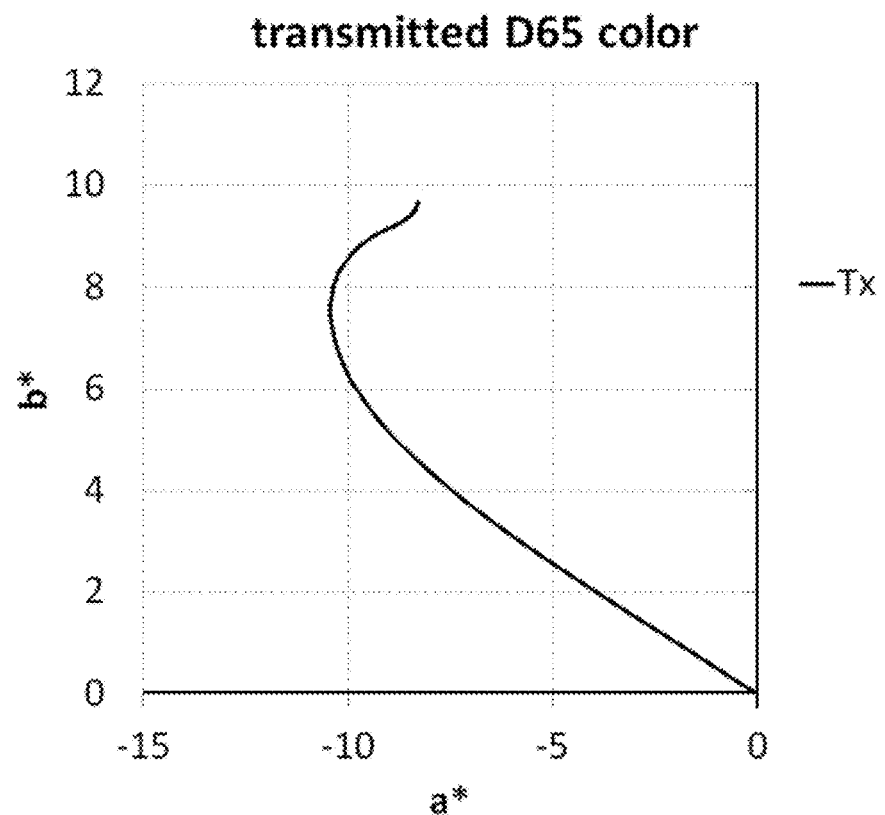
FIG. 82 shows transmitted color for Example 16.
Figure 83:
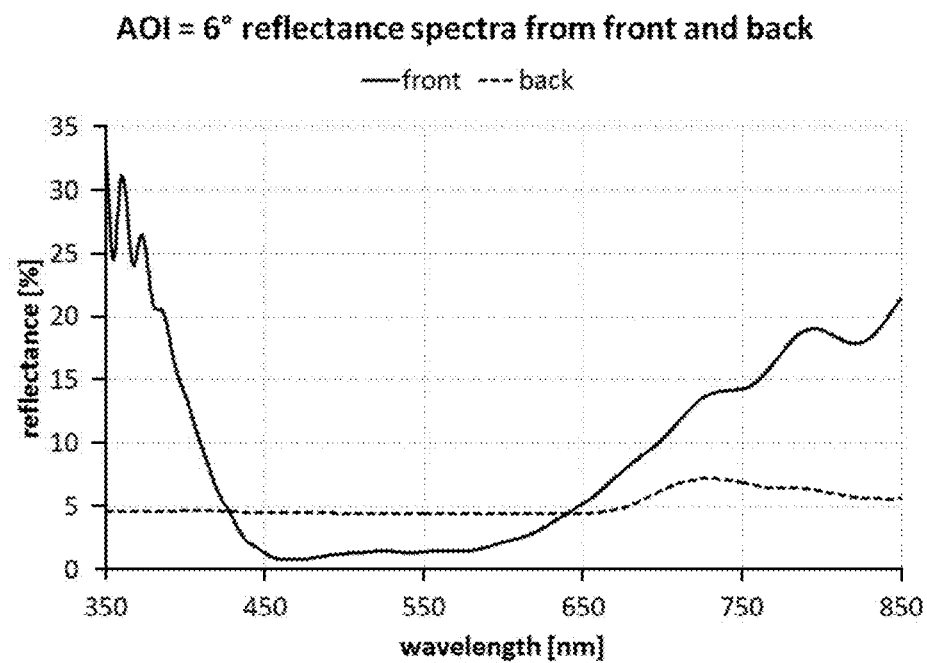
FIG. 83 shows a reflection spectrum for Example 16.
Figure 84:
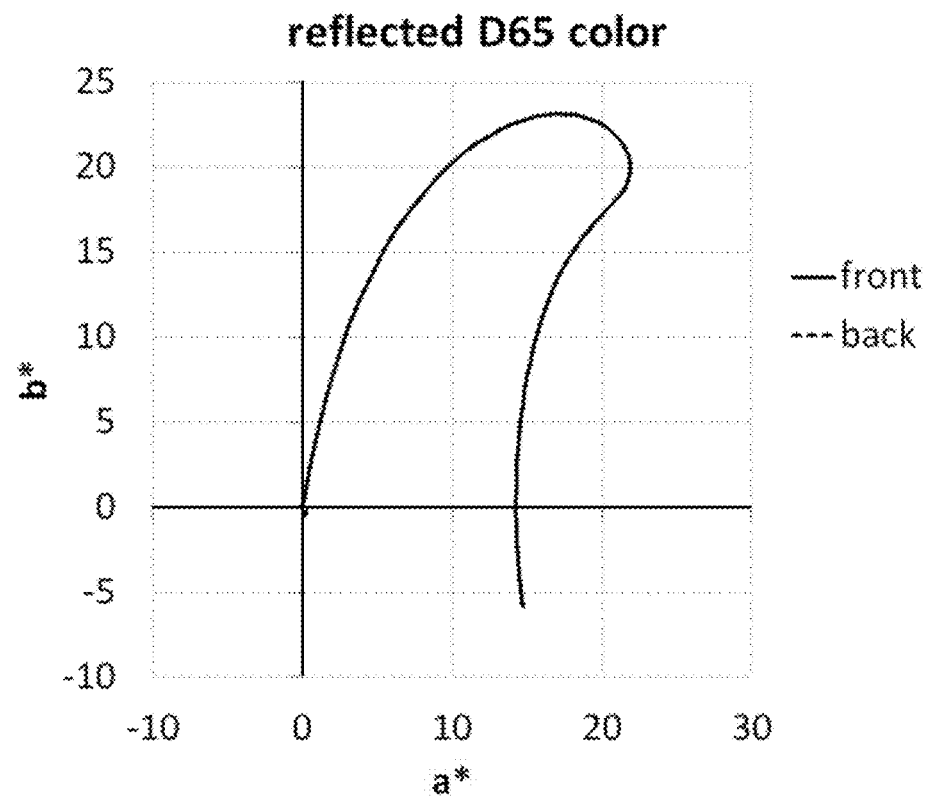
FIG. 84 shows reflected color for Example 16.

FIG. 81 shows a transmittance spectrum for Example 16. FIG. 82 shows transmitted color for Example 16. FIG. 83 shows a reflection spectrum for Example 16. FIG. 84 shows reflected color for Example 16. The incident spectrum and incident angles for FIGS. 81 through 84 are the same as for FIGS. 9 through 12, respectively. Example 16 provided a low-reflectance, high-color 'orange' scratch-resistant coating (SRC) on absorbing glass substrate. The external reflected color transitions from light purple at normal incidence to red-orange to orange to neutral (silver) at higher angles.

Table C. Compilation of reflectance and transmittance metrics for Examples 1-16. Note that the photopic average transmittance includes the effect of the absorbing substrate used in the examples. Transmittance for the coating alone (without the absorbing substrate) is understood to be approximately 100-% Refl. For these same coatings placed on a clear substrate such as a non-absorbing chemically strengthened glass having about 4% single-surface reflectance, the transmittance for each coating example is approximately 100-4-% Refl. (accounting for the 4% reflectance from the back surface of the non-absorbing substrate.

TABLE C

Compilation of Reflectance and Transmittance

At near-normal (6 deg.) incidence, coating side, D65

| ID Example | 1st Surface Photopic Avg. Refl. (%) | 1st Surface Max Refl. in 400-700 nm range (%) | Photopic Avg. Trans. (%) |
|---|---|---|---|
| 1 | 53.1 | 65.1 | 8.9 |
| 2 | 32.9 | 34.2 | 12.8 |
| 3 | 52.7 | 57.1 | 9.0 |
| 4 | 80.4 | 92.0 | 3.5 |
| 5 | 29.8 | 32.4 | 13.4 |
| 6 | 16.0 | 93.3 | 16.1 |
| 7 | 18.6 | 91.3 | 15.6 |
| 8 | 14.7 | 50.8 | 16.4 |
| 9 | 41.3 | 60.2 | 11.2 |
| 10 | 24.4 | 83.1 | 14.7 |
| 11 | 59.1 | 66.9 | 7.8 |
| 11A | 59.1 | 66.8 | 7.8 |
| 11B | 60.4 | 76.0 | 7.6 |
| 11C | 60.9 | 78.6 | 7.5 |
| 12 | 0.95 | 5.5 | 18.9 |
| 13 | 1.38 | 10.6 | 18.8 |
| 14 | 0.61 | 4.0 | 19.0 |
| 15 | 2.37 | 11.7 | 18.6 |
| 16 | 1.70 | 13.7 | 18.8 |

Modeled Examples 17-26

Modeled Examples 17-26 used modeling to demonstrate the reflectance spectra of articles that included embodiments of the optical coating, as described herein. In Modeled Examples 17-26, the optical coating included $SiO_xN_y$, $Si_3N_4$, and $SiO_2$ layers, and a glass substrate commercially available from Corning® as Gorilla® Glass having a nominal composition (in mol %) of: 67.3 $SiO_2$; 3.7 $B_2O$; 12.7 $Al_2O_3$; 13.7 $Na_2O$; 0.01$K_2O$; 2.4 MgO; 0.01 $Fe_2O_3$; 0.01 $ZrO_2$; 0.09 $SnO_2$. The thickness of the substrate was modeled as semi-infinite so that reflection from the back surface could be neglected, that is, the reflection from only the substrate-coating interface was considered. The modeled examples 17-26 used refractive index/dispersion curves from $SiO_xN_y$, $Si_3N_4$, fabricated on a metal-mode sputtering system and as characterized in Table D. The refractive index for the $SiO_2$ films is as listed in the tables below, and the dispersion curve is similar, but not identical, to that characterized in Table D.

To determine the refractive index dispersion curves for the coating materials, layers of each coating material were formed onto silicon wafers and glass substrates by metal-mode sputtering from aluminum and silicon targets. The refractive indices (as a function of wavelength) of each of the formed layers and the glass substrate were measured using spectroscopic ellipsometry. The refractive indices thus measured were then used to calculate reflectance spectra for Modeled Examples 17-26. The modeled examples use a single refractive index value in their descriptive tables for convenience, which corresponds to a point selected from the dispersion curves at about 550 nm wavelength. Unless specified otherwise, refractive index values are given at a wavelength of 550 nm.

Tables 17 through 26 show the composition and thicknesses of the layers of Modeled Examples 17 through 26, respectively. The structures look similar to that of FIG. 7, but with the specific layers, layer compositions, and layer thicknesses shown in Tables 17 through 26. The thicknesses in Tables 17 through 26 are physical thicknesses, not optical thicknesses. The thick scratch resistant layer is included as a part of the multi-layer interference stack when calculating what fraction or thickness of the stack is made of a particular material.

TABLE 17

Example 17 Coating Design

| Layer | Material | Refractive Index @550 nm | Physical Thickness (nm) |
|---|---|---|---|
| Medium | Air | 1 | |
| 1 | SiO2 | 1.4762 | 90.8 |
| 2 | Si$_3$N$_4$ | 2.0136 | 83.9 |
| 3 | SiO2 | 1.4762 | 29.8 |
| 4 | Si$_3$N$_4$ | 2.0136 | 39.9 |
| 5 | SiO2 | 1.4762 | 31.0 |
| 6 | SiO$x$N$y$ | 1.9458 | 2000 |
| 7 | SiO2 | 1.4762 | 8.6 |
| 8 | SiO$x$N$y$ | 1.9458 | 43.6 |
| 9 | SiO2 | 1.4762 | 29.4 |
| 10 | SiO$x$N$y$ | 1.9458 | 25.5 |
| 11 | SiO2 | 1.4762 | 51.1 |
| 12 | SiO$x$N$y$ | 1.9458 | 8.3 |
| Substrate | Gorilla ® Glass | 1.5063 | |
| Medium | Air | 1 | |

| | |
|---|---|
| Total coating thickness (all layers) | 2441.9 nm |
| Thickness (sum) of low-index matl. in coating | 240.7 nm |
| Fraction (%) of low-index matl. in coating | 9.9% |
| Thickness (sum) of low-index matl. above thickest hard layer in coating | 151.6 nm |
| Thickness (sum) of all layers above thickest hard layer in coating | 275.4 nm |
| Fraction (%) of low-index matl. above thickest hard layer in coating | 55.0% |

TABLE 18

Example 18 Coating Design

| Layer | Material | Refractive Index @550 nm | Physical Thickness (nm) |
|---|---|---|---|
| Medium | Air | 1 | |
| 1 | SiO2 | 1.4762 | 93.7 |
| 2 | Si$_3$N$_4$ | 2.0136 | 44.9 |
| 3 | SiO2 | 1.4762 | 175.3 |
| 4 | Si$_3$N$_4$ | 2.0136 | 139.4 |
| 5 | SiO2 | 1.4762 | 8.7 |
| 6 | SiO$x$N$y$ | 1.9458 | 2000 |
| 7 | SiO2 | 1.4762 | 8.6 |
| 8 | SiO$x$N$y$ | 1.9458 | 43.6 |
| 9 | SiO2 | 1.4762 | 29.4 |

TABLE 18-continued

Example 18 Coating Design

| Layer | Material | Refractive Index @550 nm | Physical Thickness (nm) |
|---|---|---|---|
| 10 | SiO$x$N$y$ | 1.9458 | 25.5 |
| 11 | SiO2 | 1.4762 | 51.1 |
| 12 | SiO$x$N$y$ | 1.9458 | 8.3 |
| Substrate | Gorilla ® Glass | 1.5063 | |
| Medium | Air | 1 | |

| | |
|---|---|
| Total coating thickness (all layers) | 2628.5 nm |
| Thickness (sum) of low-index matl. in coating | 366.8 nm |
| Fraction (%) of low-index matl. in coating | 14.0% |
| Thickness (sum) of low-index matl. above thickest hard layer in coating | 277.7 nm |
| Thickness (sum) of all layers above thickest hard layer in coating | 462 nm |
| Fraction (%) of low-index matl. above thickest hard layer in coating | 60.1% |

TABLE 19

Example 19 Coating Design

| Layer | Material | Refractive Index @550 nm | Physical Thickness (nm) |
|---|---|---|---|
| Medium | Air | 1 | |
| 1 | SiO2 | 1.4762 | 86.9 |
| 2 | Si$_3$N$_4$ | 2.0136 | 117.5 |
| 3 | SiO2 | 1.4762 | 28.7 |
| 4 | Si$_3$N$_4$ | 2.0136 | 40.5 |
| 5 | SiO2 | 1.4762 | 20.9 |
| 6 | SiO$x$N$y$ | 1.9458 | 2000 |
| 7 | SiO2 | 1.4762 | 8.6 |
| 8 | SiO$x$N$y$ | 1.9458 | 43.6 |
| 9 | SiO2 | 1.4762 | 29.4 |
| 10 | SiO$x$N$y$ | 1.9458 | 25.5 |
| 11 | SiO2 | 1.4762 | 51.1 |
| 12 | SiO$x$N$y$ | 1.9458 | 8.3 |
| Substrate | Gorilla ® Glass | 1.5063 | |
| Medium | Air | 1 | |

| | |
|---|---|
| Total coating thickness (all layers) | 2461.0 nm |
| Thickness (sum) of low-index matl. in coating | 225.6 nm |
| Fraction (%) of low-index matl. in coating | 9.2% |
| Thickness (sum) of low-index matl. above thickest hard layer in coating | 136.5 nm |
| Thickness (sum) of all layers above thickest hard layer in coating | 294.5 nm |
| Fraction (%) of low-index matl. above thickest hard layer in coating | 46.3% |

TABLE 20

Example 20 Coating Design

| Layer | Material | Refractive Index @550 nm | Physical Thickness (nm) |
|---|---|---|---|
| Medium | Air | 1 | |
| 1 | SiO2 | 1.4762 | 98.2 |
| 2 | Si$_3$N$_4$ | 2.0136 | 37.2 |
| 3 | SiO2 | 1.4762 | 184.3 |
| 4 | Si$_3$N$_4$ | 2.0136 | 28.6 |
| 5 | SiO2 | 1.4762 | 8.9 |
| 6 | SiO$x$N$y$ | 1.9458 | 2000 |
| 7 | SiO2 | 1.4762 | 8.6 |
| 8 | SiO$x$N$y$ | 1.9458 | 43.6 |
| 9 | SiO2 | 1.4762 | 29.4 |
| 10 | SiO$x$N$y$ | 1.9458 | 25.5 |

TABLE 20-continued

Example 20 Coating Design

| Layer | Material | Refractive Index @550 nm | Physical Thickness (nm) |
|---|---|---|---|
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2523.7 nm |
| Thickness (sum) of low-index matl. in coating | 380.5 nm |
| Faction (%) of low-index matl. in coating | 15.1% |
| Thickness (sum) of low-index matl. above thickest hard layer in coating | 291.4 nm |
| Thickness (sum) of all layers above thickest hard layer in coating | 357.2 nm |
| Faction (%) of low-index matl. above thickest hard layer in coating | 81.6% |

TABLE 21

Example 21 Coating Design

| Layer | Material | Refractive Index @550 nm | Physical Thickness (nm) |
|---|---|---|---|
| Medium | Air | 1 | |
| 1 | SiO2 | 1.4762 | 84.8 |
| 2 | Si3N4 | 2.0136 | 130.6 |
| 3 | SiO2 | 1.4762 | 24.1 |
| 4 | Si3N4 | 2.0136 | 45.4 |
| 5 | SiO2 | 1.4762 | 17.4 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2468.8 nm |
| Thickness (sum) of low-index matl. in coating | 215.4 nm |
| Fraction (%) of low-index matl. in coating | 8.7% |
| Thickness (sum) of low-index matl. above thickest hard layer in coating | 126.3 nm |
| Thickness (sum) of all layers above thickest hard layer in coating | 302.3 nm |
| Fraction (%) of low-index matl. above thickest hard layer in coating | 41.8% |

TABLE 22

Example 22 Coating Design

| Layer | Material | Refractive Index @550 nm | Physical Thickness (nm) |
|---|---|---|---|
| Medium | Air | 1 | |
| 1 | SiO2 | 1.4762 | 95.3 |
| 2 | Si3N4 | 2.0136 | 40.2 |
| 3 | SiO2 | 1.4762 | 178.1 |
| 4 | Si3N4 | 2.0136 | 258.3 |
| 5 | SiO2 | 1.4762 | 5.4 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |

TABLE 22-continued

Example 22 Coating Design

| Layer | Material | Refractive Index @550 nm | Physical Thickness (nm) |
|---|---|---|---|
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2743.8 nm |
| Thickness (sum) of low-index matl. in coating | 367.9 nm |
| Fraction (%) of low-index matl. in coating | 13.4% |
| Thickness (sum) of low-index matl. above thickest hard layer in coating | 278.8 nm |
| Thickness (sum) of all layers above thickest hard layer in coating | 577.3 nm |
| Fraction (%) of low-index matl. above thickest hard layer in coating | 48.3% |

TABLE 23

Example 23 Coating Design

| Layer | Material | Refractive Index @550 nm | Physical Thickness (nm) |
|---|---|---|---|
| Medium | Air | 1 | |
| 1 | SiO2 | 1.4762 | 97.0 |
| 2 | Si3N4 | 2.0136 | 37.3 |
| 3 | SiO2 | 1.4762 | 177.3 |
| 4 | SiOxNy | 1.9458 | 2000 |
| 5 | SiO2 | 1.4762 | 8.6 |
| 6 | SiOxNy | 1.9458 | 43.6 |
| 7 | SiO2 | 1.4762 | 29.4 |
| 8 | SiOxNy | 1.9458 | 25.5 |
| 9 | SiO2 | 1.4762 | 51.1 |
| 10 | SiOxNy | 1.9458 | 8.3 |
| Substrate | Gorilla ® Glass | 1.5063 | |
| Medium | Air | 1 | |

| | |
|---|---|
| Total coating thickness (all layers) | 2478.1 nm |
| Thickness (sum) of low-index matl. in coating | 363.4 nm |
| Fraction (%) of low-index matl. in coating | 14.7% |
| Thickness (sum) of low-index matl. above thickest hard layer in coating | 274.3 nm |
| Thickness (sum) of all layers above thickest hard layer in coating | 311.6 nm |
| Fraction (%) of low-index matl. above thickest hard layer in coating | 88.0% |

TABLE 24

Example 24 Coating Design

| Layer | Material | Refractive Index @550 nm | Physical Thickness (nm) |
|---|---|---|---|
| Medium | Air | 1 | |
| 1 | SiO2 | 1.4762 | 90.0 |
| 2 | Si3N4 | 2.0136 | 101.1 |
| 3 | SiO2 | 1.4762 | 15.0 |
| 4 | Si3N4 | 2.0136 | 40.1 |
| 5 | SiO2 | 1.4762 | 19.9 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |

TABLE 24-continued

Example 24 Coating Design

| Layer | Material | Refractive Index @550 nm | Physical Thickness (nm) |
|---|---|---|---|
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2432.6 nm |
| Thickness (sum) of low-index matl. in coating | 214 nm |
| Fraction (%) of low-index matl. in coating | 8.8% |
| Thickness (sum) of low-index matl. above thickest hard layer in coating | 124.9 nm |
| Thickness (sum) of all layers above thickest hard layer in coating | 266.1 nm |
| Fraction (%) of low-index matl. above thickest hard layer in coating | 46.9% |

TABLE 25

Example 25 Coating Design

| Layer | Material | Refractive Index @550 nm | Physical Thickness (nm) |
|---|---|---|---|
| Medium | Air | 1 | |
| 1 | SiO2 | 1.4762 | 85.3 |
| 2 | Si3N4 | 2.0136 | 70.2 |
| 3 | SiO2 | 1.4762 | 18.9 |
| 4 | Si3N4 | 2.0136 | 47.4 |
| 5 | SiO2 | 1.4762 | 18.8 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2407.1 nm |
| Thickness (sum) of low-index matl. in coating | 212.1 nm |
| Fraction (%) of low-index matl. in coating | 8.8% |
| Thickness (sum) of low-index matl. above thickest hard layer in coating | 123 nm |
| Thickness (sum) of all layers above thickest hard layer in coating | 240.6 nm |
| Fraction (%) of low-index matl. above thickest hard layer in coating | 51.1% |

TABLE 26

Example 26 Coating Design

| Layer | Material | Refractive Index @550 nm | Physical Thickness (nm) |
|---|---|---|---|
| Medium | Air | 1 | |
| 1 | SiO2 | 1.4762 | 89.3 |
| 2 | Si3N4 | 2.0136 | 82.4 |
| 3 | SiO2 | 1.4762 | 13.4 |
| 4 | Si3N4 | 2.0136 | 46.7 |
| 5 | SiO2 | 1.4762 | 25.3 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2423.6 nm |
| Thickness (sum) of low-index matl. in coating | 217.1 nm |
| Fraction (%) of low-index matl. in coating | 9.0% |
| Thickness (sum) of low-index matl. above thickest hard layer in coating | 128 nm |
| Thickness (sum) of all layers above thickest hard layer in coating | 257.1 nm |
| Fraction (%) of low-index matl. above thickest hard layer in coating | 49.8% |

Figure 89:
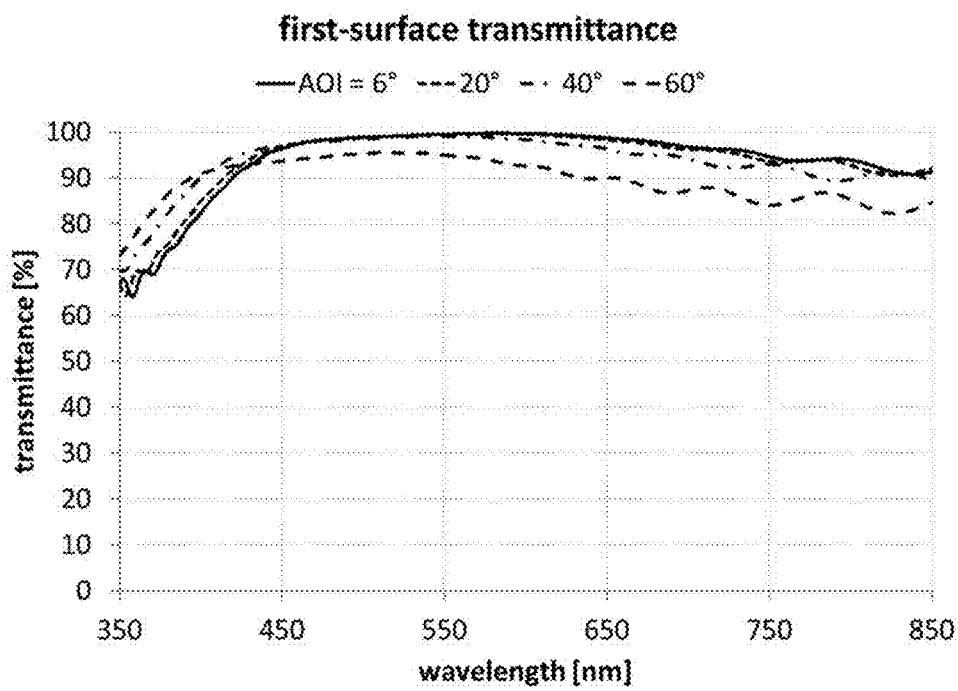
FIG. 89 shows a transmittance spectrum for Example 17.
Figure 90:
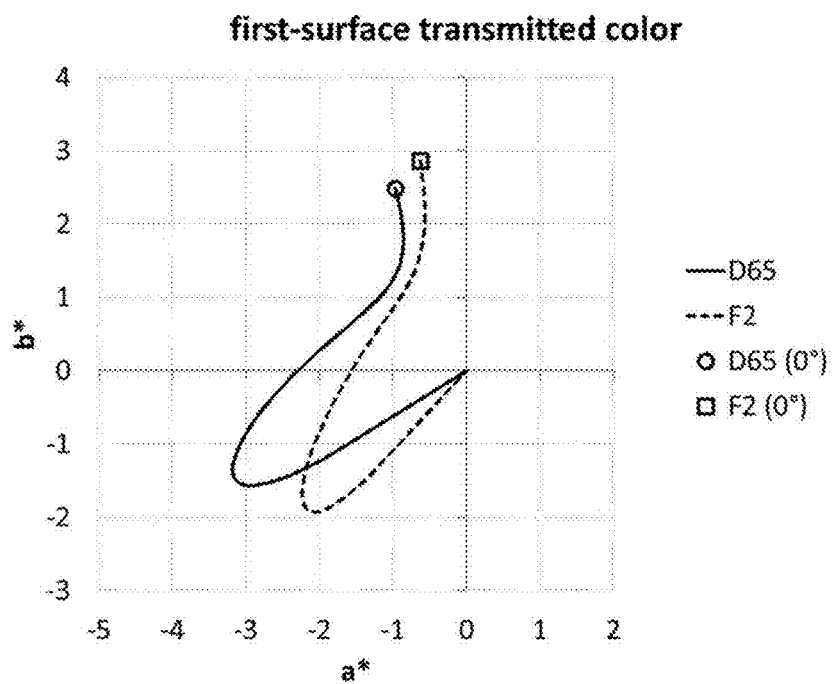
FIG. 90 shows transmitted color for Example 17.
Figure 91:
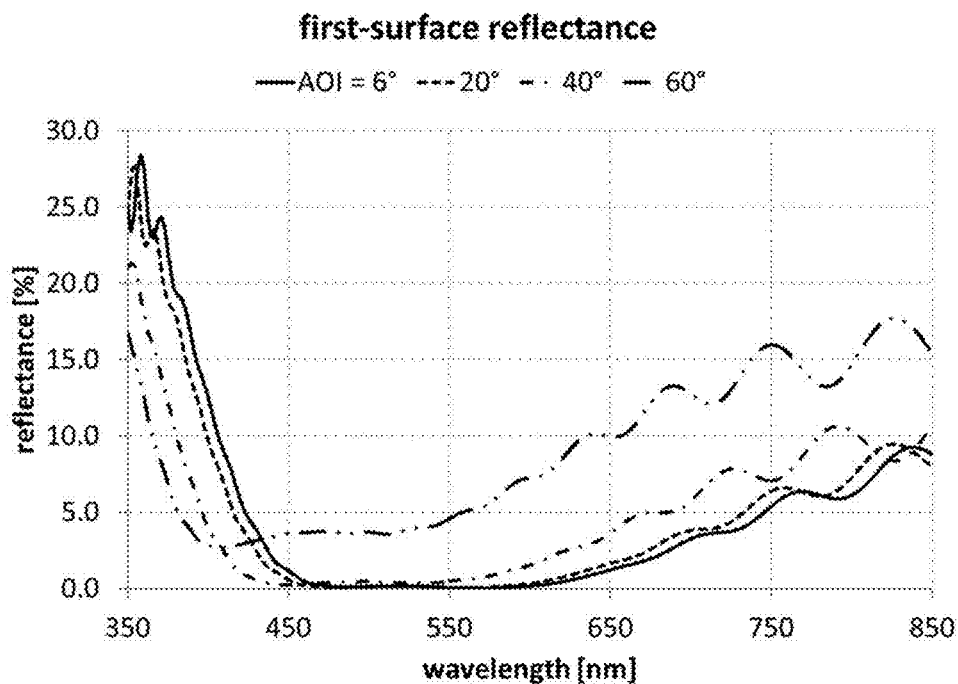
FIG. 91 shows a reflection spectrum for Example 17.
Figure 92:
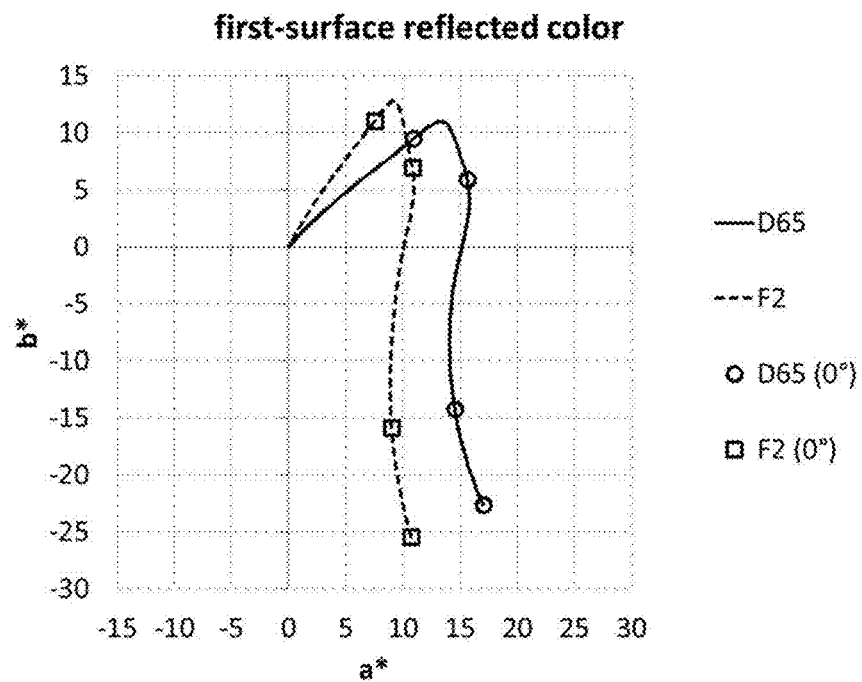
FIG. 92 shows reflected color for Example 17.
Figure 93:
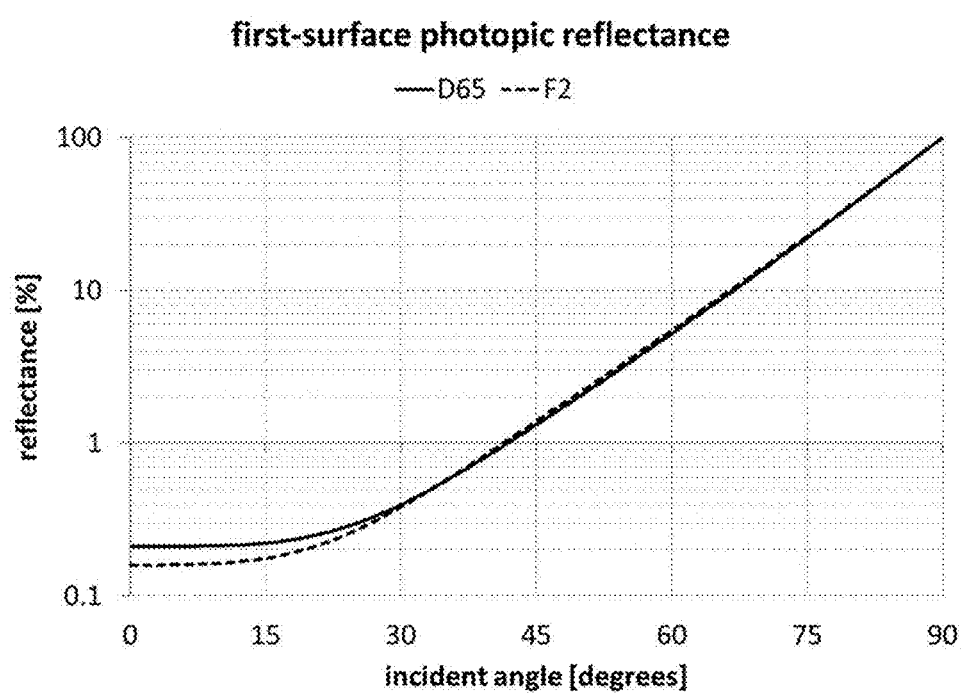
FIG. 93 shows photopic reflectance for Example 17

FIG. 89 shows a first-surface transmittance spectrum for Example 17, measured at angles of incidence of 6, 20, 40, and 60, degrees on the outer surface. FIG. 90 shows the first-surface transmitted color for Example 17, based on incident D65 (solid line) and F2 (dashed line) spectrum, for all incidence angles from 0 degrees to 90 degrees, incident on the outer surface. FIG. 91 shows a first-surface reflection spectrum for Example 17, measured at angles of incidence of 6, 20, 40, and 60, degrees on the outer surface. FIG. 92 shows the reflected color for Example 17, based on an incident D65 (solid line) and F2 (dashed line) spectrum, for all incidence angles from 0 degrees to 90 degrees, incident on the outer surface. FIG. 93 shows, on log scale, the photopic reflectance as a function of each D65 and F2 illuminants at incident angles from 0 to 90 degrees, incident on the outer surface. Example 17 had, at normal to near normal incidence, under D65 illuminant, in the CIE L* a* b* color space: a photopic reflectance of 0.21%; an a* value of 17, a b* value of −22.6; and thus provided a low-reflectance, high-color 'fuchsia' scratch-resistant coating on a glass substrate.

Figure 94:
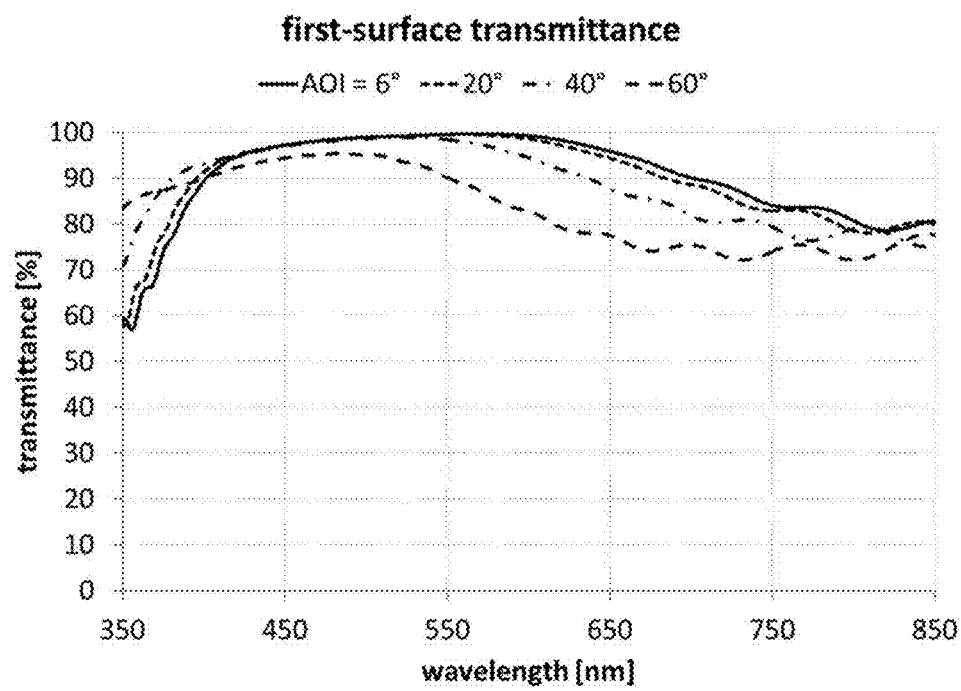
FIG. 94 shows a transmittance spectrum for Example 18.
Figure 95:
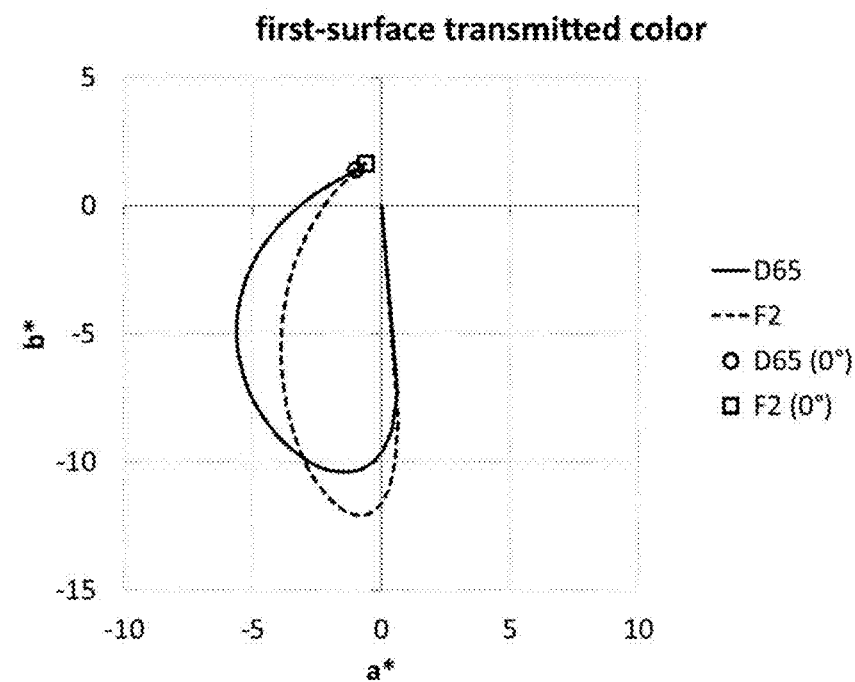
FIG. 95 shows transmitted color for Example 18.
Figure 96:
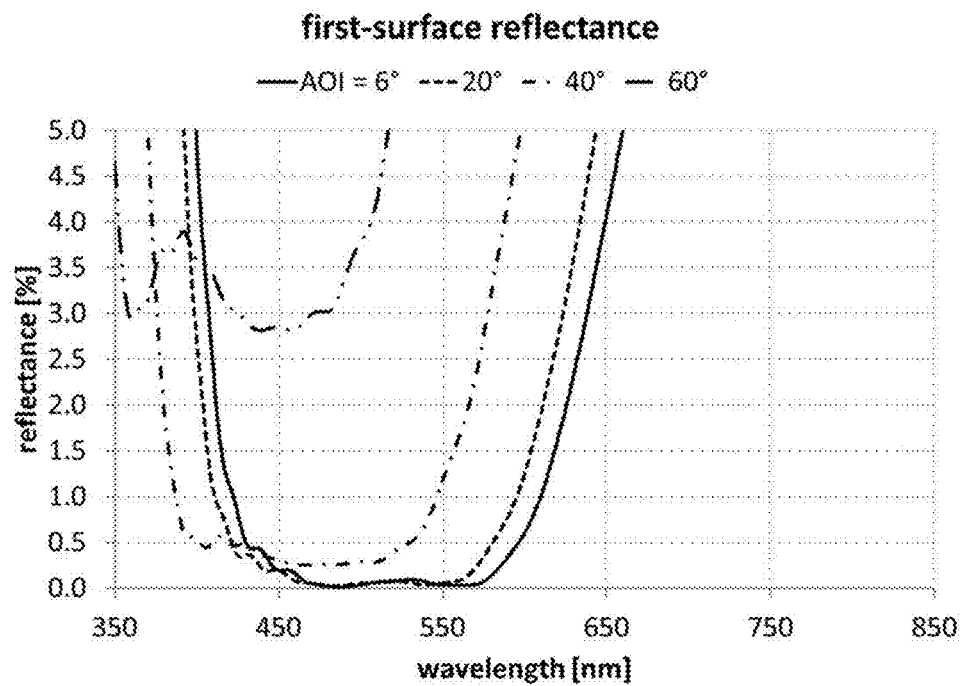
FIG. 96 shows a reflection spectrum for Example 18.
Figure 97:
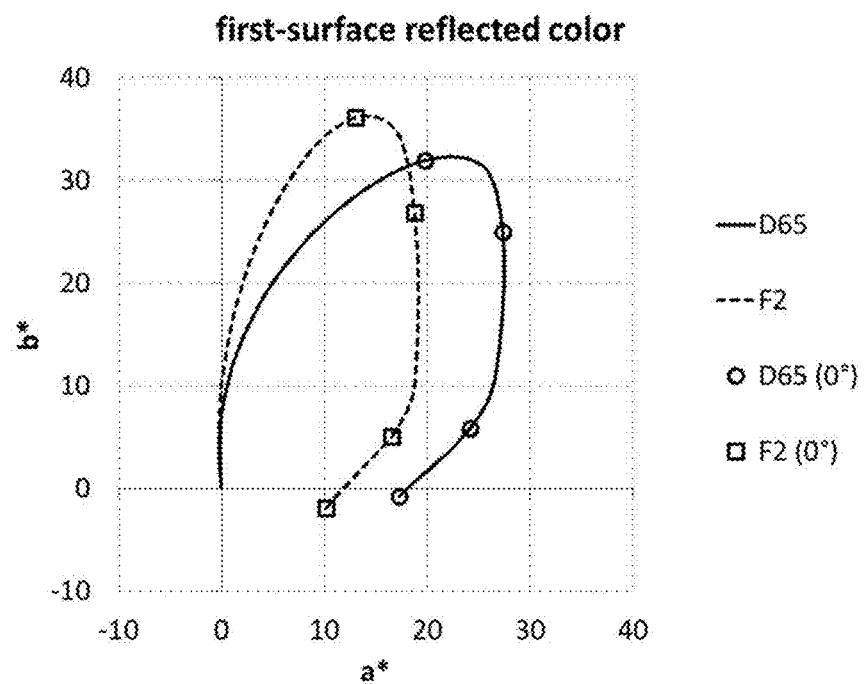
FIG. 97 shows reflected color for Example 18.
Figure 98:
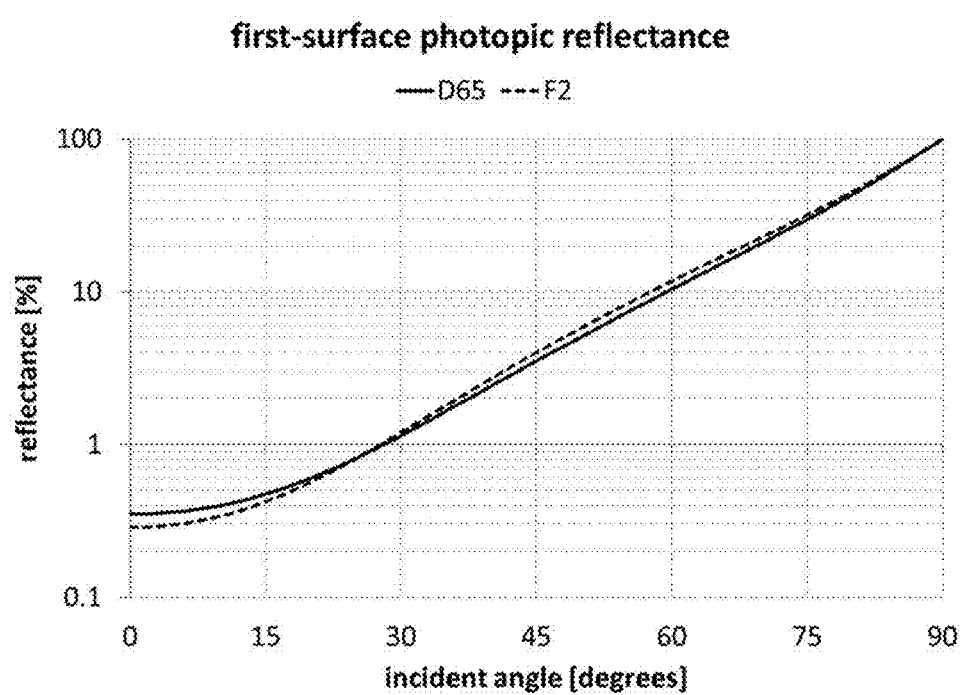
FIG. 98 shows photopic reflectance for Example 18.

FIG. 94 shows a first-surface transmittance spectrum for Example 18, measured at angles of incidence of 6, 20, 40, and 60, degrees on the outer surface. FIG. 95 shows the first-surface transmitted color for Example 18, based on incident D65 (solid line) and F2 (dashed line) spectrum, for all incidence angles from 0 degrees to 90 degrees, incident on the outer surface. FIG. 96 shows a first-surface reflection spectrum for Example 18, measured at angles of incidence of 6, 20, 40, and 60, degrees on the outer surface. FIG. 97 shows the reflected color for Example 18, based on an incident D65 (solid line) and F2 (dashed line) spectrum, for all incidence angles from 0 degrees to 90 degrees, incident on the outer surface. FIG. 98 shows, on log scale, the photopic reflectance as a function of each D65 and F2 illuminants at incident angles from 0 to 90 degrees, incident on the outer surface. Example 18 had, at normal to near normal incidence, under D65 illuminant, in the CIE L* a* b* color space: a photopic reflectance of 0.35%; an a* value of 17.3, a b* value of −0.78; and thus provided a low-reflectance, high-color 'pink' scratch-resistant coating on a glass substrate.

Figure 99:
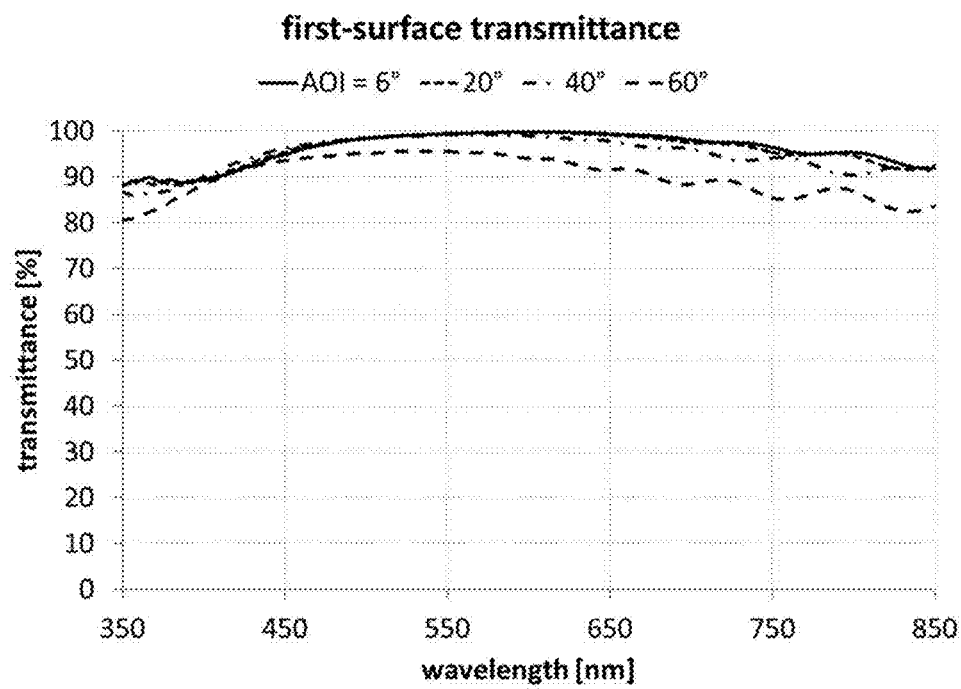
FIG. 99 shows a transmittance spectrum for Example 19.
Figure 100:
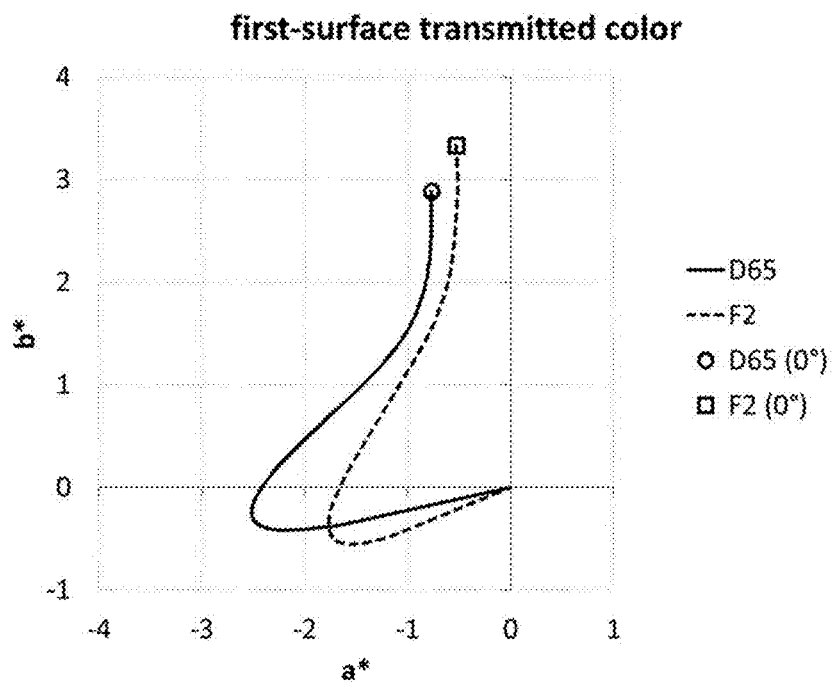
FIG. 100 shows transmitted color for Example 19.
Figure 101:
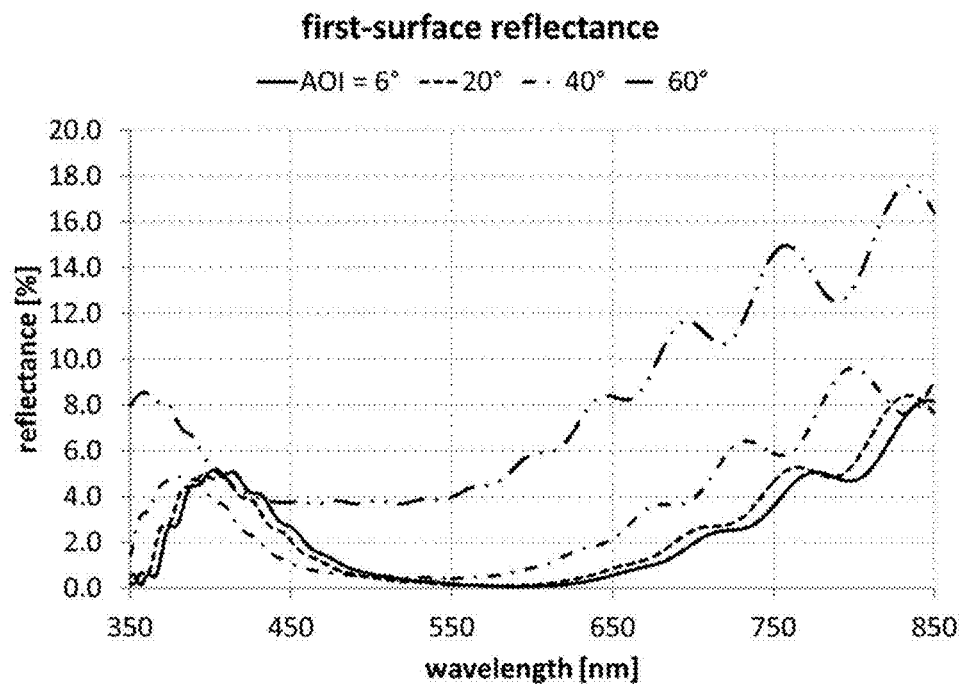
FIG. 101 shows a reflection spectrum for Example 19.
Figure 102:
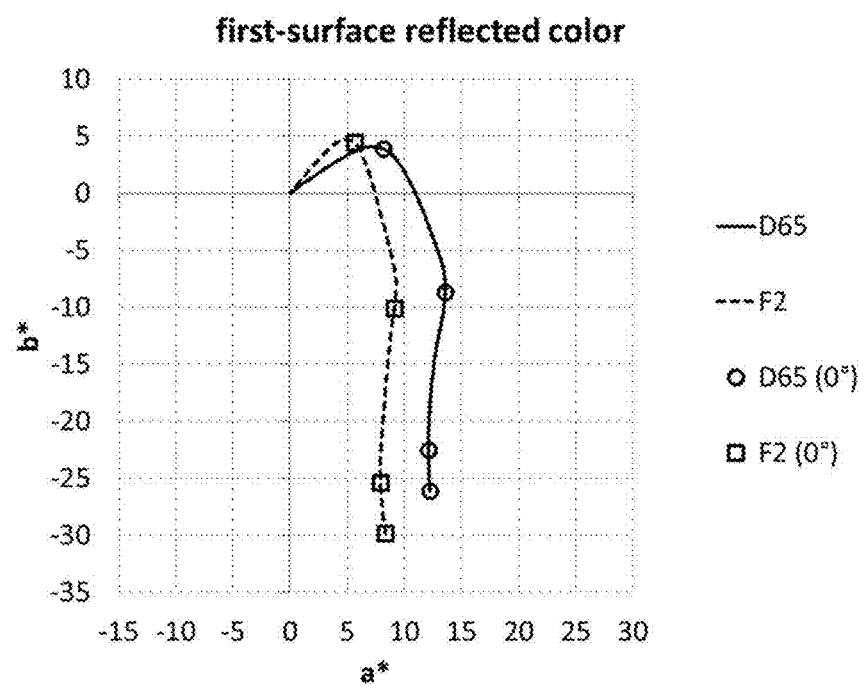
FIG. 102 shows reflected color for Example 19.
Figure 103:
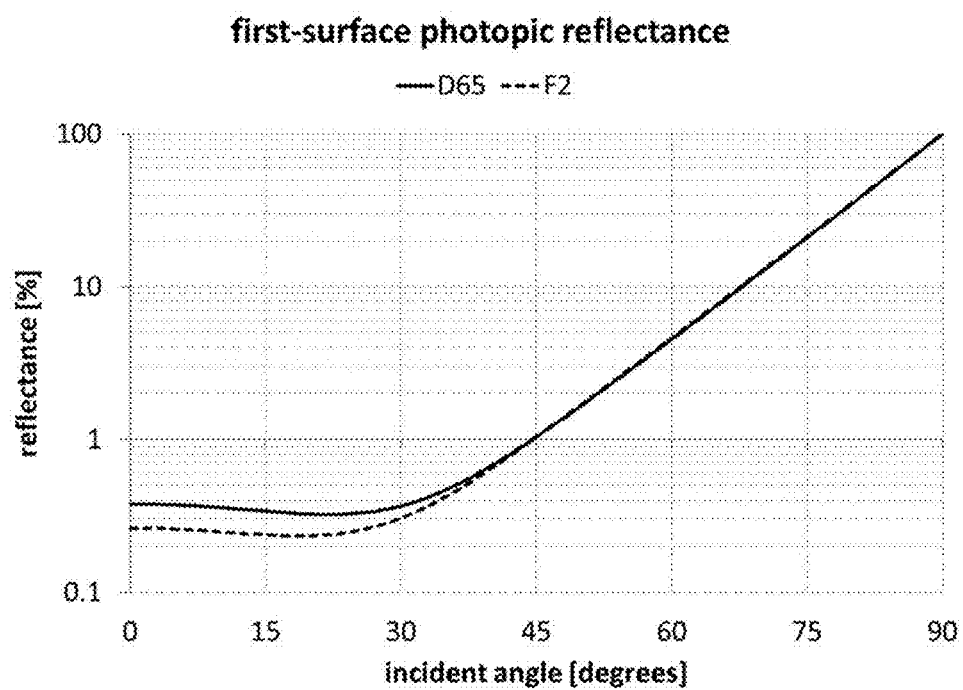
FIG. 103 shows photopic reflectance for Example 19.

FIG. 99 shows a first-surface transmittance spectrum for Example 19, measured at angles of incidence of 6, 20, 40, and 60, degrees on the outer surface. FIG. 100 shows the first-surface transmitted color for Example 19, based on incident D65 (solid line) and F2 (dashed line) spectrum, for all incidence angles from 0 degrees to 90 degrees, incident on the outer surface. FIG. 101 shows a first-surface reflection spectrum for Example 19, measured at angles of incidence of 6, 20, 40, and 60, degrees on the outer surface. FIG. 102 shows the reflected color for Example 19, based on an incident D65 (solid line) and F2 (dashed line) spectrum, for all incidence angles from 0 degrees to 90 degrees, incident on the outer surface. FIG. 103 shows, on log scale, the photopic reflectance as a function of each D65 and F2 illuminants at incident angles from 0 to 90 degrees, incident on the outer surface. Example 19 had, at normal to near normal incidence, under D65 illuminant, in the CIE L* a* b* color space: a photopic reflectance of 0.38%; an a* value of 12.2, a b* value of −26.1; and thus provided a low-reflectance, high-color 'fuchsia' scratch-resistant coating on a glass substrate.

Figure 104:
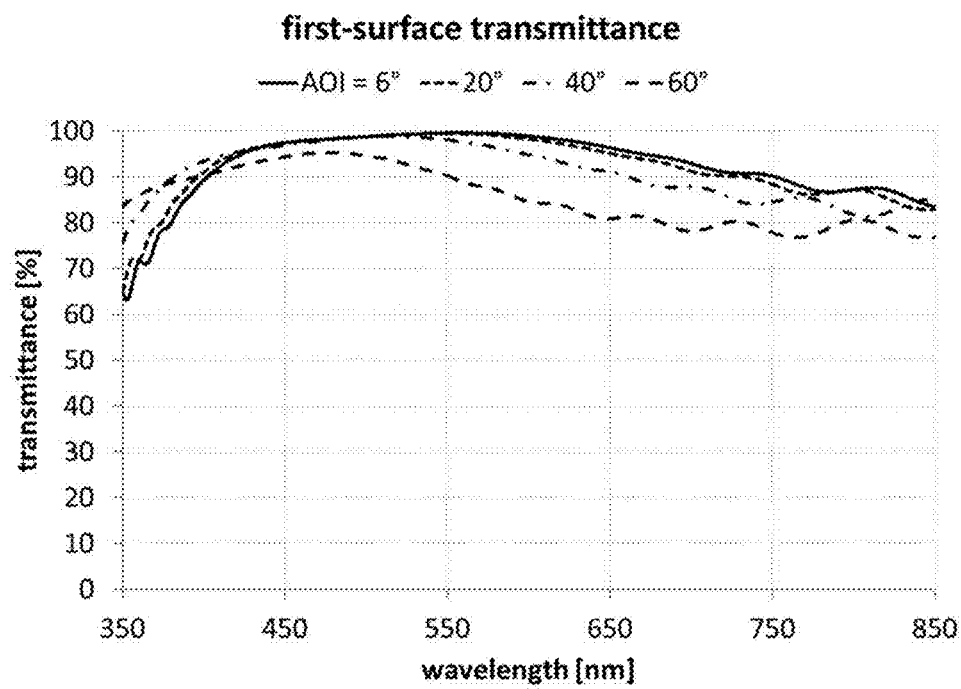
FIG. 104 shows a transmittance spectrum for Example 20.
Figure 105:
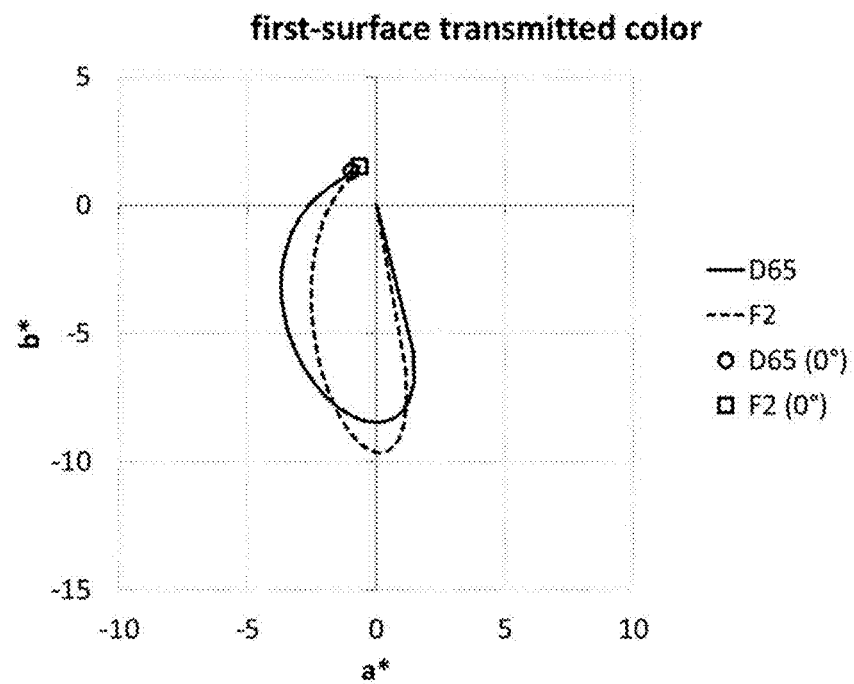
FIG. 105 shows transmitted color for Example 20.
Figure 106:
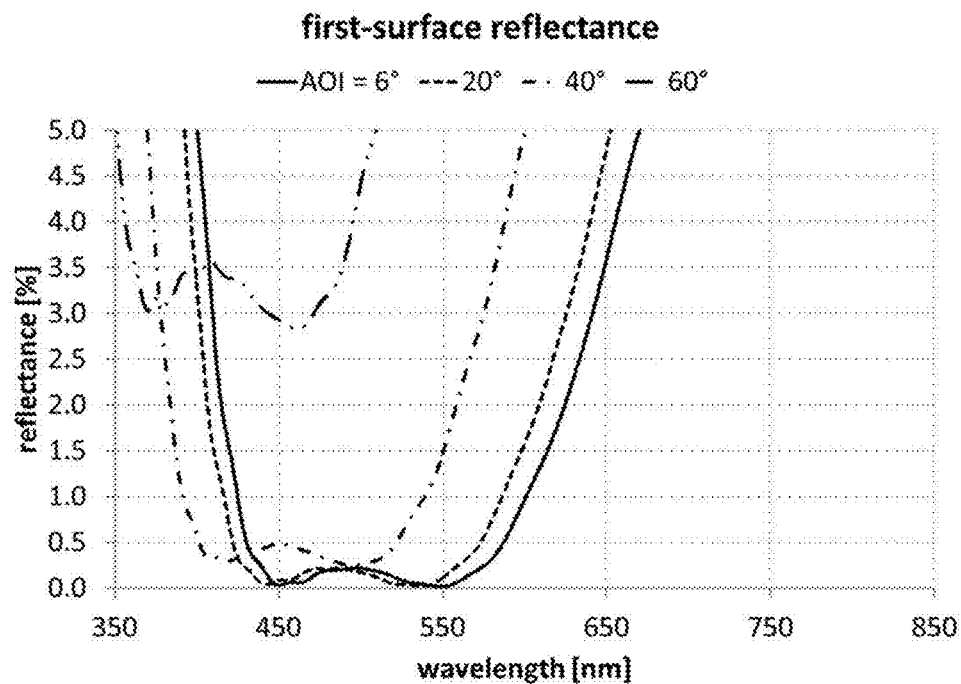
FIG. 106 shows a reflection spectrum for Example 20.
Figure 107:
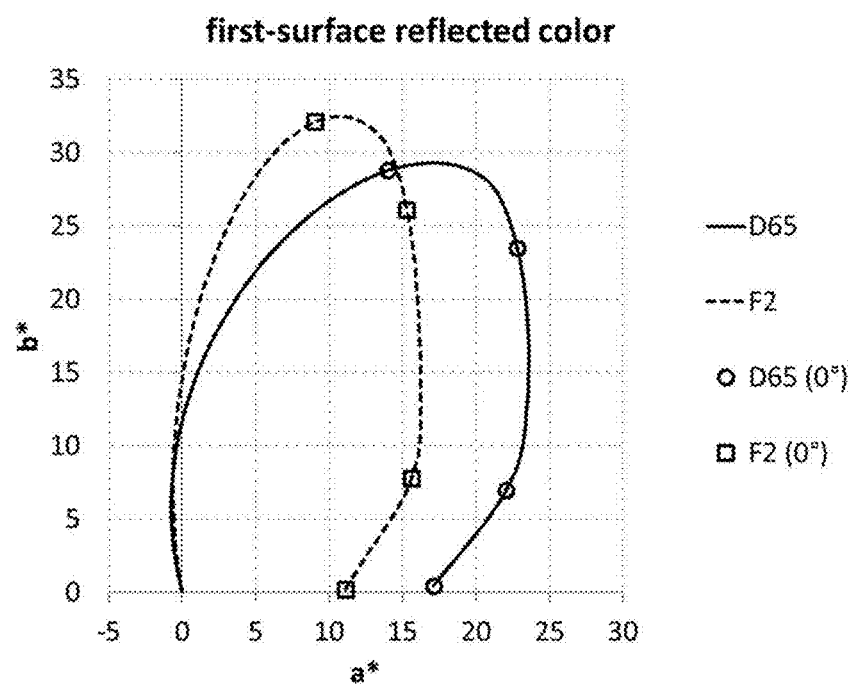
FIG. 107 shows reflected color for Example 20.
Figure 108:
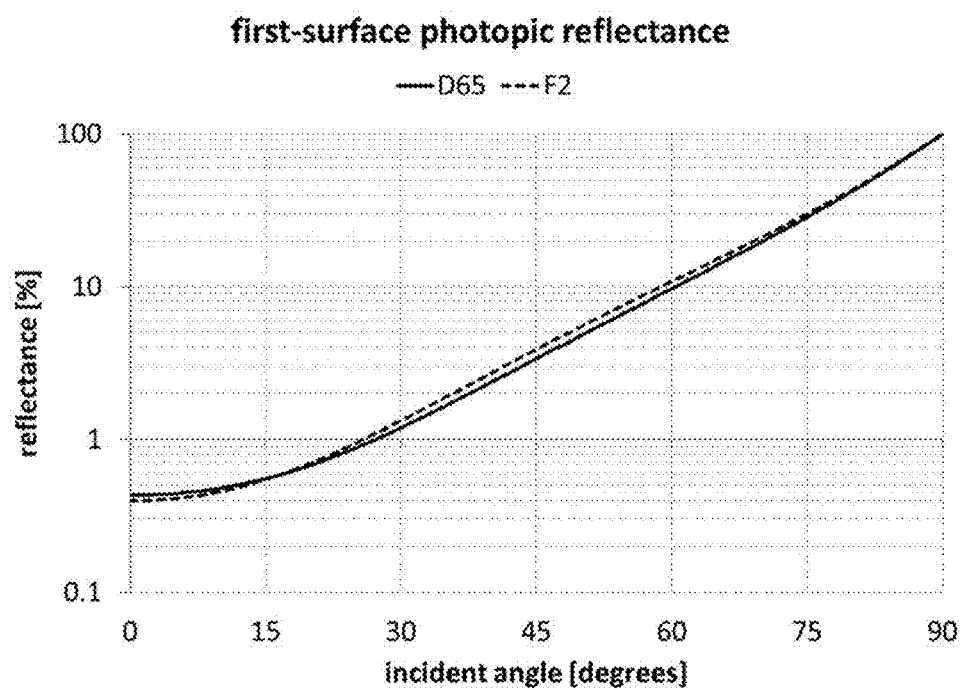
FIG. 108 shows photopic reflectance for Example 20.

FIG. 104 shows a first-surface transmittance spectrum for Example 20, measured at angles of incidence of 6, 20, 40, and 60, degrees on the outer surface. FIG. 105 shows the first-surface transmitted color for Example 20, based on incident D65 (solid line) and F2 (dashed line) spectrum, for all incidence angles from 0 degrees to 90 degrees, incident on the outer surface. FIG. 106 shows a first-surface reflection spectrum for Example 20, measured at angles of incidence of 6, 20, 40, and 60, degrees on the outer surface. FIG. 107 shows the reflected color for Example 20, based on an incident D65 (solid line) and F2 (dashed line) spectrum, for all incidence angles from 0 degrees to 90 degrees, incident on the outer surface. FIG. 108 shows, on log scale, the photopic reflectance as a function of each D65 and F2 illuminants at incident angles from 0 to 90 degrees, incident on the outer surface. Example 20 had, at normal to near normal incidence, under D65 illuminant, in the CIE L* a* b* color space: a photopic reflectance of 0.43%; an a* value of 17.1, a b* value of 0.5; and thus provided a low-reflectance, high-color 'pink' scratch-resistant coating on a glass substrate.

Figure 109:
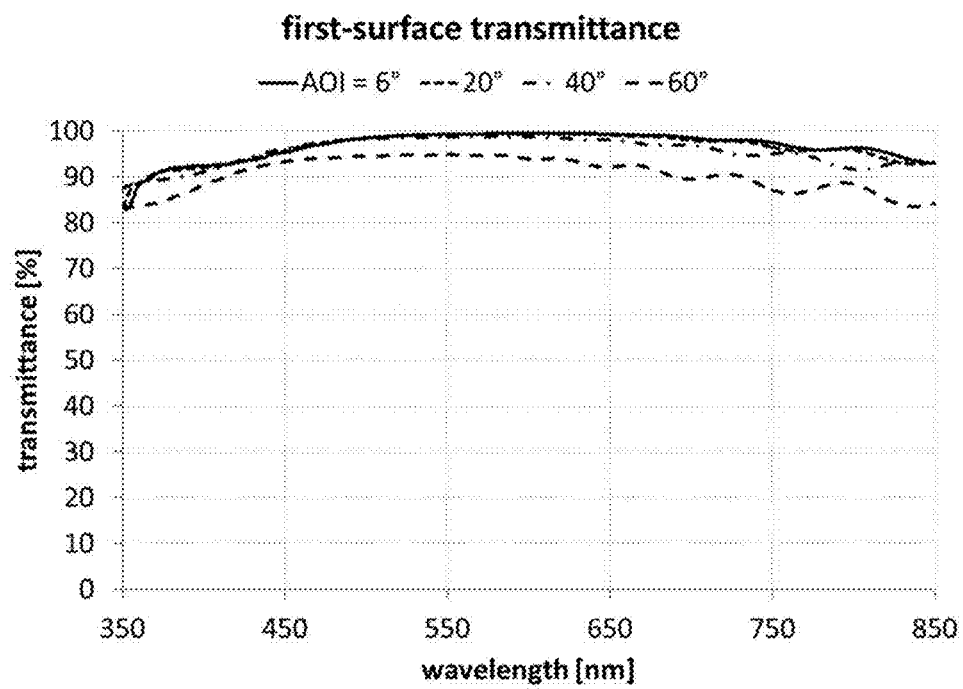
FIG. 109 shows a transmittance spectrum for Example 21.
Figure 110:
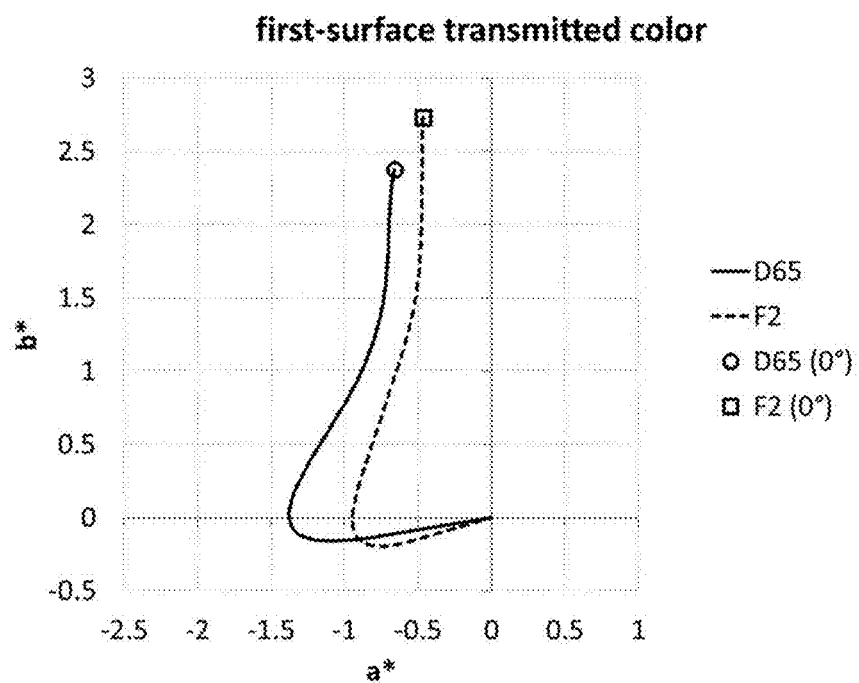
FIG. 110 shows transmitted color for Example 21.
Figure 111:
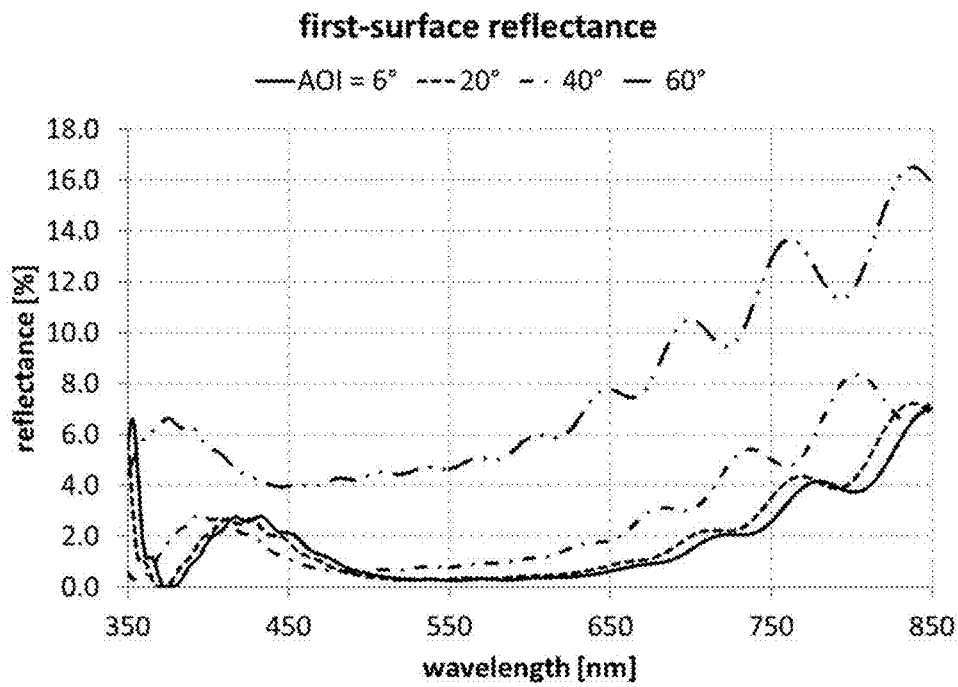
FIG. 111 shows a reflection spectrum for Example 21.
Figure 112:
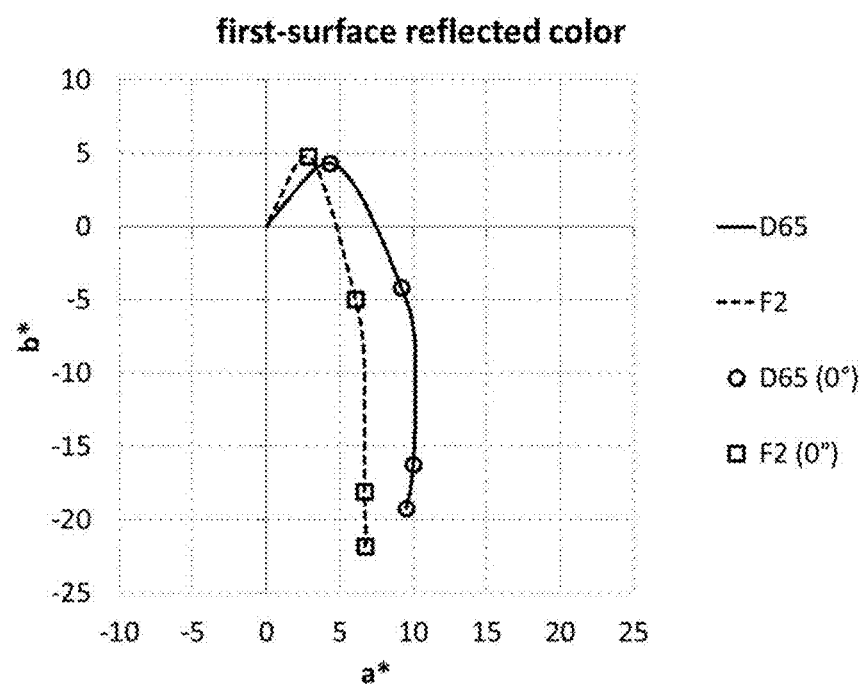
FIG. 112 shows reflected color for Example 21.
Figure 113:
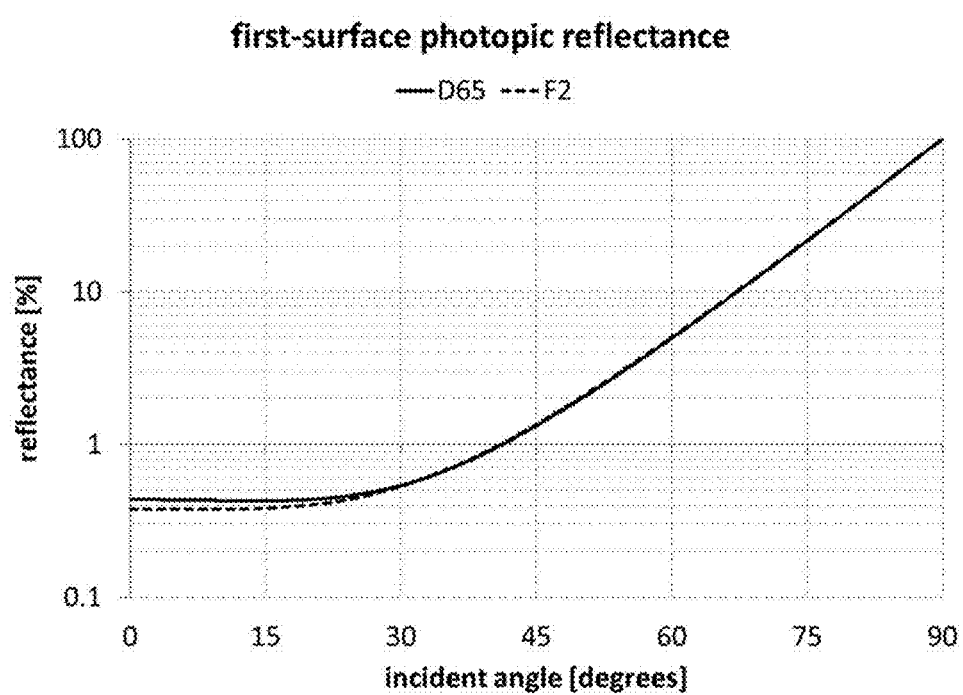
FIG. 113 shows photopic reflectance for Example 21.

FIG. 109 shows a first-surface transmittance spectrum for Example 21, measured at angles of incidence of 6, 20, 40, and 60, degrees on the outer surface. FIG. 110 shows the first-surface transmitted color for Example 21, based on incident D65 (solid line) and F2 (dashed line) spectrum, for all incidence angles from 0 degrees to 90 degrees, incident on the outer surface. FIG. 111 shows a first-surface reflection spectrum for Example 21, measured at angles of incidence of 6, 20, 40, and 60, degrees on the outer surface. FIG. 112 shows the reflected color for Example 21, based on an incident D65 (solid line) and F2 (dashed line) spectrum, for all incidence angles from 0 degrees to 90 degrees, incident on the outer surface. FIG. 113 shows, on log scale, the photopic reflectance as a function of each D65 and F2 illuminants at incident angles from 0 to 90 degrees, incident on the outer surface. Example 21 had, at normal to near normal incidence, under D65 illuminant, in the CIE L* a* b* color space: a photopic reflectance of 0.44%; an a* value of 9.5, a b* value of −19.2; and thus provided a low-reflectance, high-color 'lilac' scratch-resistant coating on a glass substrate.

Figure 114:
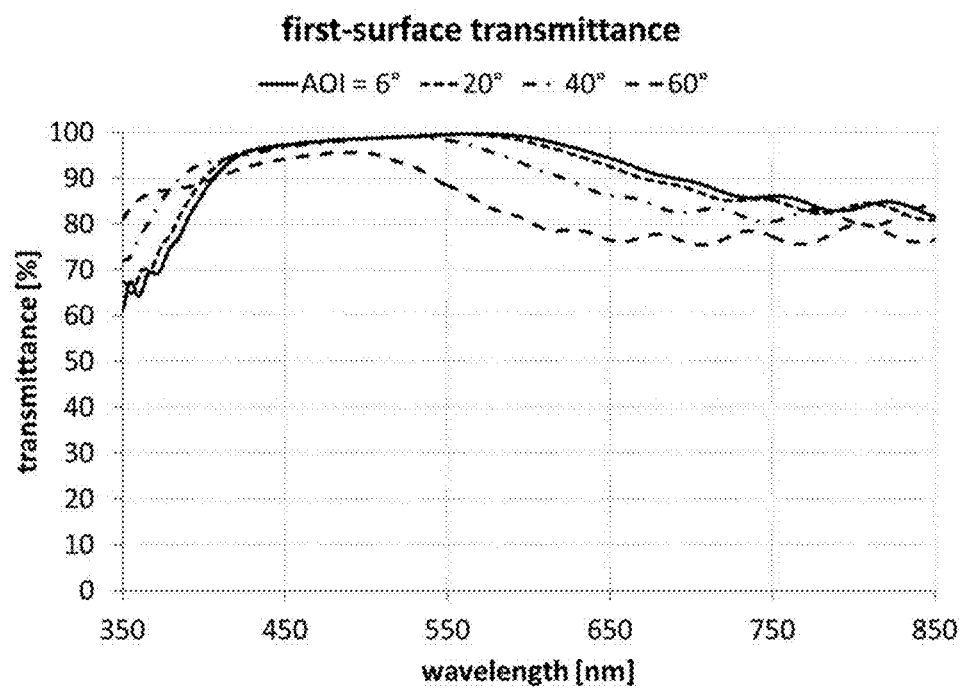
FIG. 114 shows a transmittance spectrum for Example 22.
Figure 115:
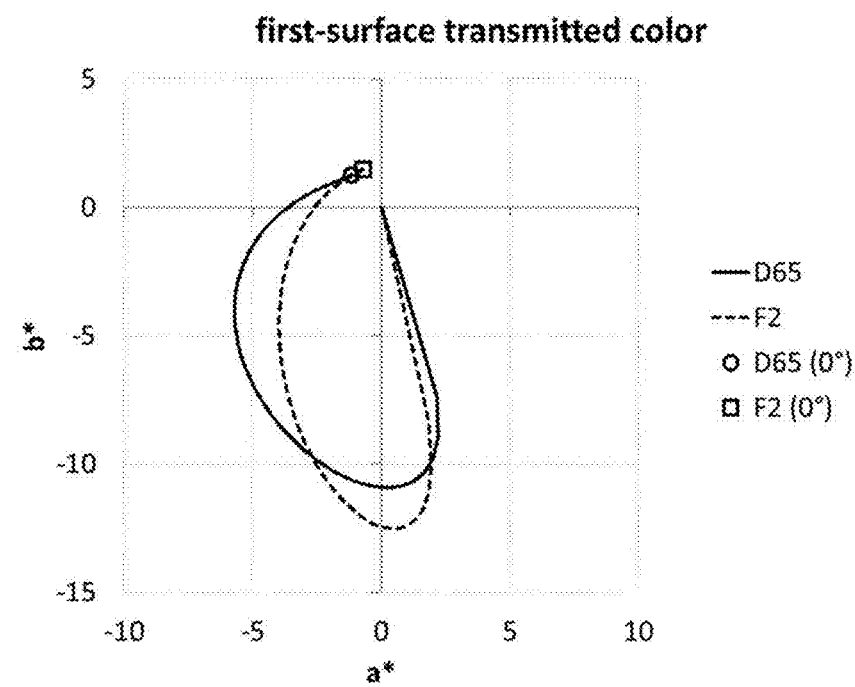
FIG. 115 shows transmitted color for Example 22.
Figure 116:
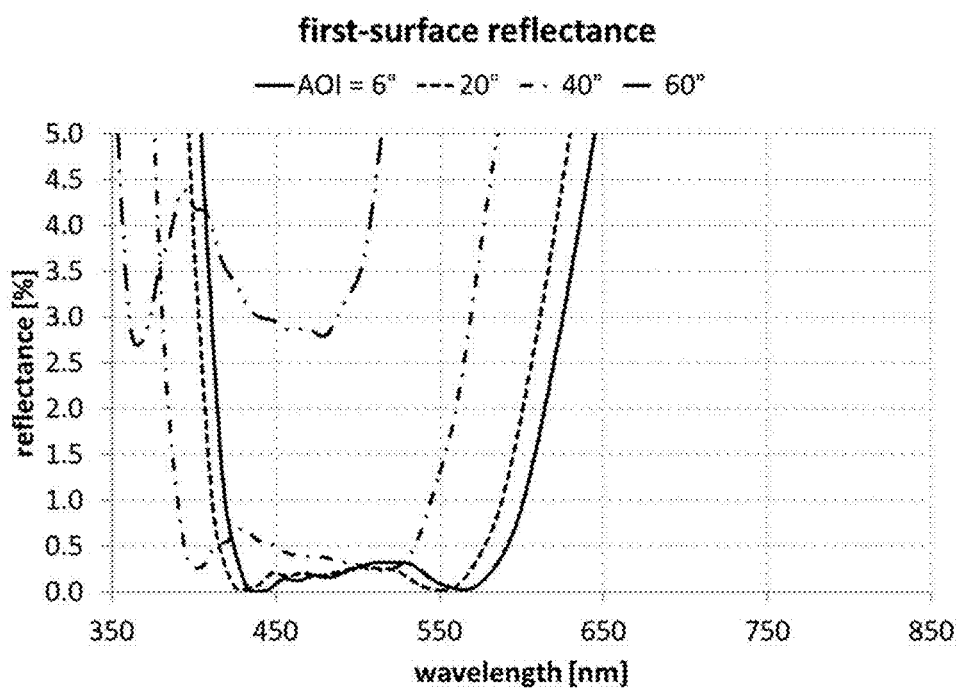
FIG. 116 shows a reflection spectrum for Example 22.
Figure 117:
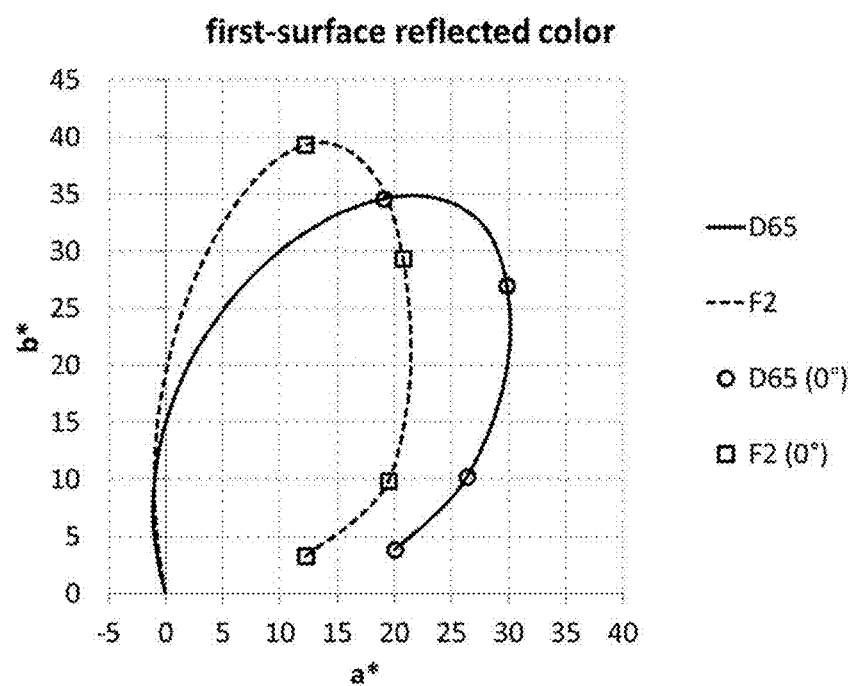
FIG. 117 shows reflected color for Example 22.
Figure 118:
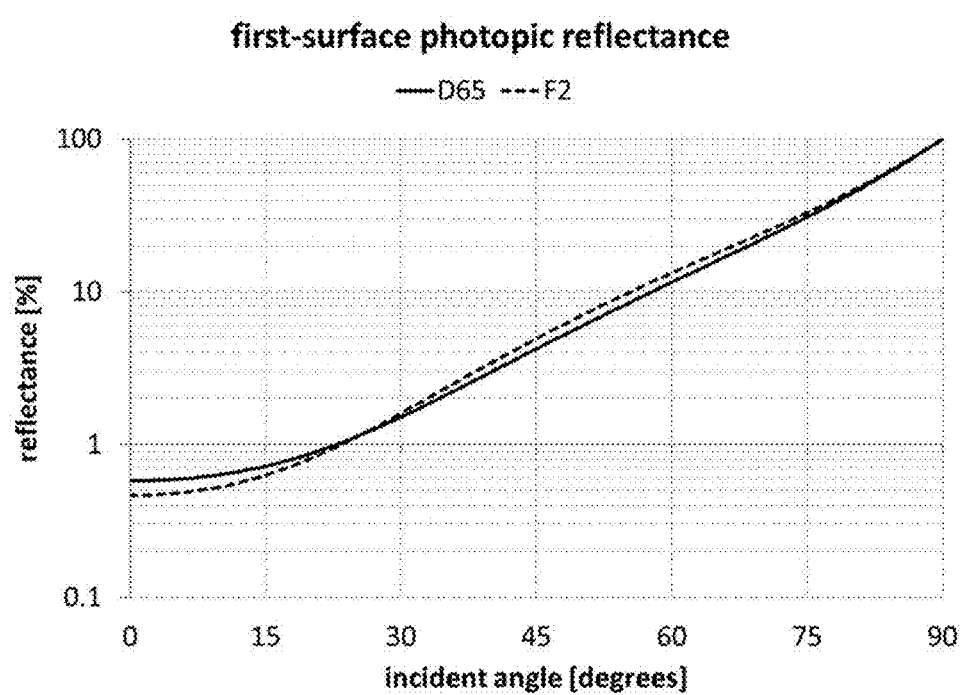
FIG. 118 shows photopic reflectance for Example 22.

FIG. 114 shows a first-surface transmittance spectrum for Example 22, measured at angles of incidence of 6, 20, 40, and 60, degrees on the outer surface. FIG. 115 shows the first-surface transmitted color for Example 22, based on incident D65 (solid line) and F2 (dashed line) spectrum, for all incidence angles from 0 degrees to 90 degrees, incident on the outer surface. FIG. 116 shows a first-surface reflection spectrum for Example 22, measured at angles of incidence of 6, 20, 40, and 60, degrees on the outer surface. FIG. 117 shows the reflected color for Example 22, based on an incident D65 (solid line) and F2 (dashed line) spectrum, for all incidence angles from 0 degrees to 90 degrees, incident on the outer surface. FIG. 118 shows, on log scale, the photopic reflectance as a function of each D65 and F2 illuminants at incident angles from 0 to 90 degrees, incident on the outer surface. Example 22 had, at normal to near normal incidence, under D65 illuminant, in the CIE L* a* b* color space: a photopic reflectance of 0.57%; an a* value of 20.1, a b* value of 3.87; and thus provided a low-reflectance, high-color 'red' scratch-resistant coating on a glass substrate.

Figure 119:
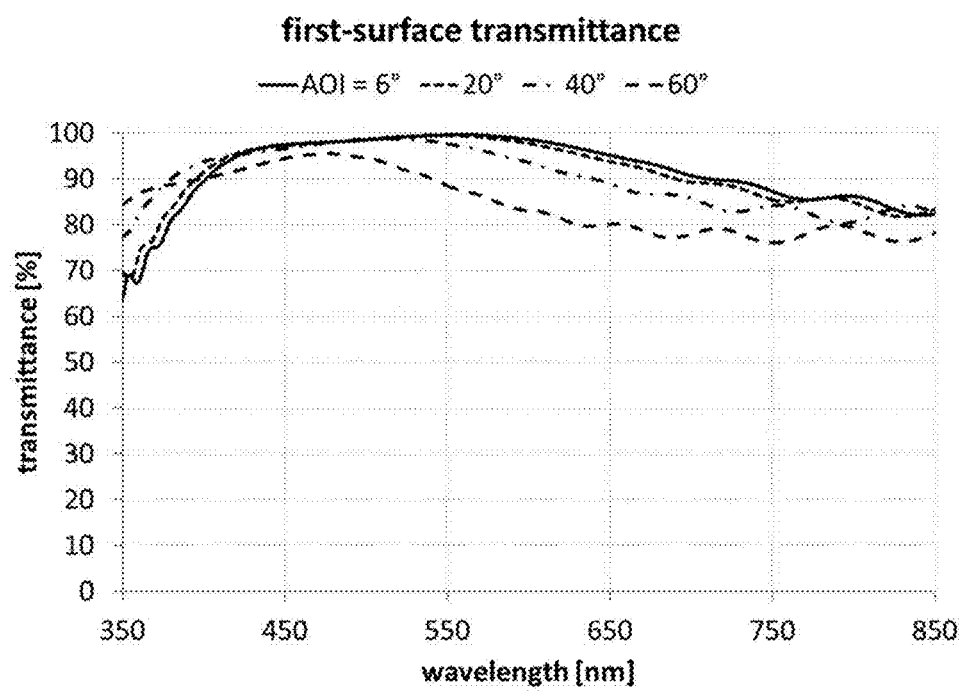
FIG. 119 shows a transmittance spectrum for Example 23.
Figure 120:
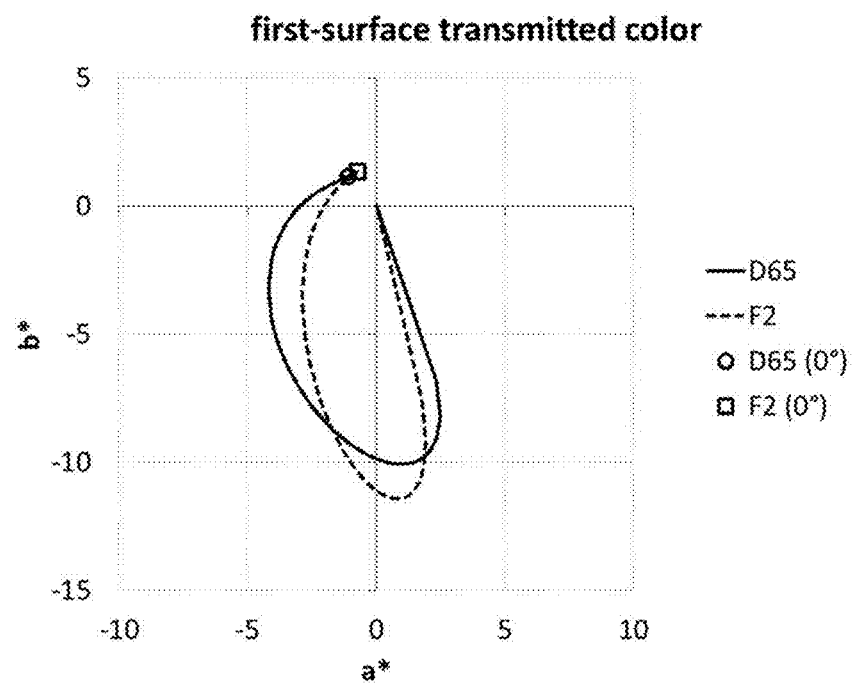
FIG. 120 shows transmitted color for Example 23.
Figure 121:
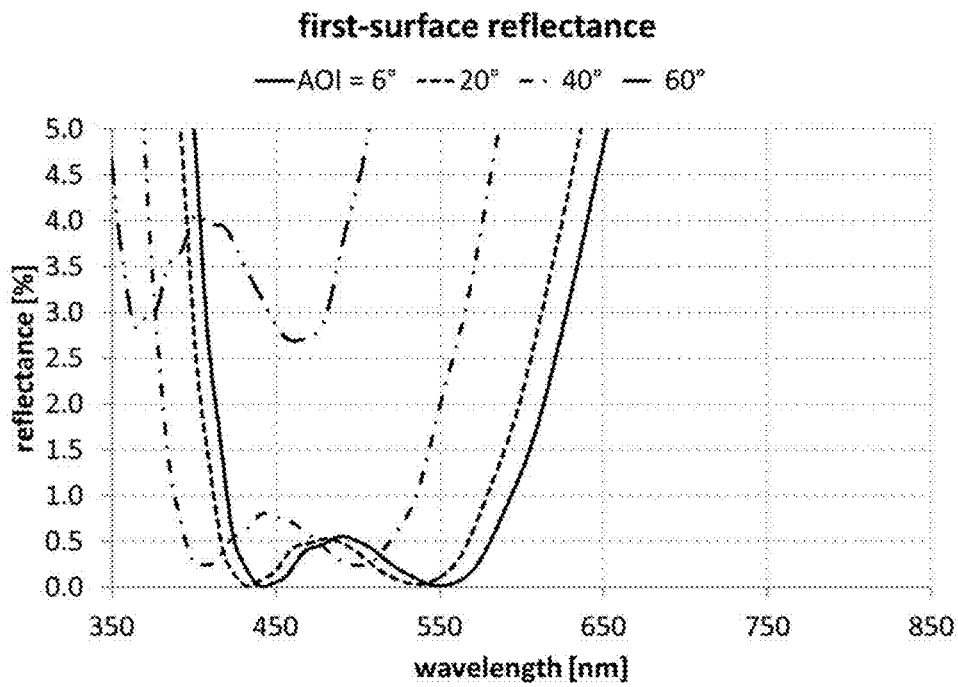
FIG. 121 shows a reflection spectrum for Example 23.
Figure 122:
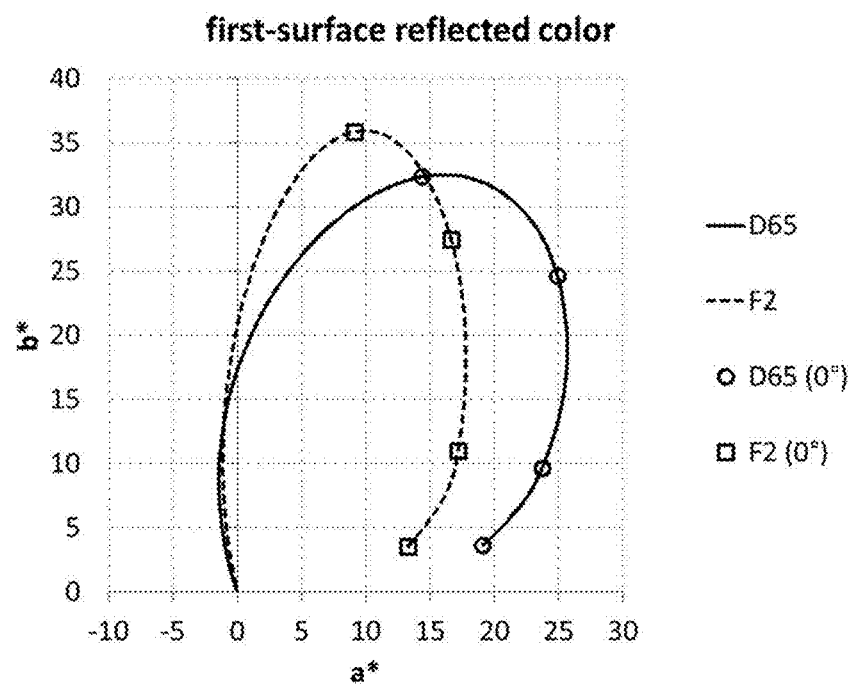
FIG. 122 shows reflected color for Example 23.
Figure 123:
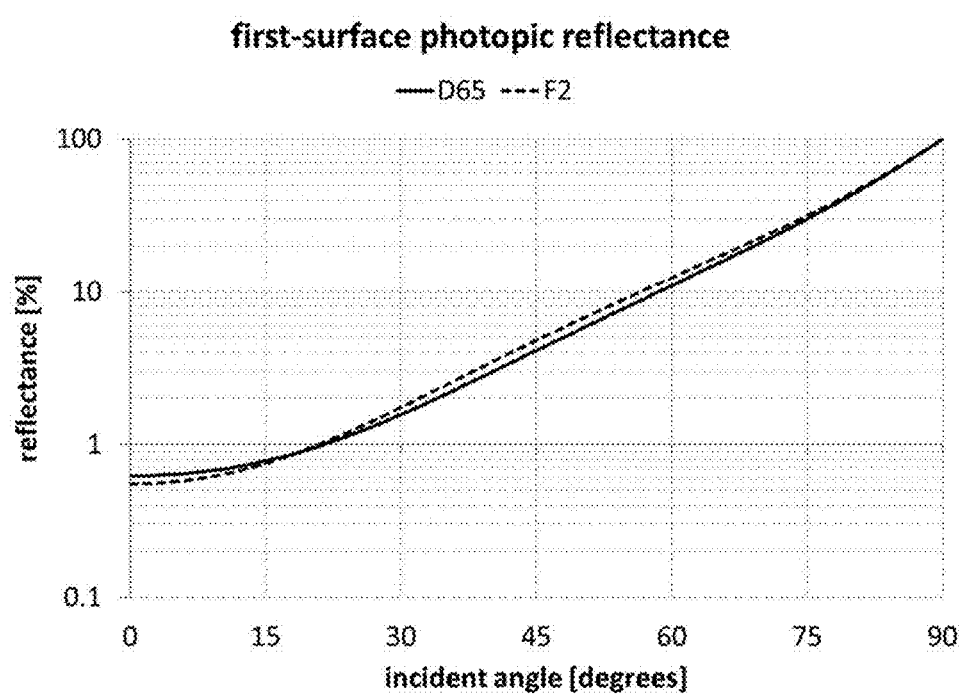
FIG. 123 shows photopic reflectance for Example 23.

FIG. 119 shows a first-surface transmittance spectrum for Example 23, measured at angles of incidence of 6, 20, 40, and 60, degrees on the outer surface. FIG. 120 shows the first-surface transmitted color for Example 23, based on incident D65 (solid line) and F2 (dashed line) spectrum, for all incidence angles from 0 degrees to 90 degrees, incident on the outer surface. FIG. 121 shows a first-surface reflection spectrum for Example 23, measured at angles of incidence of 6, 20, 40, and 60, degrees on the outer surface. FIG. 122 shows the reflected color for Example 23, based on an incident D65 (solid line) and F2 (dashed line) spectrum, for all incidence angles from 0 degrees to 90 degrees, incident on the outer surface. FIG. 123 shows, on log scale, the photopic reflectance as a function of each D65 and F2 illuminants at incident angles from 0 to 90 degrees, incident on the outer surface. Example 23 had, at normal to near normal incidence, under D65 illuminant, in the CIE L* a* b* color space: a photopic reflectance of 0.62%; an a* value of 19.1, a b* value of 3.6; and thus provided a low-reflectance, high-color 'red' scratch-resistant coating on a glass substrate.

Figure 124:
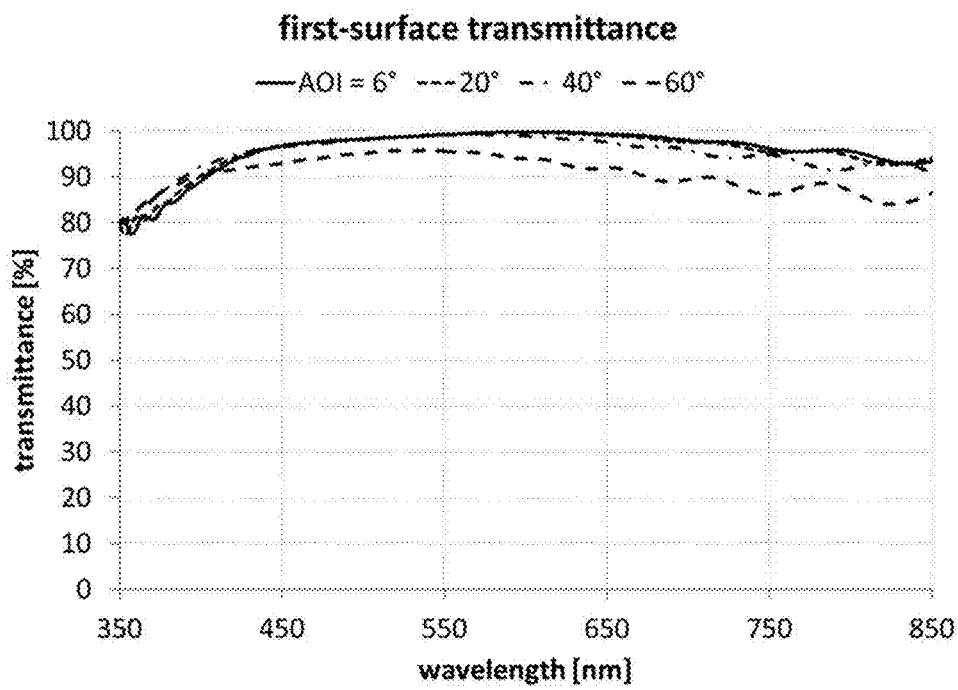
FIG. 124 shows a transmittance spectrum for Example 24.
Figure 125:
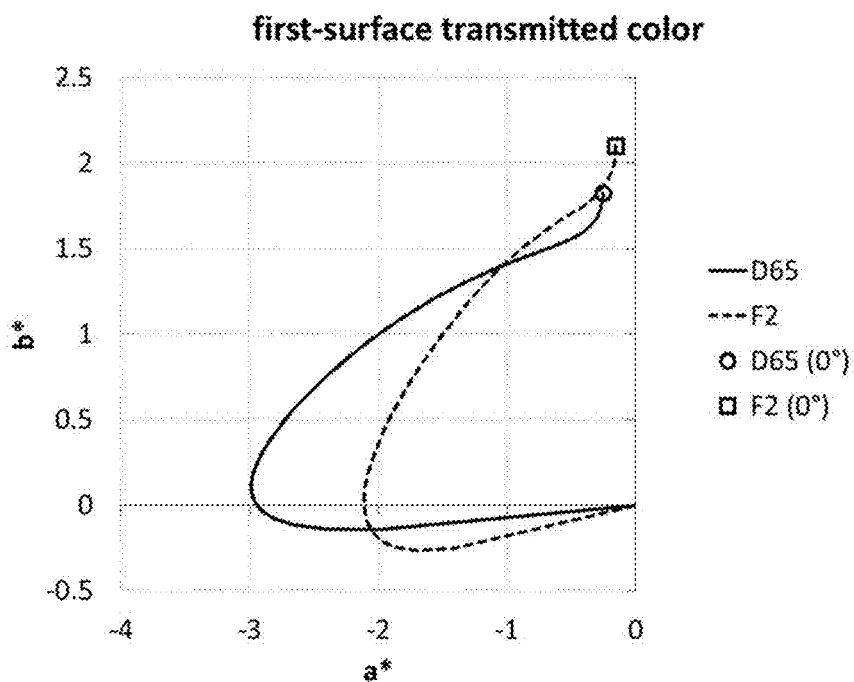
FIG. 125 shows transmitted color for Example 24.
Figure 126:
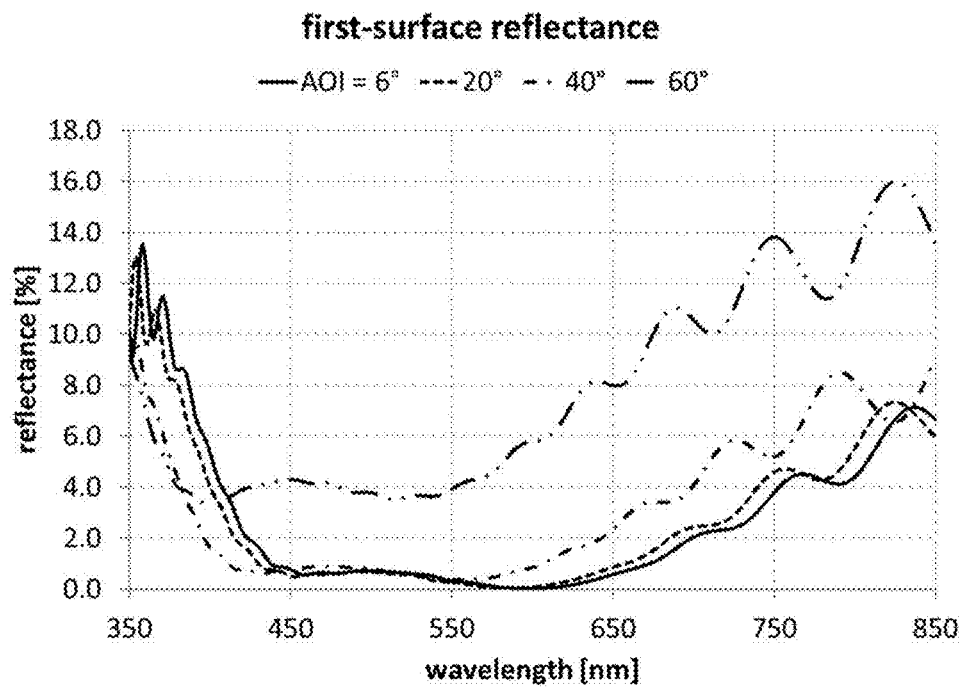
FIG. 126 shows a reflection spectrum for Example 24.
Figure 127:
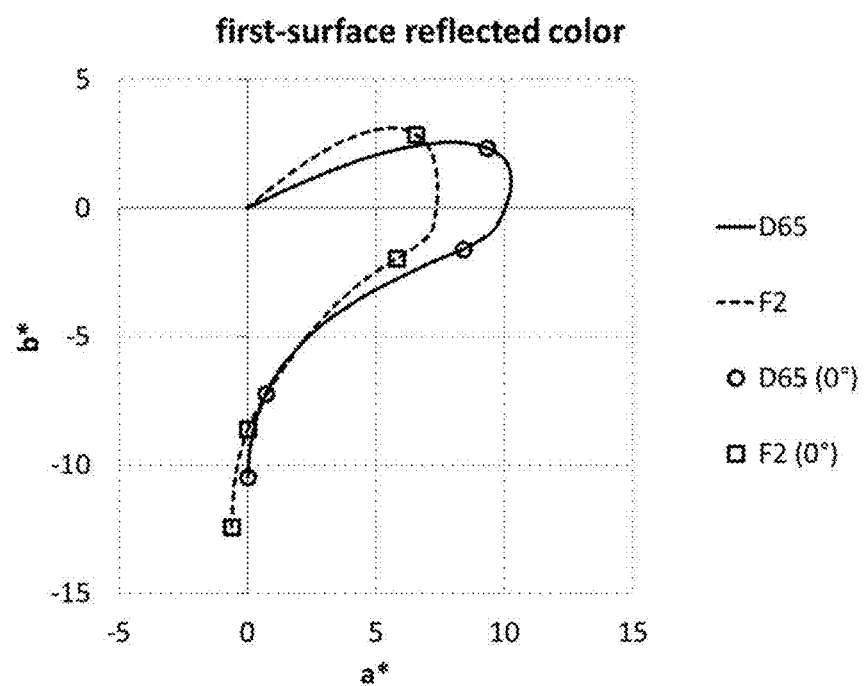
FIG. 127 shows reflected color for Example 24.
Figure 128:
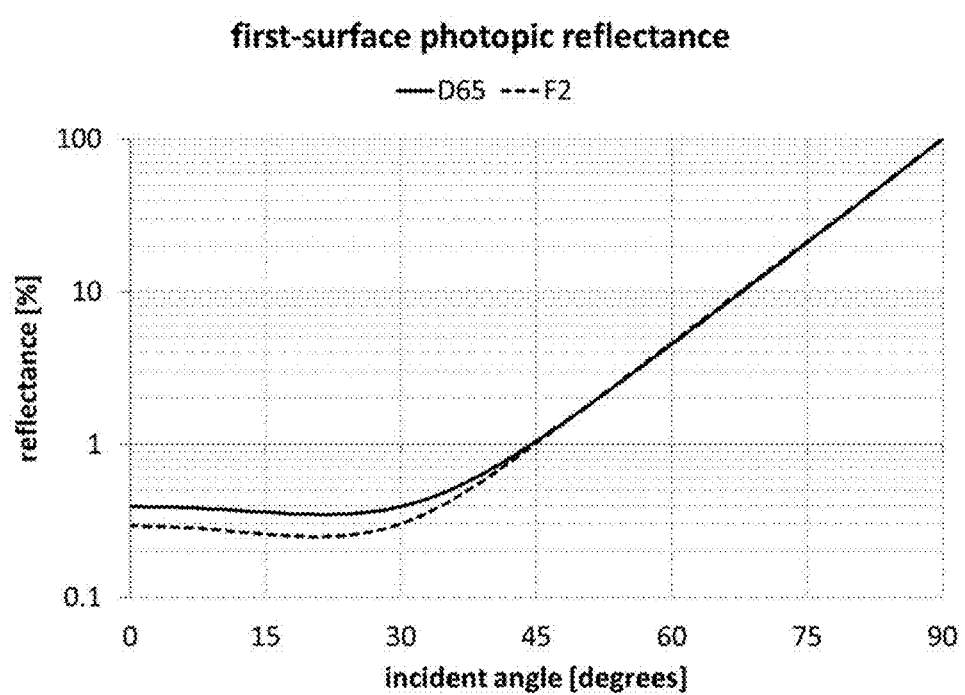
FIG. 128 shows photopic reflectance for Example 24.

FIG. 124 shows a first-surface transmittance spectrum for Example 24, measured at angles of incidence of 6, 20, 40, and 60, degrees on the outer surface. FIG. 125 shows the first-surface transmitted color for Example 24, based on incident D65 (solid line) and F2 (dashed line) spectrum, for all incidence angles from 0 degrees to 90 degrees, incident on the outer surface. FIG. 126 shows a first-surface reflection spectrum for Example 24, measured at angles of incidence of 6, 20, 40, and 60, degrees on the outer surface. FIG. 127 shows the reflected color for Example 24, based on an incident D65 (solid line) and F2 (dashed line) spectrum, for all incidence angles from 0 degrees to 90 degrees, incident on the outer surface. FIG. 128 shows, on log scale, the photopic reflectance as a function of each D65 and F2 illuminants at incident angles from 0 to 90 degrees, incident on the outer surface. Example 24 had, at normal to near normal incidence, under D65 illuminant, in the CIE L* a* b* color space: a photopic reflectance of 0.39%; an a* value of 0, a b* value of −10.5; and thus provided a low-reflectance, medium-color 'blue' scratch-resistant coating on a glass substrate.

Figure 129:
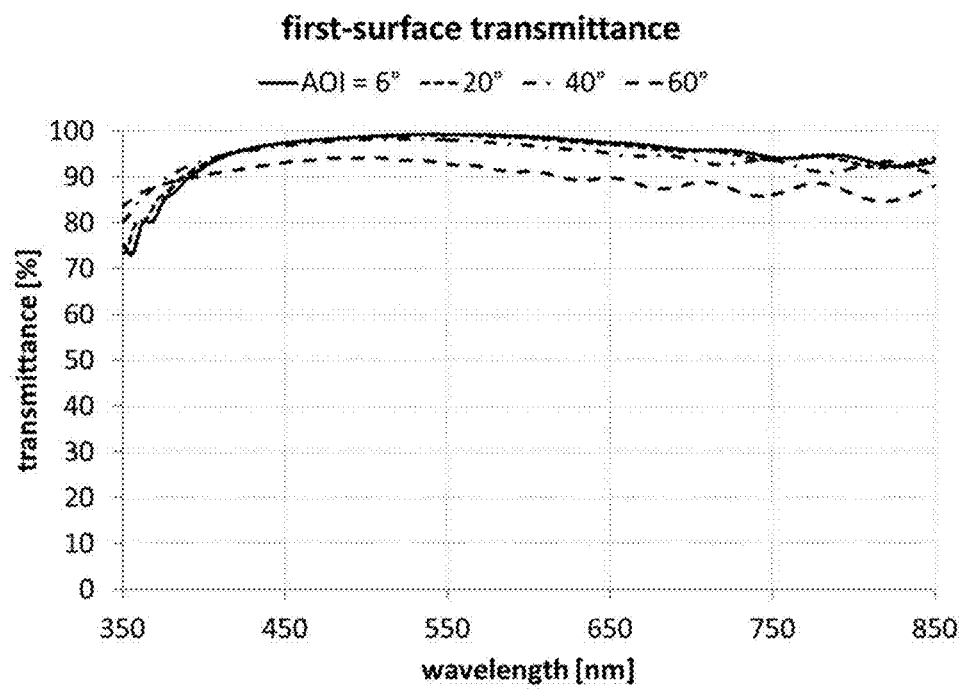
FIG. 129 shows a transmittance spectrum for Example 25.
Figure 130:
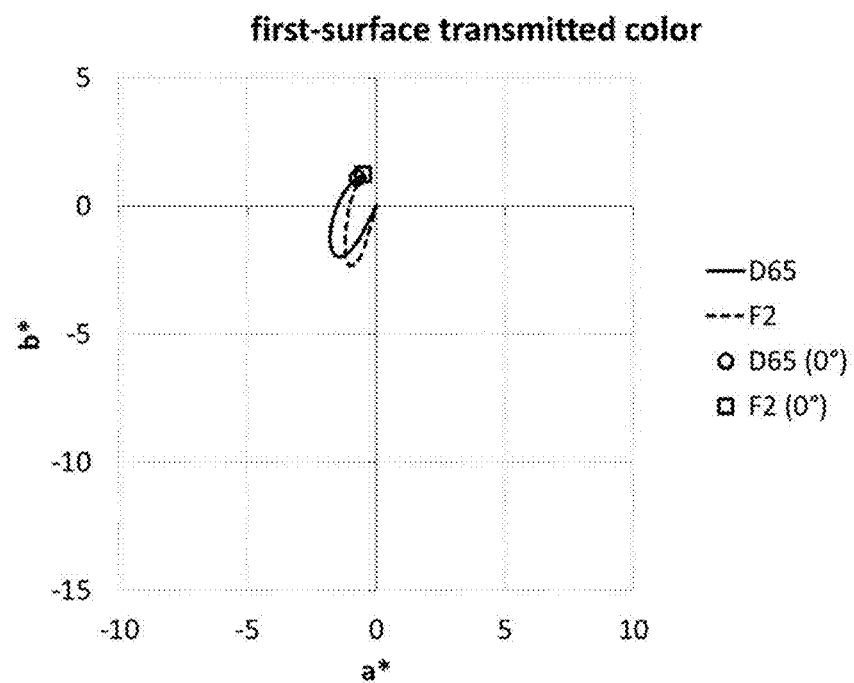
FIG. 130 shows transmitted color for Example 25.
Figure 131:
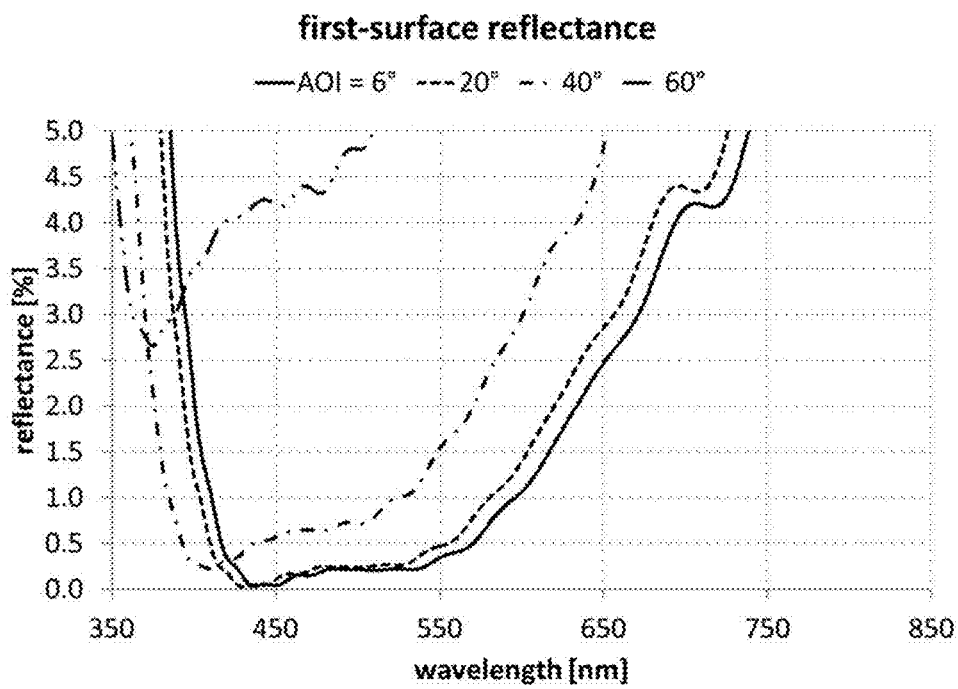
FIG. 131 shows a reflection spectrum for Example 25.
Figure 132:
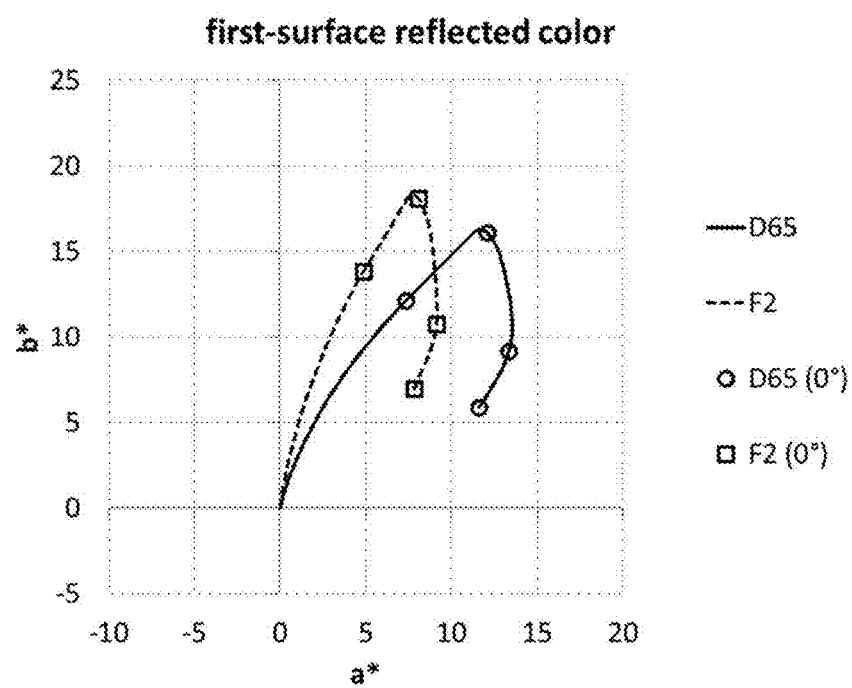
FIG. 132 shows reflected color for Example 25.
Figure 133:
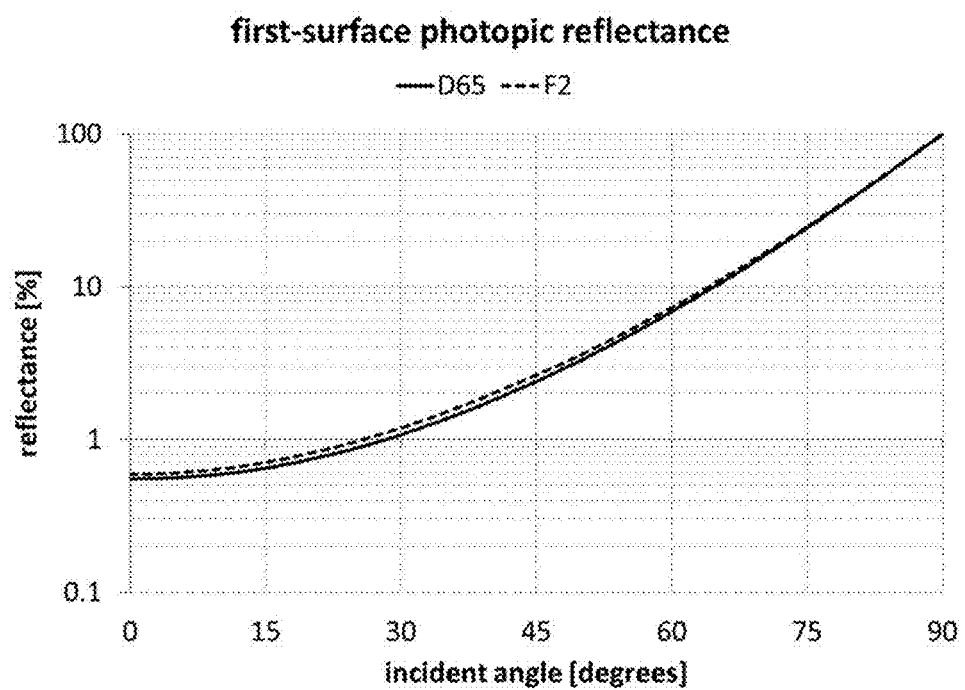
FIG. 133 shows photopic reflectance for Example 25.

FIG. 129 shows a first-surface transmittance spectrum for Example 25, measured at angles of incidence of 6, 20, 40, and 60, degrees on the outer surface. FIG. 130 shows the first-surface transmitted color for Example 25, based on incident D65 (solid line) and F2 (dashed line) spectrum, for all incidence angles from 0 degrees to 90 degrees, incident on the outer surface. FIG. 131 shows a first-surface reflection spectrum for Example 25, measured at angles of incidence of 6, 20, 40, and 60, degrees on the outer surface. FIG. 132 shows the reflected color for Example 25, based on an incident D65 (solid line) and F2 (dashed line) spectrum, for all incidence angles from 0 degrees to 90 degrees, incident on the outer surface. FIG. 133 shows, on log scale, the photopic reflectance as a function of each D65 and F2 illuminants at incident angles from 0 to 90 degrees, incident on the outer surface. Example 25 had, at normal to near normal incidence, under D65 illuminant, in the CIE L* a* b* color space: a photopic reflectance of 0.55%; an a* value of 11.6, a b* value of 5.87; and thus provided a low-reflectance, medium-color 'orange' scratch-resistant coating on a glass substrate.

Figure 134:
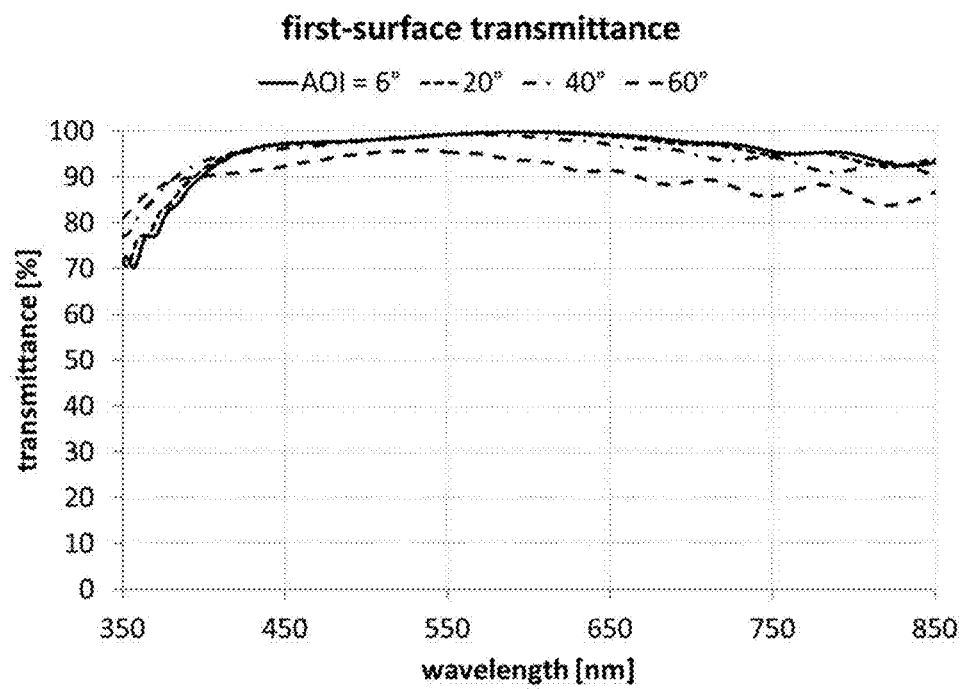
FIG. 134 shows a transmittance spectrum for Example 26.
Figure 135:
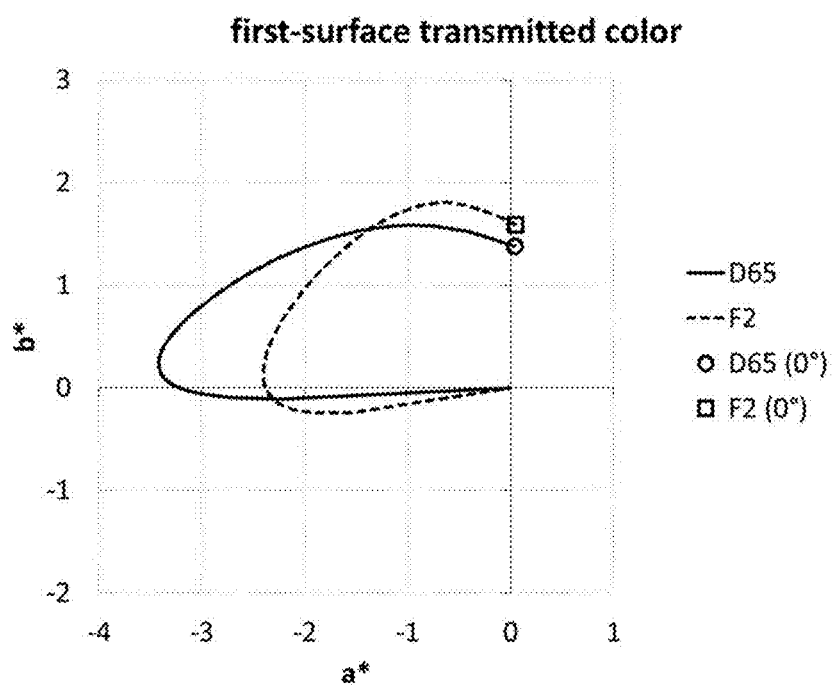
FIG. 135 shows transmitted color for Example 26.
Figure 136:
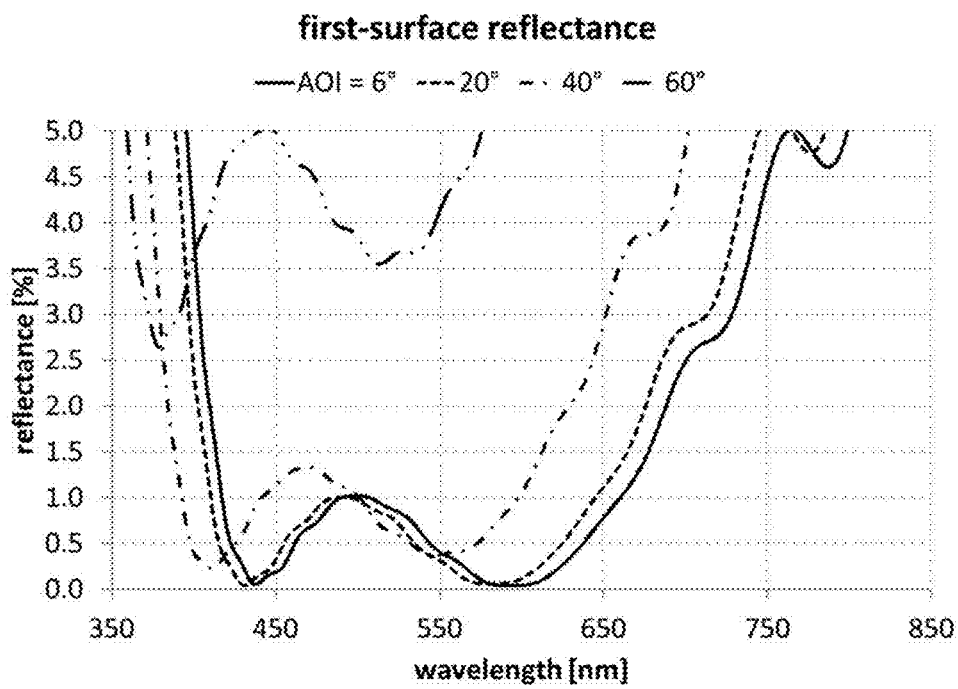
FIG. 136 shows a reflection spectrum for Example 26.
Figure 137:
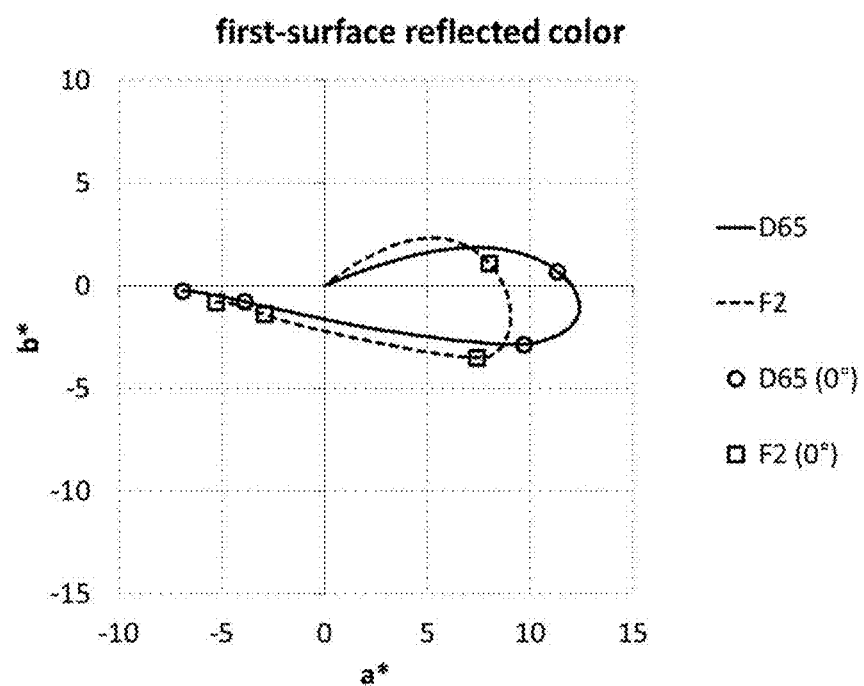
FIG. 137 shows reflected color for Example 26.
Figure 138:
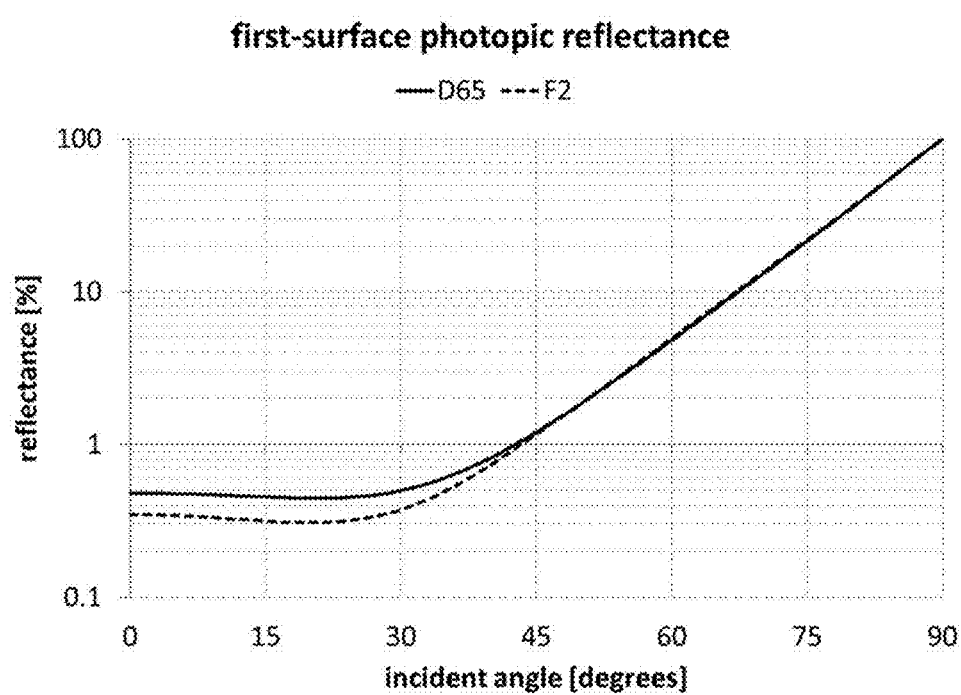
FIG. 138 shows photopic reflectance for Example 26.

FIG. 134 shows a first-surface transmittance spectrum for Example 26, measured at angles of incidence of 6, 20, 40, and 60, degrees on the outer surface. FIG. 135 shows the first-surface transmitted color for Example 26, based on incident D65 (solid line) and F2 (dashed line) spectrum, for all incidence angles from 0 degrees to 90 degrees, incident on the outer surface. FIG. 136 shows a first-surface reflection spectrum for Example 26, measured at angles of incidence of 6, 20, 40, and 60, degrees on the outer surface. FIG. 137 shows the reflected color for Example 26, based on an incident D65 (solid line) and F2 (dashed line) spectrum, for all incidence angles from 0 degrees to 90 degrees, incident on the outer surface. FIG. 138 shows, on log scale, the photopic reflectance as a function of each D65 and F2 illuminants at incident angles from 0 to 90 degrees, incident on the outer surface. Example 26 had, at normal to near normal incidence, under D65 illuminant, in the CIE L* a* b* color space: a photopic reflectance of 0.48%; an a* value of −6.9, a b* value of −0.2; and thus provided a low-reflectance, low- to medium-color 'green' scratch-resistant coating on a glass substrate.

Table D shows the refractive indices vs. wavelength (dispersions) for the materials used in Modeled Examples 1-26. Coating materials were formed using a metal-mode reactive sputtering tool. Glass was formed using known glass melting and forming techniques. Refractive indices were measured using spectroscopic ellipsometry.

TABLE D

Refractive indices vs. wavelength (dispersions)

| Wavelength (nm) | Refractive Index (n) | Extinction Coefficient (k) |
|---|---|---|
| Material: $AlO_xN_y$ | | |
| 401 | 2.0657 | 0.0 |
| 450 | 2.0418 | 0.0 |
| 501 | 2.0252 | 0.0 |
| 550 | 2.0138 | 0.0 |
| 600 | 2.0050 | 0.0 |
| 651 | 1.9984 | 0.0 |
| 700 | 1.9934 | 0.0 |
| Material: $SiO_2$ | | |
| 401 | 1.4799 | 0.0 |
| 450 | 1.4747 | 0.0 |
| 501 | 1.4708 | 0.0 |
| 550 | 1.4680 | 0.0 |
| 600 | 1.4657 | 0.0 |
| 651 | 1.4638 | 0.0 |
| 700 | 1.4622 | 0.0 |
| Material: $SiO_xN_y$ | | |
| 401 | 1.9871 | 0.0009 |
| 450 | 1.9684 | 0.0004 |
| 501 | 1.9551 | 0.0002 |
| 550 | 1.9458 | 0.0001 |
| 600 | 1.9386 | 0.0 |
| 651 | 1.9331 | 0.0 |
| 700 | 1.9287 | 0.0 |

TABLE D-continued

Refractive indices vs. wavelength (dispersions)

| Wavelength (nm) | Refractive Index (n) | Extinction Coefficient (k) |
|---|---|---|
| Material: $Si_3N_4$ | | |
| 401 | 2.0621 | 0.0007 |
| 450 | 2.0400 | 0.0003 |
| 501 | 2.0244 | 0.0001 |
| 550 | 2.0135 | 0.0 |
| 600 | 2.0053 | 0.0 |
| 651 | 1.9988 | 0.0 |
| 700 | 1.9938 | 0.0 |
| Material: Glass Grey 17 (code 82524) | | |
| 400 | 1.54376 | 0.00002 |
| 450 | 1.53681 | 0.00002 |
| 500 | 1.5319 | 0.00002 |
| 550 | 1.52829 | 0.00002 |
| 600 | 1.52556 | 0.00002 |
| 650 | 1.52344 | 0.00002 |
| 700 | 1.52177 | 0.00001 |
| Material: Gorilla ® Glass | | |
| 400 | 1.5195 | 0.0 |
| 450 | 1.5135 | 0.0 |
| 500 | 1.5093 | 0.0 |
| 550 | 1.5063 | 0.0 |
| 600 | 1.5040 | 0.0 |
| 650 | 1.5021 | 0.0 |
| 700 | 1.5001 | 0.0 |

Example 27

Figure 139:
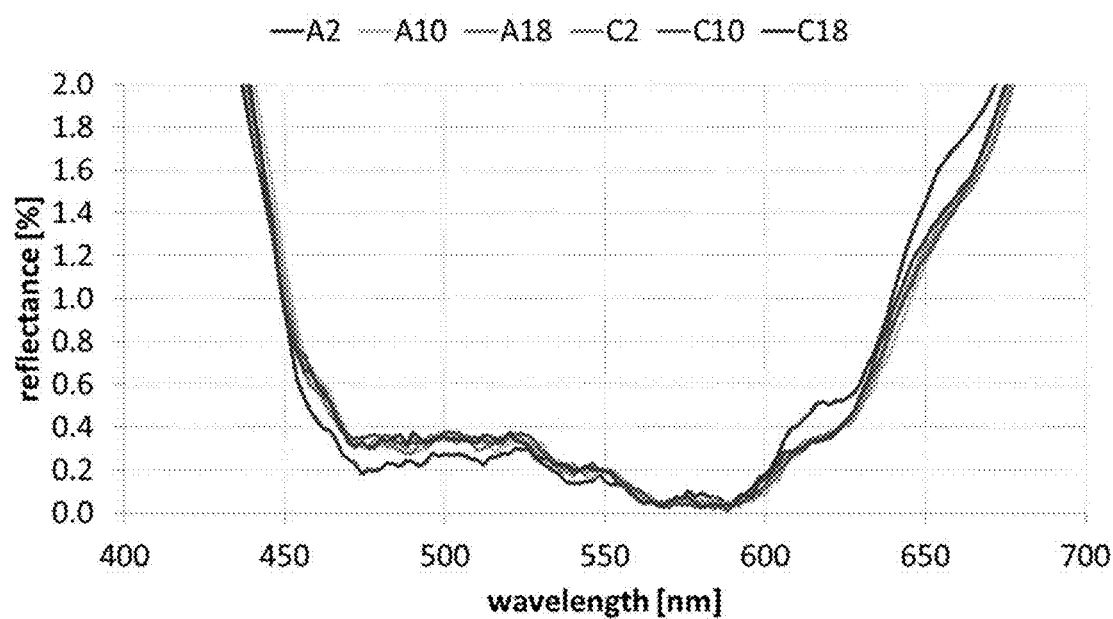
FIG. 139 shows a reflection spectrum for Example 27.

Example 27 was made on a metal mode deposition tool with a stack design configured to mimic the modeled stack of Example 17. FIG. 139 shows a first-surface reflection spectrum for Example 27, measured at six different positions (A2, A10, A18, C2, C10, and C18) on the outer surface. The values at normal incidence the photopic reflectance (Y), a* value, and b* value, are given for each position in Table 27 below. From a comparison of Example 27 with modeled Example 17, it is seen that the photopic reflectance and color achieved with the fabricated sample were closely matched with the same values of the modeled example.

TABLE 27

Properties of Example 27
First-surface reflected color coordinates

| position | Y | a* | b* |
|---|---|---|---|
| A2 | 0.27 | 13.60 | −18.34 |
| A10 | 0.28 | 13.06 | −20.60 |
| A18 | 0.28 | 12.24 | −19.17 |
| C2 | 0.28 | 11.96 | −19.11 |
| C10 | 0.29 | 11.79 | −18.96 |
| C18 | 0.29 | 12.21 | −18.96 |

Modeled Examples 28-30, and Examples 28A, 29A, and 30A

Modeled Examples 28-30 used modeling to demonstrate the reflectance spectra of articles that included embodiments of the optical coating, as described herein. In Modeled Examples 28-30, the optical coating included $SiO_xN_y$, and $SiO_2$ layers, and a glass substrate commercially available from Corning® as Gorilla® Glass having a nominal composition (in mol %) of: 67.3 $SiO_2$; 3.7 $B_2O$; 12.7 $Al_2O_3$; 13.7 $Na_2O$; 0.01$K_2O$; 2.4 MgO; 0.01 $Fe_2O_3$; 0.01 $ZrO_2$; 0.09 $SnO_2$. For any values reported as first-surface, or one-surface values, the thickness of the substrate was modeled as semi-infinite so that reflection from the back surface could be neglected, that is, the reflection from only the substrate-coating interface was considered. The modeled examples used refractive index/dispersion curves from $SiO_xN_y$ films fabricated on a metal-mode sputtering system and as characterized in Table D. The refractive index for the $SiO_2$ films is as listed in the tables below, and the dispersion curve is similar, but not identical, to that characterized in Table D.

To determine the refractive index dispersion curves for the coating materials, layers of each coating material were formed onto silicon wafers and glass substrates by metal-mode sputtering from silicon targets. The refractive indices (as a function of wavelength) of each of the formed layers and the glass substrate were measured using spectroscopic ellipsometry. The refractive indices thus measured were then used to calculate reflectance spectra for Modeled Examples 28-30. The modeled examples use a single refractive index value in their descriptive tables for convenience, which corresponds to a point selected from the dispersion curves at about 550 nm wavelength. Unless specified otherwise, refractive index values are given at a wavelength of 550 nm.

Tables 28 through 30 show the composition and thicknesses of the layers of Modeled Examples 28 through 30, respectively. The structures look similar to that of FIG. 7, but with the specific layers, layer compositions, and layer thicknesses shown in Tables 28 through 30. The thicknesses in Tables 28 through 30 are physical thicknesses, not optical thicknesses. The thick scratch resistant layer is included as a part of the multi-layer interference stack when calculating what fraction or thickness of the stack is made of a particular material.

Modeled Example 28

TABLE 28

Example 28 Coating Design

| Layer | Material | Refractive Index @550 nm | Physical Thickness (nm) |
|---|---|---|---|
| Medium | Air | 1 | |
| 1 | $SiO_2$ | 1.47924 | 82.8 |
| 2 | $SiOxNy$ | 1.95759 | 2000 |
| 3 | $SiO_2$ | 1.47924 | 79.8 |
| 4 | $SiOxNy$ | 1.95759 | 60.6 |
| 5 | $SiO_2$ | 1.47924 | 81.3 |
| 6 | $SiOxNy$ | 1.95759 | 60.9 |
| 7 | $SiO_2$ | 1.47924 | 80.8 |
| 8 | $SiOxNy$ | 1.95759 | 61 |
| 9 | $SiO_2$ | 1.47924 | 25 |
| Substrate | Gorilla ® Glass | 1.51 | |
| Medium | Air | 1 | |
| Total coating thickness (all layers) | | | 2532.2 nm |
| Thickness (sum) of low-index matl. in coating | | | 349.7 nm |
| Fraction (%) of low-index matl. in coating | | | 13.8% |
| Thickness (sum) of low-index matl. above thickest hard layer in coating | | | 82.8 nm |
| Thickness (sum) of all layers above thickest hard layer in coating | | | 82.8 nm |
| Fraction (%) of low-index matl. above thickest hard layer in coating | | | 100% |
| Fraction (%) of low-index matl. above thickest hard layer in coating, relative to total thickness of low-index material in coating | | | 23.7% |

TABLE 28-continued

Example 28 Coating Design

| Layer | Material | Refractive Index @550 nm | Physical Thickness (nm) |
|---|---|---|---|
| Fraction (%) of low-index matl. above thickest hard layer in coating, relative to total thickness of material in coating | | | 3.3% |

Figure 140:
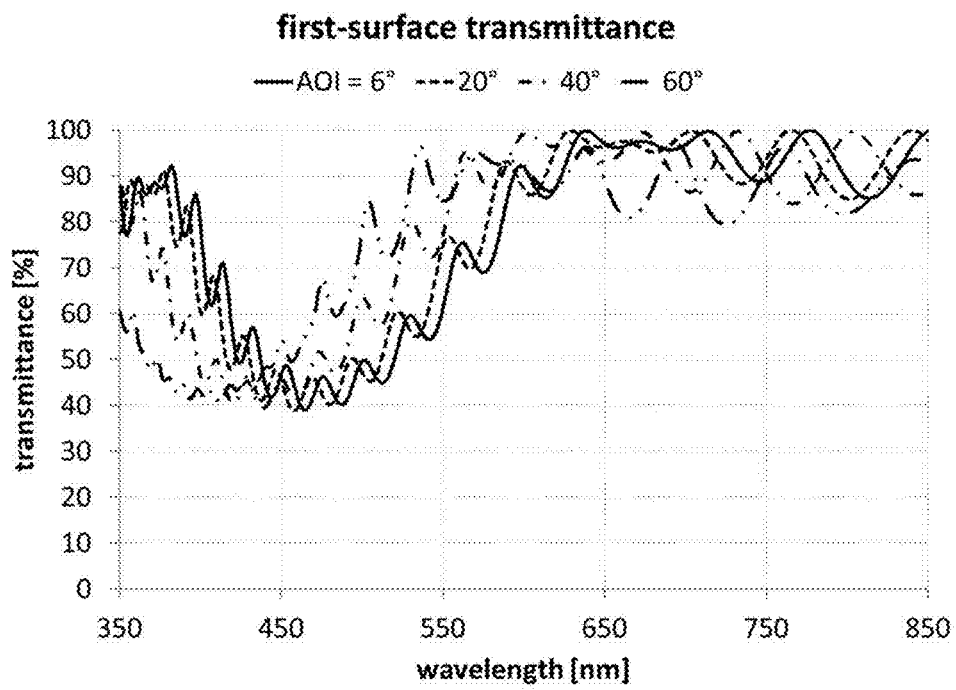
FIG. 140 shows a transmittance spectrum for Example 28.
Figure 141:
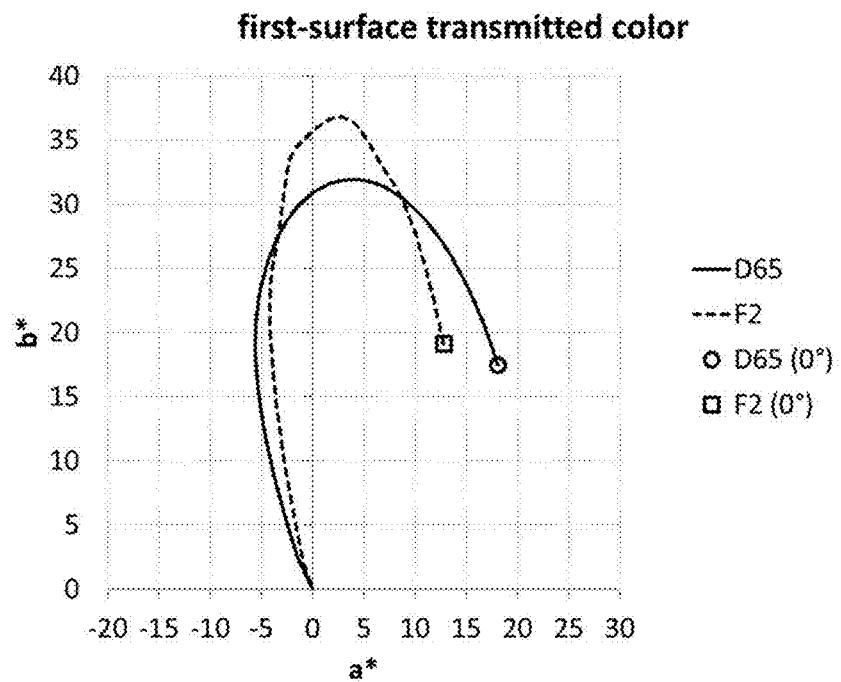
FIG. 141 shows transmitted color for Example 28.
Figure 142:
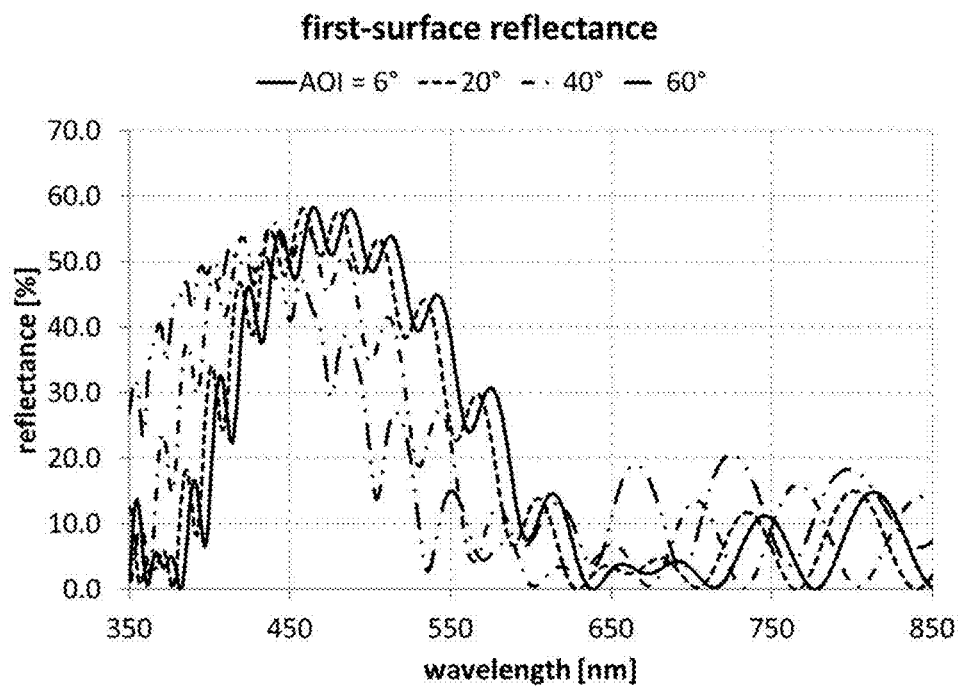
FIG. 142 shows a reflection spectrum for Example 28.
Figure 143:
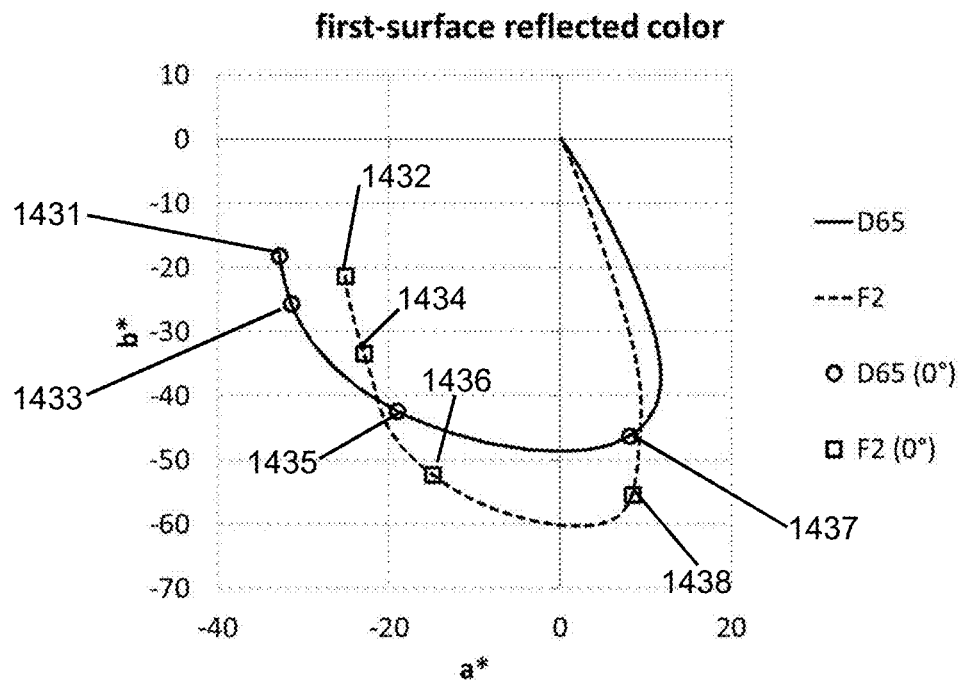
FIG. 143 shows reflected color for Example 28.
Figure 144:
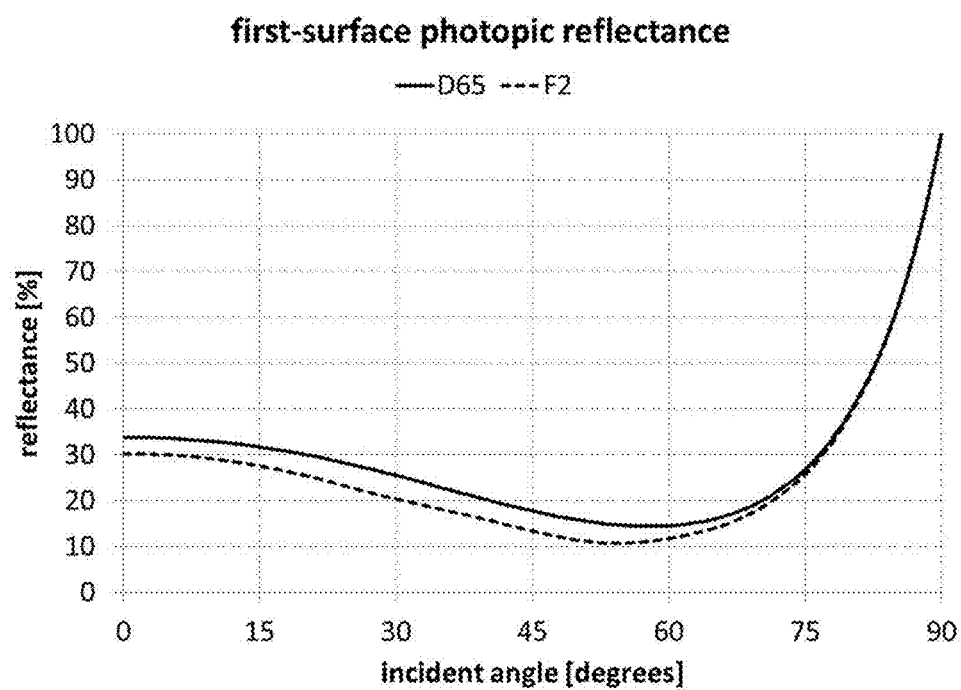
FIG. 144 shows photopic reflectance for Example 28.

FIG. 140 shows a first-surface transmittance spectrum for Example 28, measured at angles of incidence of 6 (solid line), 20 (dashed line), 40 (dash-dot line), and 60 (dash-two-dot line) degrees on the outer surface. FIG. 141 shows the first-surface transmitted color for Example 28, based on incident D65 (solid line) and F2 (dashed line) spectrum, for all incidence angles from 0 degrees to 90 degrees, incident on the outer surface. FIG. 142 shows a first-surface reflectance spectrum for Example 28, measured at angles of incidence of 6 (solid line), 20 (dashed line), 40 (dash-dot line), and 60 (dash-two-dot line) degrees on the outer surface. FIG. 143 shows the first-surface reflected color for Example 28, based on an incident D65 (solid line) and F2 (dashed line) spectrum, for all incidence angles from 0 degrees to 90 degrees, incident on the outer surface. In FIG. 143, points 1431, 1433, 1435, and 1437, respectively are incident angles of 6, 20, 40, and 60 degrees for D65 illuminant, whereas points 1432, 1434, 1436, and 1438, respectively are incident angles of 6, 20, 40, and 60 degrees for F2 illuminant. FIG. 144 shows, on log scale, the photopic reflectance as a function of each D65 (solid line) and F2 (dashed line) illuminants at incident angles from 0 to 90 degrees, incident on the outer surface. Example 28 had, at normal to near normal incidence (six degrees), under D65 illuminant, in the CIE L* a* b* color space, a first-surface: photopic reflectance of 33.5%; reflected color a* value of −32.7, b* value of −18.8; and thus provided a high-reflectance, high-color 'blue' scratch-resistant coating on a glass substrate.

Example 28A

Figure 145:
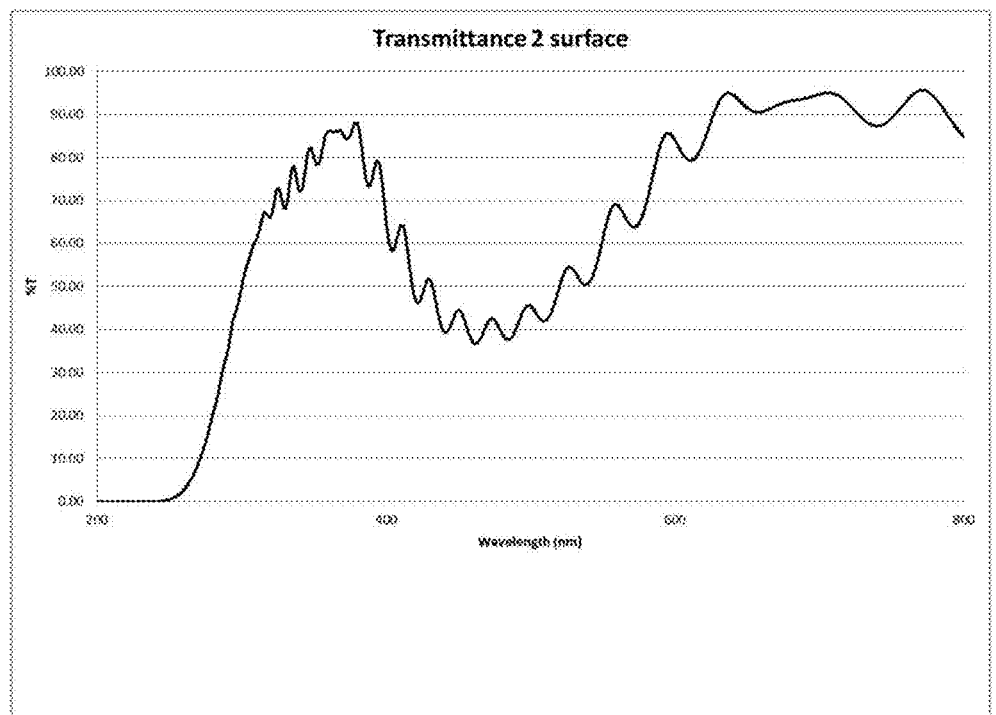
FIG. 145 shows a transmittance spectrum for Example 28A.
Figure 146:
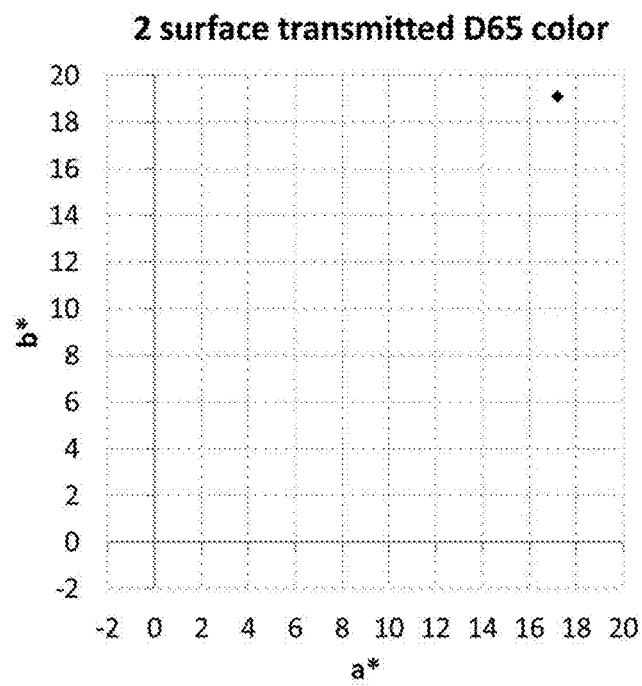
FIG. 146 shows transmitted color for Example 28A.
Figure 147:
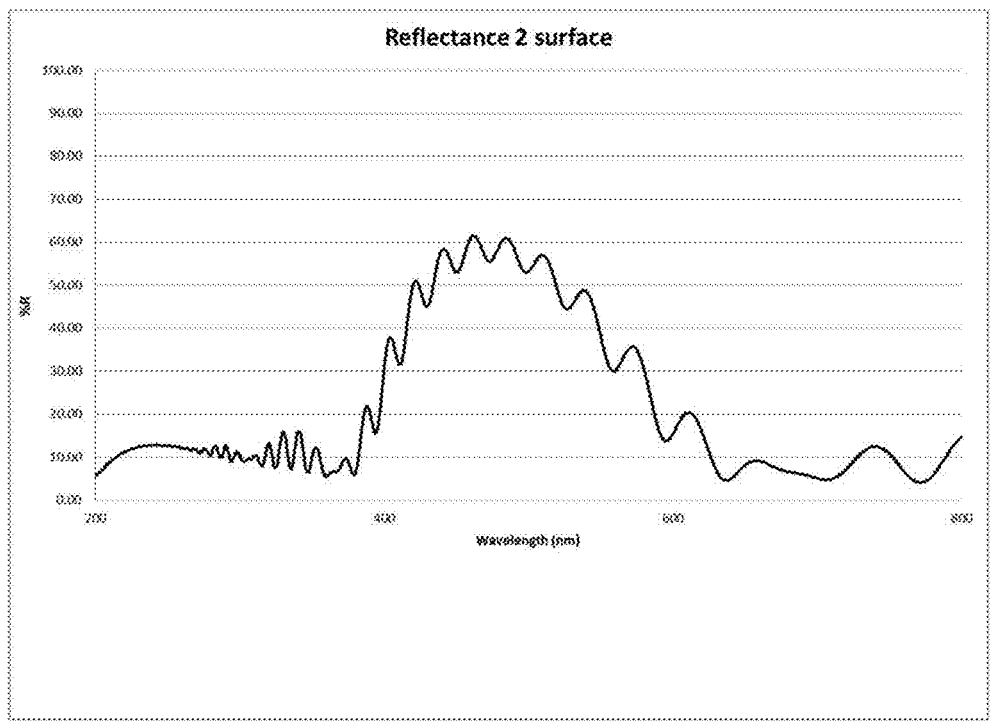
FIG. 147 shows a reflection spectrum for Example 28A.
Figure 147A:
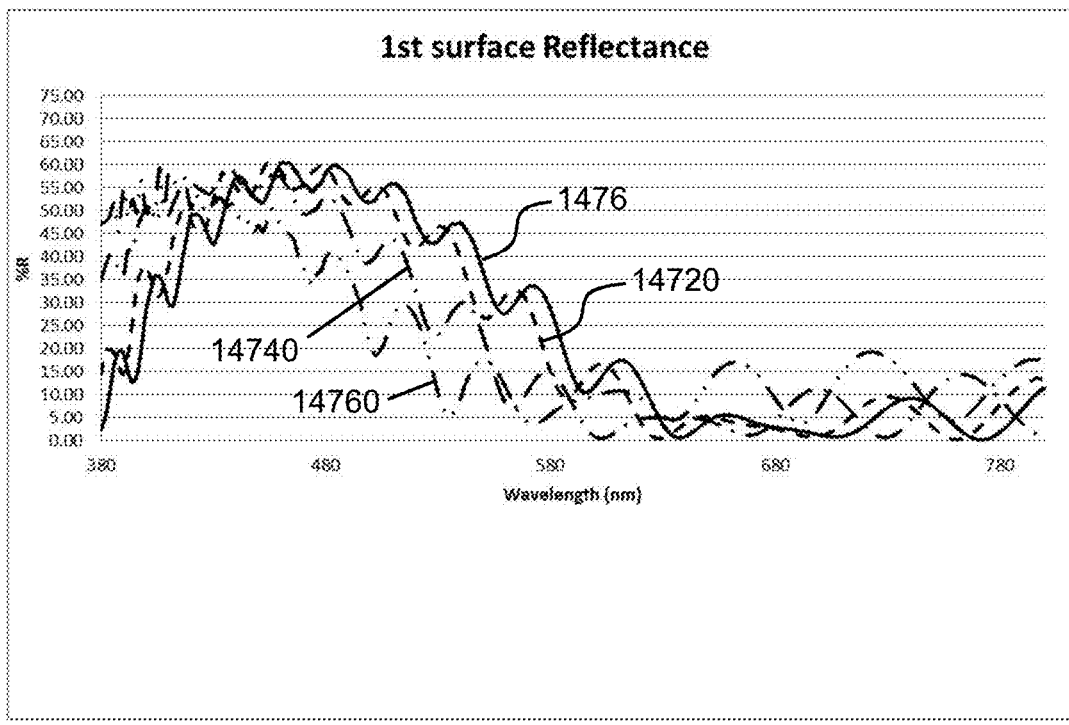
FIG. 147A shows a reflection spectrum for Example 28A.
Figure 148:
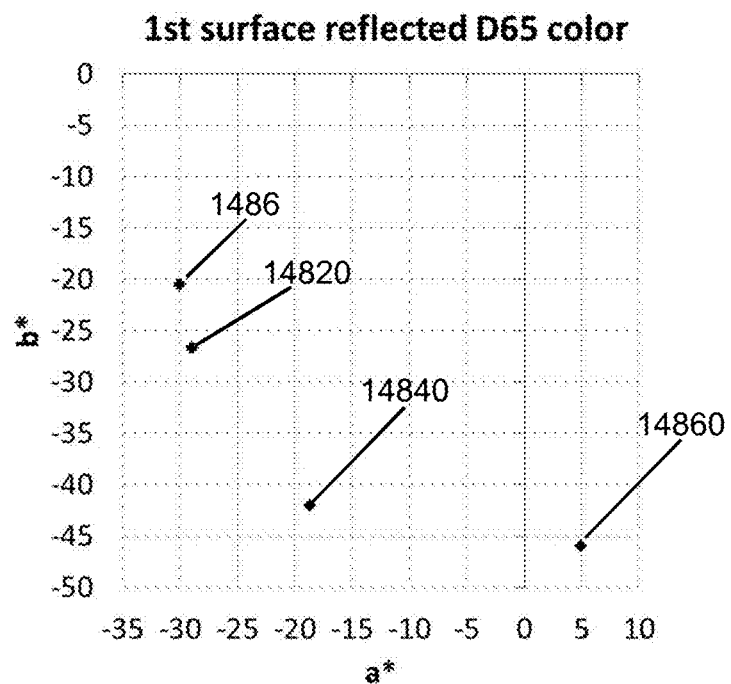
FIG. 148 shows reflected color for Example 28A.

Example 28A was made on a metal mode deposition tool with a stack design configured to mimic the modeled stack of Example 28. FIG. 145 shows a two-surface transmittance spectrum in percent transmittance on the y-axis versus wavelength in nm on the x-axis, for Example 28A, measured with six degree incident light of D65 Illumination. FIG. 146 shows a two-surface transmitted color value, at six degree incident light of D65 Illumination, for Example 28A (diamond data point), wherein a* is about 17.2, and b* is about 19.1. FIG. 147 shows a two-surface reflectance spectrum in percent reflectance on the y-axis versus wavelength in nm on the x-axis, for Example 28A, measured with six degree incident light of D65 Illumination. FIG. 147A shows a first-surface reflectance spectrum for Example 28A, measured at angles of incidence of 6 (solid line 1476), 20 (dashed line 14720), 40 (dash-dot line 14740), and 60 (dash-two-dot line 14760), degrees on the outer surface, wherein reflectance is in percent on the y-axis and wavelength is in nm on the x-axis. FIG. 148 shows first-surface reflected color values, under incident light of D65 Illumination, for Example 28A, wherein:

point 1486 is at a six degree incident angle, a* is about −30.0, and b* is about −20.5;

point 14820 is at a 20 degree incident angle, a* is about −29.0, and b* is about −26.7;

point 14840 is at a 40 degree incident angle, a* is about −18.7, and b* is about −42.1;

point 14860 is at a 60 degree incident angle, a* is about 4.9, and b* is about −46.0.

Figure 149:
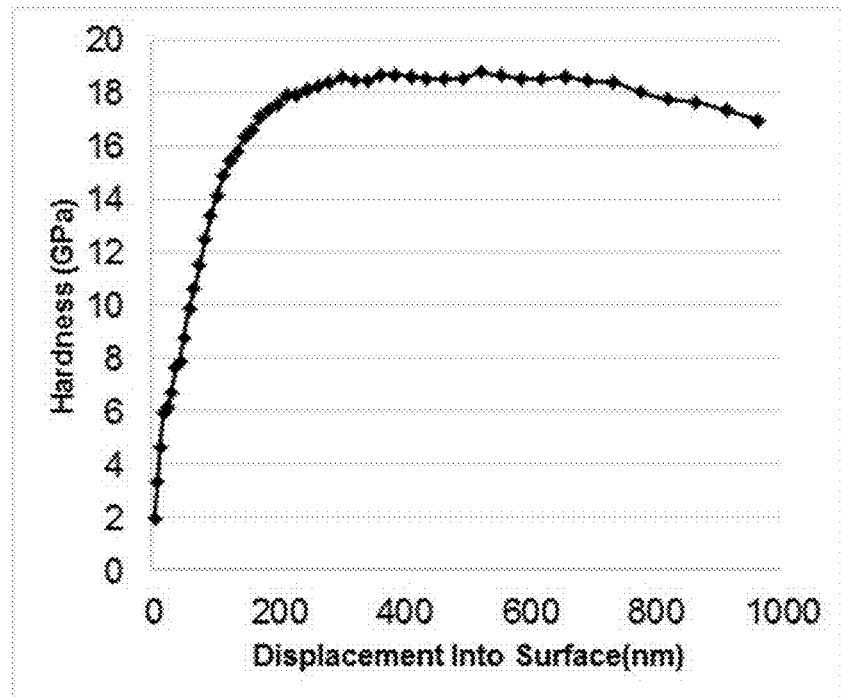
FIG. 149 shows hardness for Example 28A.

The first-surface photopic reflectance (Y), under D65 Illuminant, is 37%. From a comparison of Example 28A with modeled Example 28, it is seen that the first-surface photopic reflectance and first-surface reflected color achieved with the fabricated sample were closely matched with the same values of the modeled example. FIG. 149 shows a hardness trace for Example 28A as measured by the Berkovich Indentation test in GPa along the y-axis versus depth into the coating surface (from the air side being 0) in nm on the x-axis. As seen from FIG. 149, the hardness at 100 nm is greater than 12 GPa, and at 300 to 700 nm is greater than 18 GPa.

Modeled Example 29

TABLE 29

Example 29 Coating Design

| Layer | Material | Refractive Index @550 nm | Physical Thickness (nm) |
|---|---|---|---|
| Medium | Air | 1 | |
| 1 | SiO$_2$ | 1.47924 | 93.1 |
| 2 | SiO$_x$N$_y$ | 1.95759 | 2000 |
| 3 | SiO$_2$ | 1.47924 | 92.2 |
| 4 | SiO$_x$N$_y$ | 1.95759 | 75.9 |
| 5 | SiO$_2$ | 1.47924 | 96.4 |
| 6 | SiO$_x$N$_y$ | 1.95759 | 112.8 |
| 7 | SiO$_2$ | 1.47924 | 113.3 |
| 8 | SiO$_x$N$_y$ | 1.95759 | 80.7 |
| 9 | SiO$_2$ | 1.47924 | 117.4 |
| 10 | SiO$_x$N$_y$ | 1.95759 | 97.2 |
| 11 | SiO$_2$ | 1.47924 | 94.5 |
| 12 | SiO$_x$N$_y$ | 1.95759 | 77.2 |
| 13 | SiO$_2$ | 1.47924 | 25 |
| Substrate | Gorilla ® Glass | 1.51 | |
| Medium | Air | 1 | |

| | |
|---|---|
| Total coating thickness (all layers) | 3075.7 nm |
| Thickness (sum) of low-index matl. in coating | 631.9 nm |
| Fraction (%) of low-index matl. in coating | 20.5% |
| Thickness (sum) of low-index matl. above thickest hard layer in coating | 93.1 nm |
| Thickness (sum) of all layers above thickest hard layer in coating | 93.1 nm |
| Fraction (%) of low-index matl. above thickest hard layer in coating | 100% |
| Fraction (%) of low-index matl. above thickest hard layer in coating, relative to total thickness of low-index material in coating | 14.7% |
| Fraction (%) of low-index matl. above thickest hard layer in coating, relative to total thickness of material in coating | 3.0% |

Figure 150:
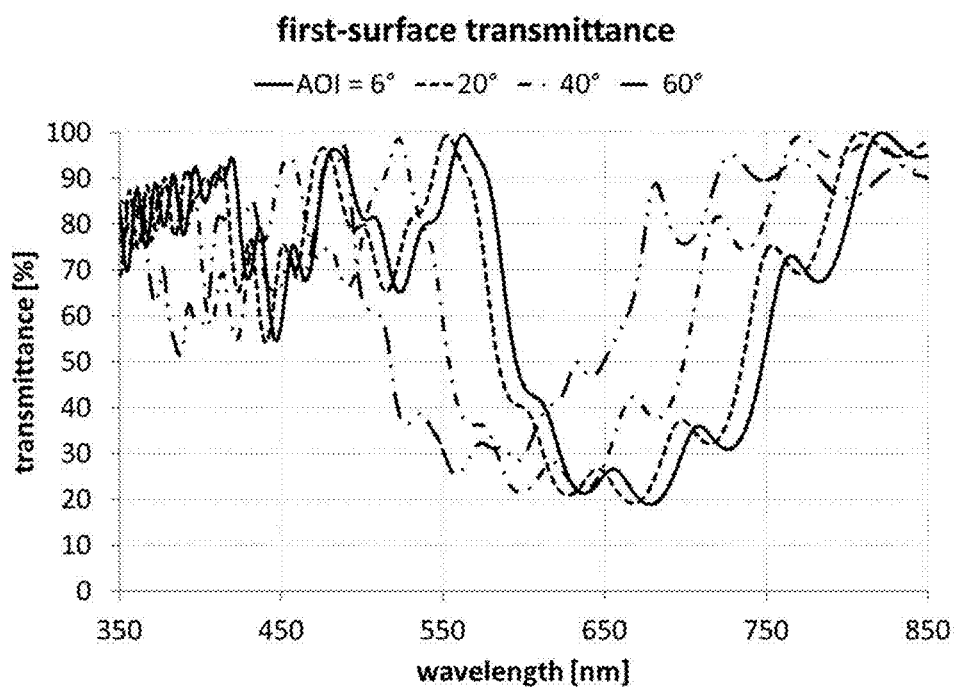
FIG. 150 shows a transmittance spectrum for Example 29.
Figure 151:
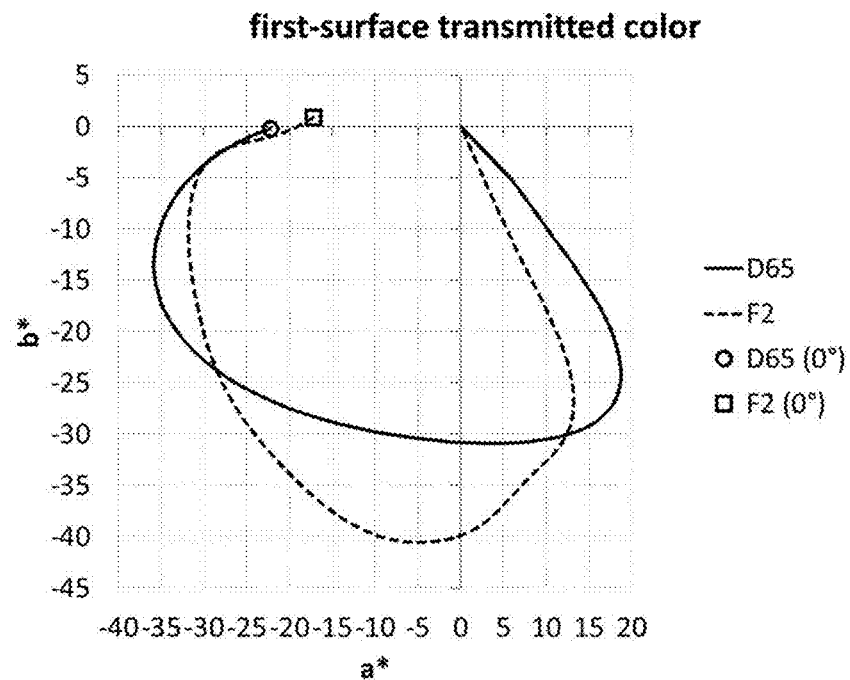
FIG. 151 shows transmitted color for Example 29.
Figure 152:
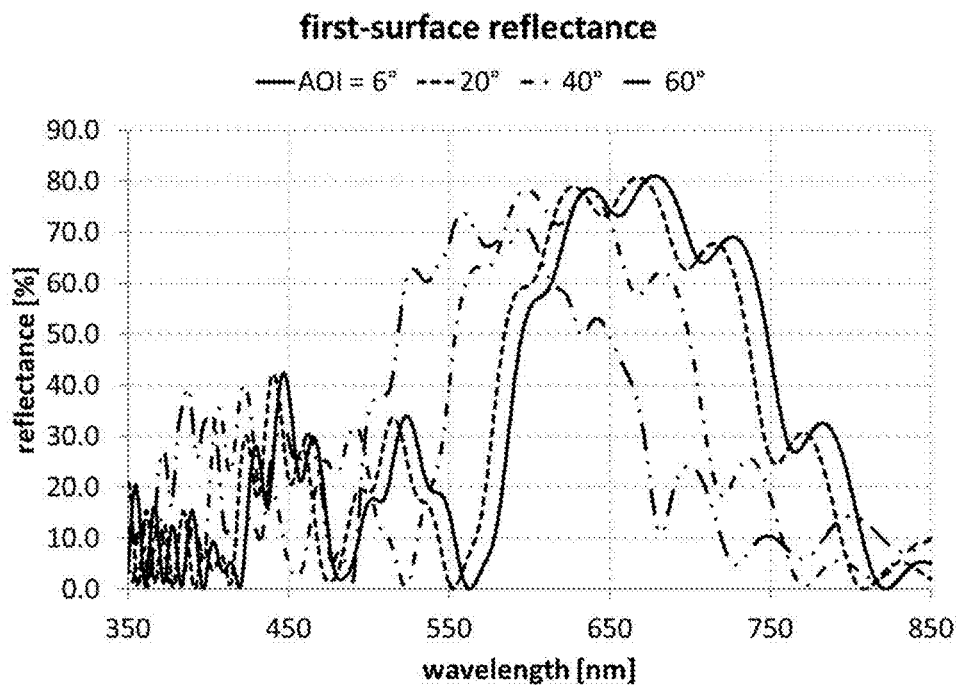
FIG. 152 shows a reflection spectrum for Example 29.
Figure 153:
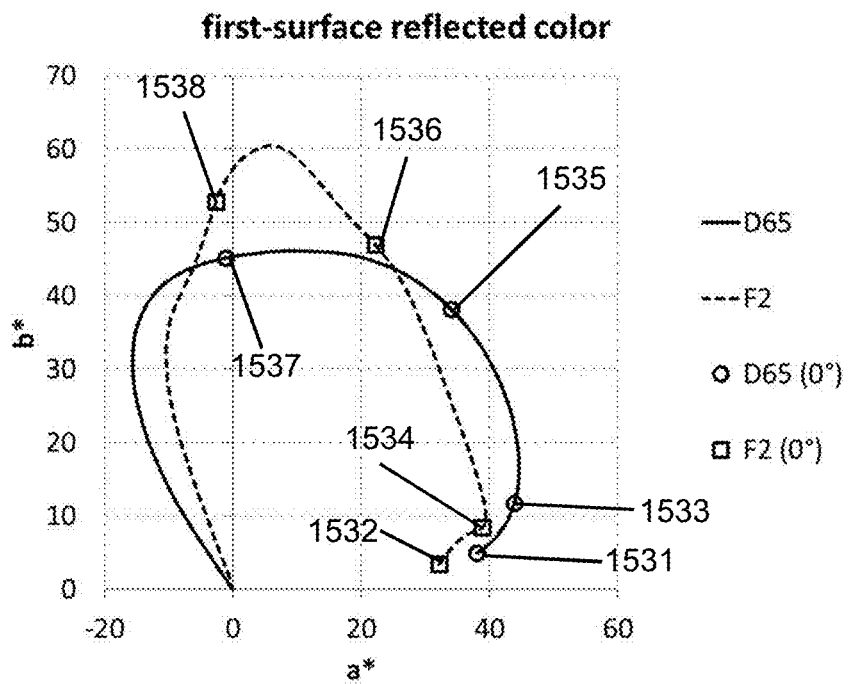
FIG. 153 shows reflected color for Example 29.
Figure 154:
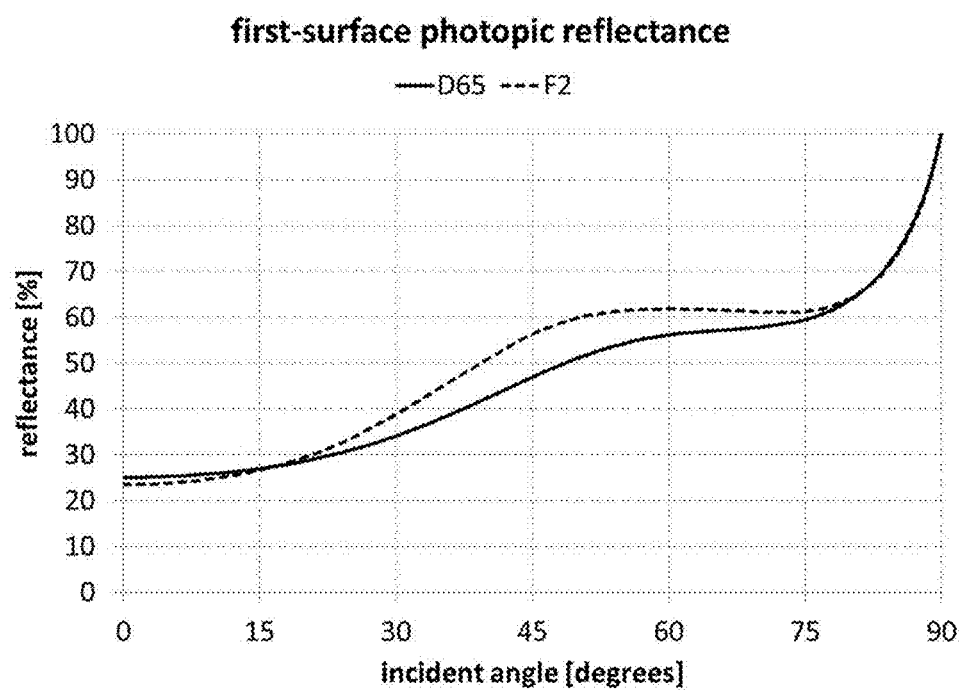
FIG. 154 shows photopic reflectance for Example 29.

FIG. 150 shows a first-surface transmittance spectrum for Example 29, measured at angles of incidence of 6 (solid line), 20 (dashed line), 40 (dash-dot line), and 60 (dash-two-dot line) degrees on the outer surface. FIG. 151 shows the first-surface transmitted color for Example 29, based on incident D65 (solid line) and F2 (dashed line) spectrum, for all incidence angles from 0 degrees to 90 degrees, incident on the outer surface. FIG. 152 shows a first-surface reflectance spectrum for Example 29, measured at angles of incidence of 6 (solid line), 20 (dashed line), 40 (dash-dot line), and 60 (dash-two-dot line) degrees on the outer surface. FIG. 153 shows the first-surface reflected color for Example 29, based on an incident D65 (solid line) and F2 (dashed line) spectrum, for all incidence angles from 0 degrees to 90 degrees, incident on the outer surface. In FIG. 153, points 1531, 1533, 1535, and 1537, respectively are incident angles of 6, 20, 40, and 60 degrees for D65 illuminant, whereas points 1532, 1534, 1536, and 1538, respectively are incident angles of 6, 20, 40, and 60 degrees for F2 illuminant. FIG. 154 shows, on log scale, the photopic reflectance as a function of each D65 (solid line) and F2 (dashed line) illuminants at incident angles from 0 to 90 degrees, incident on the outer surface. Example 29 had, at normal to near normal incidence (six degrees), under D65 illuminant, in the CIE L* a* b* color space, a first-surface: photopic reflectance of 25.3%; reflected color a* value of 38.8, b* value of 5.4; and thus provided a high-reflectance, high-color 'pink' scratch-resistant coating on a glass substrate.

Example 29A

Figure 155:
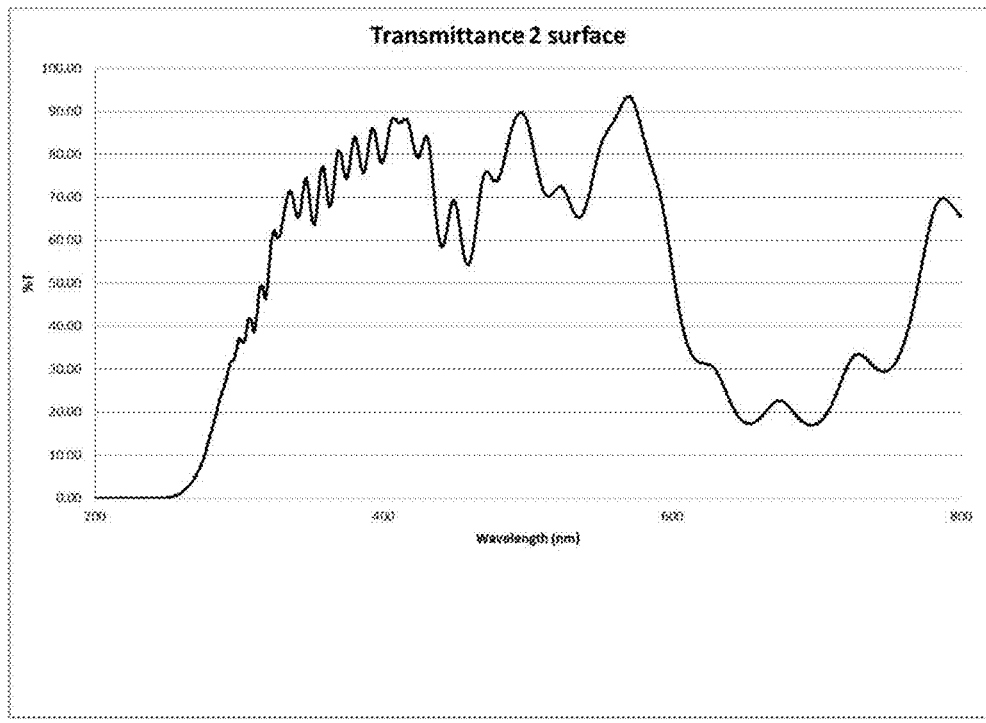
FIG. 155 shows a transmittance spectrum for Example 29A.
Figure 156:
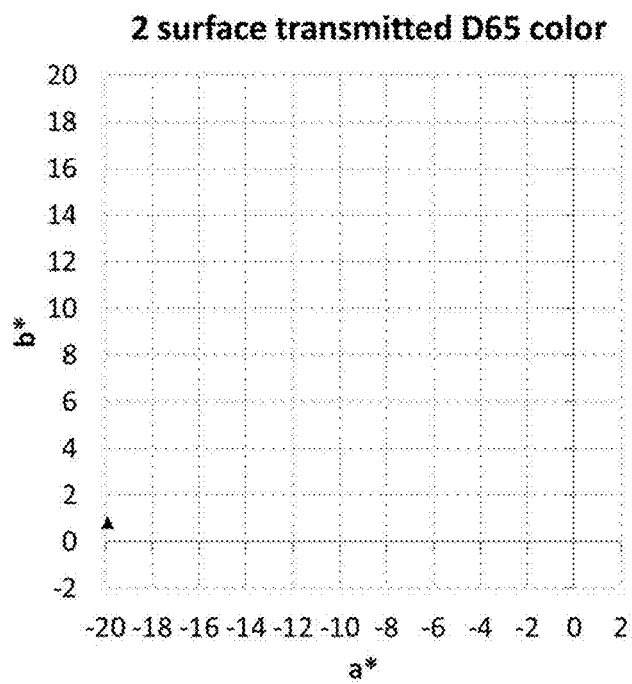
FIG. 156 shows transmitted color for Example 29A.
Figure 157:
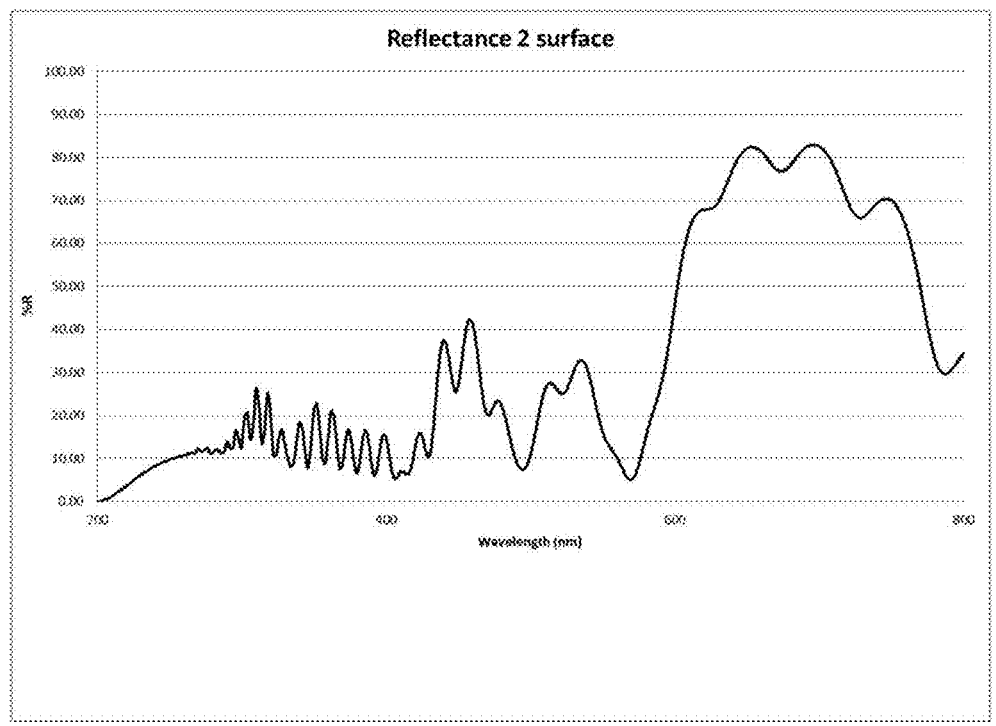
FIG. 157 shows a reflection spectrum for Example 29A.
Figure 157A:
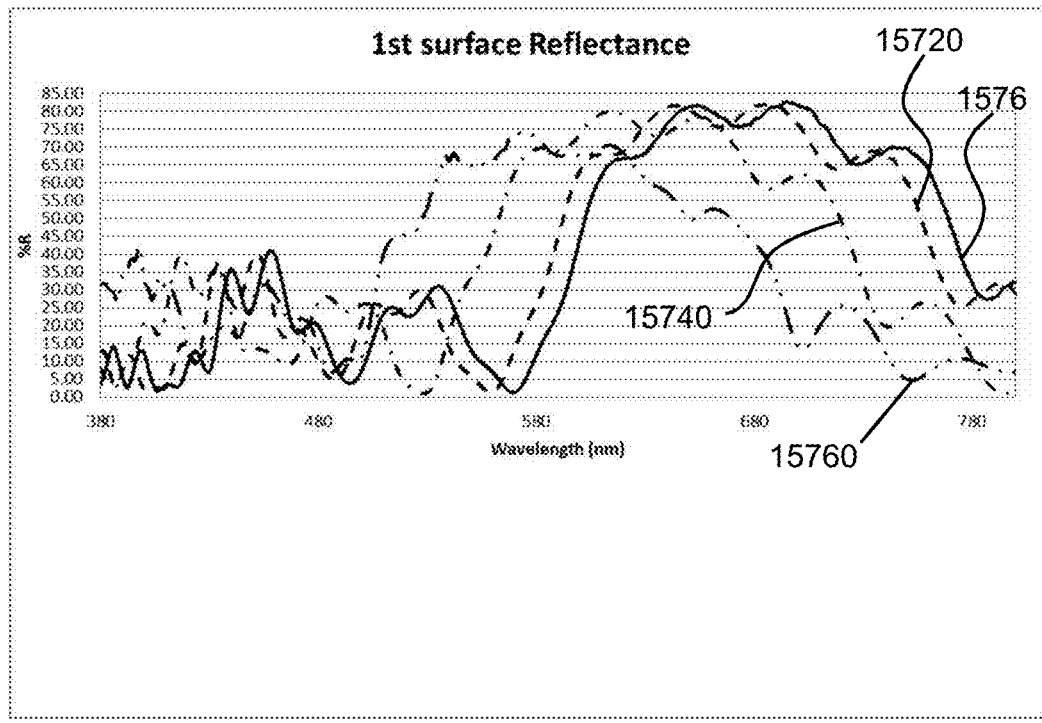
FIG. 157A shows a reflection spectrum for Example 29A.
Figure 158:
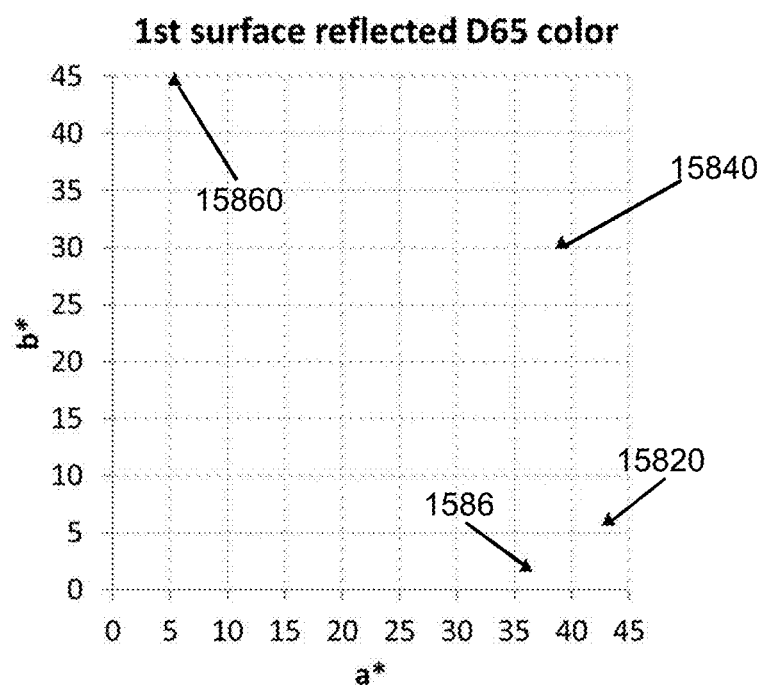
FIG. 158 shows reflected color for Example 29A.

Example 29A was made on a metal mode deposition tool with a stack design configured to mimic the modeled stack of Example 29. FIG. 155 shows a two-surface transmittance spectrum in percent transmittance on the y-axis versus wavelength in nm on the x-axis, for Example 29A, measured with six degree incident light of D65 Illumination. FIG. 156 shows a two-surface transmitted color value, at six degree incident light of D65 Illumination, for Example 29A (triangle data point), wherein a* is about −20, and b* is about 1. FIG. 157 shows a two-surface reflectance spectrum in percent reflectance on the y-axis versus wavelength in nm on the x-axis, for Example 25A, measured with six degree incident light of D65 Illumination. FIG. 157A shows a first-surface reflectance spectrum for Example 29A, measured at angles of incidence of 6 (solid line 1576), 20 (dashed line 15720), 40 (dash-dot line 15740), and 60 (dash-two-dot line 15760), degrees on the outer surface, wherein reflectance is in percent on the y-axis and wavelength is in nm on the x-axis. FIG. 158 shows first-surface reflected color values, under incident light of D65 Illumination, for Example 29A, wherein:

point 1586 is at a six degree incident angle, a* is about 36.0, and b* is about 2.2;

point 15820 is at a 20 degree incident angle, a* is about 43.3, and b* is about 6.2;

point 15840 is at a 40 degree incident angle, a* is about 39.1, and b* is about 30.5;

point 15860 is at a 60 degree incident angle, a* is about 5.4, and b* is about 44.8.

Figure 159:
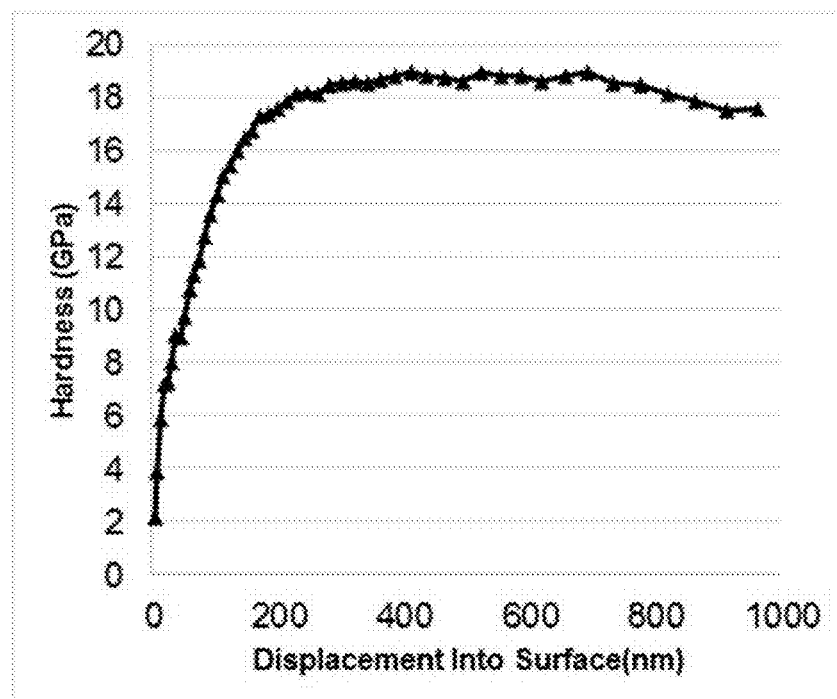
FIG. 159 shows hardness for Example 29A.

The first-surface photopic reflectance (Y), under D65 Illuminant, is 27%. From a comparison of Example 29A with modeled Example 29, it is seen that the first-surface photopic reflectance and first-surface reflected color achieved with the fabricated sample were closely matched with the same values of the modeled example. FIG. 159 shows a hardness trace for Example 29A as measured by the Berkovich Indentation test in GPa along the y-axis versus depth into the coating surface (from the air side being 0) in nm on the x-axis. As seen from FIG. 159, the hardness at 100 nm is greater than 12 GPa, and at 300 to 700 nm is greater than 18 GPa.

Modeled Example 30

TABLE 30

Example 30 Coating Design

| Layer | Material | Refractive Index @550 nm | Physical Thickness (nm) |
|---|---|---|---|
| Medium | Air | 1 | |
| 1 | $SiO_2$ | 1.47924 | 93.1 |
| 2 | $SiO_xN_y$ | 1.95759 | 2000 |
| 3 | $SiO_2$ | 1.47924 | 179.2 |
| 4 | $SiO_xN_y$ | 1.95759 | 88 |
| 5 | $SiO_2$ | 1.47924 | 87.2 |
| 6 | $SiO_xN_y$ | 1.95759 | 98.6 |
| 7 | $SiO_2$ | 1.47924 | 116.9 |
| 8 | $SiO_xN_y$ | 1.95759 | 66.5 |
| 9 | $SiO_2$ | 1.47924 | 147.6 |
| 10 | $SiO_xN_y$ | 1.95759 | 55.6 |
| 11 | $SiO_2$ | 1.47924 | 85.7 |
| 12 | $SiO_xN_y$ | 1.95759 | 62.5 |
| 13 | $SiO_2$ | 1.47924 | 77.07 |
| 14 | $SiO_xN_y$ | 1.95759 | 64.2 |
| 15 | $SiO_2$ | 1.47924 | 74.3 |
| 16 | $SiO_xN_y$ | 1.95759 | 52.4 |
| 17 | $SiO_2$ | 1.47924 | 25 |
| Substrate | Gorilla ® Glass | 1.51 | |
| Medium | Air | 1 | |

| | |
|---|---|
| Total coating thickness (all layers) | 3373.9 nm |
| Thickness (sum) of low-index matl. in coating | 886.1 nm |
| Fraction (%) of low-index matl. in coating | 26.3% |
| Thickness (sum) of low-index matl. above thickest hard layer in coating | 93.1 nm |
| Thickness (sum) of all layers above thickest hard layer in coating | 93.1 nm |
| Fraction (%) of low-index matl. above thickest hard layer in coating | 100% |
| Fraction (%) of low-index matl. above thickest hard layer in coating, relative to total thickness of low-index material in coating | 10.5% |
| Fraction (%) of low-index matl. above thickest hard layer in coating, relative to total thickness of material in coating | 2.75% |

Figure 160:
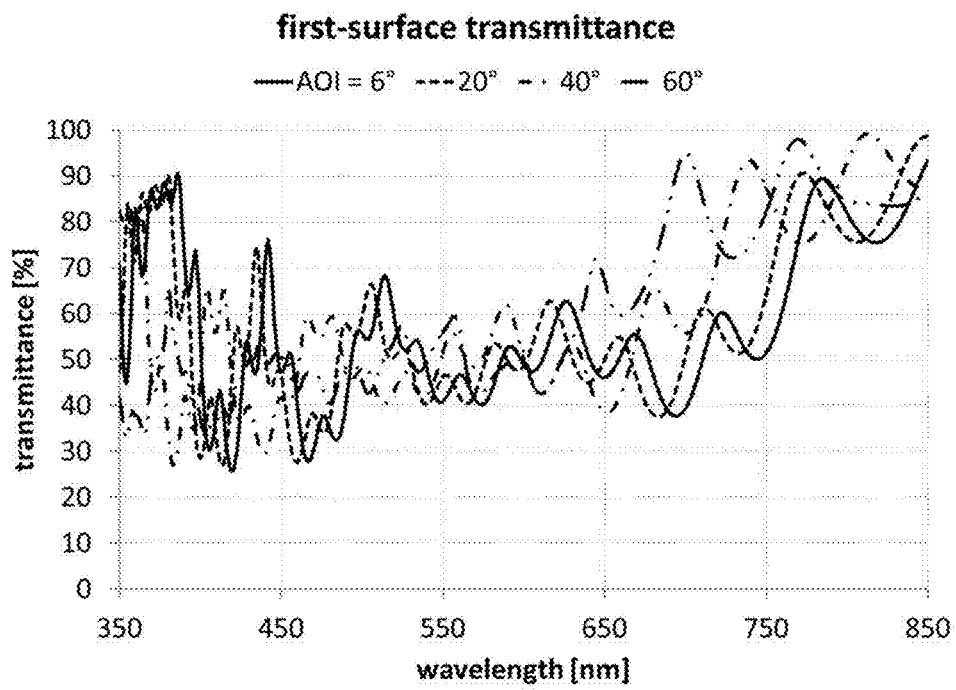
FIG. 160 shows a transmittance spectrum for Example 30.
Figure 161:
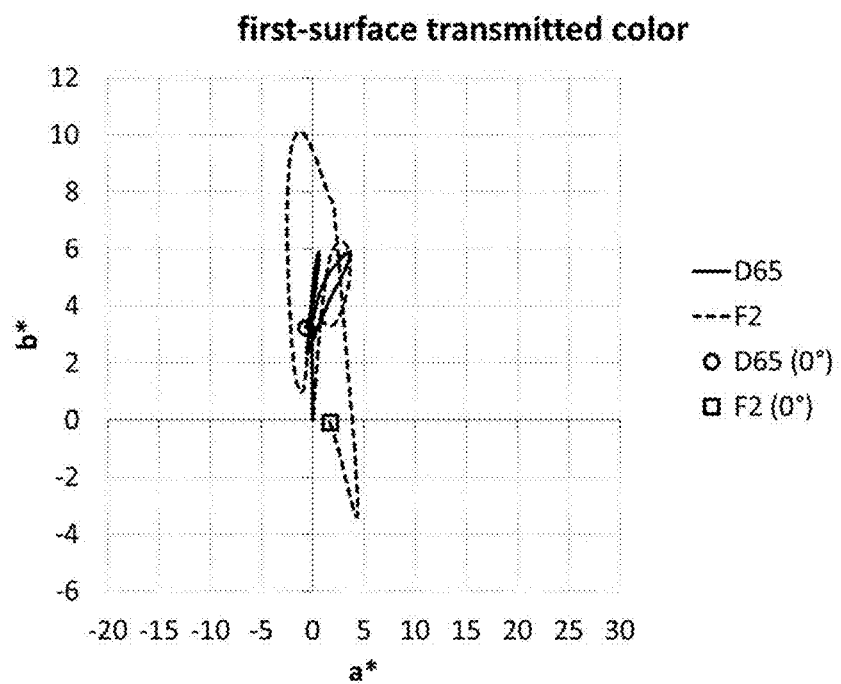
FIG. 161 shows transmitted color for Example 30.
Figure 162:
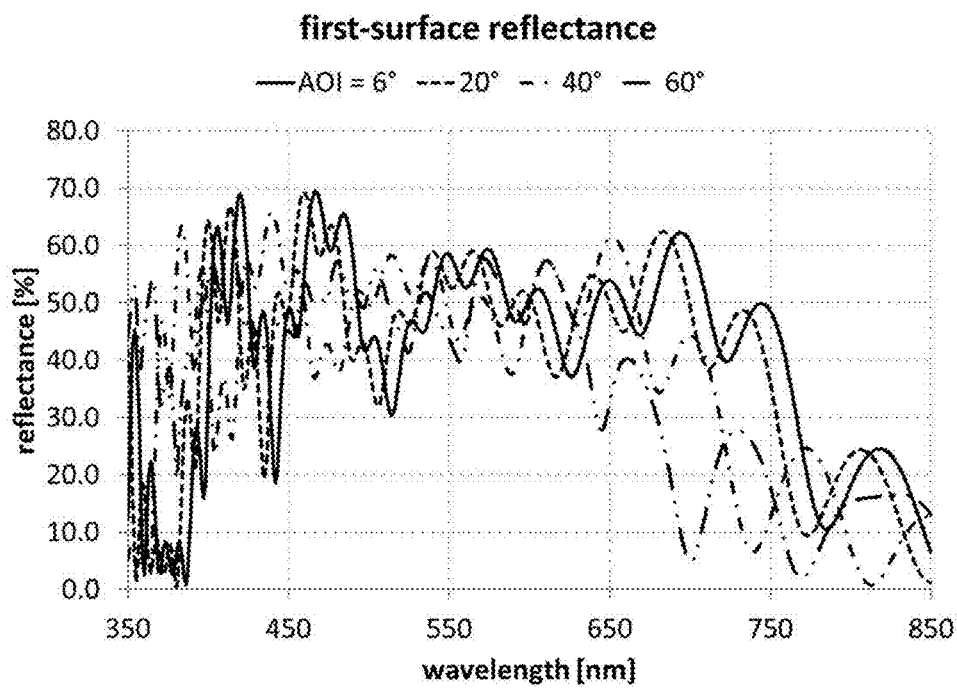
FIG. 162 shows a reflection spectrum for Example 30.
Figure 163:
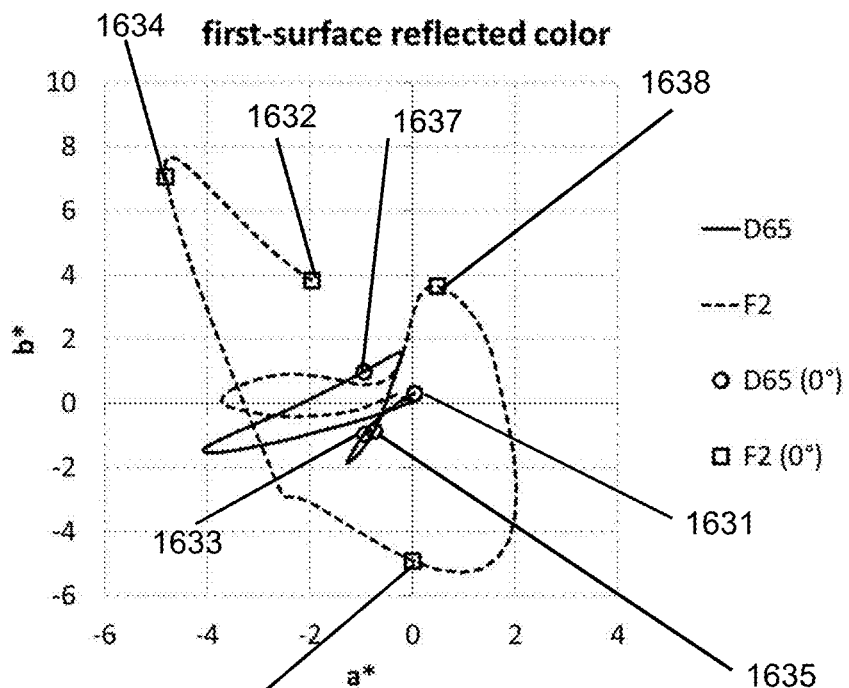
FIG. 163 shows reflected color for Example 30.
Figure 164:
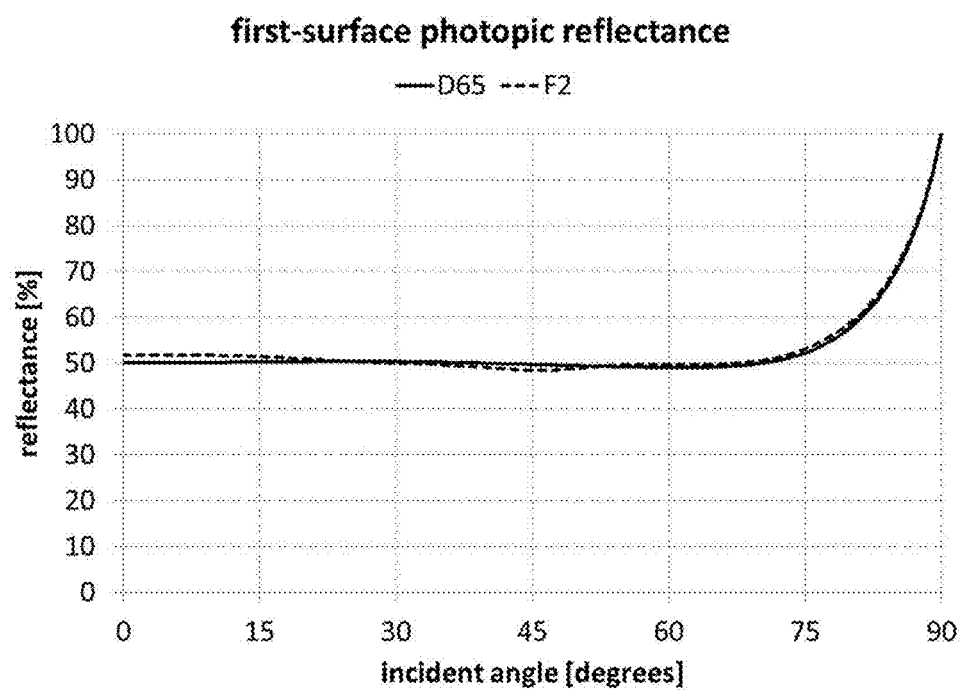
FIG. 164 shows photopic reflectance for Example 30.

FIG. 160 shows a first-surface transmittance spectrum for Example 30, measured at angles of incidence of 6 (solid line), 20 (dashed line), 40 (dash-dot line), and 60 (dash-two-dot line) degrees on the outer surface. FIG. 161 shows the first-surface transmitted color for Example 30, based on incident D65 (solid line) and F2 (dashed line) spectrum, for all incidence angles from 0 degrees to 90 degrees, incident on the outer surface. FIG. 162 shows a first-surface reflectance spectrum for Example 30, measured at angles of incidence of 6 (solid line), 20 (dashed line), 40 (dash-dot line), and 60 (dash-two-dot line) degrees on the outer surface. FIG. 163 shows the first-surface reflected color for Example 30, based on an incident D65 (solid line) and F2 (dashed line) spectrum, for all incidence angles from 0 degrees to 90 degrees, incident on the outer surface. In FIG. 163, points 1631, 1633, 1635, and 1637, respectively are incident angles of 6, 20, 40, and 60 degrees for D65 illuminant, whereas points 1632, 1634, 1636, and 1638, respectively are incident angles of 6, 20, 40, and 60 degrees for F2 illuminant FIG. 164 shows, on log scale, the photopic reflectance as a function of each D65 (solid line) and F2 (dashed line) illuminants at incident angles from 0 to 90 degrees, incident on the outer surface. Example 30 had, at normal to near normal incidence (six degrees), under D65 illuminant, in the CIE L* a* b* color space, a first-surface: photopic reflectance of 50.1%; reflected color a* value of −0.1, b* value of 0.2; and thus provided a high-reflectance, high-color 'silver' scratch-resistant coating on a glass substrate.

Example 30A

Figure 165:
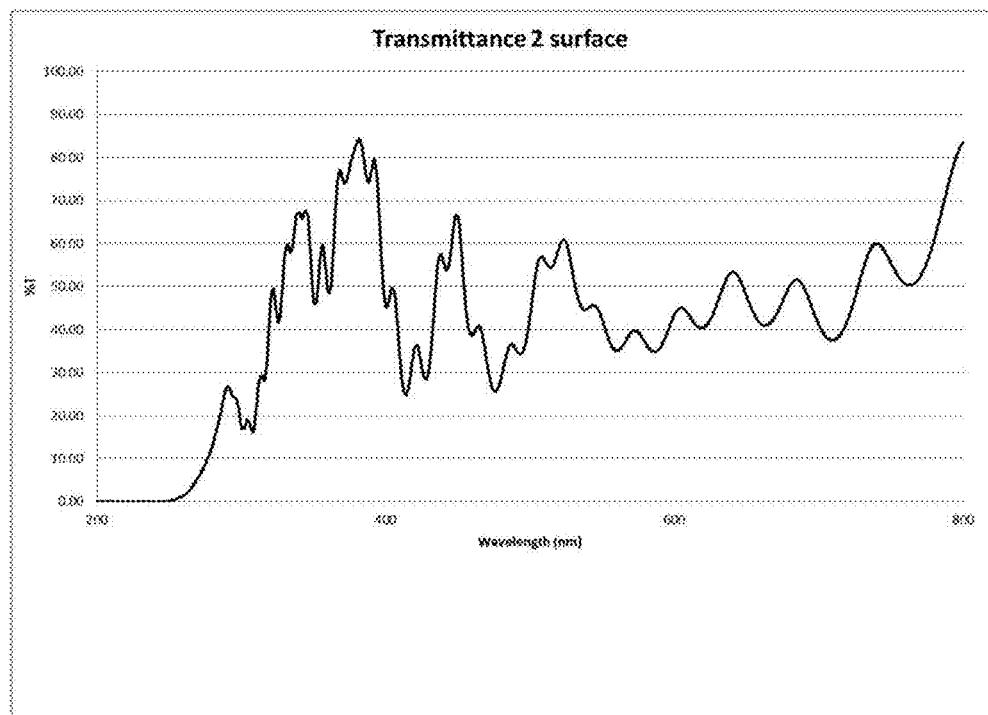
FIG. 165 shows a transmittance spectrum for Example 30A.
Figure 166:
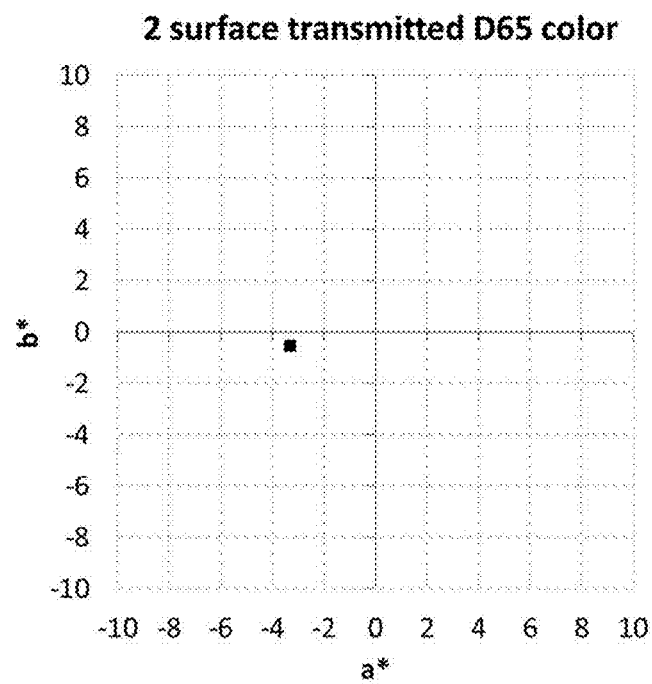
FIG. 166 shows transmitted color for Example 30A.
Figure 167:
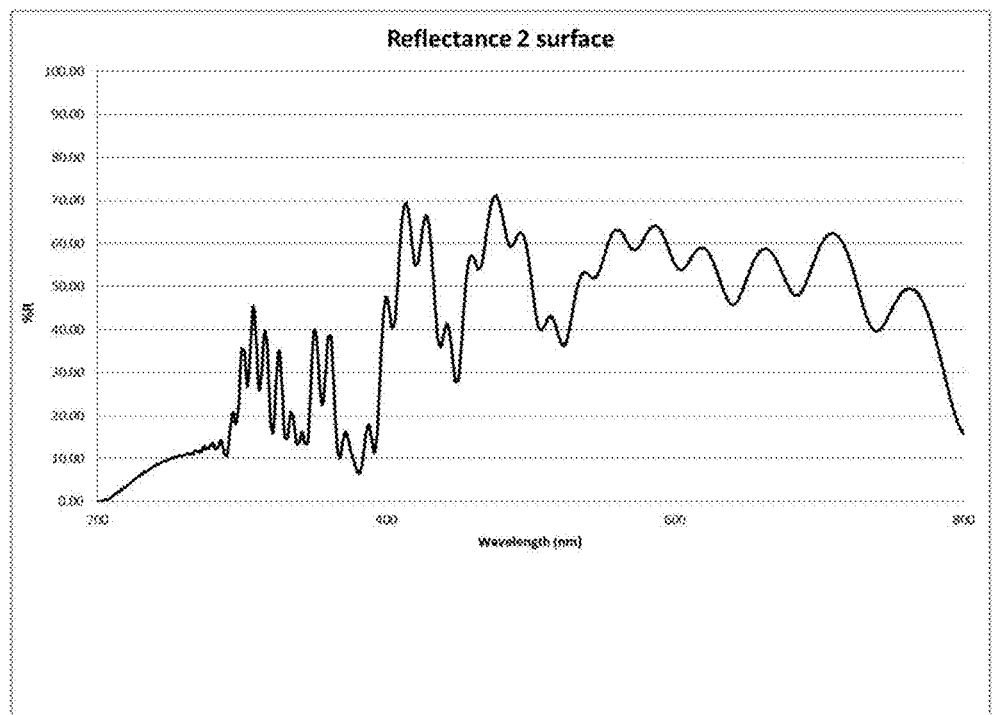
FIG. 167 shows a reflection spectrum for Example 30A.
Figure 167A:
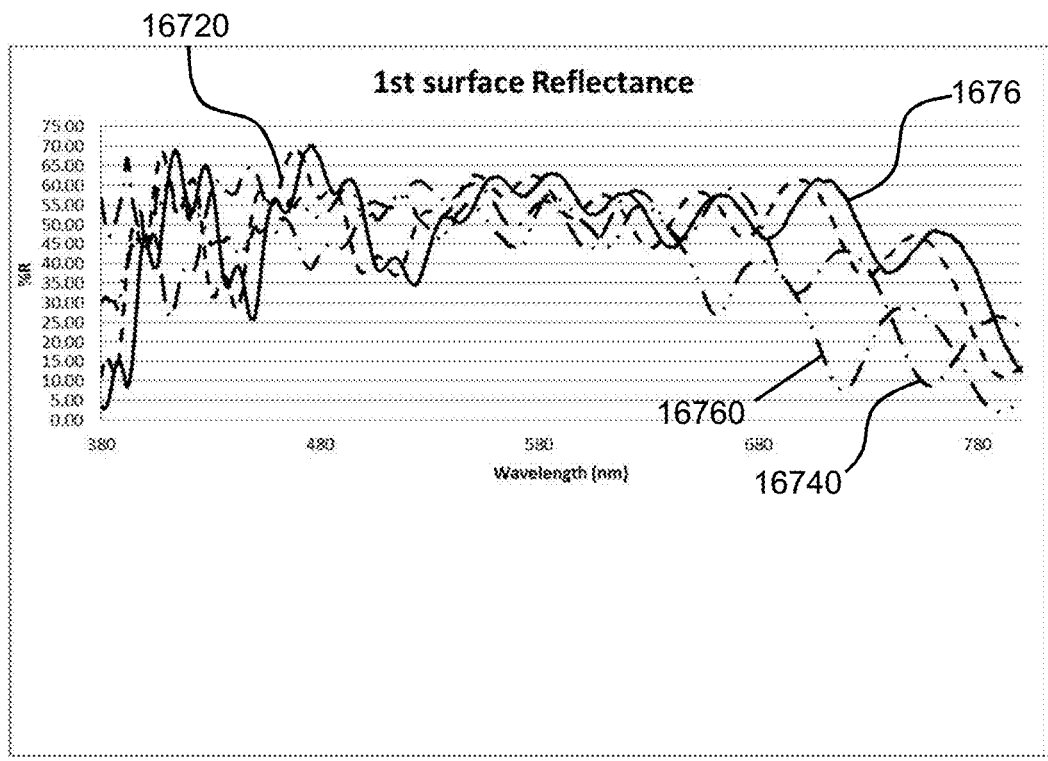
FIG. 167A shows a reflection spectrum for Example 30A.
Figure 168:
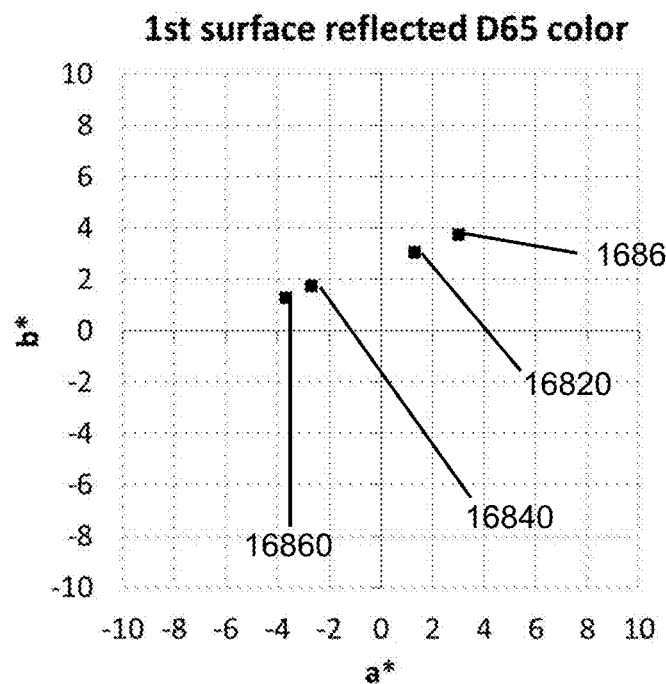
FIG. 168 shows reflected color for Example 30A.

Example 30A was made on a metal mode deposition tool with a stack design configured to mimic the modeled stack of Example 30. FIG. 165 shows a two-surface transmittance spectrum in percent transmittance on the y-axis versus wavelength in nm on the x-axis, for Example 30A, measured with six degree incident light of D65 Illumination. FIG. 166 shows a two-surface transmitted color value, at six degree incident light of D65 Illumination, for Example 30A (square data point), wherein a* is about −3.3, and b* is about −0.5. FIG. 167 shows a two-surface reflectance spectrum in percent reflectance on the y-axis versus wavelength in nm on the x-axis, for Example 30A, measured with six degree incident light of D65 Illumination. FIG. 167A shows a first-surface reflectance spectrum for Example 30A, measured at angles of incidence of 6 (solid line 1676), 20 (dashed line 16720), 40 (dash-dot line 16740), and 60 (dash-two-dot line 16760), degrees on the outer surface, wherein reflectance is in percent on the y-axis and wavelength is in nm on the x-axis. FIG. 168 shows first-surface reflected color values, under incident light of D65 Illumination, for Example 30A, wherein:

point 1686 is at a six degree incident angle, a* is about 3.0, and b* is about 3.7;

point 16820 is at a 20 degree incident angle, a* is about 1.3, and b* is about 3.0;

point 16840 is at a 40 degree incident angle, a* is about −2.7, and b* is about 1.7;

point 16860 is at a 60 degree incident angle, a* is about −3.7, and b* is about 1.3.

Figure 169:
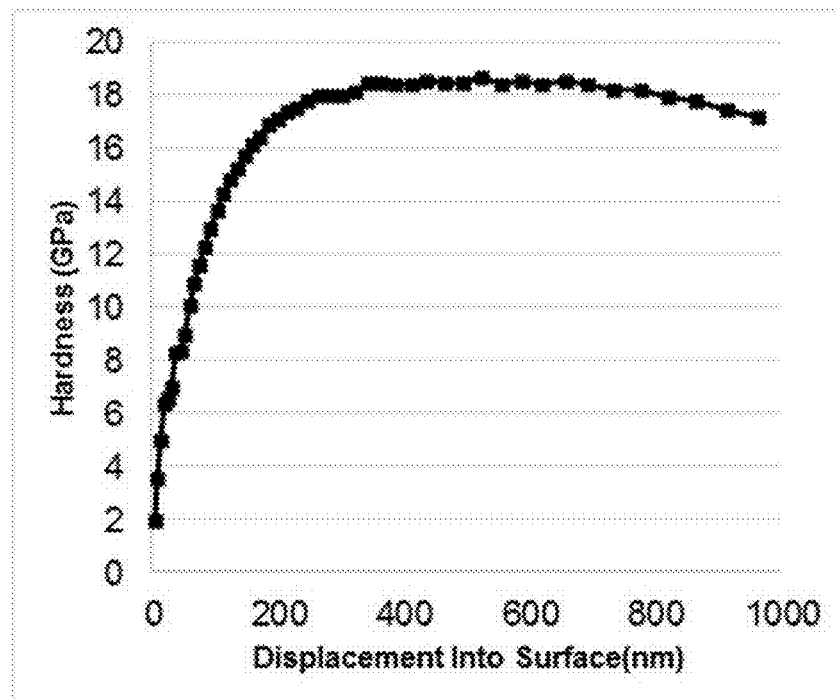
FIG. 169 shows hardness for Example 30A.

The first-surface photopic reflectance (Y), under D65 Illuminant, is 54%. From a comparison of Example 30A with modeled Example 30, it is seen that the first-surface photopic reflectance and first-surface reflected color achieved with the fabricated sample were closely matched with the same values of the modeled example. FIG. 169 shows a hardness trace for Example 30A as measured by the Berkovich Indentation test in GPa along the y-axis versus depth into the coating surface (from the air side being 0) in nm on the x-axis. As seen from FIG. 169, the hardness at 100 nm is greater than 12 GPa, and at 300 to 700 nm is greater than 18 GPa.

Modeled Examples 28-30, and Examples 28A, 29A, and 30A, show that significant color can be achieved even when the thick, scratch-resistant layer is near the top of the stack. And in these examples, the scratch-resistant layer provides good mechanical performance in terms of, among other things, protection to the layers under it from scratch as well as puncture and/or indentation resistance. Accordingly, in some embodiments, it is advantageous to have the scratch-resistant layer as the top-most layer in the stack, or the next-to-top most layer in the stack (excluding any easy-to-clean coating layers that may be placed on the stack). Stated another way, in some embodiments it is advantageous to have a small amount of low-index (and/or total) material above the scratch-resistant layer (thickest layer) in the stack. Thus, for example, in Modeled Examples 28-30, the percent of material (in this case also of low index material) above the scratch resistant layer as a percentage of total stack thickness is less than or equal to 5%, for example less than or equal to 4%, for example less than or equal to 3.5%, for example less than or equal to 3.0%, or for example less than or equal to 2.75%. Further, for example, it may be advantageous to minimize the amount of low-index material above the scratch-resistant layer, by having a low percentage of low index material, as a percent of total low-index material in the stack, located above the scratch resistant layer. Thus, for example, in Modeled Examples 28-30 the percentage of low index material above the scratch-resistant layer, as a percentage of total low index material in the stack is less than 25.0%, for example less than 20.0%, for example less than 15.0%, for example less than 10.5%.

For Examples 28A, 29A, and 30A, the stress and average surface roughness (Ra) of the samples were measured, on sample sizes of 50 mm by 50 mm, and are given in Table E, below. The measurement window for surface roughness was a 2 micron by 2 micron square area. The stress in each sample was calculated using Stoney's Equation from the measured change in warp of the substrate, wherein the change in warp was the difference of the warp before the coating was applied, and that after coating. A compressive stress (as indicated by a negative number) is beneficial for mechanical properties of the coating, for example, for scratch resistance, resistance to delamination, and/or crack resistance. It is beneficial to have low average surface roughness in order to promote durability of the coating and/or durability of polymer coatings applied on top thereof, for example an easy-to-clean (ETC) coating. Additionally, the water contact angle for each sample was measured after a coating of ETC fluoropolymer was applied to the surface. The water contact angle is a measurement of the hydrophobic nature of the surface, wherein the greater the angle, the more hydrophobic the surface, which promotes water repellency and a greater ability to easily clean the surface.

TABLE E

Measured Properties of Examples 28A, 29A, and 30A

| Example | Stress (MPa) | (Ra) in nm in 2 × 2 micron window | Water Contact Angle after ETC |
| --- | --- | --- | --- |
| 28A | −217 | 2.7 | Greater than 100° |
| 29A | −258 | 3.0 | Greater than 100° |
| 30A | −244 | 3.1 | Greater than 100° |

As can be seen from the above Table E, the Examples of the present disclosure can beneficially provide a compressive stress of between 50 and 400 MPa, for example, between 100 and 300 MPa, for example between 100 and 250 MPa, for example between 100 MPa and 400 MPa, for example, between 200 MPa and 400 MPa, for example between 200 MPa and 300 MPa. Additionally, again from Table E, the Examples of the present disclosure can beneficially provide an average surface roughness Ra of less than 5 nm, for example less than 4 nm, for example less than or equal to 3 nm, for example between 2 and 5 nm, for example between 2.5 and 3.5 nm, for example between 2.5 and 3 nm.

It will be apparent to those skilled in the art that various modifications and variations can be made without departing from the spirit or scope of the disclosure.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The invention claimed is:

1. An article comprising:
   a substrate having a major surface;
   an optical coating disposed on the major surface, the optical coating comprising a multilayer interference stack, the multilayer interference stack having an outer surface opposite the major surface; and
   the article exhibiting a maximum hardness of about 12 GPa or greater as measured on the outer surface by a Berkovich Indenter Hardness Test along an indentation depth of about 100 nm to about 500 nm,
   wherein the article exhibits:
   a reflected angular color shift of about 12 or more for at least one incident illumination angle from 20 degrees to 80 degrees, referenced to normal incidence, under an International Commission on Illumination illuminant selected from the group consisting of A series illuminants, B series illuminants, C series illuminants, D series illuminants, and F series illuminants, wherein angular color shift is calculated using the equation $\sqrt{((a*2-a*1)^2+(b*2-b*1)^2)}$, with a*1, and b*1 representing the coordinates of the article when viewed at normal incidence and a*2, and b*2 representing the coordinates of the article when viewed at the incident illumination angle, and
   wherein the article exhibits at least one of:
   (1) a single side photopic average light reflectance of about 12% or more and
   (2) a single side maximum reflectance of about 12% or more,
   measured at the outer surface for at least one near normal incident angle over an optical wavelength regime in the range from about 400 nm to about 700 nm.

2. The article of claim 1, wherein the article exhibits article reflectance color coordinates in the (L*, a*, b*) colorimetry system for at least one incidence angle from 0 degrees to 90 degrees under an International Commission on Illumination illuminant exhibiting a reference point color shift of more than about 12 from a reference point as measured at the outer surface, the reference point comprising at least one of the color coordinates (a*=0, b*=0), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

3. The article of claim 2, wherein the article is a sunglass lens.

4. The article of claim 1, wherein the article exhibits article reflectance color coordinates in the (L*, a*, b*) colorimetry system for all incidence angles from 0 degrees to 90 degrees under an International Commission on Illumination illuminant exhibiting a reference point color shift of less than about 12 from a reference point as measured at the outer surface, the reference point comprising at least one of the color coordinates (a*=0, b*=0), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

5. The article of claim 4, wherein the article is a sunglass lens.

6. The article of claim 1, wherein the article exhibits:

a photopic average light transmission of about 5% to about 50% over an optical wavelength regime from about 400 nm to about 800 nm;

article transmittance color coordinates in the (L*, a*, b*) colorimetry system at normal incidence under an International Commission on Illumination illuminant exhibiting a reference point color shift of less than about 12 from a reference point as measured at the outer surface, the reference point comprising at least one of the color coordinates (a*=0, b*=0) and the transmittance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

7. The article of claim 6, wherein the article exhibits:

article transmittance color coordinates in the (L*, a*, b*) colorimetry system at all incidence angles from 0 degrees to 90 degrees under an International Commission on Illumination illuminant exhibiting a reference point color shift of less than about 12 from a reference point as measured at the outer surface, the reference point comprising at least one of the color coordinates (a*=0, b*=0) and the transmittance color coordinates of the substrate.

8. The article of claim 1, wherein the substrate has a hardness less than the maximum hardness of the article.

9. The article of claim 1, further comprising an easy-to-clean coating, a diamond-like coating or a scratch-resistant coating disposed on the optical coating.

10. The article of claim 1, wherein the optical coating comprises a scratch resistant layer having a thickness in the range from about 500 nm to about 5000 nm.

11. The article of claim 10, wherein the multilayer interference stack is disposed between the scratch resistant layer and the substrate.

12. The article of claim 10, wherein:

the multilayer interference stack comprises at least one layer comprising a material having a hardness of 10 GPa or less, and at least one layer comprising a material having a hardness of 12 GPa or more.

13. The article of claim 12, wherein:

the total thickness of layers in multilayer interference stack having a hardness of 10 GPa or less is 600 nm or less.

14. The article of claim 12, wherein:

the total thickness of layers in multilayer interference stack having a hardness of 10 GPa or less is 45 percent or less of the total thickness of the multilayer interference stack.

15. The article of claim 1, wherein, when the topmost 200 nm of the optical coating is removed:

the near-normal photopic average reflectance changes by about 10% or less, and the range of reflected color for all angles from 0 to 90 degrees shifts by about 6 or less, relative to the near-normal photopic average reflectance and reflected color prior to removal of the topmost 200 nm of the optical coating.

16. Glasses, comprising a lens, wherein the lens comprises an article according to claim 1.

17. A consumer electronic product, comprising:

a housing having a front surface, a back surface and side surfaces;

electrical components provided at least partially within the housing, the electrical components including at least a controller, a memory, and a display, the display being provided at or adjacent the front surface of the housing; and a cover substrate disposed over the display, wherein at least one of a portion of the housing or the cover substrate comprises the article of claim 1.

18. An article comprising:

a substrate having a major surface;

an optical coating disposed on the major surface, the optical coating comprising a multilayer interference stack, the multilayer interference stack having an outer surface opposite the major surface; and the article exhibiting a maximum hardness of about 10 GPa or greater as measured on the outer surface by a Berkovich Indenter Hardness Test along an indentation depth from about 200 nm to about 600 nm, wherein the article exhibits at least one of:

(1) a single side photopic average light reflectance of about 12% or more and (2) a single side maximum reflectance of about 12% or more, measured at the outer surface for at least one near normal incident angle over an optical wavelength regime in the range from about 400 nm to about 700 nm.

19. The article of claim 18, wherein the article exhibits a maximum hardness of about 10 GPa or greater as measured on the outer surface by a Berkovich Indenter Hardness Test along an indentation depth from about 200 nm to about 400 nm.

20. The article of claim 18, wherein the article exhibits a maximum hardness of about 12 GPa or greater as measured on the outer surface by a Berkovich Indenter Hardness Test along an indentation depth from about 200 nm to about 600 nm.

21. The article of claim 18, wherein the article exhibits a maximum hardness of about 14 GPa or greater as measured on the outer surface by a Berkovich Indenter Hardness Test along an indentation depth from about 200 nm to about 600 nm.

22. The article of claim 18, wherein the article exhibits a maximum hardness of about 16 GPa or greater as measured on the outer surface by a Berkovich Indenter Hardness Test along an indentation depth from about 200 nm to about 600 nm.

23. The article of claim 18, wherein the article exhibits a compressive stress of between 50 MPa and 400 MPa.

24. The article of claim 18, wherein the multilayer interference stack comprises a plurality of layers, wherein the plurality of layers comprises a first low RI layer, and a second high RI layer.

25. The article of claim 24, wherein the multilayer interference stack comprises a plurality of periods such that the first low RI layer and the second high RI layer alternate.

26. The article of claim 25, wherein the multilayer interference stack comprises up to about 10 periods.

27. The article of claim 18, wherein the article exhibits article reflectance color coordinates in the (L*, a*, b*) colorimetry system for at least one incidence angle from 0 degrees to 60 degrees under an International Commission on Illumination illuminant exhibiting a reference point color shift of 100 or less from a reference point as measured at the outer surface, the reference point comprising at least one of the color coordinates (a*=0, b*=0), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

28. The article of claim 18, wherein the article exhibits article reflectance color coordinates in the (L*, a*, b*) colorimetry system for all incidence angles from 0 degrees to 60 degrees under an International Commission on Illumination illuminant exhibiting a reference point color shift of 100 or less from a reference point as measured at the outer surface, the reference point comprising at least one of the color coordinates (a*=0, b*=0), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

29. The article of claim 18, wherein the article exhibits article reflectance color coordinates in the (L*, a*, b*) colorimetry system for at least one incidence angle from 0 degrees to 60 degrees under an International Commission on Illumination illuminant exhibiting a reference point color shift of 12 or more from a reference point as measured at the outer surface, the reference point comprising at least one of the color coordinates (a*=0, b*=0), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates of the substrate, the color shift is defined by $\sqrt{((a^*_{article}-a^*_{substrate})^2+(b^*_{article}-b^*_{substrate})^2)}$.

* * * * *

UNITED STATES PATENT AND TRADEMARK OFFICE
CERTIFICATE OF CORRECTION

Page 1 of 1

PATENT NO. : 11,016,680 B2
APPLICATION NO. : 16/229673
DATED : May 25, 2021
INVENTOR(S) : Shandon Dee Hart et al.

It is certified that error appears in the above-identified patent and that said Letters Patent is hereby corrected as shown below:

On the Title Page

On page 2, in Column 2, item (56), Other Publications, Line 6, delete "Vo.. 356," and insert -- Vol. 356, --, therefor.

Signed and Sealed this
Twenty-fifth Day of July, 2023

Katherine Kelly Vidal
*Director of the United States Patent and Trademark Office*